United States Patent
Mochizuki et al.

(10) Patent No.: US 10,616,885 B2
(45) Date of Patent: Apr. 7, 2020

(54) COMMUNICATION SYSTEM

(71) Applicant: Mitsubishi Electric Corporation, Chiyoda-ku (JP)

(72) Inventors: Mitsuru Mochizuki, Tokyo (JP); Noriyuki Fukui, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/745,813

(22) PCT Filed: May 24, 2016

(86) PCT No.: PCT/JP2016/065257
§ 371 (c)(1),
(2) Date: Jan. 18, 2018

(87) PCT Pub. No.: WO2017/026159
PCT Pub. Date: Feb. 16, 2017

(65) Prior Publication Data
US 2018/0213530 A1 Jul. 26, 2018

(30) Foreign Application Priority Data
Aug. 11, 2015 (JP) .................................. 2015-159063

(51) Int. Cl.
*H04W 72/04* (2009.01)
*H04L 5/00* (2006.01)
*H04W 72/12* (2009.01)

(52) U.S. Cl.
CPC ....... *H04W 72/0446* (2013.01); *H04L 5/0044* (2013.01); *H04W 72/12* (2013.01); *H04L 5/0007* (2013.01)

(58) Field of Classification Search
None
See application file for complete search history.

(56) References Cited

U.S. PATENT DOCUMENTS

| | | | |
|---|---|---|---|
| 8,498,235 B2 | 7/2013 | Miki et al. | |
| 9,407,408 B2 * | 8/2016 | Chun | H04L 5/0048 |
| (Continued) | | | |

FOREIGN PATENT DOCUMENTS

| | | |
|---|---|---|
| JP | 2009-212597 A | 9/2009 |
| WO | WO 2014/069598 A1 | 5/2014 |

OTHER PUBLICATIONS

International Preliminary Report on Patentability and Written Opinion dated Feb. 22, 2018 in PCT/JP2016/065257 with English translation.

(Continued)

*Primary Examiner* — Jamaal Henson
(74) *Attorney, Agent, or Firm* — Oblon, McClelland, Maier & Neustadt, L.L.P.

(57) ABSTRACT

A PDSCH of a legacy UE is mapped to physical resources per subframe, whereas a PDSCH of an LR-UE is mapped, per physical resource block (PRB) included in the subframe, to a region of the physical resources to which the PDSCH of the legacy UE is mapped. The PDSCH of the legacy UE may be also mapped to the physical resources per PRB pair including two physical resource blocks, whereas the PDSCH of the LR-UE may be mapped to the remaining physical resources excluding the PRB pairs to which the PDSCH of the legacy UE is mapped.

2 Claims, 41 Drawing Sheets

(56) References Cited

U.S. PATENT DOCUMENTS

| | | | | |
|---|---|---|---|---|
| 2013/0064196 | A1* | 3/2013 | Gao | H04L 5/0055 370/329 |
| 2013/0088985 | A1* | 4/2013 | Park | H04W 48/16 370/252 |
| 2013/0114570 | A1* | 5/2013 | Park | H04L 5/0053 370/335 |
| 2014/0094216 | A1* | 4/2014 | Park | H04W 52/242 455/522 |
| 2016/0100395 | A1* | 4/2016 | Xu | H04L 1/1607 370/336 |
| 2018/0213530 | A1* | 7/2018 | Mochizuki | H04W 72/12 |
| 2018/0302868 | A1* | 10/2018 | Bhorkar | H04W 56/0005 |
| 2019/0029013 | A1* | 1/2019 | Xu | H04L 1/1812 |

OTHER PUBLICATIONS

Huawei, HiSilicon, "*Motivation of New SI Proposal Latency Reduction*", 3GPP TSG RAN Meeting #67, RP-150238, Mar. 2015, retrieved from the Internet <URL: http://www.3gpp.org/ftp/tsg_ran/TSG_-_RAN/TSGR_-_67/Docs/RP-150238.zip> [retrieved on Aug. 3, 2016]. 13 pages.

Catt, China Telecom, "*Initial analysis on latency reduction*", 3GPP TSG RAN WG2 Meeting #90, R2-152274, May 2015, retrieved from the Internet <URL: http://www.3gpp.org/ftp/tsg_ran/WG2 - RL2/TSGR2 - 90/Docs/R2-152274.zip> [retrieved on Aug. 3, 2016], 7 pages.

3GPP TS 36.300 V13.0.0, "*3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)*", Jun. 2015, pp. 1-254.

3GPP TSG-SA1 #42, S1-083461, "*LS on HNB/HeNB Open Access Mode*", Oct. 2008, 2 pages.

3GPP TSG-RAN meeting #62, R2-082899, "*LS on CSG cell identification*", May 2008, 2 pages.

3GPP TR 36.814 V9.0.0, "*3rd Generation Partnership Project; Technical Specification Group Radio Access Network; Evolved Universal Terrestrial Radio Access (E-UTRA); Further advancements for E-UTRA physical layer aspects (Release 9)*", Mar. 2010, pp. 1-104.

3GPP TR 36.912 V10.0.0, "*3rd Generation Partnership Project; Technical Specification Group Radio Access Network; Feasibility study for Further Advancements for E-UTRA (LTE-Advanced) (Release 10)*", Mar. 2011, 252 pages.

3GPP TR 36.819 V11.2.0, "*3rd Generation Partnership Project; Technical Specification Group Radio Access Network; Coordinated multi-point operation for LTE physical layer aspects (Release 11)*", Sep. 2013, pp. 1-70.

3GPP TSG RAN Meeting #67, RP-150465 (revision of RP-150309), "*New SI proposal: Study on Latency reduction techniques for LTE*", Mar. 2015, 7 pages.

3GPP TS 36.141 V13.0.0, "*3rd Generation Partnership Project; Technical Specification Group Radio Access Network; Evolved Universal Terrestrial Radio Access (E-UTRA); Base Station (BS) conformance testing (Release 13)*", Jul. 2015, pp. 1-266.

3GPP TS 36.211 V12.6.0, "*3rd Generation Partnership Project; Technical Specification Group Radio Access Network; Evolved Universal Terrestrial Radio Access (E-UTRA); Physical channels and modulation (Release 12)*", Jun. 2015, pp. 1-136.

3GPP TS 36.212 V12.5.0, "*3rd Generation Partnership Project: Technical Specification Group Radio Access Network; Evolved Universal Terrestrial Radio Access (E-UTRA); Multiplexing and channel coding (Release 12)*", Jun. 2015, pp. 1-94.

Roessler, A., et al., "*LTE-Advanced (3GPP Rel.11) Technology Introduction*", White Paper, Rohde & Schwarz Japan, Jul. 2013, 1MA232_1J, 84 pages.

3GPP TS 36.213 V12.6.0, "*3rd Generation Partnership Project; Technical Specification Group Radio Access Network; Evolved Universal Terrestrial Radio Access (E-UTRA); Physical layer procedures (Release 12)*", Jun. 2015, pp. 1-241.

International Search Report dated Aug. 16, 2016 in PCT/JP2016/065257, filed on May 24, 2016.

Extended European Search Report dated Feb. 11, 2019 in corresponding European Patent Application No. 16834856.3, 7 pages.

\* cited by examiner

F I G . 1
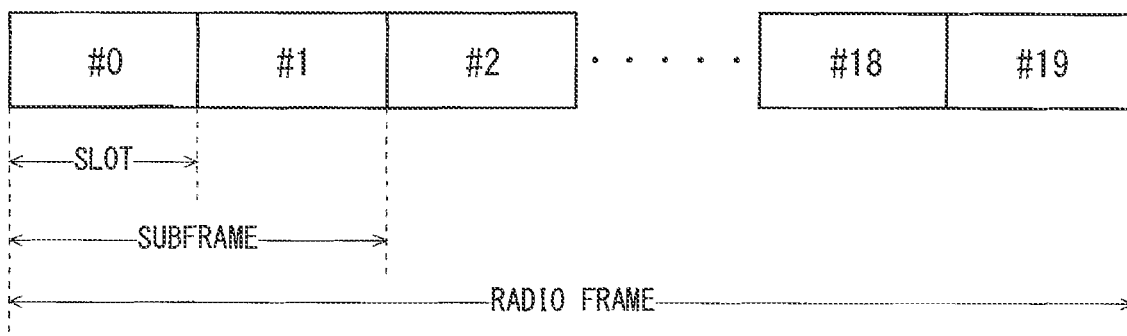

F I G. 2

F I G . 5
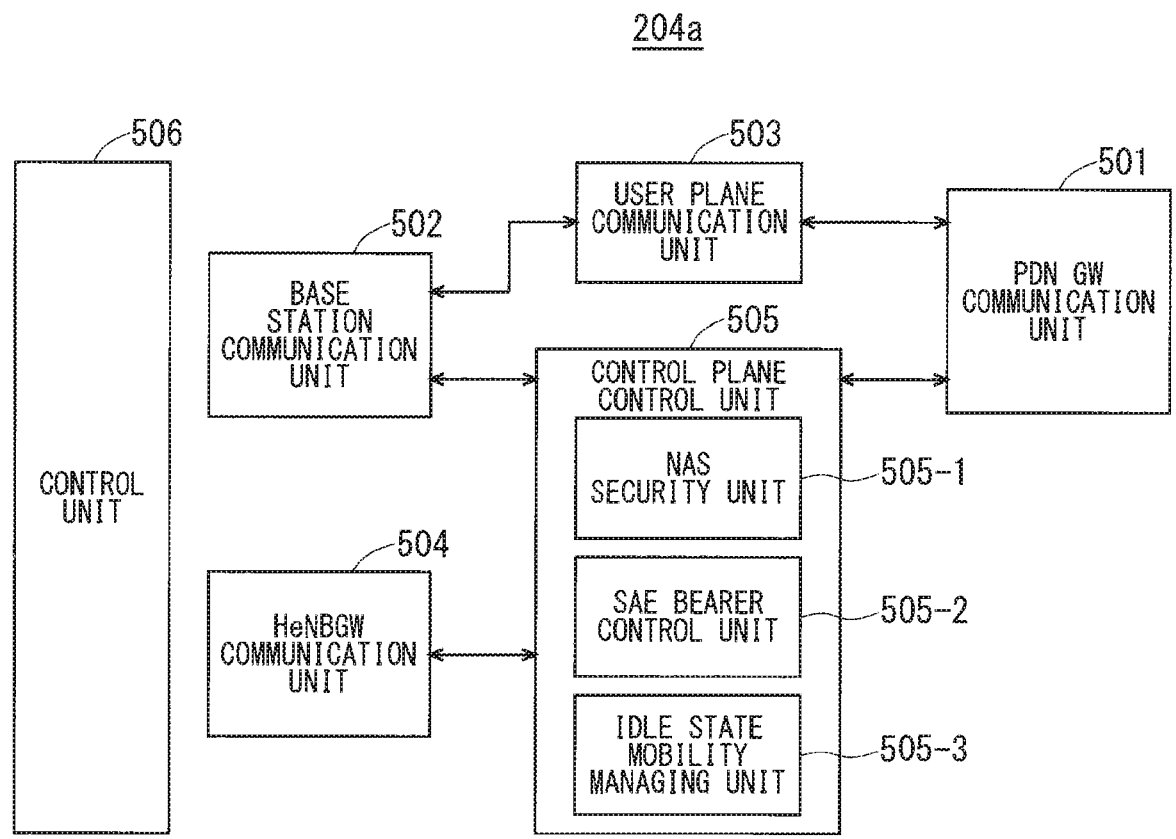

F I G. 9
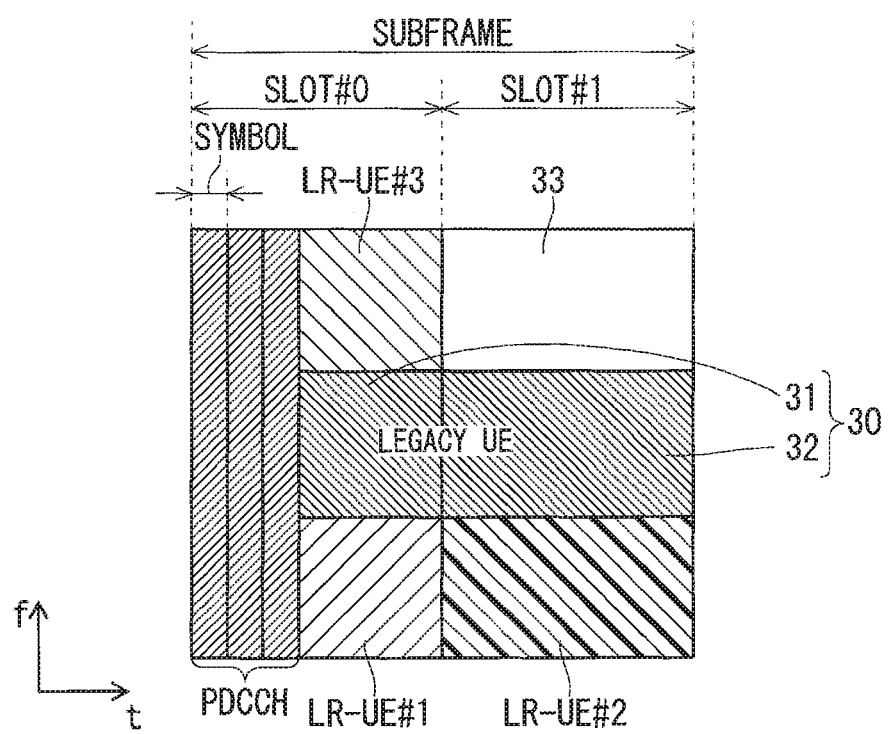

F I G . 2 4
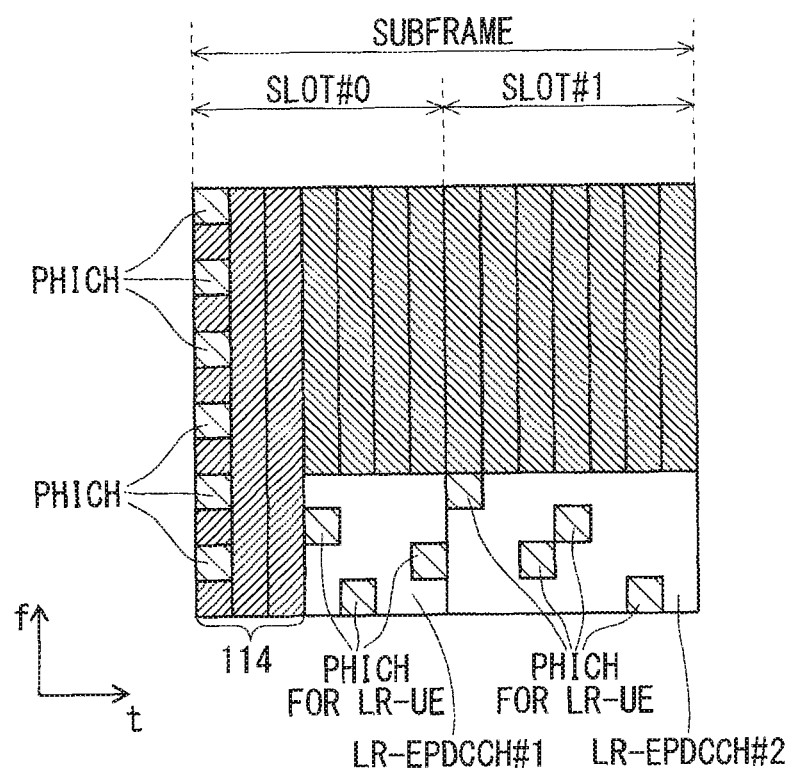

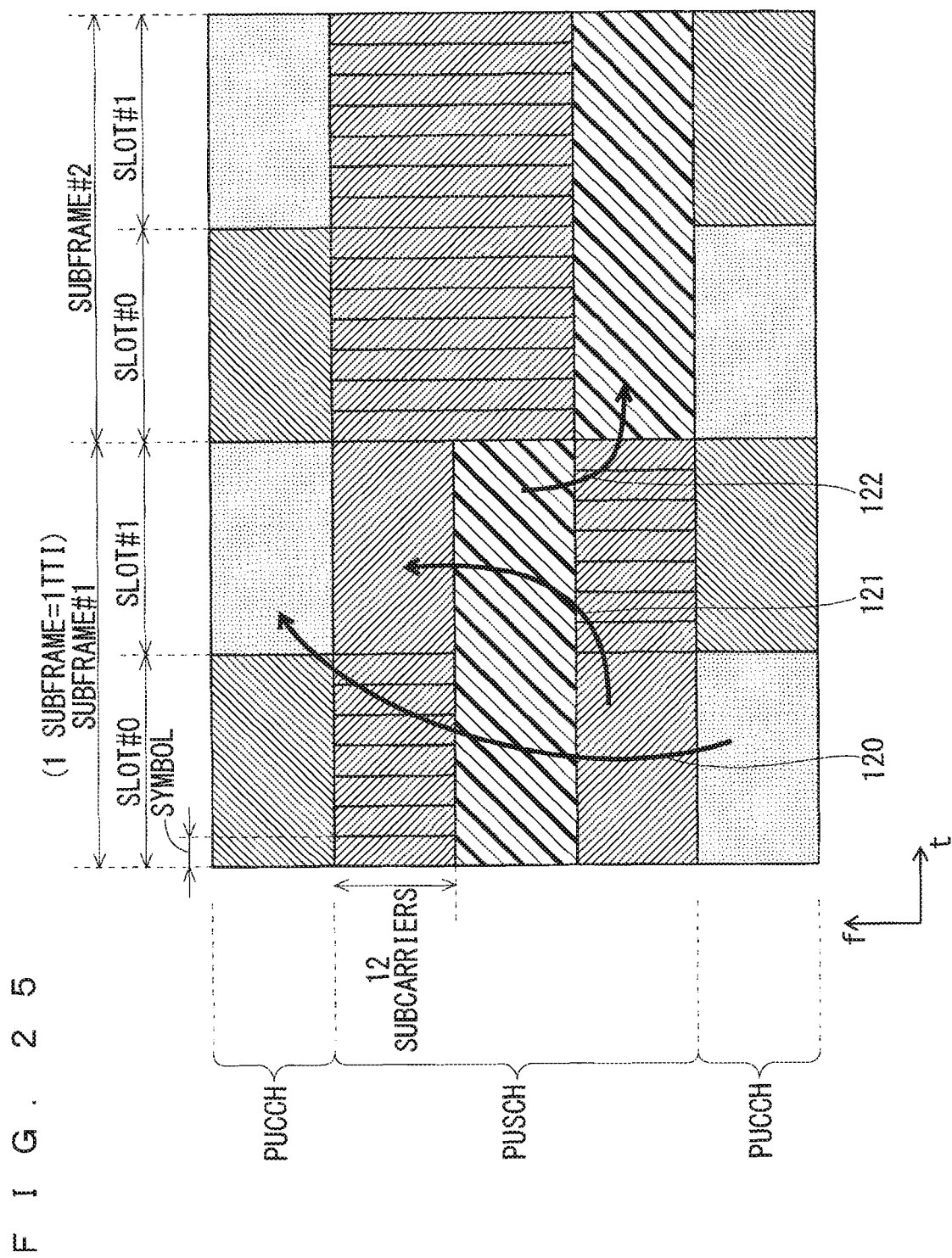

F I G . 3 9
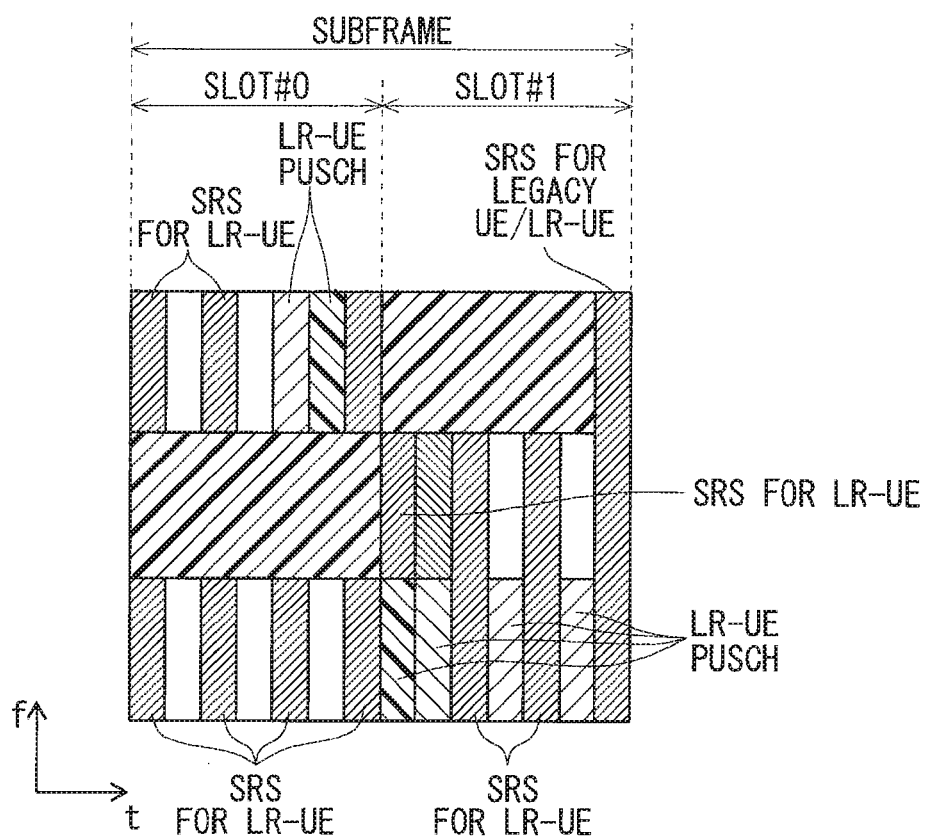

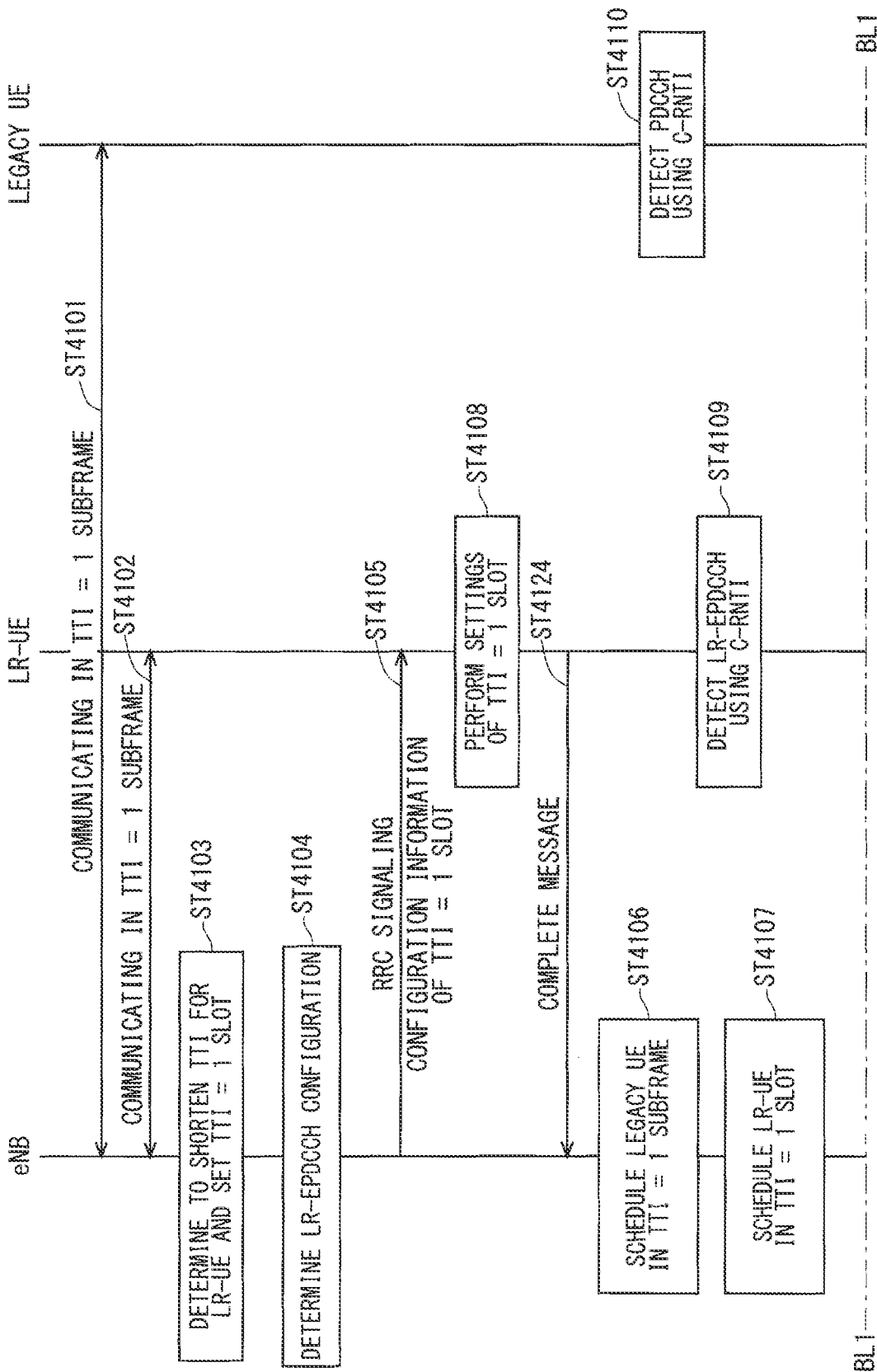
F I G. 41

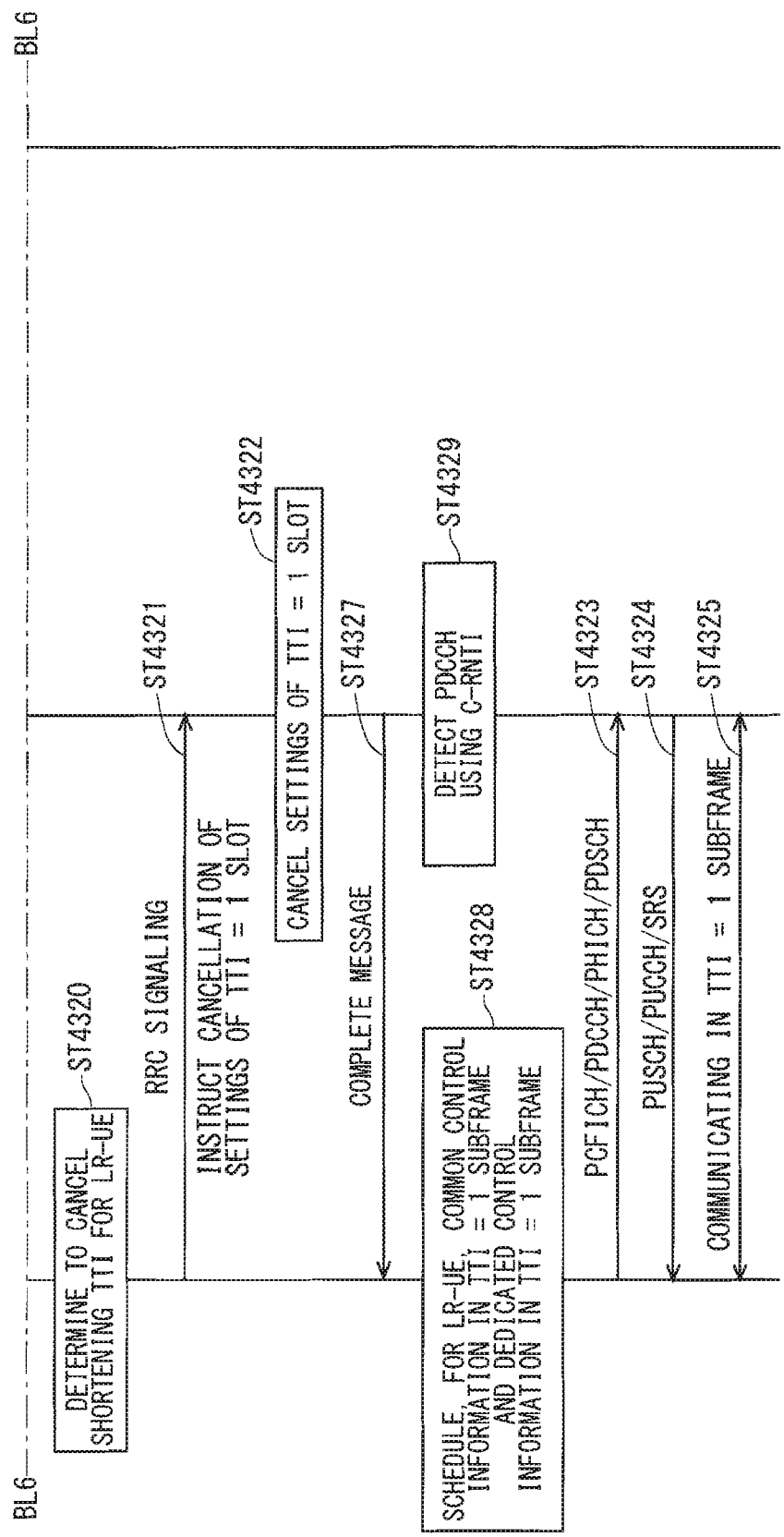

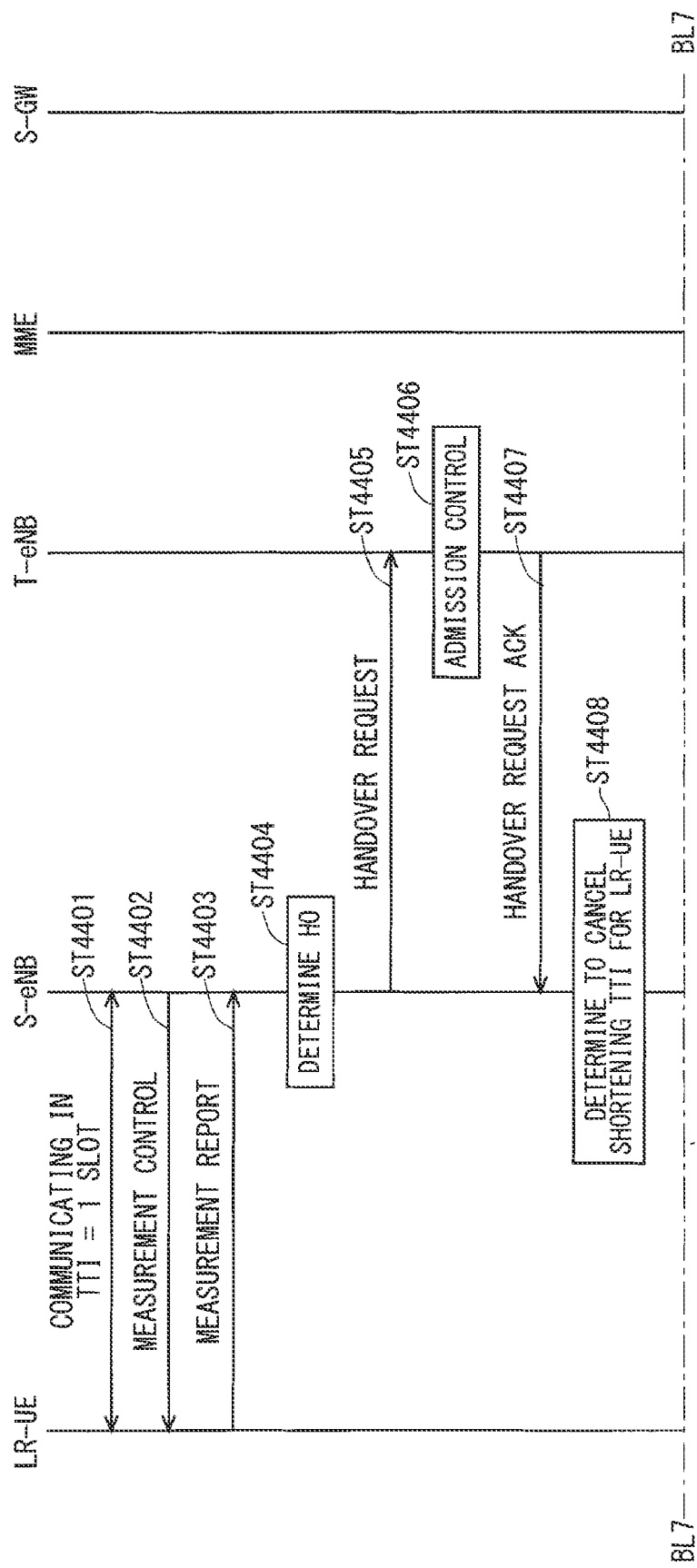

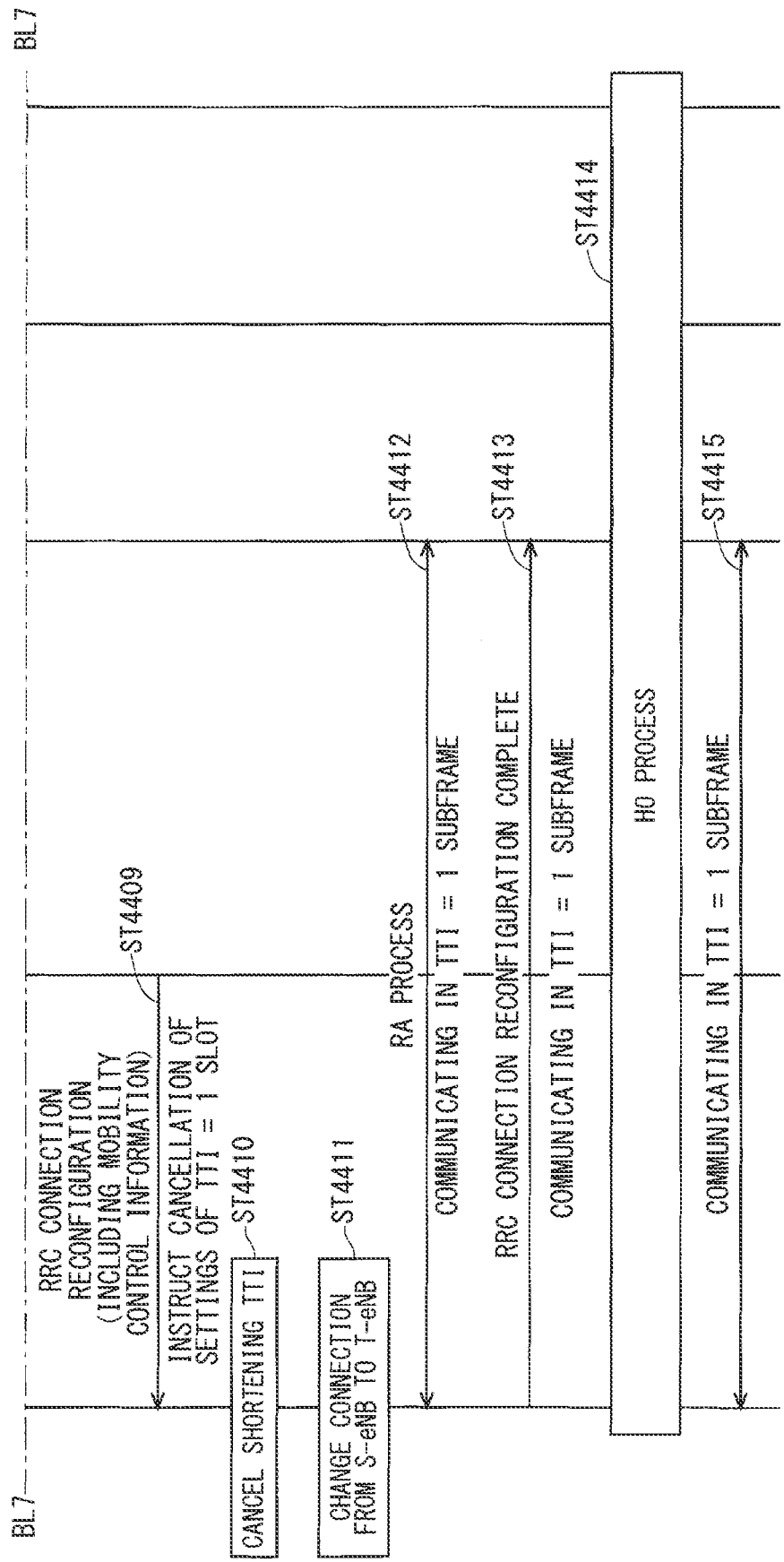

COMMUNICATION SYSTEM

TECHNICAL FIELD

The present invention relates to a communication system in which radio communication is performed between a communication terminal device such as a user equipment device and a base station device.

BACKGROUND ART

The 3rd generation partnership project (3GPP), the standard organization regarding the mobile communication system, is studying communication systems referred to as long term evolution (LTE) regarding radio sections and system architecture evolution (SAE) regarding the overall system configuration including a core network and a radio access network, which will be hereinafter collectively referred to as a network as well (for example, see Non-Patent Documents 1 to 12 and Patent Document 1). This communication system is also referred to as 3.9 generation (3.9 G) system.

As the access scheme of the LTE, orthogonal frequency division multiplexing (OFDM) is used in a downlink direction and single carrier frequency division multiple access (SC-FDMA) is used in an uplink direction. Further, differently from the wideband code division multiple access (W-CDMA), circuit switching is not provided but a packet communication system is only provided in the LTE.

The decisions by 3GPP regarding the frame configuration in the LTE system described in Non-Patent Document 1 (Chapter 5) will be described with reference to FIG. 1. FIG. 1 is a diagram illustrating the configuration of a radio frame used in the LTE communication system. With reference to FIG. 1, one radio frame is 10 ms. The radio frame is divided into ten equally sized subframes. The subframe is divided into two equally sized slots. The first and sixth subframes contain a downlink synchronization signal per radio frame. The synchronization signals are classified into a primary synchronization signal (P-SS) and a secondary synchronization signal (S-SS).

Non-Patent Document 1 (Chapter 5) describes the decisions by 3GPP regarding the channel configuration in the LTE system. It is assumed that the same channel configuration is used in a closed subscriber group (CSG) cell as that of a non-CSG cell.

A physical broadcast channel (PBCH) is a channel for downlink transmission from a base station device (hereinafter may be simply referred to as a "base station") to a communication terminal device (hereinafter may be simply referred to as a "communication terminal") such as a user equipment device (hereinafter may be simply referred to as a "user equipment"). A BCH transport block is mapped to four subframes within a 40 ms interval. There is no explicit signaling indicating 40 ms timing.

A physical control format indicator channel (PCFICH) is a channel for downlink transmission from a base station to a communication terminal. The PCFICH notifies the number of orthogonal frequency division multiplexing (OFDM) symbols used for PDCCHs from the base station to the communication terminal. The PCFICH is transmitted per subframe.

A physical downlink control channel (PDCCH) is a channel for downlink transmission from a base station to a communication terminal. The PDCCH notifies the resource allocation information for downlink shared channel (DL-SCH) being one of the transport channels described below, resource allocation information for a paging channel (PCH) being one of the transport channels described below, and hybrid automatic repeat request (HARQ) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) is a channel for downlink transmission from a base station to a communication terminal. A downlink shared channel (DL-SCH) that is a transport channel and a PCH that is a transport channel are mapped to the PDSCH.

A physical multicast channel (PMCH) is a channel for downlink transmission from a base station to a communication terminal. A multicast channel (MCH) that is a transport channel is mapped to the PMCH.

A physical uplink control channel (PUCCH) is a channel for uplink transmission from a communication terminal to a base station. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR).

A physical uplink shared channel (PUSCH) is a channel for uplink transmission from a communication terminal to a base station. An uplink shared channel (UL-SCH) that is one of the transport channels is mapped to the PUSCH.

A physical hybrid ARQ indicator channel (PHICH) is a channel for downlink transmission from a base station to a communication terminal. The PHICH carries Ack/Nack that is a response signal to uplink transmission. A physical random access channel (PRACH) is a channel for uplink transmission from the communication terminal to the base station. The PRACH carries a random access preamble.

A downlink reference signal (RS) is a known symbol in the LTE communication system. The following five types of downlink reference signals are defined: a cell-specific reference signal (CRS), an MBSFN reference signal, a data demodulation reference signal (DM-RS) being a UE-specific reference signal, a positioning reference signal (PRS), and a channel state information reference signal (CSI-RS). The physical layer measurement objects of a communication terminal include reference signal received power (RSRP).

The transport channels described in Non-Patent Document 1 (Chapter 5) will be described. A broadcast channel (BCH) among the downlink transport channels is broadcast to the entire coverage of a base station (cell). The BCH is mapped to the physical broadcast channel (PBCH).

Retransmission control according to a hybrid ARQ (HARQ) is applied to a downlink shared channel (DL-SCH). The DL-SCH can be broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a communication terminal for enabling the communication terminal to save power. The DL-SCH is mapped to the physical downlink shared channel (PDSCH).

The paging channel (PCH) supports DRX of the communication terminal for enabling the communication terminal to save power. The PCH is required to be broadcast to the entire coverage of the base station (cell). The PCH is mapped to physical resources such as the physical downlink shared channel (PDSCH) that can be used dynamically for traffic.

The multicast channel (MCH) is used for broadcast to the entire coverage of the base station (cell). The MCH supports SFN combining of multimedia broadcast multicast service (MBMS) services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels. The UL-SCH supports dynamic or semi-static resource allocation. The UL-SCH is mapped to the physical uplink shared channel (PUSCH).

A random access channel (RACH) is limited to control information. The RACH involves a collision risk. The RACH is mapped to the physical random access channel (PRACH).

The HARQ will be described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method will be described. If the receiver fails to successfully decode the received data, in other words, if a cyclic redundancy check (CRC) error occurs (CRC=NG), the receiver transmits "Nack" to the transmitter. The transmitter that has received "Nack" retransmits the data. If the receiver successfully decodes the received data, in other words, if a CRC error does not occur (CRC=OK), the receiver transmits "AcK" to the transmitter. The transmitter that has received "Ack" transmits the next data.

The logical channels described in Non-Patent Document 1 (Chapter 6) will be described. A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging information and system information change notifications. The PCCH is used when the network does not know the cell location of a communication terminal. The PCCH that is a logical channel is mapped to the paging channel (PCH) that is a transport channel.

A common control channel (CCCH) is a channel for transmission control information between communication terminals and a base station. The CCCH is used in the case where the communication terminals have no RRC connection with the network. In the downlink direction, the CCCH is mapped to the downlink shared channel (DL-SCH) that is a transport channel. In the uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a communication terminal. The MCCH is used only by a communication terminal during reception of the MBMS. The MCCH is mapped to the multicast channel (MCH) that is a transport channel.

A dedicated control channel (DCCH) is a channel that transmits dedicated control information between a communication terminal and a network on a point-to-point basis. The DCCH is used when the communication terminal has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated communication terminal. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a communication terminal. The MTCH is a channel used only by a communication terminal during reception of the MBMS. The MTCH is mapped to the multicast channel (MCH).

CGI represents a cell global identifier. ECGI represents an E-UTRAN cell global identifier. A closed subscriber group (CSG) cell is introduced in the LTE, and the long term evolution advanced (LTE-A) and universal mobile telecommunication system (UMTS) described below.

The closed subscriber group (CSG) cell is a cell in which subscribers who are allowed use are specified by an operator (hereinafter, also referred to as a "cell for specific subscribers"). The specified subscribers are allowed to access one or more cells of a public land mobile network (PLMN). One or more cells to which the specified subscribers are allowed access are referred to as "CSG cell(s)". Note that access is limited in the PLMN.

The CSG cell is part of the PLMN that broadcasts a specific CSG identity (CSG ID) and broadcasts "TRUE" in a CSG indication. The authorised members of the subscriber group who have registered in advance access the CSG cells using the CSG ID that is the access permission information.

The CSG ID is broadcast by the CSG cell or cells. A plurality of CSG IDs exist in the LTE communication system. The CSG IDs are used by communication terminals (UEs) for making access from CSG-related members easier.

The locations of communication terminals are tracked based on an area composed of one or more cells. The locations are tracked for enabling tracking the locations of communication terminals and calling communication terminals, in other words, incoming calling to communication terminals even in an idle state. An area for tracking locations of communication terminals is referred to as a tracking area.

3GPP is studying base stations referred to as Home-NodeB (Home-NB; HNB) and Home-eNodeB (Home-eNB; HeNB). HNB/HeNB is a base station for, for example, household, corporation, or commercial access service in UTRAN/E-UTRAN. Non-Patent Document 2 discloses three different modes of the access to the HeNB and HNB. Specifically, an open access mode, a closed access mode, and a hybrid access mode are disclosed.

The individual modes have the following characteristics. In the open access mode, the HeNB and HNB are operated as a normal cell of a normal operator. In the closed access mode, the HeNB and HNB are operated as a CSG cell. The CSG cell is a CSG cell where only CSG members are allowed access. In the hybrid access mode, the HeNB and HNB are operated as CSG cells where non-CSG members are allowed access at the same time. In other words, a cell in the hybrid access mode (also referred to as a hybrid cell) is the cell that supports both of the open access mode and the closed access mode.

In 3GPP, among all physical cell identities (PCIs) is a range of PCIs reserved by the network for use by CSG cells (see Chapter 10.5.1.1 of Non-Patent Document 1). Division of the PCI range is also referred to as PCI split. The information about PCI split (also referred to as PCI split information) is broadcast in the system information from a base station to communication terminals being served thereby. Being served by a base station means taking the base station as a serving cell.

Non-Patent Document 3 discloses the basic operation of a communication terminal using PCI split. The communication terminal that does not have the PCI split information needs to perform cell search using all PCIs, for example, using all 504 codes. On the other hand, the communication terminal that has the PCI split information is capable of performing cell search using the PCI split information.

Further, 3GPP is pursuing specifications standard of long term evolution advanced (LTE-A) as Release 10 (see Non-Patent Documents 4 and 5). The LTE-A is based on the LTE radio communication system and is configured by adding several new techniques to the system.

Carrier aggregation (CA) is studied for the LTE-A system, in which two or more component carriers (CCs) are aggregated to support wider transmission bandwidths up to 100 MHz.

In the case where CA is configured, a UE has a single RRC connection with a network (NW). In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a serving cell group with a PCell, in accordance with the UE capability. In downlink, a carrier corresponding to SCell is a downlink secondary component carrier (DL SCC). In uplink, a carrier corresponding to SCell is an uplink secondary component carrier (UL SCC).

A serving cell group of one PCell and one or more SCells is configured for one UE.

The new techniques in the LTE-A include the technique of supporting wider bands (wider bandwidth extension) and the coordinated multiple point transmission and reception (CoMP) technique. The CoMP studied for LTE-A in 3GPP is described in Non-Patent Document 6.

The traffic flow of a mobile network is on the rise, and the communication rate is also increasing. It is expected that the communication rate will be further increased when the operations of the LTE and the LTE-A are fully initiated.

Thus, 3GPP is studying latency reduction to meet requirements to improve the data transmission rate (see Non-Patent Document 7). Shortening a Transmission Time Interval (TTI) for UEs in a connected state has been proposed as one of the latency reduction methods. Defining, for example, TTI=1 slot or TTI=1 symbol has been proposed instead of TTI=1 subframe under the current LTE standards. 1 subframe is 1 ms long, 1 slot is 0.5 ms long, and 1 symbol is 0.1 ms long.

Patent Document 1 describes an operation method when the TTI is shortened.

PRIOR-ART DOCUMENTS

Non-Patent Documents

Non-Patent Document 1: 3GPP TS36.300 V13.0.0
Non-Patent Document 2: 3GPP S1-083461
Non-Patent Document 3: 3GPP R2-082899
Non-Patent Document 4: 3GPP TR 36.814 V9.0.0
Non-Patent Document 5: 3GPP TR 36.912 V10.0.0
Non-Patent Document 6: 3GPP TR 36.819 V11.2.0
Non-Patent Document 7: 3GPP RP-150465
Non-Patent Document 8: 3GPP TS 36.141 V13.0.0
Non-Patent Document 9: 3GPP TS36.211 V12.6.0
Non-Patent Document 10: 3GPP TS36.212 V12.5.0
Non-Patent Document 11: A. Roessler, M. Kottkamp, "LTE-Advanced (3GPP Rel.11) Technology Introduction", White Paper, ROHDE & SCHWARZ Japan, July 2013, IMA232_1J
Non-Patent Document 12: 3GPP TS36.213 V12.6.0

Patent Document

Patent Document 1: Japanese Patent Application Laid-Open No. 2009-212597

SUMMARY

Problems to be Solved by the Invention

The TTI is a unit of transmission time. Data is scheduled every TTI, and is mapped to physical resources to be transmitted. For example, TTI=1 subframe under the current standards defines performing the data scheduling and the physical resource mapping during 1 subframe. Thus, the current standards are incompatible with the shortened TTI.

Supporting a UE compatible with the newly shortened TTI (hereinafter referred to as a "LR-UE") together with a legacy UE compatible with conventional TTI specifications on the current LTE carriers, that is, providing backward compatibility is difficult without any ingenuity. 3GPP has not yet discussed these problems.

Although Patent Document 1 above describes shortening the TTI, it still discloses a configuration method per TTI=1 subframe. In other words, the method is the same as the conventional scheduling per subframe. Thus, Patent Document 1 fails to disclose supporting the shortened TTI, for example, TTI=1 slot and TTI=1 symbol, etc. To support the shortened TTI on the same LTE carriers, the LR-UE and the legacy UE have to coexist. Patent Document 1 fails to disclose how to map, within 1 subframe, two kinds of data, namely, the conventional TTI and the shortened TTI and transmit the data.

The object of the present invention is to provide a communication system compatible with various Transmission Time Intervals and having backward compatibility.

Means to Solve the Problems

The communication system according to the present invention is a communication system including a plurality of communication terminal devices, and a base station device capable of radio communication with each of the plurality of communication terminal devices, wherein the plurality of communication terminal devices include a first communication terminal device whose Transmission Time Interval with the base station device is set to 1 subframe, and a second communication terminal device whose Transmission Time Interval is set shorter than 1 subframe, a shared channel of the first communication terminal device to which data is mapped is mapped to physical resources per subframe, and a shared channel of the second communication terminal device is mapped, per physical resource block included in the subframe, to a region of the physical resources to which the shared channel of the first communication terminal device is mapped.

Effects of the Invention

According to the communication system of the present invention, a shared channel of the first communication terminal device is mapped to physical resources per subframe. A shared channel of the second communication terminal device is mapped, per physical resource block, to a region of the physical resources to which the shared channel of the first communication terminal device is mapped. Consequently, the shared channel of the second communication terminal device can be mapped to the physical resources every Transmission Time Interval. The shared channel of the first communication terminal device and the shared channel of the second communication terminal device can coexist in the physical resources in one subframe. Thus, a communication system compatible with various Transmission Time Intervals and having backward compatibility can be implemented.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a diagram illustrating the configuration of a radio frame for use in an LTE communication system.

FIG. 2 is a block diagram showing the overall configuration of an LTE communication system 200 under discussion of 3GPP.

FIG. 5 is a block diagram showing the configuration of an MME according to the present invention.

FIG. 9 is a view for describing mapping PDSCHs of an LR-UE to physical resources according the first embodiment.

FIG. 24 is a view for describing a method for multiplexing Ack/Nack to LR-EPDCCH regions to transmit the Ack/Nack according to the second embodiment.

FIG. 25 is a view for describing mapping conventional PUSCHs and PUCCHs to physical resources.

FIG. 39 is a view for describing a method for configuring SRSs of the LR-UE according to the tenth embodiment.

FIG. 41 illustrates an example sequence on TTI switching for the LR-UE according to the eleventh embodiment.

FIG. 49 illustrates the example sequence on the processes of simultaneously supporting the plurality of TTIs for one LR-UE according to the twelfth embodiment.

FIG. 50 illustrates an example sequence on processes of notifying cancelation of a shortened TTI from an S-eNB to the LR-UE in performing a HO according to the sixteenth embodiment.

FIG. 51 illustrates the example sequence on the processes of notifying cancelation of the shortened TTI from the S-eNB to the LR-UE in performing the HO according to the sixteenth embodiment.

DESCRIPTION OF EMBODIMENTS

First Embodiment

Figure 2:
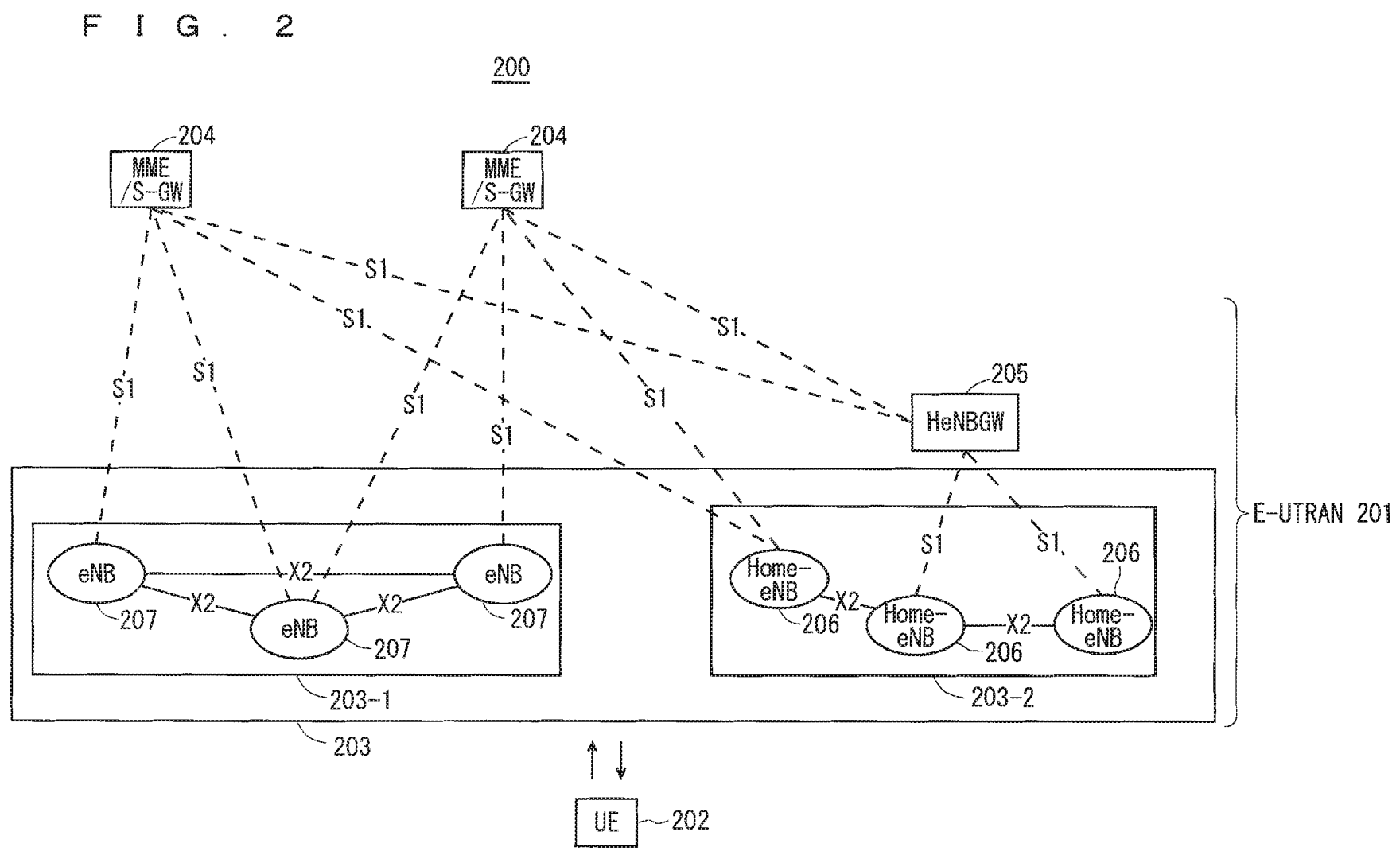
Figure 3:
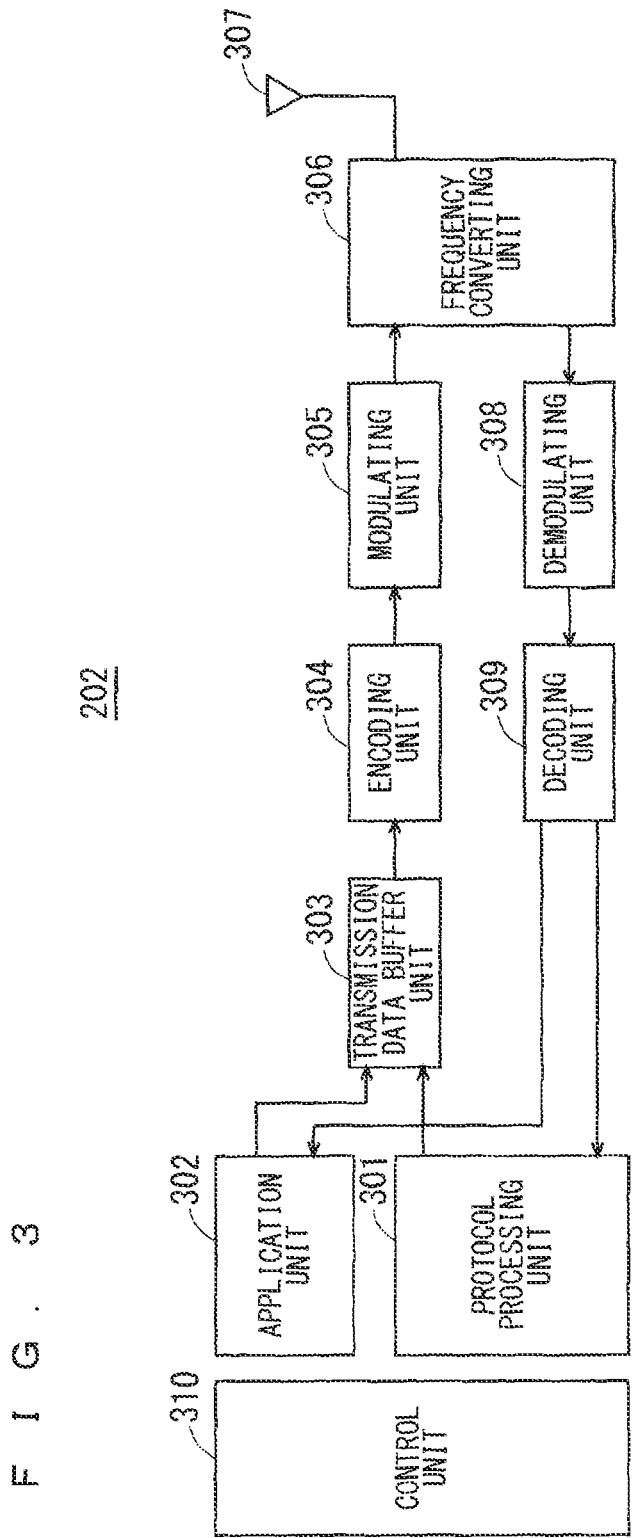
FIG. 3 is a block diagram showing the configuration of a user equipment 202 shown in FIG. 2, which is a communication terminal according to the present invention.

FIG. 2 is a block diagram showing an overall configuration of an LTE communication system 200, which is under discussion of 3GPP. FIG. 2 will be described. A radio access network is referred to as an evolved universal terrestrial radio access network (E-UTRAN) 201. A user equipment device (hereinafter, referred to as a "user equipment (LTE)") 202 that is a communication terminal device is capable of radio communication with a base station device (hereinafter, referred to as a "base station (E-UTRAN Node B: eNB)") 203 and transmits and receives signals through radio communication.

Here, the "communication terminal device" covers not only a user equipment device such as a movable mobile phone terminal device, but also an unmovable device such as a sensor. In the following description, the "communication terminal device" may be simply referred to as a "communication terminal".

The E-UTRAN is composed of one or a plurality of base stations 203, provided that a control protocol for the user equipment 202 such as a radio resource control (RRC), and user planes such as a packet data convergence protocol (PDCP), radio link control (RLC), medium access control (MAC), or physical layer (PHY) are terminated in the base station 203.

The control protocol radio resource control (RRC) between the user equipment 202 and the base station 203 performs broadcast, paging, RRC connection management, and the like. The states of the base station 203 and the user equipment 202 in RRC are classified into RRC_IDLE and RRC_CONNECTED.

In RRC_IDLE, public land mobile network (PLMN) selection, system information (SI) broadcast, paging, cell re-selection, mobility, and the like are performed. In RRC_CONNECTED, the user equipment has RRC connection and is capable of transmitting and receiving data to and from a network. In RRC_CONNECTED, for example, handover (HO) and measurement of a neighbor cell are performed.

The base stations 203 are classified into eNBs 207 and Home-eNBs 206. The communication system 200 includes an eNB group 203-1 including a plurality of eNBs 207 and a Home-eNB group 203-2 including a plurality of Home-eNBs 206. A system, composed of an evolved packet core (EPC) being a core network and an E-UTRAN 201 being a radio access network, is referred to as an evolved packet system (EPS). The EPC being a core network and the E-UTRAN 201 being a radio access network may be collectively referred to as a "network".

The eNB 207 is connected to an MME/S-GW unit (hereinafter, also referred to as an "MME unit") 204 including a mobility management entity (MME), a serving gateway (S-GW), or an MME and an S-GW by means of an S1 interface, and control information is communicated between the eNB 207 and the MME unit 204. A plurality of MME units 204 may be connected to one eNB 207. The eNBs 207 are connected to each other by means of an X2 interface, and control information is communicated between the eNBs 207.

The Home-eNB 206 is connected to the MME unit 204 by means of an S1 interface, and control information is communicated between the Home-eNB 206 and the MME unit 204. A plurality of Home-eNBs 206 are connected to one MME unit 204. Or, the Home-eNBs 206 are connected to the MME units 204 through a Home-eNB gateway (HeNBGW) 205. The Home-eNB 206 is connected to the HeNBGW 205 by means of an S1 interface, and the HeNBGW 205 is connected to the MME unit 204 by means of an S1 interface.

One or a plurality of Home-eNBs 206 are connected to one HeNBGW 205, and information is communicated therebetween through an S1 interface. The HeNBGW 205 is connected to one or a plurality of MME units 204, and information is communicated therebetween through an S1 interface.

The MME units 204 and HeNBGW 205 are entities of higher layer, specifically, higher nodes, and control the connections between the user equipment (UE) 202 and the eNB 207 and the Home-eNB 206 being base stations. The MME units 204 configure an EPC being a core network. The base station 203 and the HeNBGW 205 configure the E-UTRAN 201.

Further, 3GPP is studying the configuration below. The X2 interface between the Home-eNBs 206 is supported. In other words, the Home-eNBs 206 are connected to each other by means of an X2 interface, and control information is communicated between the Home-eNBs 206. The HeNBGW 205 appears to the MME unit 204 as the Home-eNB 206. The HeNBGW 205 appears to the Home-eNB 206 as the MME unit 204.

The interfaces between the Home-eNBs 206 and the MME units 204 are the same, which are the S1 interfaces, in both cases where the Home-eNB 206 is connected to the MME unit 204 through the HeNBGW 205 and it is directly connected to the MME unit 204.

The base station device 203 may configure a single cell or a plurality of cells. Each cell has a range predetermined as a coverage in which the cell can communicate with the user equipment 202 and performs radio communication with the user equipment 202 within the coverage. In the case where one base station device 203 configures a plurality of cells, every cell is configured so as to communicate with the user equipment 202.

FIG. 3 is a block diagram showing the configuration of the user equipment 202 of FIG. 2 that is a communication terminal according to the present invention. The transmission process of the user equipment 202 shown in FIG. 3 will be described. First, a transmission data buffer unit 303 stores the control data from a protocol processing unit 301 and the user data from an application unit 302. The data stored in the transmission data buffer unit 303 is passed to an encoding unit 304 and is subjected to an encoding process such as error correction. There may exist the data output from the transmission data buffer unit 303 directly to a modulating unit 305 without the encoding process. The data encoded by the encoding unit 304 is modulated by the modulating unit 305. The modulated data is converted into a baseband signal, and the baseband signal is output to a frequency converting unit 306 and is then converted into a radio transmission frequency. After that, a transmission signal is transmitted from an antenna 307 to the base station 203.

The user equipment 202 executes the reception process as follows. The radio signal from the base station 203 is received through the antenna 307. The received signal is converted from a radio reception frequency into a baseband signal by the frequency converting unit 306 and is then demodulated by a demodulating unit 308. The demodulated data is passed to a decoding unit 309 and is subjected to a decoding process such as error correction. Among the pieces of decoded data, the control data is passed to the protocol processing unit 301, and the user data is passed to the application unit 302. A series of processes by the user equipment 202 is controlled by a control unit 310. This means that, though not shown in FIG. 3, the control unit 310 is connected to the individual units 301 to 309.

Figure 4:
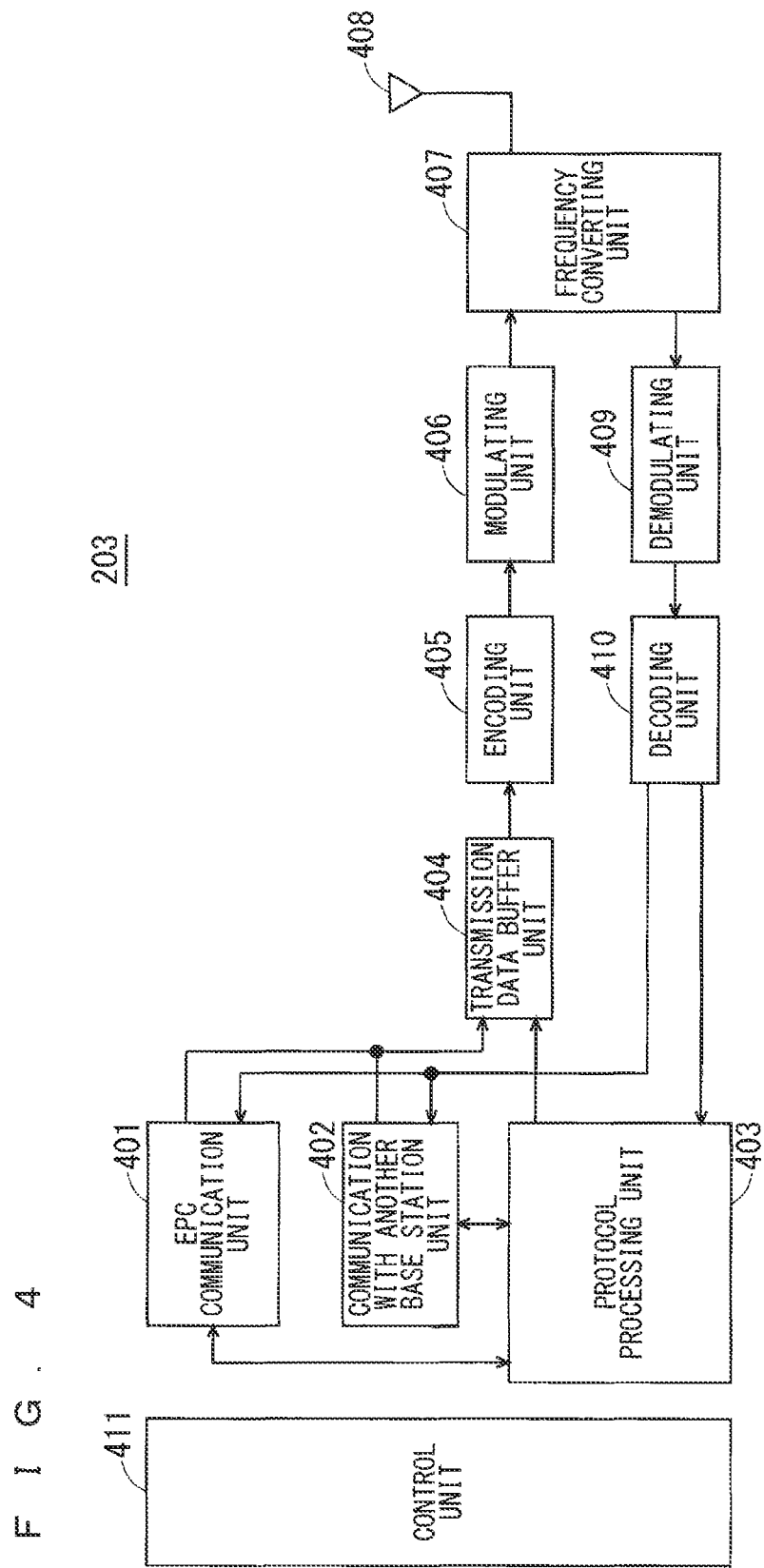
FIG. 4 is a block diagram showing the configuration of a base station 203 shown in FIG. 2, which is a base station according to the present invention.

FIG. 4 is a block diagram showing the configuration of the base station 203 of FIG. 2 that is a base station according to the present invention. The transmission process of the base station 203 shown in FIG. 4 will be described. An EPC communication unit 401 performs data transmission and reception between the base station 203 and the EPC (such as the MME unit 204), HeNBGW 205, and the like. A communication with another base station unit 402 performs data transmission and reception to and from another base station. The EPC communication unit 401 and the communication with another base station unit 402 each transmit and receive information to and from a protocol processing unit 403. The control data from the protocol processing unit 403, and the user data and the control data from the EPC communication unit 401 and the communication with another base station unit 402 are stored in a transmission data buffer unit 404.

The data stored in the transmission data buffer unit 404 is passed to an encoding unit 405 and is then subjected to an encoding process such as error correction. There may exist the data output from the transmission data buffer unit 404 directly to a modulating unit 406 without the encoding process. The encoded data is modulated by the modulating unit 406. The modulated data is converted into a baseband signal, and the baseband signal is output to a frequency converting unit 407 and is then converted into a radio transmission frequency. After that, a transmission signal is transmitted from an antenna 408 to one or a plurality of user equipments 202.

The reception process of the base station 203 is executed as follows. A radio signal from one or a plurality of user equipments 202 is received through the antenna 408. The received signal is converted from a radio reception frequency into a baseband signal by the frequency converting unit 407, and is then demodulated by a demodulating unit 409. The demodulated data is passed to a decoding unit 410 and is then subjected to a decoding process such as error correction. Among the pieces of decoded data, the control data is passed to the protocol processing unit 403, the EPC communication unit 401, or the communication with another base station unit 402, and the user data is passed to the EPC communication unit 401 and the communication with another base station unit 402. A series of processes by the base station 203 is controlled by a control unit 411. This means that, though not shown in FIG. 4, the control unit 411 is connected to the individual units 401 to 410.

FIG. 5 is a block diagram showing the configuration of the MME according to the present invention. FIG. 5 shows the configuration of an MME 204*a* included in the MME unit 204 shown in FIG. 2 described above. A PDN GW communication unit 501 performs data transmission and reception between the MME 204*a* and the PDN GW. A base station communication unit 502 performs data transmission and reception between the MME 204*a* and the base station 203 by means of the S1 interface. In the case where the data received from the PDN GW is user data, the user data is passed from the PDN GW communication unit 501 to the base station communication unit 502 via a user plane communication unit 503 and is then transmitted to one or a plurality of base stations 203. In the case where the data received from the base station 203 is user data, the user data is passed from the base station communication unit 502 to the PDN GW communication unit 501 via the user plane communication unit 503 and is then transmitted to the PDN GW.

In the case where the data received from the PDN GW is control data, the control data is passed from the PDN GW communication unit 501 to a control plane control unit 505. In the case where the data received from the base station 203 is control data, the control data is passed from the base station communication unit 502 to the control plane control unit 505.

A HeNBGW communication unit 504 is provided in the case where the HeNBGW 205 is provided, which performs data transmission and reception between the MME 204*a* and the HeNBGW 205 by means of the interface (IF) according to an information type. The control data received from the HeNBGW communication unit 504 is passed from the HeNBGW communication unit 504 to the control plane control unit 505. The processing results of the control plane control unit 505 are transmitted to the PDN GW via the PDN GW communication unit 501. The processing results of the control plane control unit 505 are transmitted to one or a plurality of base stations 203 by means of the S1 interface via the base station communication unit 502, and are transmitted to one or a plurality of HeNBGWs 205 via the HeNBGW communication unit 504.

The control plane control unit 505 includes a NAS security unit 505-1, an SAE bearer control unit 505-2, and an idle state mobility managing unit 505-3, and performs an overall process for the control plane. The NAS security unit 505-1 provides, for example, security of a non-access stratum (NAS) message. The SAE bearer control unit 505-2 manages, for example, a system architecture evolution (SAE) bearer. The idle state mobility managing unit 505-3 performs, for example, mobility management of an idle state (LTE-IDLE state, which is merely referred to as idle as well), generation and control of a paging signal in the idle state, addition, deletion, update, and search of a tracking area of one or a plurality of user equipments 202 being served thereby, and tracking area list management.

The MME 204*a* distributes a paging signal to one or a plurality of base stations 203. In addition, the MME 204*a* performs mobility control of an idle state. When the user equipment is in the idle state and an active state, the MME 204*a* manages a list of tracking areas. The MME 204*a* begins a paging protocol by transmitting a paging message to the cell belonging to a tracking area in which the UE is registered. The idle state mobility managing unit 505-3 may manage the CSG of the Home-eNBs 206 to be connected to the MME 204a, CSG IDs, and a whitelist.

Figure 6:
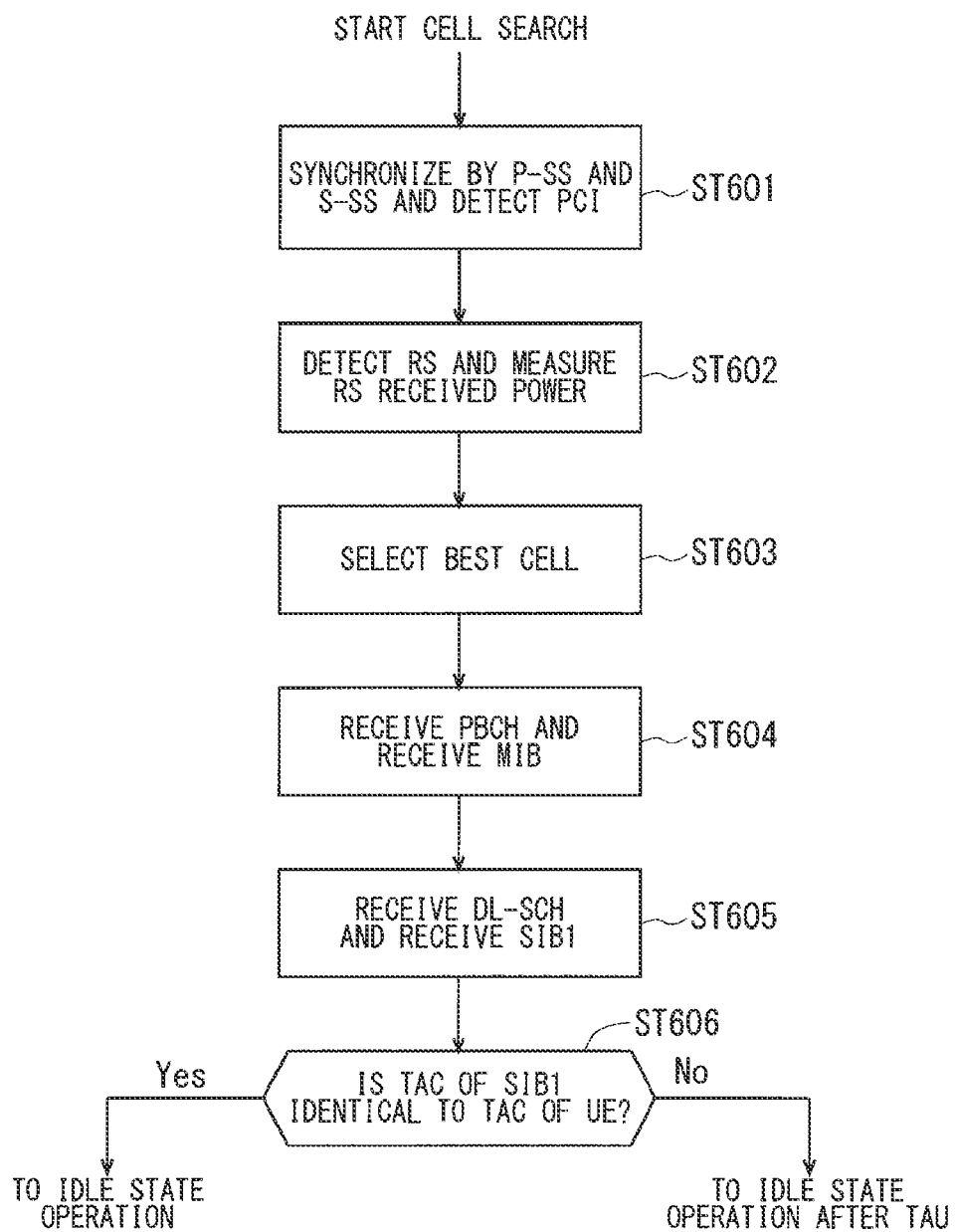
FIG. 6 is a flowchart showing an outline from a cell search to an idle state operation performed by a communication terminal (UE) in the LTE communication system.

An example of a cell search method in a mobile communication system will be described next. FIG. 6 is a flowchart showing an outline from a cell search to an idle state operation performed by a communication terminal (UE) in the LTE communication system. When starting a cell search, in Step ST601, the communication terminal synchronizes slot timing and frame timing by a primary synchronization signal (P-SS) and a secondary synchronization signal (S-SS) transmitted from a neighbor base station.

The P-SS and S-SS are collectively referred to as a synchronization signal (SS). Synchronization codes, which correspond one-to-one to PCIs assigned per cell, are assigned to the synchronization signals (SSs). The number of PCIs is currently studied in 504 ways. The 504 ways of PCIs are used for synchronization, and the PCIs of the synchronized cells are detected (specified).

In Step ST602, next, the user equipment detects a cell-specific reference signal (CRS) being a reference signal (RS) transmitted from the base station per cell and measures the reference signal received power (RSRP). The codes corresponding one-to-one to the PCIs are used for the reference signal RS. Separation from another cell is enabled by correlation using the code. The code for RS of the cell is derived from the PCI specified in Step ST601, so that the RS can be detected and the RS received power can be measured.

In Step ST603, next, the user equipment selects the cell having the best RS received quality, for example, the cell having the highest RS received power, that is, the best cell, from one or more cells that have been detected up to Step ST602.

In Step ST604, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as a transmission bandwidth configuration (dl-bandwidth)), the number of transmission antennas, and a system frame number (SFN).

In Step ST605, next, the user equipment receives the DL-SCH of the cell based on the cell configuration information of the MIB, to thereby obtain a system information block (SIB) 1 of the broadcast information BCCH. The SIB1 contains the information about the access to the cell, information about cell selection, and scheduling information on another SIB (SIBk; k is an integer equal to or greater than two). In addition, the SIB1 contains a tracking area code (TAC).

In Step ST606, next, the communication terminal compares the TAC of the SIB1 received in Step ST605 with the TAC portion of a tracking area identity (TAI) in the tracking area list that has already been possessed by the communication terminal. The tracking area list is also referred to as a TAI list. TAI is the identification information for identifying tracking areas and is composed of a mobile country code (MCC), a mobile network code (MNC), and a tracking area code (TAC). MCC is a country code. MNC is a network code. TAC is the code number of a tracking area.

If the result of the comparison of Step ST606 shows that the TAC received in Step ST605 is identical to the TAC included in the tracking area list, the user equipment enters an idle state operation in the cell. If the comparison shows that the TAC received in Step ST605 is not included in the tracking area list, the communication terminal requires a core network (EPC) including MME and the like to change a tracking area through the cell for performing tracking area update (TAU).

The device configuring a core network (hereinafter, also referred to as a "core-network-side device") updates the tracking area list based on an identification number (such as UE-ID) of a communication terminal transmitted from the communication terminal together with a TAU request signal. The core-network-side device transmits the updated tracking area list to the communication terminal. The communication terminal rewrites (updates) the TAC list of the communication terminal based on the received tracking area list. After that, the communication terminal enters the idle state operation in the cell.

Widespread use of smartphones and tablet terminal devices explosively increases traffic in cellular radio communications, causing a fear of insufficient radio resources all over the world. To increase spectral efficiency, thus, it is studied to downsize cells for further spatial separation.

In the conventional configuration of cells, the cell configured by an eNB has a relatively-wide-range coverage. Conventionally, cells are configured such that relatively-wide-range coverages of a plurality of cells configured by a plurality of macro eNBs cover a certain area.

When cells are downsized, the cell configured by an eNB has a narrow-range coverage compared with the coverage of a cell configured by a conventional eNB. Thus, in order to cover a certain area as in the conventional case, a larger number of downsized eNBs than the conventional eNBs are required.

In the description below, a "macro cell" refers to a cell having a relatively wide coverage, such as a cell configured by a conventional eNB, and a "macro eNB" refers to an eNB configuring a macro cell. A "small cell" refers to a cell having a relatively narrow coverage, such as a downsized cell, and a "small eNB" refers to an eNB configuring a small cell.

The macro eNB may be, for example, a "wide area base station" described in Non-Patent Document 7.

The small eNB may be, for example, a low power node, local area node, or hotspot. Alternatively, the small eNB may be a pico eNB configuring a pico cell, a femto eNB configuring a femto cell, HeNB, remote radio head (RRH), remote radio unit (RRU), remote radio equipment (RRE), or relay node (RN). Still alternatively, the small eNB may be a "local area base station" or "home base-station" described in Non-Patent Document 7.

Figure 7:
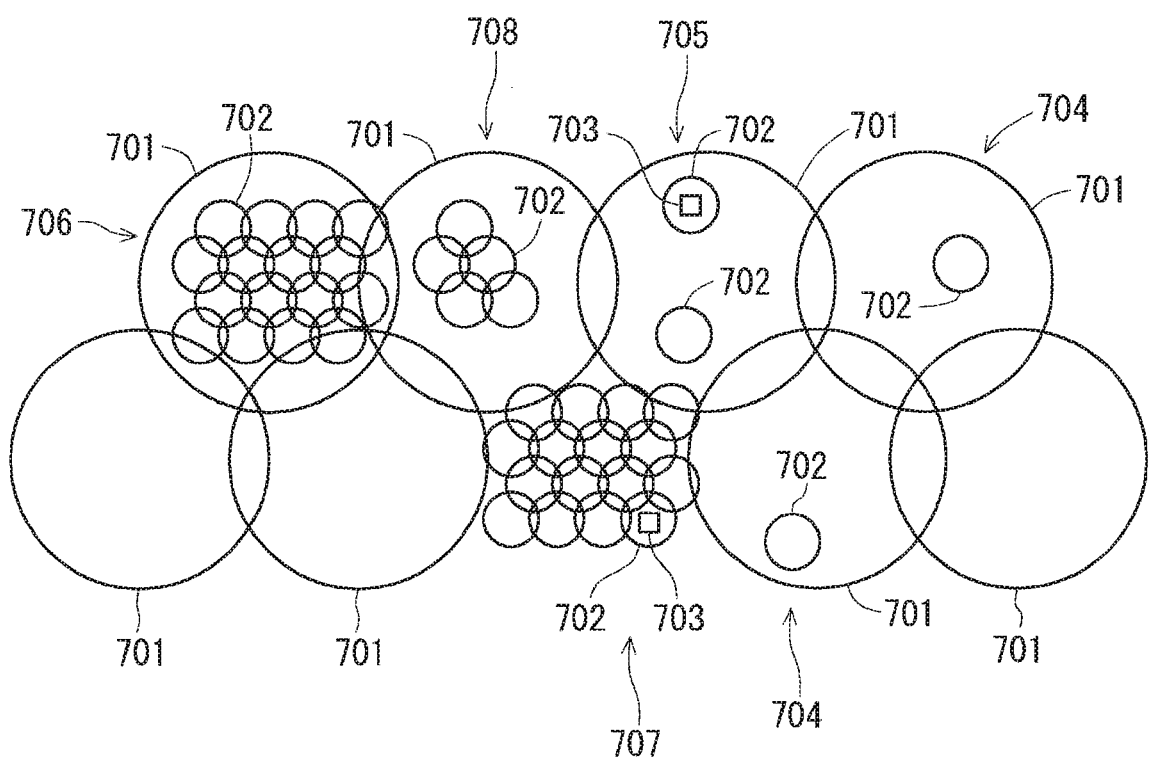
FIG. 7 shows the concept of a cell configuration when macro eNBs and small eNBs coexist.

FIG. 7 shows the concept of the cell configuration in which macro eNBs and small eNBs coexist. The macro cell configured by a macro eNB has a relatively-wide-range coverage 701. A small cell configured by a small eNB has a coverage 702 whose range is narrower than that of the coverage 701 of a macro eNB (macro cell).

When a plurality of eNBs coexist, the coverage of the cell configured by an eNB may be included in the coverage of the cell configured by another eNB. In the cell configuration shown in FIG. 7, as indicated by a reference "704" or "705", the coverage 702 of the small cell configured by a small eNB may be included in the coverage 701 of the macro cell configured by a macro eNB.

As indicated by the reference "705", the coverages 702 of a plurality of, for example, two small cells may be included in the coverage 701 of one macro cell. A user equipment (UE) 703 is included in, for example, the coverage 702 of the small cell and performs communication via the small cell.

In the cell configuration shown in FIG. 7, as indicated by a reference "706" the coverage 701 of the macro cell configured by a macro eNB may overlap the coverages 702 of the small cells configured by small eNBs in a complicated manner.

As indicated by a reference "707", the coverage 701 of the macro cell configured by a macro eNB may not overlap the coverages 702 of the small cells configured by small eNBs.

Further, as indicated by a reference "708", the coverages 702 of a large number of small cells configured by a large number of small eNBs may be configured in the coverage 701 of one macro cell configured by one macro eNB.

3GPP is studying latency reduction to meet requirements to improve the data transmission rate (see Non-Patent Document 7). Shortening the Transmission Time Interval (TTI) for UEs in a connected state has been proposed as one of the latency reduction methods. Defining, for example, TTI=1 slot or TTI=1 symbol has been proposed instead of TTI=1 subframe under the current LTE standards. 1 subframe is 1 ms long, 1 slot is 0.5 ms long, and 1 symbol is 0.1 ms long.

The TTI is a unit of transmission time. Data is scheduled every TTI, and is mapped to physical resources to be transmitted. For example, TTI=1 subframe under the current standards defines performing the data scheduling and the physical resource mapping during 1 subframe. Thus, the current standards are incompatible with the shortened TTI.

Supporting a UE compatible with the newly shortened TTI (hereinafter referred to as a "LR-UE") together with a legacy UE compatible with conventional TTI specifications on the current LTE carriers, that is, providing backward compatibility is difficult without any ingenuity, 3GPP has not yet discussed these problems.

The first embodiment will disclose a method for solving such problems.

The PDSCH will be disclosed. The PDSCH that is a shared channel to which data of the legacy UE is mapped is mapped to physical resources per subframe. Under the current LTE standards, the PDSCH of the legacy UE is mapped to the physical resources in PRB pairs. However, the conventional PDSCH is not mapped to a PDCCH region.

The PRB stands for Physical Resource Block, and is composed of a physical resource of 12 sub-carriers in a frequency axis direction and 1 slot in a time axis direction. The PRB pair consists of 2 PRBs on the time axis (see Non-Patent Document 9).

Figure 8:
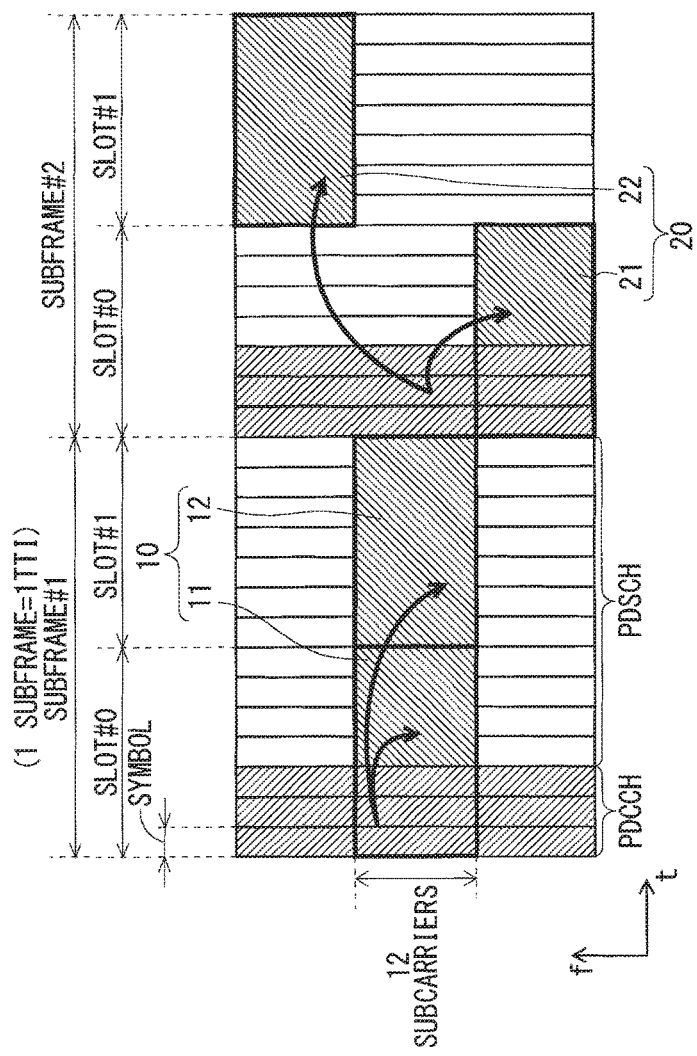
FIG. 8 is a view for describing mapping conventional PDSCHs to physical resources.

FIG. 8 is a view for describing mapping conventional PDSCHs to physical resources. In FIG. 8, the horizontal axis represents a time t, and the vertical axis represents a frequency f.

In the example illustrated in FIG. 8, 1 slot consists of 7 symbols. Thus, 1 subframe consists of 14 symbols. The PDCCHs are mapped to the first 3 symbols in the 1 subframe. The PDSCHs are mapped to the fourth and subsequent symbols. 1 PRB is composed of a physical resource of 12 sub-carriers in a direction of the frequency axis that is the vertical axis, and 1 slot in a direction of the time axis that is the horizontal axis. References "11", "12", "21", and "22" denote PRBs in FIG. 8.

As illustrated in FIG. 8, the conventional PDSCHs are mapped to a PRB pair consisting of 2 PRBs of 2 slots. However, the conventional PDSCHs are not mapped to a PDCCH region. In the example illustrated in FIG. 8, in a subframe #1 that is the first subframe, the PDSCHs are mapped to a PRB pair 10 consisting of the PRBs 11 and 12 whose frequency domains are the same. In a subframe #2 that is the second subframe, the PDSCHs are mapped to a PRB pair 20 consisting of the PRBs 21 and 22 whose frequency domains are different between the slots. In other words, frequency hopping is performed.

The PDSCHs are scheduled using the PDCCHs. The PDCCHs are mapped to the PDCCH region. In other words, the physical resources to which the PDSCHs are mapped are scheduled per PRB pair. The physical resources are temporally scheduled per subframe.

Since the TTI of the UE (LR-UE) operating with the shortened TTI is shorter than 1 subframe, the mapping method of the legacy UE is not applicable to mapping the PDSCHs to the physical resources. Thus, some new methods are required.

Patent Document 1 describes the operation method when the TTI is shortened. Although Patent Document 1 describes shortening the TTI, it still discloses a configuration method per TTI=1 subframe. In other words, the method is the same as the conventional scheduling per subframe. Thus, Patent Document 1 fails to disclose supporting the shortened TTI, for example, TTI=1 slot and TTI=1 symbol, etc. To support the shortened TTI on the same LTE carriers, the LR-UE and the legacy UE have to coexist. Patent Document 1 fails to disclose how to map, within 1 subframe, two kinds of data, namely, the conventional TTI and the shortened TTI and transmit the data.

To support the shortened TTI on the same LTE carriers, these problems need to be solved. The present invention discloses a method for solving these problems.

In the first embodiment, the PDSCHs of the LR-UE are mapped, per PRB, to a physical resource region to which the conventional PDSCHs are mapped. One or more PRBs may be used per PDSCH.

The PDSCHs of the LR-UE are mapped by avoiding the PRB pairs to which the PDSCHs of the legacy UE are mapped.

The PDSCHs of the LR-UE are mapped to symbols except for the symbols to which the conventional PDCCHs are mapped.

FIG. 9 is a view for describing mapping the PDSCHs of the LR-UE to physical resources according to the first embodiment. As illustrated in FIG. 9, the legacy UE is mapped to 2 PRBs 31 and 32, that is, per PRB pair denoted by a reference "30". The LR-UE is mapped per PRB. An LR-UE #1 and an LR-UE #3 are mapped only to a slot #0 that is the first slot. An LR-UE #2 is mapped only to a slot #1 that is the second slot. There may be a PRB in which no PDSCH is scheduled, per PRB. The PDSCH is not scheduled, for example, in a PRB denoted by a reference "33". The PDSCHs are mapped to physical resources in a region except for the PDCCH region. Since the PDCCH region in the PRBs is excluded from a region to which the PDSCHs, etc. are mapped, regions to which the PDSCHs, etc. are mapped imply PRBs in the drawings from FIG. 9.

With such a method of mapping the PDSCHs of the LR-UE to the physical resources, the PDSCHs of the LR-UE can be mapped to the physical resources every TTI. Moreover, both the PDSCH of the legacy UE and the PDSCH of the LR-UE can be mapped to the physical resources within 1 subframe.

The PDCCH will be described. The conventional scheduling is performed per subframe. The PDSCHs of the legacy UE are scheduled per subframe, and allocated to the physical resources per subframe. The control information for scheduling is included in downlink control information (DCI), and mapped to the PDCCHs. The PDCCHs are mapped to the first to fourth symbols from the beginning every subframe. The PCFICH indicates how many symbols are used among the first to fourth symbols. The PDCCHs are mapped only to the first slot in 1 subframe (see Non-Patent Documents 9 and 10).

However, the TTI of the LR-UE is shorter than 1 subframe, and the physical resources to be allocated are also shorter than the 1 subframe. Thus, the conventional scheduling method performed per subframe is not applicable. In other words, the scheduling cannot be performed using the PDCCHs per subframe.

To support the shortened TTI on the same LTE carriers, the LR-UE and the legacy UE have to coexist. The methods for solving these problems will be disclosed hereinafter.

Scheduling per shortened TTI data is performed for the LR-UE. The PDSCH of the LR-UE is scheduled every shortened TTI. The scheduling is performed per slot when TTI=1 slot. The PDSCH of the LR-UE is allocated to the physical resources per slot.

The PDCCH per slot is provided. The scheduling is performed every TTI data using the PDCCH per slot. The scheduling is performed per slot using the PDCCH per slot.

The PDCCH includes the downlink control information (DCI) per slot. The DCI includes, for example, the downlink (DL) scheduling information and the uplink (UL) scheduling information. The scheduling information includes, for example, information on allocation of the physical resources and modulation and coding scheme (MCS) information.

Similarly as the conventional PDCCHs, a physical resource region of the PDCCH per slot is provided in one or more symbols in a slot over the entirety of the system bandwidth. The PDCCH per slot of the first slot in a subframe may be mapped by avoiding the symbols to which the conventional PDCCHs are mapped. Consequently, a conflict with the conventional PDCCHs can be avoided.

The PDCCH may be mapped from symbols subsequent to the symbols to which the conventional PDCCHs are mapped. Consequently, the physical resource region of the PDCCHs can be temporally continuous.

The PDCCH per slot of the second slot in a subframe may be mapped from the first symbol in the slot.

The conventional methods for mapping the PDCCHs may be applied to a method for mapping the PDCCHs to the physical resources.

The PCFICH per slot may be provided. The PCFICH per slot indicates the number of symbols used for the PDCCH per slot. The PCFICH may be mapped to the first symbol in a region to which the PDCCH per slot is mapped. The conventional methods for mapping the PCFICH may be applied to a method for mapping the PCFICH to the physical resources every slot.

The PCFICH per slot indicates the number of symbols to which the PDCCHs are mapped every slot. The LR-UE can recognize the number of symbols for the PDCCHs per slot through receiving the PCFICH every slot.

Figure 10:
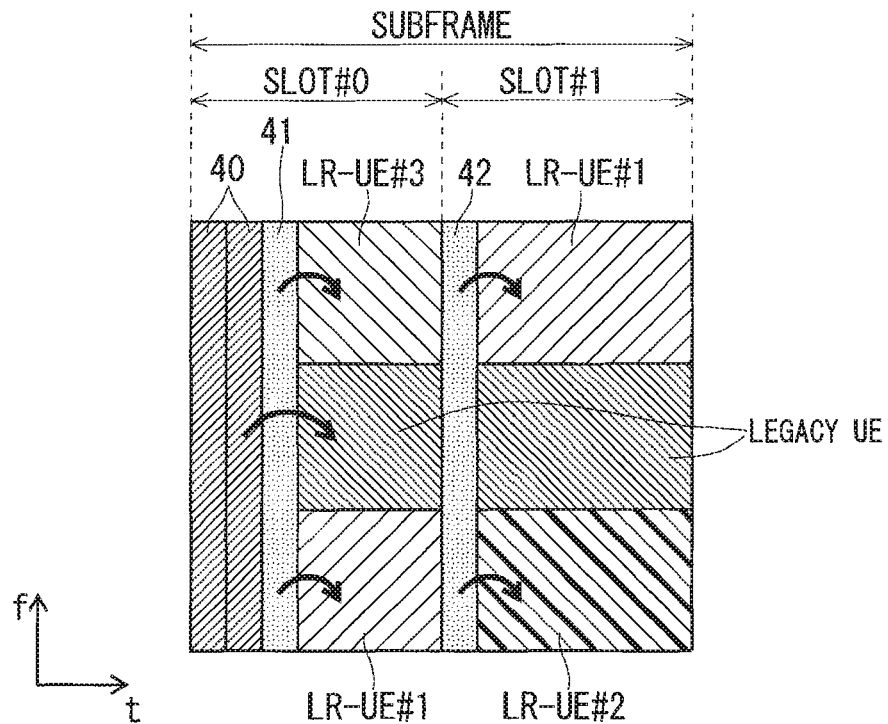
FIG. 10 is a view for describing PDCCHs per slot according to the first embodiment.

FIG. 10 is a view for describing the PDCCHs per slot according to the first embodiment. FIG. 10 illustrates that the conventional PDCCHs are mapped to the first two symbols of 1 subframe that are denoted by a reference "40". The PDCCH for the LR-UE is mapped every slot. The PDCCH for the LR-UE is mapped to the third symbol denoted by a reference "41" in the slot #0 that is the first slot in the subframe. The PDCCH for the LR-UE is mapped to the first symbol denoted by a reference "42" in the slot #1 that is the second slot in the subframe. The PDCCH for the LR-UE is mapped by avoiding the region to which the conventional PDCCHs are mapped (hereinafter may be referred to as a "PDCCH region") in the slot #0 that is the first slot in the subframe.

As indicated by thick arrows in FIG. 10, the PDCCH of the legacy UE is mapped to the conventional PDCCH region 40, and the PDSCHs per subframe of the legacy UE are scheduled using the PDCCH. The PDSCH per slot is scheduled using the PDCCH of the LR-UE. The PDSCH in the same slot is scheduled using the PDCCH of the LR-UE.

In the example illustrated in FIG. 10, the PDSCHs of the LR-UE #1 and the LR-UE #3 are scheduled using the PDCCH of the LR-UE that is mapped to the third symbol 41 in the slot #0 that is the first slot in the subframe. The PDSCHs of the LR-UE #1 and the LR-UE #2 are scheduled using the PDCCH of the LR-UE that is mapped to the first symbol 42 in the slot #1 that is the second slot in the subframe.

The PDCCH per slot that is to be mapped to the first slot in the subframe may be multiplexed and napped to the symbol to which the conventional PDCCH is mapped. Here, for example, the PDCCH per slot for the LR-UE and the conventional PDCCH for the legacy UE may be mapped to the conventional PDCCH region. Consequently, the PDCCH region per slot does not have to be separately provided.

The PCFICH per slot is not required in the first slot in the subframe. Here, the conventional PCFICH may be used. The LR-UE can recognize the number of symbols of the PDCCHs and the symbol number of the first symbol to which the PDSCH is mapped through receiving the conventional PCFICH, similarly as the legacy UE.

Figure 11:
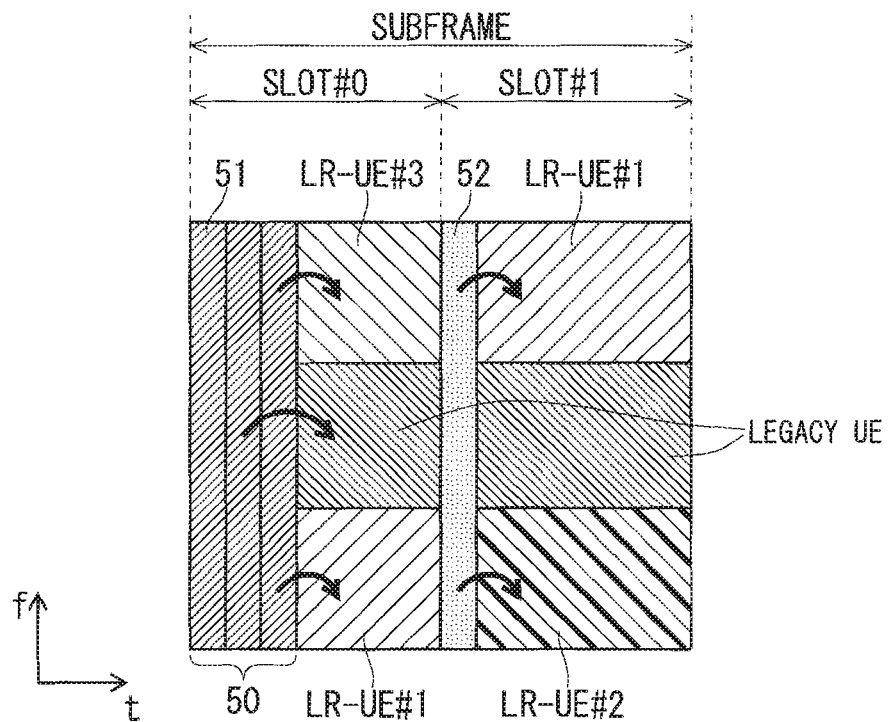
FIG. 11 is a view for describing a mapping method according to the first embodiment.

FIG. 11 is a view for describing a mapping method according to the first embodiment. FIG. 11 illustrates the method for mapping the PDCCH per slot to the conventional PDCCH region. In the example illustrated in FIG. 11, the PDCCHs of the LR-UE in the slot #0 that is the first slot in the subframe are mapped to a conventional PDCCH region 50. For example, the PDCCH of the LR-UE is mapped to a first symbol 51 in the slot #0. The PDCCHs of the LR-UE in the slot #0 are multiplexed and mapped to the conventional PDCCHs. The PDCCH of the LR-UE in the slot #1 that is the second slot in the subframe is mapped to a first symbol 52 in the slot #1 that is the second slot, similarly as the example illustrated in FIG. 10.

In the example illustrated in FIG. 11, the PDSCHs of the LR-UE #1 and the LR-UE #3 in the slot #0 that is the first slot in the subframe are scheduled using the PDCCHs of the LR-UE that are mapped to the conventional PDCCH region 50. The PDSCHs of the LR-UE #1 and the LR-UE #2 in the slot #1 that is the second slot in the subframe are scheduled using the PDCCH of the LR-UE that is mapped to the same slot #1.

The DCI per TTI=1 slot may be newly provided as the DCI for the LR-UE. For example, a DCI format for the LR-UE is newly provided. Consequently, the scheduling per shortened TTI can be performed using the PDCCHs.

The DCI includes, for example, at least one of information indicating being per slot and information for identifying a slot. Specifically, the DCI may include scheduling information every TTI data. Examples of the scheduling information include the allocation information and the MCS information. Examples of the allocation information include information on physical resources per PRB. Examples of such information include the number of PRBs and a PRB number, etc.

The eNB schedules PRBs for the LR-UE other than the PRB pairs for the legacy UE.

The DCI for the LR-UE is mapped to the PDCCH. The CRC scrambled by a cell radio-network temporary identifier (C-RNTI) of the LR-UE may be used for the PDCCH for the LR-UE. Consequently, the PDCCH can be detected by the own C-RNTI of the LR-UE, similarly as the PDCCH for the conventional UEs.

The PDCCHs are mapped to the first to fourth symbols from the beginning of a subframe. The method for mapping the PDCCHs to the physical resources, for example, a method using a control channel element (CCE), etc. may be the conventional ones. Using the conventional methods eliminates the need for newly determining a method for mapping the PDCCHs to the physical resources and enables the PDCCH for the legacy UE to coexist with the PDCCH for the LR-UE. Consequently, the backward compatibility can be provided.

The operations of the LR-UE will be disclosed. The LR-UE receives at least one of the PCFICH per slot and the conventional PCFICH, and recognizes the number of symbols in the PDCCH region for each slot, and the symbol number of the first symbol in a PDSCH region for each slot.

The LR-UE detects the PDCCH region per slot or the conventional PDCCH region by the own C-RNTI. Consequently, the LR-UE can detect the PDCCH addressed to itself. The LR-UE obtains the DCI from the PDCCH detected by the own C-RNTI. The LR-UE receives the PDSCH using the scheduling information in the DCI. The slot information and the PRB information per slot may be used to recognize to which slot and to which PRB the PDSCH is allocated. The LR-UE demodulates the received PDSCH using the scheduling information to obtain the data. The LR-UE may use the CRS as an RS for demodulation.

Mapping the PDCCHs per slot of the LR-UE to the entirety of the system bandwidth causes a conflict with the PDSCH of the legacy UE. As illustrated in FIGS. 10 and 11, the PDSCHs of the legacy UE are mapped per subframe. The first and second slots of the subframe in FIG. 10 and the second slot of the subframe in FIG. 11 have symbols 41, 42, and 52 to each of which the PDCCH per slot of the LR-UE is mapped over the entirety of the system bandwidth.

Consequently, the PDSCH of the legacy UE conflicts with the PDCCH per slot in each of the symbols 41, 42, and 52. This conflict causes the PDSCH of the legacy UE to be missed in each of the symbols 41, 42, and 52. Thus, the reception performance of the PDSCHs by the legacy UE is degraded.

However, the degradation in the reception performance of data can be reduced in the legacy UE by the gain in the demodulation through the CRC check, etc. by setting the PDCCH per slot of the LR-UE to relatively fewer symbols, for example, 1 symbol as illustrated in FIGS. 10 and 11.

The influence over the legacy UE can be further reduced by applying the method for mapping the PDCCH of the LR-UE every slot to the region 50 to which the conventional PDCCHs are mapped in the first slot as illustrated in FIG. 11. Consequently, degradation in the reception performance of data in the legacy UE can be further reduced. Thus, the legacy UE can receive the data.

Applying the method disclosed according to the first embodiment enables the LR-UE to receive the PDCCH every slot and also to receive, every slot, the PDSCH in the same slot.

Thus, both the legacy UE and the LR-UE can coexist in the same LTE carriers. Consequently, the same method as the conventional mapping method can be used, and controls over the mapping methods can be integrated. Thus, the implementation can be facilitated.

The eNB schedules the PDSCH of the legacy UE per subframe, and schedules the PDSCH of the LR-UE per unit compatible with the TTI. The eNB already schedules the PDSCHs of the legacy UE per subframe including the slot #1 that is the second slot in the subframe, before the slot #0 that is the first slot in the subframe.

The eNB schedules the PDSCH of the LR-UE in the slot #1 that is the second slot in the subframe, using the physical resources excluding the PRB pair to which the PDSCHs of the legacy UE are mapped. If the remaining physical resources excluding the PRB pair to which the PDSCHs of the legacy UE are mapped are less than the physical resources necessary for scheduling the PDSCH of the LR-UE, the PDSCH of the LR-UE that cannot be scheduled may be scheduled in subsequent TTIs, for example, in a slot #0 that is the first slot in the next subframe. Thus, the eNB can perform the flexible scheduling per unit compatible with the TTI.

The eNB may perform the scheduling in the slot #0 that is the first slot in the subframe also in consideration of the PDSCH of the LR-UE that may be scheduled in the slot #1 that is the second slot in the subframe. The scheduling may be performed, for example, using the number of the LR-UEs in a connected state and an amount of data in a downlink transmission buffer for the LR-UEs, etc.

The HARQ will be disclosed. The HARQ is performed per TTI. The HARQ may be performed on the LR-UE per shortened TTI, that is, per slot according to the first embodiment. The HARQ is performed on the legacy UE per conventional TTI, that is, per subframe.

Since the scheduling can be performed per shortened TTI for the LR-UE in the disclosed method or a method disclosed on the PUCCH to be described later, the HARQ can be performed per shortened TTI for the downlink. Similarly, since the scheduling can be performed per shortened TTI for the LR-UE in the disclosed method or a method disclosed on the PHICH and a PUSCH to be described later, the HARQ can be performed per shortened TTI for the uplink.

A round-trip time (RTT) may be shortened in the HARQ for the LR-UE. Since the scheduling can be performed per shortened TTI, the RTT can be shortened. For example, a duration from the transmission timing of downlink data to the reception timing of an uplink Ack/Nack or a duration from the reception timing of the uplink Ack/Nack to the retransmission timing of the downlink data in the eNB may be shortened as a method for shortening the RTT. A duration from the scheduling timing of uplink data to the reception timing of the uplink data, or a time until transmission of a downlink Ack/Nack or the scheduling timing of the uplink retransmission data in response to the reception of the uplink data may also be shortened. Although the cases for the eNB are described, these hold true for the UE.

When the RTT is shortened, the number of TTIs may be the same as that for the conventional RTT. Since the TTI to be used is shorter than the conventional TTI, the RTT is shortened even with the same number of TTIs. For example, the number of TTIs from the transmission timing of downlink data to the reception timing of an uplink Ack/Nack or the number of TTIs from the reception timing of the uplink Ack/Nack to the retransmission timing of the downlink data in the eNB may be the same as the conventional number of TTIs. The number of TTIs from the scheduling timing of uplink data to the reception timing of the uplink data, or the number of TTIs until transmission of a downlink Ack/Nack or the scheduling timing of the uplink retransmission data in response to the reception of the uplink data may be the same as the conventional number of TTIs. Although the cases for the eNB are described, these hold true for the UE.

The aforementioned processes can expedite retransmission control. Consequently, the data transmission rate can be improved with the low latency.

The number of HARQ processes may be increased in the HARQ per shortened TTI. For example, when the number of HARQ processes based on the conventional TTI is 8, the number of HARQ processes when 1 TTI=1 slot is doubled to 16. Thus, the number of HARQ processes is increased even with the same RTT. Increase in the number of HARQ processes and in the number of data processes can improve the data transmission rate.

According to the first embodiment, the PDSCHs of the legacy UE are mapped to the physical resources per subframe. The PDSCHs of the LR-UE are mapped per PRB in a region of the physical resources to which the PDSCHs of the legacy UE are mapped. Consequently, the PDSCHs of the LR-UE can be mapped to the physical resources every TTI. Thus, the data transmission rate of the LR-UE can be improved. Moreover, the PDSCHs of the legacy UE and the PDSCHs of the LR-UE can coexist in the physical resources in one subframe. Thus, a communication system compatible with various TTIs and having backward compatibility can be implemented.

According to the first embodiment, the PDSCHs of the legacy UE are mapped to the physical resources per PRB pair, whereas the PDSCHs of the LR-UE are mapped to the remaining physical resources excluding the PRB pairs to which the PDSCHs of the legacy UE are mapped. Consequently, the PDSCHs of the legacy UE and the PDSCHs of the LR-UE can more reliably coexist in the physical resources in one subframe.

According to the first embodiment, the PDSCHs of the legacy UE are scheduled per subframe, and the PDSCHs of the LR-UE are scheduled per unit compatible with the TTI. Consequently, the PDSCHs of the legacy UE and the PDSCHs of the LR-UE can more reliably coexist in the physical resources in one subframe.

First Modification of First Embodiment

The first embodiment discloses a method for providing and mapping a PDCCH every slot. The conflict with the PDSCHs of the legacy UE particularly in the second slot is described as a problem with the PDCCH per slot.

Although the first embodiment describes that degradation in the reception performance of data can be reduced by fewer symbols of the PDCCHs per slot and the gain in demodulating the PDSCHs of the legacy UE, the reception quality may be degraded and the reception error may increase, depending on, for example, a radio propagation environment between the UE and the eNB and the UE capability. The first modification will disclose a method for solving this problem.

The first embodiment discloses that the PDCCH per slot of the first slot in a subframe may be multiplexed and mapped to the symbol to which the conventional PDCCHs are mapped.

In the first modification, the PDCCH per slot of the second slot in the subframe is further multiplexed and mapped to the symbols to which the conventional PDCCHs are mapped.

The PDCCHs per slot of two slots of the subframe are multiplexed and mapped to the symbols to which the conventional PDCCHs are mapped.

Consequently, the PDCCH region per slot does not have to be separately provided in the second slot in the subframe.

The PDSCHs in two slot of the same subframe are scheduled using the two PDCCHs per slot that are mapped to the conventional PDCCH region. The scheduling for two slots may be performed using the two PDCCHs per slot for any one of the LR-UEs.

Figure 12:
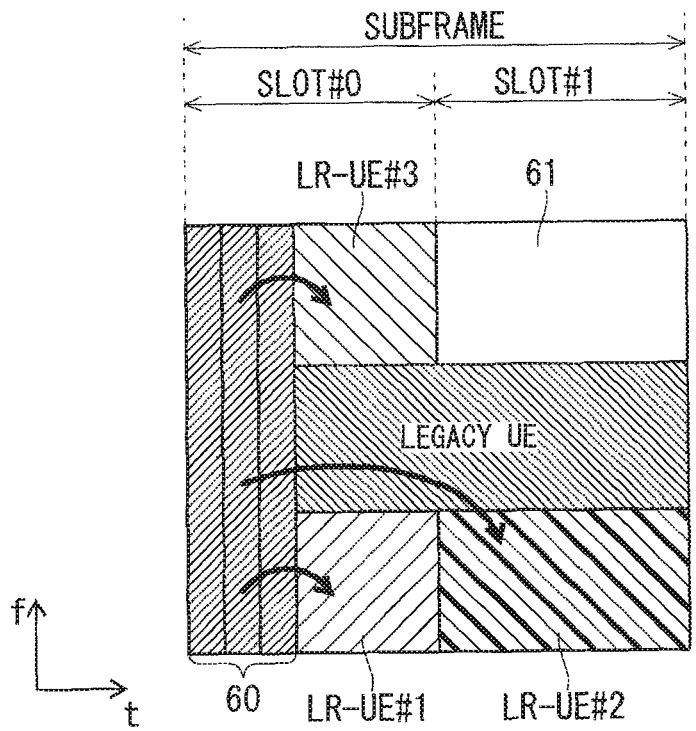
FIG. 12 is a view for describing a mapping method according to the first modification of the first embodiment.

FIG. 12 is a view for describing a mapping method according to the first modification of the first embodiment. FIG. 12 illustrates the method for mapping the two PDCCHs per slot to the conventional PDCCH region. In the first modification, the PDCCH of the LR-UE for the slots #0 and #1 that are the first and second slots in the subframe is mapped to a conventional PDCCH region 60. The PDCCH of the LR-UE is multiplexed and mapped to the conventional PDCCHs. In the example illustrated in FIG. 12, the PDCCH for each LR-UE that schedules the PDSCHs for the LR-UE #1 and the LR-UE #3 of the slot #0 that is the first slot in the subframe and the PDSCHs for the LR-UE #2 of the slot #1 that is the second slot in the subframe is mapped to the conventional PDCCH region 60. In the example illustrated in FIG. 12, the PDSCH of the LR-UE #1 is not mapped to the slot #1 that is the second slot in the subframe. The PDSCH is not scheduled in a PRB denoted by a reference "61".

Figure 13:
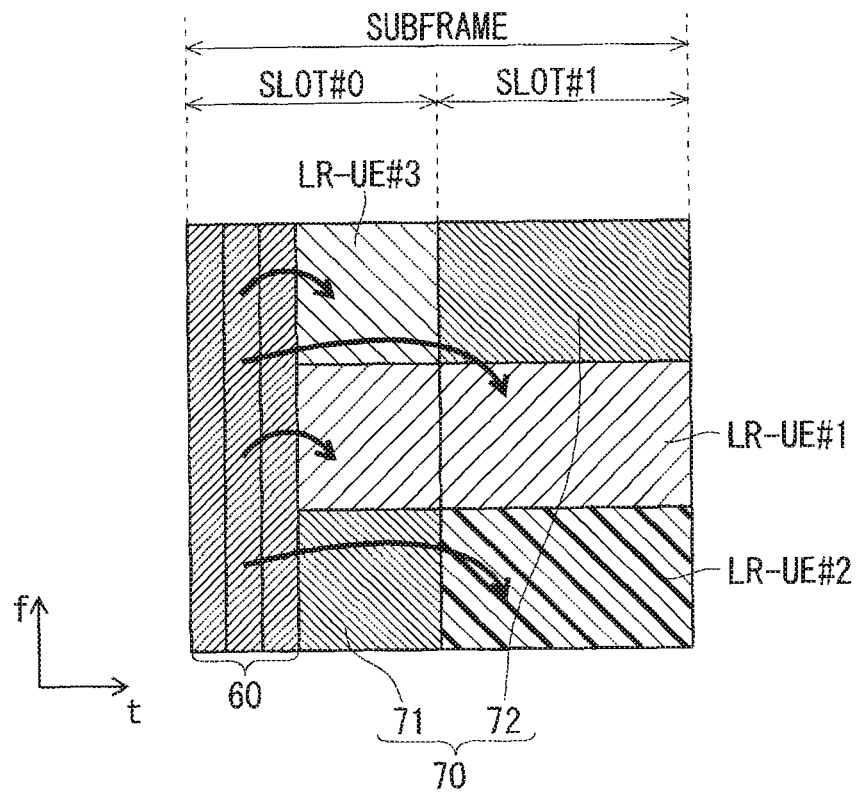
FIG. 13 is a view for describing another example of the mapping method according to the first modification of the first embodiment.

FIG. 13 is a view for describing another example of the mapping method according to the first modification of the first embodiment. FIG. 13 illustrates another example of the method for mapping the two PDCCHs per slot to a conventional PDCCH region. FIG. 13 illustrates that the PDSCH per slot of the LR-UE #1 is scheduled in the slot #0 that is the first slot and the slot #1 that is the second slot in the subframe. The PDCCH for each LR-UE that schedules the PDSCHs for each of the slots is mapped to the conventional PDCCH region 60. The legacy UE is mapped to a PRB pair 70 consisting of PRBs 71 and 72 whose frequency domains are different between the slots.

The DCI for the LR-UE may be the DCI per TTI=1 slot, similarly as according to the first embodiment. The DCI includes the scheduling information for 1 slot.

The DCI includes at least one of information indicating being per slot and information for identifying a slot. The DCI may include the scheduling information every TTI data. Examples of the scheduling information include the allocation information and the MCS information. Examples of the allocation information include information on physical resources per PRB. Examples of such information include the number of PRBs and a PRB number, etc. The scheduling information may include information for associating the number of TTIs with a slot number. Consequently, the LR-UE can recognize which TTI data is mapped to which slot.

The DCI per slot is mapped to the PDCCH per slot to schedule the first and second slots in a subframe using the PDCCH per slot.

Using the conventional PDCCH region, 2 slots in a subframe including the PDCCH region can be scheduled for any of the LR-UEs. The scheduling information for each slot may be different, or may be the same other than the slots.

The CRC scrambled by the C-RNTI of the LR-UE may be used for the PDCCH for the LR-UE. Consequently, the PDCCH can be detected by the own C-RNTI of the LR-UE, similarly as the PDCCH for the conventional UEs.

The PDCCHs are mapped to the first to fourth symbols from the beginning of a subframe. The method for mapping the PDCCHs to the physical resources, for example, a method using the CCE, etc. may be the conventional ones.

Using the conventional methods eliminates the need for newly determining a method for mapping the PDCCHs to the physical resources and enables the PDCCHs for the legacy UE to coexist with the PDCCHs for the LR-UE. Consequently, the backward compatibility can be provided.

The operations of the LR-UE will be disclosed. The LR-UE receives the conventional PCFICH, and recognizes the number of symbols in a conventional PDCCH region and the symbol number of the first symbol of a PDSCH region.

The LR-UE detects the conventional PDCCH region by the own C-RNTI. Consequently, the LR-UE can detect the PDCCH addressed to itself. When the PDCCHs of the LR-UE are mapped for 2 slots, the LR-UE detects the PDCCHs for the 2 slots by the own C-RNTI. The LR-UE obtains the DCI from the PDCCHs detected by the own C-RNTI. The LR-UE receives the PDSCH using the scheduling information in the DCI. The slot information and the PRB information per slot may be used to recognize to which slot and to which PRB the PDSCH is allocated. The TTI information may be used to recognize which TTI data is mapped to which slot. The LR-UE demodulates the received PDSCH using the scheduling information to obtain the data.

The method disclosed in the first embodiment may be applied to the HARQ. In the first modification, the PDCCH for the LR-UE including the DCI of the PDSCH in the slot #1 that is the second slot in a subframe is mapped to the PDCCH region in the slot #0 that is the first slot in the subframe. Thus, the timing for mapping the PDCCH including the DCI of the PDSCH for retransmission in the slot #1 that is the second slot in the subframe is earlier by 1 slot. The same holds true for the uplink.

There will be no problem if the processing time is sufficient. However, a problem occurs if there is insufficient processing time. Variable retransmission timing may be desired due to not only the insufficient processing time but some other reasons. A method for solving such a problem may be asynchronous HARQ. The retransmission timing can be variable by determining the timing through scheduling the retransmission data, without fixing the retransmission timing in advance. Thus, the retransmission of the PDSCH in the slot #1 that is the second slot in the subframe can be scheduled using the PDCCH region in the slot #0 that is the first slot in the subframe. The same holds true for the uplink. This method is applicable to the first embodiment.

The aforementioned processes can expedite the retransmission control. Consequently, the data transmission rate can be improved with the low latency. Increase in the number of data processes can improve the data transmission rate. The HARQ can be performed with asynchronous HARQ when there is insufficient processing time and flexible control over the retransmission timing is desired.

The method disclosed in the first modification eliminates the need for the physical resource regions for mapping the PDCCH per slot in the first and second slots, because the per-slot PDCCH for 2 slots can be mapped to the conventional PDCCH region.

Thus, the PDCCH per slot never conflicts with the PDSCH of the legacy UE. Consequently, degradation in the reception quality of data of the legacy UE caused by the conflict can be reduced more than that by the first embodiment.

The LR-UE can receive the PDCCH per shortened TTI, that is, per slot herein, and receive the PDSCH per slot.

Thus, latency can be shortened, and the data transmission rate can be improved.

Both the legacy UE and the LR-UE can coexist in the same LTE carriers.

The same method as the conventional mapping method can be used, and controls over the mapping methods can be integrated. Thus, the implementation can be facilitated.

Second Modification of First Embodiment

The first modification of the first embodiment discloses a method for transmitting the per-slot PDCCH for 2 slots using the conventional PDCCH region.

The second modification will disclose another method for transmitting the PDCCH of the LR-UE using the conventional PDCCH region.

The PDSCH of the LR-UE is scheduled per 2 slots using the PDCCH. The PDSCH is allocated to physical resources per 2 slots, using the PDCCH. Data for 2 TTIs=2 slots is scheduled using the PDCCH for the LR-UE.

One or more PRBs may be used for the PDSCH of the LR-UE every slot. The 2 slots may have the same number of PRBs, or each of the slots may have different numbers of PRBs. Consequently, data per shortened TTI can be flexibly scheduled.

Figure 14:
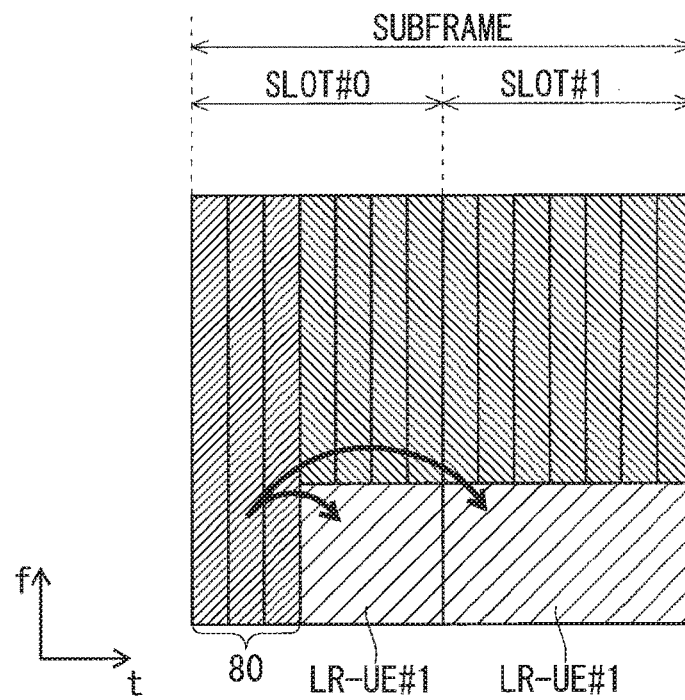
FIG. 14 is a view for describing a scheduling method according to the second modification of the first embodiment.

FIG. 14 is a view for describing a scheduling method according to the second modification of the first embodiment. FIG. 14 illustrates the scheduling method per 2 slots using the PDCCH of the LR-UE. FIG. 14 illustrates that the PDSCH per slot of the LR-UE #1 is scheduled in the first and second slots in the subframe. The PDSCH for each of the slots is scheduled using one PDCCH of the LR-UE. The PDCCH of the LR-UE is mapped to a conventional PDSCH region 80.

The DCI for 2 TTIs=2 slots may be newly provided as the DCI for the LR-UE. The one DCI may include the scheduling information for 2 slots. The scheduling information for each slot may be different. The one DCI may include the per-slot allocation information for 2 slots.

The DCI may include information indicating being for 2 slots. Alternatively, a DCI format including the scheduling information for 2 slots may be defined as a new DCI format. Consequently, the LR-UE can recognize inclusion of the scheduling information for 2 slots.

The DCI may include 2 TTIs of the scheduling information per TTI data. Examples of the scheduling information include the allocation information and the MCS information. Examples of the allocation information include information on physical resources per PRB. Examples of such information include the number of PRBs and a PRB number, etc.

The DCI may include information for identifying information on which slot. The DCI may include information for associating the number of TTIs with the slot number. Consequently, the LR-UE can recognize which TTI data is mapped to which slot.

No data for 2 slots may allow no scheduling or no transmission.

The conventional method for scheduling a PRB pair may be applied as an alternative method. The PRB pair is identified by the scheduling information for 1 subframe. The 1 subframe consists of 2 slots. Thus, the scheduling for 2 slots can be performed using the method for scheduling the PRB pair. Since no new method is required, increase in complexity of the communication system can be avoided.

The eNB schedules PRBs for the LR-UE other than the PRB pairs for the legacy UE.

Figure 15:
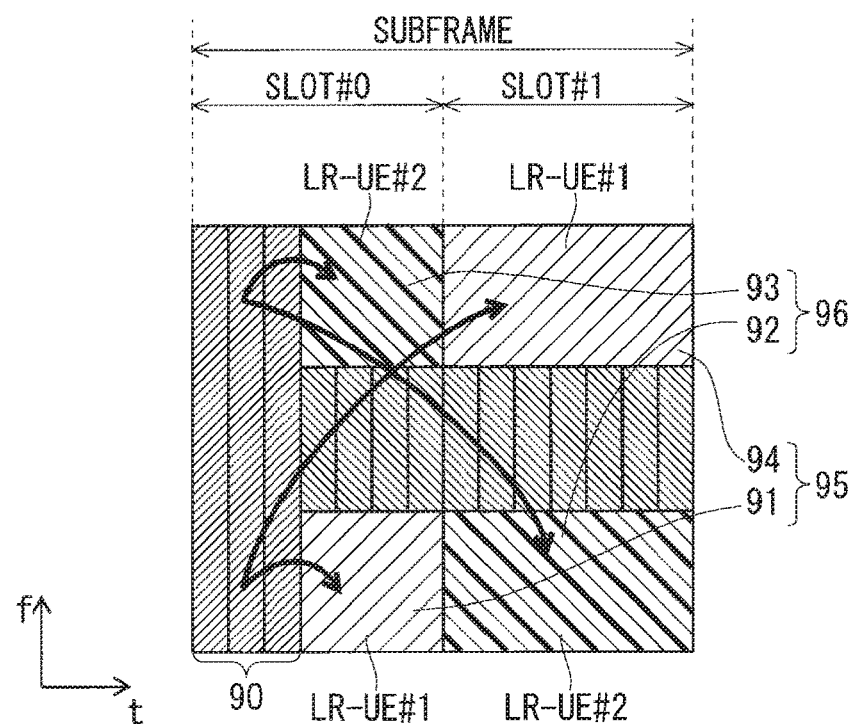
FIG. 15 is a view for describing a scheduling method according to the second modification of the first embodiment.

FIG. 15 is a view for describing a scheduling method according to the second modification of the first embodiment. FIG. 15 illustrates the scheduling method per 2 slots with application of the conventional method for scheduling the PRB pair to the PDCCH of the LR-UE.

In the example illustrated in FIG. 15, the PDSCHs of the LR-UE #1 in the first and second slots in the subframe are scheduled using one PDCCH of the LR-UE with application of the method on the PRB pair. The PDSCHs of the LR-UE #2 in the first and second slots in the subframe are also scheduled, similarly, using the one PDCCH of the LR-UE with application of the method or the PRB pair.

In the example illustrated in FIG. 15, the LR-UE #1 is mapped to a PRB pair 95 consisting of a PRB 91 in the slot #0 and a PRB 94 in the slot #1. In a PRB pair 96 consisting of a PRB 93 in the slot #0 and a PRB 92 in the slot #1, the LR-UE #2 is mapped to the PRB 93 in the slot #0, and the LR-UE #2 is mapped to the PRB 92 in the slot #1.

Although the legacy UE is not described in the examples of FIGS. 14 and 15, the PDSCH of the legacy UE may be mapped. Here, the PDSCH is scheduled using the PDCCH of the legacy UE. The PDCCH of the legacy UE is multiplexed to the PDCCH of the LR-UE, and mapped to conventional PDCCH regions 80 and 90. The description of the legacy UE will be omitted without any particular purpose.

The DCI for the LR-UE is mapped to the PDCCH in the second modification. The CRC scrambled by the C-RNTI of the LR-UE may be used for the PDCCH for the LR-UE. Consequently, the PDCCH can be detected by the own C-RNTI of the LR-UE, similarly as the PDCCH for the conventional UEs.

The PDCCHs are mapped to the first to fourth symbols from the beginning of a subframe. The method for mapping the PDCCHs to the physical resources, for example, a method using the CCE, etc. may be the conventional ones. Using the conventional methods eliminates the need for newly determining a method for mapping the PDCCHs to the physical resources and enables the PDCCHs for the legacy UE to coexist with the PDCCHs for the LR-UE. Consequently, the backward compatibility can be provided.

The operations of the LR-UE will be disclosed. The LR-UE receives the PCFICH, and recognizes the first symbol in a PDSCH region. The LR-UE detects a PDCCH region by the own C-RNTI. Consequently, the LR-UE can detect the PDCCH addressed to itself. The LR-UE obtains the DCI from the PDCCH detected by the own C-RNTI. The LR-UE receives the PDSCH using the scheduling information in the DCI. The LR-UE receives the PDSCHs for 2 slots if the DCI includes the scheduling information for the 2 slots. The slot information and the PRB information per slot may be used to recognize to which slot and to which PRB the PDSCH is allocated. The TTI information may be used to recognize which TTI data is mapped to which slot. The LR-UE demodulates the received PDSCH using the scheduling information to obtain the data.

The method disclosed in the first modification of the first embodiment may be applied to the HARQ. Consequently, the same advantages as those according to the first modification of the first embodiment can be produced. The HARQ may be performed per 2 TTIs as an alternative method. Since the HARQ is performed per subframe for both the legacy UE and the LR-UE, increase in complexity of the scheduler can be avoided.

The method disclosed in the second modification can produce the same advantages as those according to the first modification of the first embodiment.

Inclusion of the scheduling information for 2 slots in one DCI can reduce the number of the PDCCHs of the LR-UE that are mapped to the PDCCH region. Thus, the use efficiency of the physical resources that are mapped to the PDCCHs can be improved.

The LR-UE can receive the scheduling information for 2 slots through detection and receipt of one PDCCH from the conventional PDCCH region. Consequently, the time for receiving the PDCCH in the LR-UE and the received power can be reduced.

Third Modification of First Embodiment

The first modification of the first embodiment discloses a method for transmitting the per-slot PDCCH for 2 slots using the conventional PDCCH region. The third modification will disclose another method for transmitting the PDCCHs of the LR-UE using the conventional PDCCH region.

The eNB transmits, using the conventional PDCCH region, a per-slot PDCCH including the DCI of the preceding slot, and a per-slot PDCCH including the DCI in the same slot as that of the PDCCH region.

The eNB determines the scheduling of the PDSCH whose slot # is an odd number that is an odd-numbered slot, includes the scheduling information in the DCI, and maps the DCI to the PDCCH per slot. The eNB maps the PDCCH per slot to a PDCCH region in the next slot, and transmits the PDCCH. The eNB determines the scheduling of the PDSCH whose slot # is an even number that is an even-numbered slot, includes the scheduling information in the DCI, and maps the DCI to the PDCCH per slot. The eNB maps the PDSCH per slot to the PDCCH region in the same slot, and transmits the PDCCH.

The PDCCH per slot of the second slot in the subframe is multiplexed and mapped to the symbols to which the conventional PDCCHs of the next subframe are mapped. The PDCCH per slot of the first slot in the subframe is multiplexed and mapped to the symbols to which the conventional PDCCHs of the same subframe are mapped.

The PDSCH of the preceding slot and the PDSCH of the same slot are scheduled using the two PDCCHs per slot that are mapped to the conventional PDCCH region. The scheduling for 2 slots including the preceding slot and the same slot may be performed for any one of the LR-UEs using the two PDCCHs per slot.

The third modification differs from the first modification of the first embodiment in that the PDSCH of the preceding slot is scheduled using the PDCCH per slot that is mapped to the conventional PDCCH region.

Figure 16:
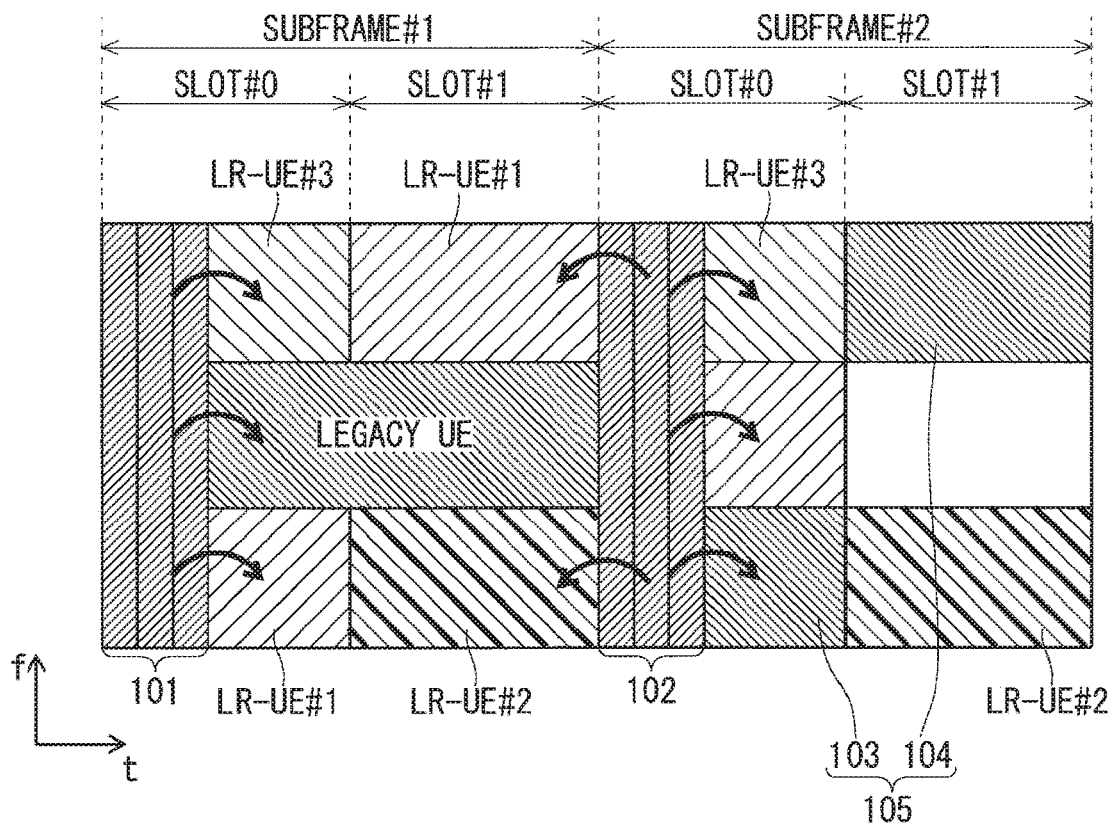
FIG. 16 is a view for describing a scheduling method according to the third modification of the first embodiment.

FIG. 16 is a view for describing a scheduling method according to the third modification of the first embodiment. FIG. 16 illustrates the method for scheduling the preceding slot and the same slot, using the PDCCHs of the LR-UE that are mapped to the conventional PDCCH region.

In the third modification, the PDCCH for scheduling the PDSCH of the LR-UE in the first slot in a subframe and the PDCCH for scheduling the PDSCH of the LR-UE in the second slot in the preceding subframe are mapped to the same conventional PDCCH region. The PDCCHs of the LR-UE are multiplexed and mapped to the conventional PDCCHs.

In the example illustrated in FIG. 16, the PDCCH for scheduling the PDSCHs of the LR-UE #1 and the LR-UE #3 in the slot #0 that is the first slot of a subframe #2, and the PDCCH for scheduling the PDSCHs of the LR-UE #1 and the LR-UE #2 in the slot #1 that is the second slot of a subframe #1 are mapped to a conventional PDCCH region 102 of the subframe #2.

In the subframe #2, the legacy UE is mapped to a PRB pair 105 consisting of PRBs 103 and 104 whose frequency bands are different. The PDCCH of the legacy UE to be mapped to the conventional PDCCH region 102 of the subframe #2 is used for scheduling the PDSCH of the legacy UE to be mapped to the PRB pair 105.

The PDCCH for scheduling the PDSCH of the LR-UE #1 and the LR-UE #3 of the slot #0 that is the first slot in the subframe #1 is mapped to a conventional PDCCH region 101 of the subframe #1.

The DCI for the LR-UE may be the DCI per TTI similarly as according to the first embodiment, that is, per slot herein. The DCI includes the scheduling information for 1 slot.

The DCI includes at least one of information indicating being per slot and information for identifying a slot. The DCI may include information for identifying a subframe. The DCI may include the scheduling information per TTI data. Examples of the scheduling information include the allocation information and the MCS information. Examples of the allocation information include information on physical resources per PRB. Examples of such information include the number of PRBs and a PRB number, etc. The scheduling information may include information for associating the number of TTIs with a slot number or information for associating the number of TTIs, a subframe number, and a slot number. The LR-UE can recognize which TTI data is mapped to which slot.

The DCI per slot is mapped to the PDCCH per slot, and a slot preceding the subframe to which the conventional PDCCHs are mapped and the same slot are scheduled using the PDCCH per slot.

Using the conventional PDCCH region, the slot preceding the subframe including the PDCCH region and the same slot can be scheduled for any of the LR-UEs. The scheduling information for each slot may be different, or may be the same other than the slots.

The CRC scrambled by the C-RNTI of the LR-UE may be used for the PDCCH for the LR-UE. The PDCCH can be detected by the own C-RNTI of the LR-UE, similarly as the PDCCH for the conventional UEs.

The PDCCHs are mapped to the first to fourth symbols from the beginning of a subframe. The method for mapping the PDCCHs to the physical resources, for example, a method using the CCE, etc. may be the conventional ones. Using the conventional methods eliminates the need for newly determining a method for mapping the PDCCHs to the physical resources and enables the PDCCHs for the legacy UE to coexist with the PDCCHs for the LR-UE. Consequently, the backward compatibility can be provided.

The operations of the LR-UE will be disclosed. The LR-UE receives the conventional PCFICH, and recognizes the number of symbols in a conventional PDCCH region and the symbol number of the first symbol of a PDSCH region.

The LR-UE detects the conventional PDCCH region by the own C-RNTI. Consequently, the LR-UE can detect the PDCCH addressed to itself. When the PDCCHs of the LR-UE are mapped for 2 slots, the LR-UE detects the PDCCHs for the 2 slots by the own C-RNTI. The LR-UE obtains the DCI from the PDCCH detected by the own C-RNTI. The LR-UE receives the PDSCH using the scheduling information in the DCI. The slot information and the PRB information per slot may be used to recognize to which slot and to which PRB the PDSCH is allocated. The TTI information may be used to recognize which TTI data is mapped to which slot. The LR-UE demodulates the received PDSCH using the scheduling information to obtain the data.

In the third modification, the LR-UE receives the PDSCH of the preceding slot or the PDSCH of the same slot, using the scheduling information in the DCI of the detected PDCCH.

The LR-UE receives and stores the second slot that is a slot whose slot # is odd-numbered in a subframe. Upon receipt of the second slot in the subframe, the LR-UE cannot recognize whether the PDSCH addressed to itself is scheduled. The LR-UE can recognize whether the PDSCH addressed to itself exists by receiving and detecting a conventional PDCCH region in the next slot. Thus, the LR-UE can receive the PDSCH of the slot preceding the slot in which the scheduling information has been received, by receiving and storing the second slot in the subframe in such a manner.

According to the method disclosed in the first or second modification of the first embodiment, for example, when data is generated during the first slot in a subframe, the eNB cannot perform scheduling in a slot subsequent to the first slot, specifically, the second slot in the subframe. This is because the scheduling information of the slot has already been transmitted in the conventional PDCCH region in the first slot in the subframe. In such a case, the eNB needs to wait for the subsequent slot, specifically, wait for 1 slot until the first slot in the next subframe and transmit the scheduling information and data. In other words, latency may occur for 1 slot, depending on the data generation timing.

However, even when data is generated during the first slot in a subframe, the method disclosed in the third modification enables the eNB to schedule a slot subsequent to the first slot, specifically, the second slot in the subframe. This is because the scheduling information of the slot is transmitted in the conventional PDCCH region in the first slot in the next subframe. When data is generated during the first slot in a subframe, for example, the eNB schedules data in the second slot in the subframe and maps the data to the second slot in the subframe. Then, the eNB transmits the scheduling information of the data transmitted in the first slot in the next subframe.

Thus, the method disclosed in the third modification enables immediate transmission of data per slot after data is generated. Consequently, the latency for 1 slot can be prevented.

The method disclosed in the first modification of the first embodiment may be applied to the HARQ. Consequently, the same advantages as those according to the first modification of the first embodiment can be produced.

Since the per-slot PDSCH for 2 slots can be mapped to a conventional PDCCH region according to the method disclosed in the third modification, the physical resource region for mapping the per-slot PDCCHs in the first and second slots is unnecessary.

Since the PDCCH per slot never conflicts with the PDSCH of the legacy UE, degradation in the reception quality of data of the legacy UE caused by the conflict can be reduced more than that by the first embodiment.

The LR-UE can receive the PDCCH per shortened TTI, that is, per slot herein, and receive the PDSCH per slot.

Thus, latency can be shortened, and the data transmission rate can be improved.

Both the legacy UE and the LR-UE can coexist in the same LTE carriers.

The same method as the conventional mapping method can be used, and controls over the mapping methods can be integrated. Thus, the implementation can be facilitated.

Although the latency occurs for 1 slot depending on the data generation timing according to the first and second modifications of the first embodiment, the latency for 1 slot can be prevented with the method disclosed in the third modification. Thus, latency can be shortened, and the data transmission rate can be improved.

The method using the PRB pair that is disclosed in the second modification of the first embodiment may be applied. Consequently, the amount of PDCCHs can be reduced. The use efficiency of the physical resources that are mapped to the PDCCHs can be improved.

The LR-UE can receive the scheduling information for 2 slots through detection and receipt of one PDCCH from the conventional PDCCH region. Consequently, the time for receiving the PDCCH in the LR-UE and the received power can be reduced.

With application of the conventional method on the PRB pair, the scheduling can be performed in an integrated manner with the legacy UE and the control can be facilitated.

Fourth Modification of First Embodiment

Under the current LTE standards, the PDSCH of the legacy UE is mapped to the physical resources using the PRB pair. The mapping methods include localized mapping that is a method for mapping PRBs of a PRB pair to the same frequency domain, that is, to the same sub-carrier, and distributed mapping that is a method for mapping the PRBs of the PRB pair to different frequency domains, that is, to different sub-carriers.

However, when the shortened TTI data for the LR-UE is mapped to the physical resources every slot, the distributed mapping cannot be performed because the data is mapped every slot. Thus, the frequency diversity gain cannot be obtained.

The methods for solving such problems will be disclosed hereinafter. When the PDSCH for the LR-UE is mapped to the physical resources, the PDSCH is mapped to non-consecutive frequency domains, that is, non-consecutive sub-carriers within 1 slot. The frequency domains may be set per PRB. The distributed mapping is performed within 1 slot.

Although disclosed is allocation of one or more PRBs within 1 slot for the LR-UE, the one or more PRBs may be localized PRBs or distributed PRBs. When the radio environment is favorable in a particular frequency domain, the communication quality can be improved using the localized PRBs in the frequency domain. Using the distributed PRBs in the presence of the frequency fading enables a desired communication quality to be obtained even under the inferior radio environment in a particular frequency domain.

The plurality of the distributed PRBs may be defined as a PRB set. The DCI may newly include PRB set information as a method for scheduling the PRB set.

Methods for allocating the PRB set include a method for identifying the plurality of PRBs using an absolute PRB number. Here, the absolute PRB number for each of the PRBs in the PRB set may be included as allocation information.

The allocation information may include the smallest PRB number and frequency interval information up to the following PRB, for example, the number of sub-carriers or PRB interval information, for example, the number of PRBs. The plurality of PRBs can be identified using the smallest PRB number in the PRB set, and a frequency interval or a PRB interval up to the following PRB.

The allocation information may include information on the number of PRBs or information indicating the last PRB. The frequency interval information or the PRB interval information up to the following PRB may not be set to the last PRB. Consequently, the PRB is recognized as the last PRB.

Figure 17:
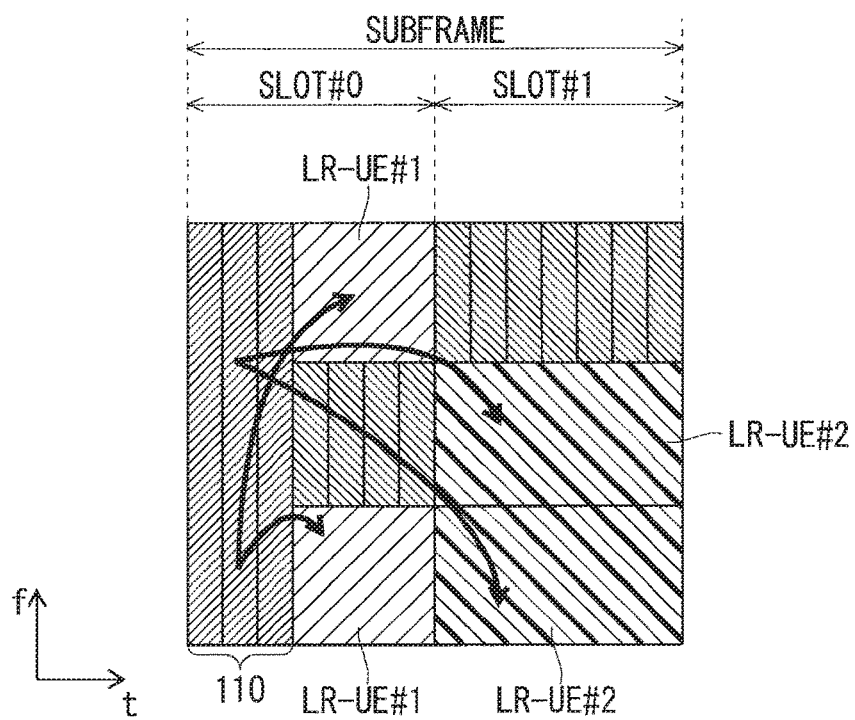
FIG. 17 is a view for describing a scheduling method according to the fourth modification of the first embodiment.

FIG. 17 is a view for describing a scheduling method according to the fourth modification of the first embodiment. FIG. 17 illustrates the method for scheduling a plurality of PRBs within 1 slot for the LR-UE. In the fourth modification, the plurality of PRBs are mapped to the PDSCH of the LR-UE. The plurality of PRBs are allocated to the PDSCH using the PDCCH of the LR-UE.

In the example illustrated in FIG. 17, the PDSCH of the LR-UE #1 is mapped to two distributed PRBs in the first slot in the subframe. The PDSCHs are scheduled using the PDCCH of the LR-UE #1. The PDCCH is mapped to a conventional PDCCH region 110.

The PDSCH of the LR-UE #2 is mapped to two localized PRBs in the second slot in the subframe. The PDSCHs are scheduled using the PDCCH of the LR-UE #2. The PDCCH is mapped to the conventional PDCCH region 110.

The allocation information may include PRB number information on the first and the last PRBs. When the PRBs have the same frequency interval, the plurality of PRBs can be identified through further inclusion of the information on the number of PRBs and the frequency interval information between the PRBs, for example, the number of sub-carriers or the PRB interval information, for example, the number of PRBs.

When there are 2 PRBs, the PRBs may be paired as a PRB pair in 1 slot, and the conventional method for allocating the PRB pair may be applied to the PRBs.

Information for identifying whether a PRB pair is in 1 slot for the LR-UE or between 2 slots for the legacy UE may be provided. The scheduling information may include such information.

Alternatively, information for identifying whether a PRB pair is intended for the LR-UE or the legacy UE may be provided. If the PRB pair is for the LR-UE, the PRB pair may be used within the same slot. If the PRB pair is for the legacy UE, the PRB pair may be used between 2 slots. Since the conventional method for designating a PRB pair is applicable to such a method, increase in complexity of the control can be avoided.

As an alternative method, the eNB sets the information on the conventional PRB pairs between 2 slots as the PRB pair information of the DCI for the PDCCH of the legacy UE, and sets the PRB pair information within 1 slot as the PRB pair information included in the DCI for the PDCCH of the LR-UE. The eNB determines the settings based on whether the PDCCH including the DCI including the PRB pair information is intended for the LR-UE or the legacy UE. Consequently, the legacy UE or the LR-UE can determine by itself whether the PRB pair of the PDCCHs is a PRB pair between 2 slots or a PRB pair within 1 slot, depending on being the legacy UE or the LR-UE. This eliminates the need for specific information indicating which one of the PRB pairs.

Fifth Modification of First Embodiment

The first embodiment discloses a method for providing and mapping the PDCCH every slot. The first embodiment describes a problem with unavoidable conflict with the PDSCH of the legacy UE due to provision of the PDCCHs in symbols of slots over the entirety of the system bandwidth.

Although the first embodiment describes that the influence over the PDSCH of the legacy UE can be reduced with fewer symbols of the PDCCHs per slot and degradation in the reception performance of data can be reduced by the gain in demodulation, the reception quality may be degraded and the reception error may increase, depending on, for example, the radio propagation environment between the UE and the eNB and the UE capability. The fifth modification will disclose a method for solving this problem.

The PDCCH per slot is mapped to one or more PRBs in a slot. The scheduling is performed every TTI data using the PDCCH per slot. The scheduling is performed per slot using the PDCCH per slot. The allocation to the physical resources per slot is performed using the PDCCH per slot. The PDSCH allocated to the same slot as that of the PDCCH per slot is scheduled.

Consequently, the physical resource region to which the PDCCH per slot is mapped can be reduced over the entirety of the system bandwidth, and limited to a predetermined PRB, that is, a predetermined frequency domain.

Thus, the scheduling can be performed without conflicting with the PDSCH of the legacy UE.

Since there is no conflict with the PDSCH of the legacy UE even with increase in the PDCCHs per slot according to increase in the LR-UEs and increase in the number of symbols necessary for the PDCCHs, degradation in the communication quality of data caused by the conflict can be prevented.

The PDCCH region for the LR-UE may be provided every slot. A region for mapping the PDCCH to the physical resources may be set per PRB. One or more PRBs may be used. The PDCCH per slot is defined as an LR-EPDCCH. The LR-EPDCCH is used as the PDCCH of the LR-UE.

The LR-EPDCCH is mapped to a physical resource region to which the conventional PDSCH is mapped.

The PDSCH of the LR-UE is mapped by avoiding a PRB pair to which the PDSCH of the legacy UE is mapped.

The LR-EPDCCH whose slot # is even-numbered is mapped except for the symbols (the first to fourth symbols) to which the conventional PDCCHs are mapped.

Figure 18:
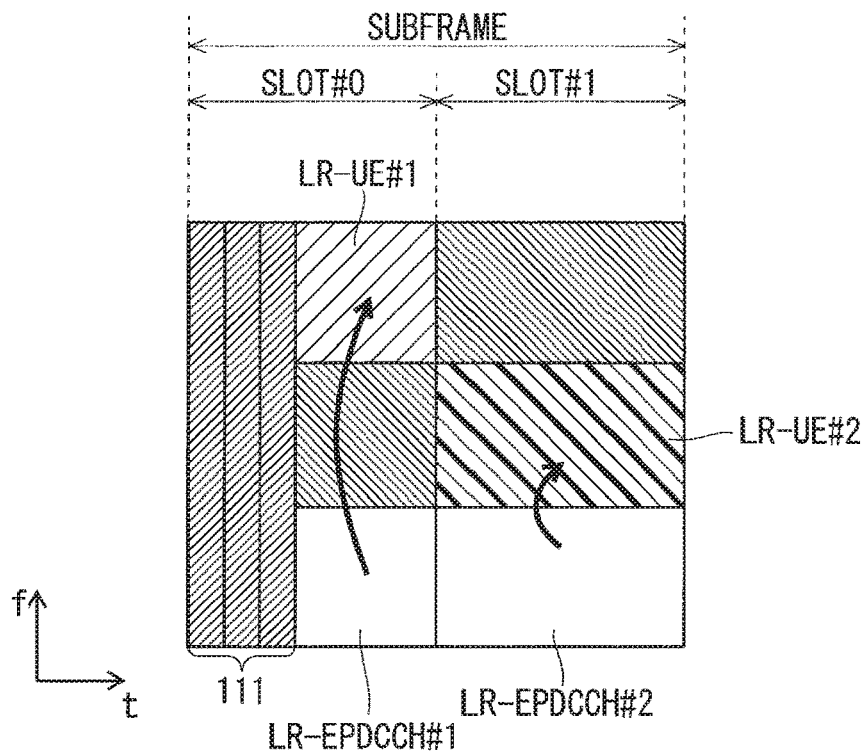
FIG. 18 is a view for describing a scheduling method according to the fifth modification of the first embodiment.

FIG. 18 is a view for describing a scheduling method according to the fifth modification of the first embodiment. FIG. 18 illustrates the scheduling method using the LR-EPDCCH for the LR-UE. As illustrated in FIG. 18, the LR-EPDCCH is mapped, every slot, to a physical resource region to which the conventional PDSCH is mapped. For example, an LR-EPDCCH #1 is mapped to the first slot in the subframe, and an LR-EPDCCH #2 is mapped to the second slot in the subframe.

The LR-EPDCCH #1 is a PDCCH of the LR-UE #1, and schedules the PDSCH of the LR-UE #1 in the same slot. The LR-EPDCCH #2 is a PDCCH of the LR-UE #2, and schedules the PDSCH of the LR-UE #2 in the same slot. The LR-EPDCCH #1 of the first slot in the subframe is mapped to symbols excluding a conventional PDCCH region 111.

Providing a region for mapping the PDCCH of the LR-UE (hereinafter may be referred to as an "LR-EPDCCH region") using a predetermined PRB every slot is disclosed. Here, a method for mapping the PDCCH of the LR-UE to the region will be further disclosed.

A conventional control channel to be mapped to a predetermined frequency domain is an EPDCCH. However, the EPDCCH is mapped over the entirety of 1 subframe. Thus, application of the conventional method for mapping the EPDCCH to a method for mapping the PDCCH per slot enables the mapping to a predetermined frequency domain but disables the mapping per slot.

Here, a method for mapping the PDCCH of the LR-UE using a predetermined PRB every slot will be disclosed.

The DCI per slot is mapped to the LR-EPDCCH. The DCI per slot is divided into one or more control channel elements, that is, LR-ECCEs herein.

An LR-EREG consisting of one or more resource elements (REs) is provided as a physical resource of the LR-EPDCCH. The LR-ECCEs are mapped to the LR-EREG.

As such, the DCI per slot is mapped to the LR-EPDCCH, and the LR-EPDCCH is mapped to the physical resources in 1 slot.

Any number of the LR-EREGs may be structured in a PRB. For example, 16 groups of LR-EREGs=0 to 15 may be structured in the PRB. The structure of the EREG for the conventional EPDCCH may be used (see Non-Patent Document 11). Note that 16 groups of EREGs are structured in a PRB pair for the conventional EPDCCH. Since the LR-EPDCCH cannot form the PRB pairs, the structure of the EREG is not applicable as it is.

Here, while the arrangement of the EREGs in a PRB pair is maintained, only the EREGs in the PRB are used as the LR-EREGs. Consequently, the LR-EREGs can be structured in the PRB while the number of the EREG groups is kept the same as the number of the LR-EREG groups.

For example, when the 16 groups of LR-EREGs are structured in 1 PRB, the number of REs included in 1 LR-EREG in the 1 PRB is 4 or 5.

Although the 16 groups of LR-EREGs can be structured similarly as the conventional EREGs, the number of the REs per LR-EREG is halved.

The number of REs necessary for mapping the DCI is the same for both the EPDCCH and the LR-EPDCCH. Thus, when the number of REs in an LR-EREG is halved, a problem with failing to include the DCI occurs. The methods for solving such a problem will be disclosed hereinafter.

The number of LR-EPDCCH sets to be allocated to the LR-UE is increased. Normally, the eNB allocates an EPDCCH region to the UE. This region may be continuous or discontinuous. This EPDCCH region may be referred to as an EPDCCH set. Conventionally, two EPDCCH sets can be allocated to the UE.

Similarly, the LR-EPDCCH region that the eNB allocates to the LR-UE is defined as an LR-EPDCCH set. The maximum number of LR-EPDCCH sets that can be allocated to the LR-UE is increased to more than 2.

The UE searches for the LR-EPDCCH sets larger than 2 to receive the own LR-EPDCCH.

In addition to 1 set and 2 sets, for example, 4 sets may be settable to 1 LR-UE as the number of the LR-EPDCCH sets.

Consequently, the number of PRBs included in all the LR-EPDCCH sets can be increased. The number of PRBs received by the LR-UE can also be increased. Thus, even when the number of REs in an LR-EREG in 1 PRB is halved, the number of REs as many as the conventional REs can be maintained with increase in the number of PRBs.

Another method will be disclosed hereinafter. The LR-EPDCCH region that the eNB allocates to the LR-UE is increased. The number of PRBs included in an LR-EPDCCH set to be allocated to the LR-UE may be increased. The maximum number of PRBs included in the LR-EPDCCH set that can be allocated to the LR-UE is increased to more than 8. The UE searches for the LR-EPDCCH set including more than 8 PRBs to receive the own LR-EPDCCH.

In addition to 2, 4, and 8, for example, 16 may be settable to 1 LR-UE as the number of PRBs in an LR-EPDCCH set.

Consequently, the number of PRBs included in all the LR-EPDCCH sets that can be allocated to the LR-UE can be increased. The number of PRBs received by the LR-UE can also be increased. Thus, even when the number of REs in an LR-EREG in 1 PRB is halved, the number of REs as many as the conventional REs can be maintained with increase in the number of PRBs.

Another method will be disclosed hereinafter. An aggregation level of the control channel element (CCE) supported by the LR-UE is reduced to be lower than the conventional numbers. Conventionally, 1, 2, 4, 8, 16, and 32 can be set to the aggregation level of the CCE for 1 UE. Here, the maximum aggregation level of the CCE supported by the LR-UE is set smaller than 32. For example, the maximum number of the CCEs supported by the LR-UE is set to 16.

Consequently, the number of CCEs including the DCI for the LR-UE can be reduced. Thus, the number of REs necessary for mapping the DCI for the LR-UE can be reduced.

Consequently, even when the number of REs in an LR-EREG in 1 PRB that can be allocated to the LR-UE is halved and the number of REs included in all the LR-EPDCCH sets is halved, the DCI for the LR-UE can be mapped.

Another method will be disclosed hereinafter. The amount of physical resources necessary for the LR-ECCE including the DCI for the LR-UE is reduced. The information amount of the DCI for the LR-UE may be reduced to reduce the amount of physical resources.

Conventionally, 1 ECCE mapped to the EPDCCH is mapped to, for example, 36 REs or 72 REs. Here, the physical resources necessary for the LR-ECCE including the DCI for the LR-UE are reduced to be less than 36 REs or 72 REs. The physical resource of 1 LR-ECCE is set to, for example, 18 REs or 36 REs.

Consequently, the amount of physical resources necessary for the LR-ECCE including the DCI for the LR-UE can be reduced.

Thus, even when the number of REs in an LR-EREG in 1 PRB that can be allocated to the LR-UE is halved and the number of REs included in all the LR-EPDCCH sets is halved, the DCI for the LR-UE can be mapped.

As described above, the fifth modification discloses that any number of LR-EREGs are structured in a PRB, for example, 16 groups of LR-EREGs=0 to 15 in a PRB. As an alternative example, 8 groups of LR-EREGs=0 to 7 are structured in a PRB. The LR-EREGs may be identically numbered in all the PRBs for the LR-EPDCCH. Alternatively, the LR-EREGs may be numbered in two ways. For example, the LR-EREGs may be divided into LR-EREGs=0 to 7 PRBs and LR-EREGs=8 to 15 PRBs.

When the 8 groups of LR-EREGs are structured in 1 PRB, the number of REs included in one LR-EREG in 1 PRB is 9. Consequently, the number of REs per LR-EREG can be equal to the number of REs per conventional EREG.

As described above, the number of REs necessary for mapping the DCI is the same for both the EPDCCH and the LR-EPDCCH.

Thus, the method disclosed herein enables obtainment of the number of REs necessary for the LR-EPDCCH region which is to be allocated to one LR-UE. The DCI for the LR-UE can be included. This eliminates the need for the solution to decrease in the number of REs.

Although the number of REs per LR-EREG can be equal to the number of REs per conventional EREG with the method disclosed herein, the number of LR-EREGs is reduced to half the number of conventional EREGs. Since the number of LR-EREGs included in the LR-EPDCCH region decreases, the number of LR-UEs that can be supported in the LR-EPDCCH region also decreases.

The method for solving the problem with the number of REs in the LR-EREG halved may be applied as a method for solving such problems.

The method disclosed in the first embodiment may be applied to the DCI for the LR-UE.

The DCI for the LR-UE is mapped to the LR-EPDCCH.

The CRC scrambled by the C-RNTI of the LR-UE may be used for the LR-EPDCCH for the LR-UE. The LR-EPDCCH can be detected by the own C-RNTI of the LR-UE, similarly as the PDCCH for the conventional UEs.

A method for setting the LR-EPDCCH will be disclosed.

An LR-EPDCCH region is set. The LR-EPDCCH region may be set as an LR-EPDCCH set. The resources for the LR-EPDCCH set on the frequency axis are set per PRB. The localized PRBs or the distributed PRBs may be set.

The resources for the LR-EPDCCH on the time axis are set per slot that is a shortened TTI. The consecutive slots or the non-consecutive slots may be set.

The LR-EPDCCH region or the LR-EPDCCH set is set per slot.

The LR-EPDCCH may be set every cell or every LR-UE. Alternatively, the LR-EPDCCH may be set every cell and every LR-UE in combination.

The LR-EPDCCH is set, for example, every cell on the time axis, and every UE on the frequency axis. Consequently, the eNB can preset the slot timing of the LR-EPDCCH, which facilitates the scheduling. The LR-UE can recognize the slot timing of the LR-EPDCCH that is set every cell, and the PRB configuration of the LR-EPDCCH that is set every UE in the slot.

As an alternative example, the resources to inch the LR-EPDCCH can be set may be set every cell, and the LR-EPDCCH for the LR-UE may be actually set every UE. Presetting, every cell, the resources to which the LR-EPDCCH can be set can facilitate the scheduling of the LR-EPDCCH in the same subframe as that of the legacy UE. The legacy UE and the LR-UE can easily coexist.

Settings of the LR-EPDCCH may be statically, semi-statically, or dynamically determined.

The settings may be statically determined, for example, in a standard. The RRC signaling may be used when the settings are semi-statically or dynamically determined.

For example, the settings per cell may be determined in a standard, and the settings per UE may be semi-statically or dynamically determined using the RRC signaling.

As an alternative example, the eNB may broadcast the settings per cell to the UEs being served thereby as broadcast information. The eNB notifies the LR-UE that implements the shortened TTI of the settings per LR-UE through the UE-dedicated signaling.

The eNB may include the setting information of the LR-EPDCCH in an RRC Connection Reconfiguration message and notify the LR-UE of such a message as the RRC signaling.

The number of the LR-EREGs for the LR-ECCEs may be less in a slot whose slot # is even-numbered when, for example, the number of symbols for the PDCCH increases. As a method for solving this problem, the number of the LR-EPDCCH sets may further be increased in the method for increasing the number of the LR-EPDCCH sets to be allocated to the LR-UE as described above. Alternatively, the LR-EPDCCH region may further be increased in the method for increasing the LR-EPDCCH region that the eNB allocates to the LR-UE as described above. Consequently, even when the number of symbols for the PDCCH increases, the number of REs in the LR-EPDCCH region in the slot whose slot # is even-numbered can be increased, and the DCI for the LR-UE can be mapped every slot.

The operations of the LR-UE will be disclosed. The LR-UE receives the PCFICH, and recognizes the first symbol in the PDSCH region of the slot #0. The LR-UE detects the LR-EPDCCH region by the own C-RNTI. The eNB notifies the configuration of the LR-EPDCCH region using, for example, the RRC signaling.

Consequently, the LR-UE can detect the LR-EPDCCH addressed to itself. The LR-UE obtains the DCI from the LR-EPDCCH detected by the own C-RNTI. The LR-UE receives the PDSCH using the scheduling information in the DCI. The slot information and the PRB information per slot may be used to recognize to which slot and to which PRB the PDSCH is allocated. The LR-UE demodulates the received PDSCH using the scheduling information to obtain the data. The LR-UE may use the CRS as an RS for demodulation. Alternatively, an RS for each UE may be provided, and the LR-UE may use the RS.

The method disclosed in the first modification of the first embodiment may be applied to the HARQ. Consequently, the same advantages as those according to the first modification of the first embodiment can be produced.

Sixth Modification of First Embodiment

The method for transmitting the PDCCH per slot for the LR-UE using the conventional PDCCH region may be combined with the method for transmitting the PDCCH per slot for the LR-UE using a predetermined PRB (LR-EPDCCH) per slot.

Figure 19:
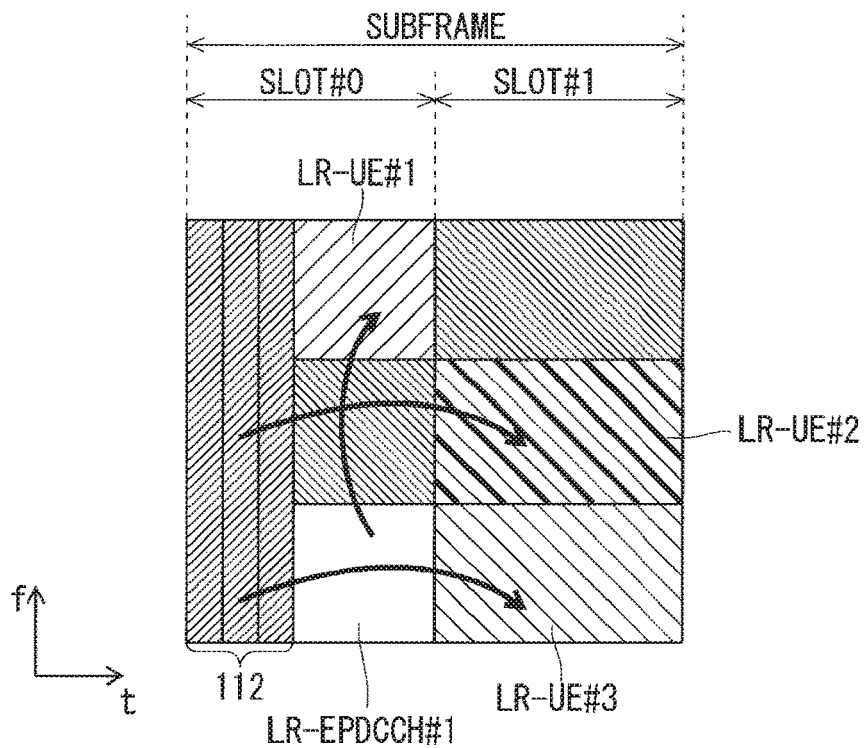
FIG. 19 is a view for describing a transmitting method according to the sixth modification of the first embodiment.

FIG. 19 is a view for describing a transmitting method according to the sixth modification of the first embodiment. FIG. 19 illustrates an example of combining the method for transmitting the PDCCH per slot for the LR-UE using the conventional PDCCH region with the method for transmitting the PDCCH per slot for the LR-UE using the LR-EPDCCH. The PDCCH per slot in the first slot in the subframe is transmitted using the LR-EPDCCH, and the PDCCH per slot in the second slot in the subframe is transmitted using a conventional PDCCH region 112.

Using the PDCCH per slot that is mapped to the LR-EPDCCH region in the first slot in the subframe, the PDSCH in the same slot is scheduled. Using the PDCCH per slot that is mapped to the conventional PDCCH region in the first slot in the subframe, the PDSCH in the next slot is scheduled.

Since the PDCCH per slot in the second slot in the subframe is transmitted using the conventional PDCCH region, the method for including the DCI for 1 TTI data, that is, 1 slot herein may be applied to the PDCCH per slot. The first modification of the first embodiment may be applied to the method for including the DCI for 1 slot.

The conventional PDCCH region already exists in the first slot in the subframe. Thus, use of the PDCCH region eliminates the need for configuring the LR-EPDCCH region in both of the slots in 1 subframe. Since new increase in the resources for control channels can be prevented, decrease in the resources for data channels can be prevented. Thus, the system throughput can be improved.

Figure 20:
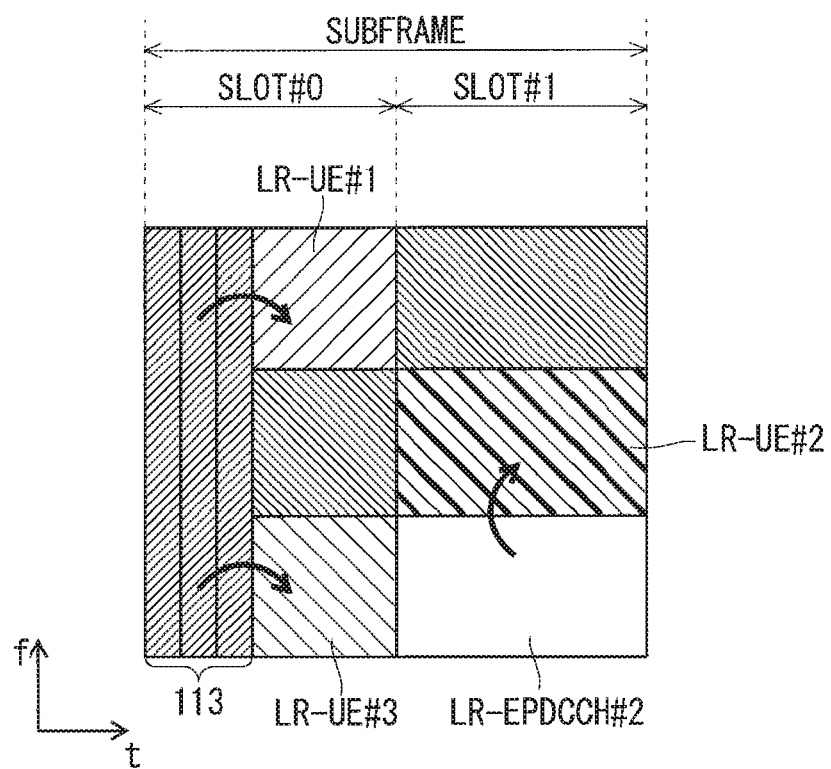
FIG. 20 is a view for describing a transmitting method according to the sixth modification of the first embodiment.

FIG. 20 is a view for describing a transmitting method according to the sixth modification of the first embodiment. FIG. 20 illustrates another example of combining the method for transmitting the PDCCH per slot for the LR-UE using the conventional PDCCH region with the method for transmitting the PDCCH per slot for the LR-UE using the LR-EPDCCH.

The PDCCH per slot in the first slot in the subframe is transmitted using a conventional PDCCH region 113, and the PDCCH per slot in the second slot in the subframe is transmitted using the LR-EPDCCH.

Using the PDCCH per slot that is mapped to the conventional PDCCH region in the first slot in the subframe, the PDSCH in the same slot is scheduled. Using the PDCCH per slot that is mapped to the LR-EPDCCH in the second slot in the subframe, the PDSCH in the same slot is scheduled.

Since the PDCCH per slot in the first slot in the subframe is transmitted using the conventional PDCCH region, the method for including the DCI for 1 TTI data, that is, 1 slot herein may be applied to the PDCCH per slot. The first modification of the first embodiment may be applied to the method for including the DCI for 1 slot.

As illustrated in the example of FIG. 19, the conventional PDCCH region already exists when the LR-EPDCCH region is configured in the first slot in the subframe. Thus, mapping to the physical resources excluding, the conventional PDCCH region may increase the physical resources in the frequency axis direction.

As illustrated in the example of FIG. 20, using the conventional PDCCH region in the first slot in the subframe eliminates the need for configuring the LR-EPDCCH region in the slot. Thus, since increase in the resources can be prevented more than that in the example illustrated in FIG. 19, decrease in the resources for data channels can be further prevented. Thus, the system throughput can be further improved.

Second Embodiment

Ack/Nack for the uplink data will be disclosed. The HARQ is conventionally performed per subframe due to TTI=1 subframe in LTE. Thus, the PHICH for transmitting Ack/Nack for the uplink data is transmitted also every subframe in LTE.

Since the TTI is shorter than 1 subframe, the HARQ needs to be performed on the LR-UE per unit shorter than 1 subframe.

When the HARQ is performed per unit shorter than 1 subframe, the conventional method for transmitting the PHICH in LTE cannot be applied thereto. To support the shortened TTI on the same LTE carriers, the LR-UE and the legacy UE have to coexist. The second embodiment will disclose a method for solving such problems.

The HARQ is performed on the LR-UE per TTI. Ack/Nack for the uplink data of the LR-UE can be transmitted per slot.

The following (1) to (8) will be disclosed as specific examples of the method for transmitting Ack/Nack.

(1) Ack/Nack is transmitted using an LR-PHICH.

(2) Ack/Nack is multiplexed to the LR-EPDCCH region to be transmitted.

(3) Ack/Nack is transmitted using the LR-EPDCCH.

(4) Ack/Nack is transmitted using the PHICH.

(5) Ack/Nack for the preceding slot is transmitted using the PHICH.

(6) Ack/Nack is transmitted using the PDCCH.

(7) Ack/Nack for the preceding slot is transmitted using the PDCCH.

(8) A combination of (1) to (7) above.

A method for transmitting Ack/Nack using the LR-PHICH in the specific example (1) will be disclosed. A physical channel for transmitting Ack/Nack for the uplink data of the LR-UE is provided. This physical channel may be referred to as an "LR-PHICH". The LR-PHICH may be transmitted in a slot whose slot # is even-numbered or odd-numbered. The physical resources for the LR-PHICH may be set per PRB.

The LR-PHICH is mapped to a physical resource region to which the conventional PDSCH is mapped. The LR-PHICH is mapped by avoiding PRB pairs to which the other channels are mapped. The TR-PHICH whose slot # is even-numbered is mapped except for the symbols (the first to fourth symbols) to which the conventional PDCCHs are mapped.

Figure 21:
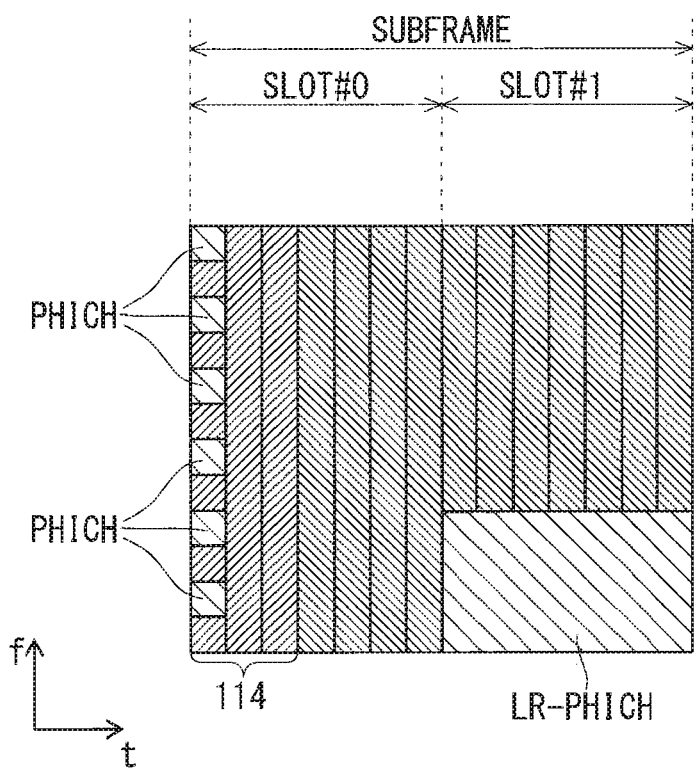
FIG. 21 is a view for describing a method for transmitting an LR-PHICH according to the second embodiment.
Figure 22:
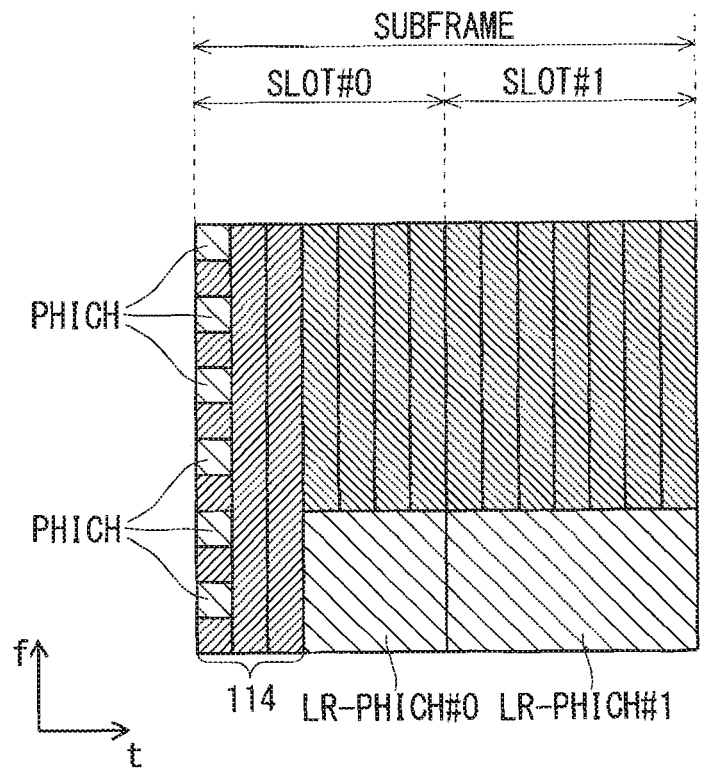
FIG. 22 is a view for describing a method for transmitting the LR-PHICH according to the second embodiment.

FIGS. 21 and 22 are views for describing a method for transmitting the LR-PHICH according to the second embodiment. FIG. 21 illustrates that the LR-PHICH is mapped to one PRB in the second slot in the subframe. FIG. 22 illustrates that the LR-PHICH is mapped to each of the PRBs in the first and second slots in the subframe. In the first slot in the subframe, the LR-PHICH is mapped to symbols except for symbols 114 to which the conventional PDCCHs are mapped.

A method for mapping Ack/Nack per shortened TTI, that is, per slot to the LR-PHICH be disclosed.

Ack/Nack for the uplink data of the LR-UE is configured in predetermined bits to be modulated. Multiplying modulation data of each LR-UE by an orthogonal code, multiplexing Ack/Nacks of a plurality of the LR-UEs, and scrambling are performed. The plurality of the LR-UEs are grouped into an LR-PHICH group.

The method applied to Ack/Nack for the uplink data of the legacy UE may cover the bits of the Ack/Nack to the scrambling. Ack/Nack is configured in 3 bits, BPSK modulation is performed on the Ack/Nack, the Ack/Nack is multiplexed using an orthogonal code, and the scrambling in SF=4 is performed on the Ack/Nack. The scrambling results in 12 symbols of data in 1 LR-PHICH group. Furthermore, 8 LR-UEs are multiplexed to the 1 LR-PHICH group.

Using the same method as that of the legacy UE can integrate the configurations of modulation and coding or the configurations of decoding and demodulation into one configuration. This can avoid increase in complexity of the communication system and facilitate its implementation.

One or more LR-PHICH groups are mapped to the physical resources for the LR-PHICH.

The mapping method will be disclosed hereinafter. One or more resource element groups are provided in 1 PRB that is an LR-PHICH region. These resource element groups will be referred to as "HREGs". 1 HREG consists of one or more REs. 1 LR-PHICH group is mapped to one or more HREGs.

For example, REs in 1 PRB are divided into 18 HREGs. The dividing method may be the same as that for the EREG. The REs in 1 PRB are numbered 0 to 17, and REs having the same number form 1 HREG. The REs may be numbered except for the RSs in 1 PRB. Assuming that the RSs correspond to 12 REs, the number of REs included in 1 HEREG is 4.

With the same modulating and coding methods as those of the legacy UE, the number of symbols necessary for 1 LR-PHICH group is 12. Thus, 1 LR-PHICH group may be mapped to 3 HREGs. Since 1 PRB consists of 18 HREGs, 6 LR-PHICH groups can be mapped.

When the number of RSs is larger than 4, the number of HREGs to which 1 LR-PHICH group is mapped may be increased.

Consequently, the LR-PHICH group can be mapped to 1 PRB that is an LR-PHICH region.

In the examples above, 1 PRB that is an LR-PHICH region can accommodate LR-PHICHs of 48 LR-UEs. If more LR-UEs need to be accommodated, the physical resources to which the LR-PHICH is mapped may be formed from a plurality of PRBs. The LR-PHICH region may be provided using a plurality of PRBs in 1 slot.

Another mapping method will be disclosed hereinafter.

The physical resources to which the LR-PHICH is mapped are formed from a plurality of PRBs, and 1 LR-PHICH group is mapped to the plurality of PRBs. The plurality of PRBs are formed in the same slot. The plurality of PRBs may be formed consecutively or non-consecutively.

A plurality of LR-PHICH regions each formed by one PRB may be defined as an LR-PHICH set. 1 LR-PHICH group is mapped to the LR-PHICH set.

The LR-PHICH set consisting of, for example, 3 LR-PHICH regions each formed by 1 PRB is provided. The LR-PHICH set consists of 3 PRBs. The LR-PHICH group is mapped to the entirety of the LR-PHICH set. The LR-PHICH group may be mapped using the HREG for each of the PRBs. Since the entire LR-PHICH set consists of 3 PRBs, the mapping is performed using 3 HREGs in total. Thus, 12 symbols necessary for the LR-PHICH group are mapped to the 3 HREGs.

Here, 18 LR-PHICH groups can be mapped to 1 LR-PHICH set. Thus, 1 LR-PHICH set can accommodate 144 LR-UEs.

Consequently, the LR-PHICHs for 1 LR-UE can be dispersed in the frequency axis direction and mapped.

With this, the frequency diversity gain can be obtained, and the HARQ can be reliably executed. Thus, the data transmission rate can be improved.

The setting information on the PHICH has conventionally been partly included in an MIB and mapped to a PBCH to be broadcast. This is because the PHICH is multiplexed to the symbol to which the PDCCH is mapped. The UE needs to recognize the setting information on the PHICH to enable reception of the PDCCH.

However, the LR-PHICH is mapped by avoiding a region to which the PDCCH is mapped. Thus, the setting information may not be included in the MIB. The setting information may not be mapped to the PBCH to be broadcast, either. Consequently, the amount of information of the MIB to be frequently transmitted can be reduced.

A method for setting the LR-PHICH will be disclosed hereinafter. An LR-PHICH region is set. The LR-PHICH region may be set as an LR-PHICH set. The resources for the LR-PHICH set on the frequency axis are set per PRB. The localized PRBs or the distributed PRBs may be set.

The resources for the LR-PHICH on the time axis are set per slot that is a shortened TTI. The consecutive slots or the non-consecutive slots may be set. The resources may be set every slot.

The LR-PHICH region or the LR-PHICH set is set per slot.

The LR-PHICH may be set every cell, every LR-UE, or every LR-UE group, that is, for example, every LR-PHICH group. The LR-PHICH may also be set as a system in a standard. Alternatively, the LR-PHICH may be set by a combination of these.

For example, the LR-PHICH is set every cell on the time axis and the frequency axis, and the HREGs are numbered every UE. The number of HREGs and the method for mapping the REs in a PRB may be predetermined as a system in a standard. Consequently, the eNB can preset the slot timing and a PRB of the LR-PHICH, which facilitates the scheduling. The LR-UE can recognize the slot timing and the PRB of the LR-PHICH that are set every cell, and the HREG in the slot and the PRB that are set every UE.

As an alternative example, the resources to which the LR-PHICH can be set may be set every cell, and the LR-PHICH for the LR-UE may be actually set every UE. Presetting, every cell, the resources to which the LR-PHICH can be set can facilitate the scheduling of the LR-PHICH in the same subframe as that of the legacy UE. The legacy UE and the LR-UE can easily coexist.

Settings of the LR-PHICH may be statically, semi-statically, or dynamically determined.

The settings may be statically determined, for example, in a standard. The RRC signaling may be used when the settings are semi-statically or dynamically determined.

For example, the settings per cell may be determined in a standard, and the settings per UE may be semi-statically or dynamically determined using the RRC signaling.

As an alternative example, the eNB may broadcast the settings per cell to the UEs being served thereby as broadcast information. The eNB notifies the LR-UE that implements the shortened TTI of the settings per LR-UE through the UE-dedicated signaling.

The eNB may include the setting information of the LR-PHICH in an RRC Connection Reconfiguration message and notify the LR-UE of such a message as the RRC signaling.

The operations of the LR-UE will be disclosed. The LR-UE receives the PCFICH and recognizes the first symbol in the PDSCH region of the slot #0.

The LR-UE detects the own LR-PHICH from the own HREG number in the LR-PHICH region. The eNB notifies the configuration of the LR-PHICH region and the HREG number using, for example, the RRC signaling.

Consequently, the LR-UE can detect the LR-PHICH addressed to itself and receive Ack/Nack.

The examples above disclose that the eNB notifies the HREG number to the LR-UE, and identifies the own LR-PHICH using the HREG number.

As an alternative example, the HREG number may be derived using the physical resources to which the PUSCH that is the uplink data corresponding to the LR-PHICH is mapped. Examples of the physical resources include a RE number and a PRB number. The HREG number may be identified as, for example, the smallest RE number or the smallest PRB number among them.

Alternatively, the HREG number may be derived using the control channel element number to which the scheduling information of the PUSCH that is uplink data corresponding to the LR-PHICH is mapped. The HREG number may be identified as, for example, the smallest control channel element number.

Alternatively, the HREG number may be derived using the cyclic shift number to be used for a RS for demodulating the PUSCH that is the uplink data corresponding to the LR-PHICH. Alternatively, the HREG number may be derived using a combination of these.

The eNB performs the scheduling or mapping in consideration of these numbers. The LR-UE can derive the own HREG number and identify the own LR-PHICH, even when the HREG number is not explicitly notified.

With the aforementioned processes, Ack/Nack for the uplink data of the LR-UE can be transmitted, and the HARQ for the uplink data can be performed per shortened TTI. The HARQ for the uplink data can be performed per slot. Thus, latency can be reduced, and the data transmission rate can be improved.

The method for multiplexing Ack/Nack to the LR-EPDCCH region to transmit the Ack/Nack in the specific example (2) will be disclosed.

Ack/Nack for the LR-UE is multiplexed and mapped to physical resources to which the LR-EPDCCH is mapped. The PHICH for the LR-UE and the PDCCH for the LR-UE are multiplexed within 1 PRB to which the LR-EPDCCH is mapped.

The multiplexing method will be disclosed. The multiplexing may be performed every RE. One or more LR-EREGs of the LR-EPDCCH are used for the PHICH for the LR-UE. In other words, one or more LR-EREGs are used for mapping not the LR-EPDCCH but the PHICH for the LR-LE. In other words, one or more LR-EREGs are defined as HREGs to which the PHICH for the LR-UE is mapped.

The aforementioned method may be applied to a method for configuring the LR-EPDCCH. The method for structuring the 16 groups of LR-EREGs 0 to 15 in a PRB is more suitable as the method for configuring the LR-EPDCCH. This is because according to the conventional modulating and coding methods for Ack/Nack, the number of REs necessary for 1 HREG is 4 and therefore the numbers of REs in the respective LR-EREGs are equal or closer to each other.

The LR-EPDCCH sets may be 3 sets. Thus, the LR-EPDCCH sets can be used for configuring 3 HREGs.

The aforementioned method for identifying the HREG in the LR-PHICH may be applied as a method for identifying the HREG.

Thus, the physical resource region for the LR-PHICH may not be newly provided. Since the eNB does not need to notify the LR-UE of the configuration of the LR-PHICH, the amount of signaling can be reduced.

Figure 23:
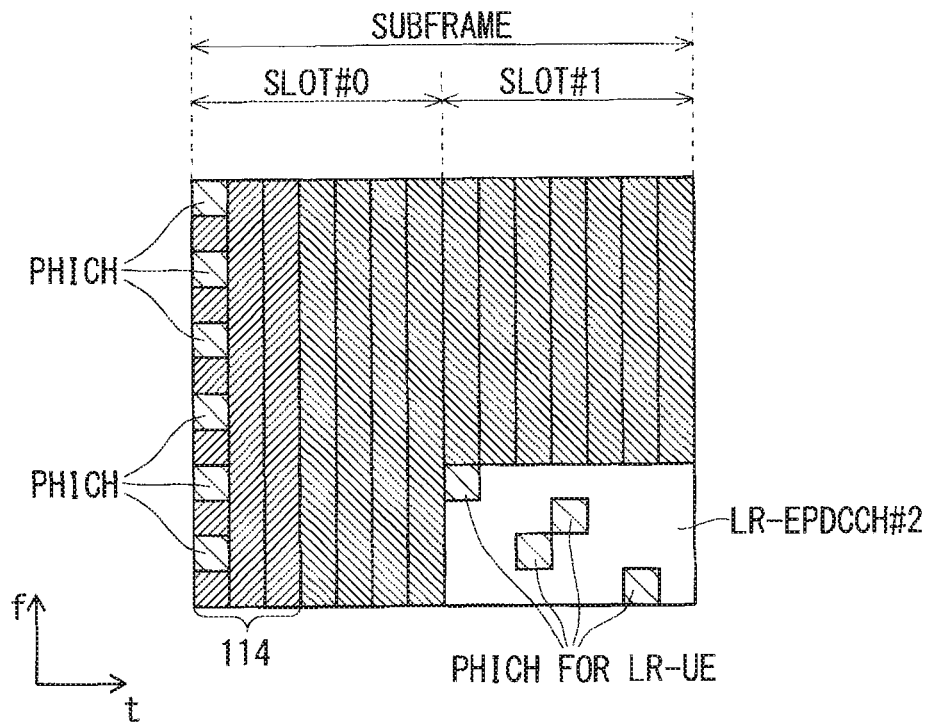
FIG. 23 is a view for describing a method for multiplexing Ack/Nack to an LR-EPDCCH region to transmit the Ack/Nack according to the second embodiment.

FIGS. 23 and 24 are views for describing a method for multiplexing Ack/Nack to the LR-EPDCCH region to transmit the Ack/Nack according to the second embodiment. Ack/Nack for the uplink data is mapped to the PHICHs for the LR-UE and multiplexed to the LR-EPDCCH region to be transmitted according to the second embodiment.

FIG. 23 illustrates that the PHICHs for the LR-UE are multiplexed and mapped to the LR-EPDCCH region in the second slot in the subframe. FIG. 24 illustrates that the PHICHs for the LR-UE are multiplexed and mapped to the LR-EPDCCH region in each of the first and second slots in the subframe. In the first slot in the subframe, the PHICHs for the LR-UE are multiplexed and mapped to the LR-EPDCCH except for the symbols to which the conventional PDCCHs are mapped.

Consequently, Ack/Nack for the uplink data of the LR-UE can be transmitted, and the HARQ for the uplink data can be performed per shortened TTI. The HARQ for the uplink data can also be performed per slot. Thus, latency can be reduced, and the data transmission rate can be improved.

The method for transmitting Ack/Nack using the LR-EPDCCH in the specific example (3) will be disclosed. Ack/Nack for the uplink data of the LR-UE is transmitted only by scheduling in the LR-EPDCCH. The PHICH of the LR-UE may not be provided.

The DCI for the LR-UE includes information indicating new data or not. The DCI is mapped to the LR-EPDCCH. The LR-UE can recognize whether the scheduling is performed for the new data or the retransmission data by receiving the LR-EPDCCH addressed to itself and receiving the information in the DCI. When the information indicates the new data, the LR-UE transmits the new data according to the scheduling. Here, the LR-UE can determine Ack. When the information does not indicate the new data, the LR-UE transmits the retransmission data according to the scheduling. Here, the LR-UE can determine Nack.

Consequently, Ack/Nack for the uplink data of the LR-UE can be transmitted, and the HARQ for the uplink data can be performed per shortened TTI. The HARQ for the uplink data can also be performed per slot. Thus, latency can be reduced, and the data transmission rate can be improved.

Neither the LR-PHICH nor the region for the LR-PHICH may be provided. Thus, the physical resources to be used as data can be increased, and the data transmission rate can be further improved.

The method for transmitting Ack/Nack using the PHICH in the specific example (4) will be disclosed. The PHICH of the legacy UE is mapped to a slot whose slot # is even-numbered. In the present method, the PHICH of the LR-UE is also mapped to a region to which the PHICH is mapped. The PHICH of the LR-UE may be mapped to the physical resources of the PHICH in the same manner as that of the legacy UE.

Consequently, Ack/Nack for the uplink data of the LR-UE can be transmitted, and the HARQ for the uplink data can be performed.

The region for the LR-PHICH may not be provided. Thus, the physical resources to be used as data can be increased, and the data transmission rate can be improved.

The method for transmitting Ack/Nack for the preceding slot using the PHICH in the specific example (5) will be disclosed. The PHICH of the legacy UE is mapped to a slot whose slot # is even-numbered. In the present method, the PHICH of the LR-UE for the preceding slot is also mapped to a region to which the PHICH is mapped. The PHICH of the LR-UE for the preceding slot may be mapped to the physical resources of the PHICH in the same manner as that of the legacy UE.

The LR-UE stores the uplink data corresponding to the PHICH for the preceding slot. Upon receipt of the PHICH of the slot whose slot # is even-numbered, the LR-UE can recognize the Ack/Nack of the uplink data corresponding to the PHICH for the preceding slot. Thus, the LR-UE can transmit the new data or the retransmission data according to the PHICH in the slot whose slot # is even-numbered by storing the uplink data corresponding to the PHICH for the preceding slot.

Consequently, Ack/Nack for the uplink data of the LR-UE can be transmitted, and the HARQ for the uplink data can be performed.

The region for the LR-PHICH may not be provided. Thus, the physical resources to be used as data can be increased, and the data transmission rate can be improved.

The method for transmitting Ack/Nack using the PDCCH in the specific example (6) will be disclosed. In the present method, Ack/Nack for the uplink data of the LR-UE is transmitted only by scheduling in the PDCCH. The scheduling method using the PDCCH described above or to be described later is used. The method for scheduling the PUSCH using the PDCCH is used. The scheduling is performed using the DCI of per-TTI data for the LR-UE. Consequently, Ack/Nack can be transmitted every slot. The DCI of per-TTI data for the LR-UE includes information indicating new data or not. The DCI is mapped to the PDCCH. The LR-UE can recognize whether the scheduling is performed for the new data or the retransmission data by receiving the PDCCH addressed to itself and receiving the information in the DCI. When the information indicates the new data, the LR-UE transmits the new data according to the scheduling. Here, the LR-UE can determine Ack. When the information does not indicate the new data, the LR-UE transmits the retransmission data according to the scheduling. Here, the LR-UE can determine Nack.

In a method of including, in the DCI, 2 TTIs of the scheduling information of the per-TTI data for the LR-UE, the DCI may include the information indicating new data or not, in association with the data per TTI. The DCI is mapped to the PDCCH. The LR-UE can recognize whether the scheduling for each slot is performed for the new data or the retransmission data by receiving the PDCCH addressed to itself and receiving the information in the DCI. When the information indicates the new data, the LR-UE transmits the new data in the corresponding slot according to the scheduling. Here, the LR-UE can determine Ack. When the information does not indicate the new data, the LR-UE transmits the retransmission data in the corresponding slot according to the scheduling. Here, the LR-UE can determine Nack.

Consequently, Ack/Nack for the uplink data of the LR-UE can be transmitted, and the HARQ for the uplink data can be performed.

Neither the LR-PHICH nor the region for the LR-PHICH may be provided. Thus, the physical resources to be used as data can be increased, and the data transmission rate can be improved.

The method for transmitting Ack/Nack for the preceding slot using the PDCCH in the specific example (7) will be disclosed.

In the present method, Ack/Nack for the uplink data of the LR-UE is transmitted only by scheduling in the PDCCH. Ack/Nack to be transmitted in a predetermined slot is transmitted for the LR-UE through the scheduling of the PUSCH using the PDCCH in the next slot. In other words, Ack/Nack to be transmitted in a preceding slot is transmitted through the scheduling of the PUSCH in a predetermined slot using the PDCCH. The method for scheduling the PUSCH using the PDCCH to which the third modification of the first embodiment is applied may be applied thereto. Ack/Nack to be transmitted in a preceding slot whose slot # is odd-numbered is transmitted using the scheduling of the PUSCH in the PDCCH in a slot whose slot # is even-numbered.

The DCI including the scheduling information of the PUSCH to be scheduled for the LR-UE in the PDCCH in the slot whose slot # is even-numbered includes information indicating whether the uplink data corresponding to Ack/Nack for the preceding slot is new data. The LR-UE can recognize whether the scheduling is performed for the new data or the retransmission data by receiving the PDCCH addressed to the own slot whose slot # is even-numbered and receiving the information in the DCI. When the information indicates the new data, the LR-UE transmits the new data according to the scheduling. Here, the LR-UE can determine Ack. When the information does not indicate the new data, the LR-UE transmits the retransmission data according to the scheduling. Here, the LR-UE can determine Nack.

The LR-UE stores the uplink data corresponding to Ack/Nack for the preceding slot. Upon receipt of the PDCCH of the slot whose slot # is even-numbered, the LR-UE can recognize Ack/Nack for the preceding slot. Thus, the LR-UE can transmit the new data or the retransmission data according to Ack/Nack of the slot whose slot # is even-numbered by storing the uplink data corresponding to the Ack/Nack for the preceding slot.

Consequently, Ack/Nack for the uplink data of the LR-UE can be transmitted, and the HARQ for the uplink data can be performed.

Neither the LR-PHICH nor the region for the LR-PHICH may be provided. Thus, the physical resources to be used as data can be increased, and the data transmission rate can be improved.

With application to mapping the PDCCH of the LR-UE only to slots whose slot # is even-numbered, the PDCCH may not be mapped to slots whose slot # is odd-numbered and the PDCCH region may not be provided for the slots whose slot # is odd-numbered. Consequently, increase in the physical resources for control can be avoided, and the physical resources for data can be increased.

The specific examples (1) to (7) may be combined. For example, the method in the specific example (4) or (5) is used for the slots whose slot # is even-numbered, and the method in one of the specific examples (1) to (3) is used for the slots whose slot # is odd-numbered.

Since a slot whose slot # is even-numbered includes a PDCCH region, the physical resource to be allocated to the LR-PHICH becomes less in 1 PRB. Thus, many more physical resources may be required in the slot for transmitting the LR-PHICH on the frequency axis.

Applying the method using the PHICH in the specific example (4) or the PHICH in the specific example (5) to a slot whose slot # is even-numbered can prevent increase in the physical resources to be allocated to the LR-PHICH in the slot whose slot # is even-numbered. Thus, the physical resources to be used as data can be increased, and the data transmission rate can be improved.

Third Embodiment

The uplink shared channel PUSCH to which data of the legacy UE is mapped is mapped to the physical resources per subframe. Under the current LTE standards, the PUSCH of the legacy UE is mapped to physical resources in PRB pairs.

The PRB stands for Physical Resource Block, and is composed of a physical resource of 12 sub-carriers in a frequency axis direction and 1 slot in a time axis direction, similarly as the downlink. The PRB pair consists of 2 PRBs on the time axis (see Non-Patent Document 9).

FIG. 25 is a view for describing mapping the conventional PUSCHs and PUCCHs to physical resources. In the example illustrated in FIG. 25, 1 slot consists of 7 symbols. Thus, 1 subframe consists of 14 symbols. The PUCCHs are mapped to both ends of the frequency axis direction. The PUSCHs are mapped to the frequency domain between the PUCCHs at both ends of the frequency axis direction.

1 PRB is composed of a physical resource of 12 sub-carriers in the frequency axis direction and 1 slot in the time axis direction.

As illustrated in FIG. 25, the conventional PUSCHs are mapped to a PRB pair consisting of 2 PRBs of 2 slots. Arrow marks 121 and 122 indicate frequency hopping between 2 slots in a subframe and frequency hopping between subframes, respectively.

The PUCCHs are mapped to a PRB pair consisting of 2 PRBs of 2 slots. As illustrated by an arrow mark 120, frequency hopping is performed between 2 slots in the subframe. The PUCCHs are set per subframe.

The PUSCHs are scheduled using PDCCHs. The PDCCHs are mapped to a PDCCH region. In other words, the physical resources to which the PUSCHs are mapped are scheduled per PRB pair. The physical resources are temporally scheduled per subframe.

Since the TTI of the UE (LR-UE) operating with the shortened TTI is shorter than 1 subframe, the mapping method of the legacy UE is not applicable to mapping the PUSCHs to the physical resources. Thus, some new methods are required.

To support the shortened TTI on the same LTE carriers, the LR-UE and the legacy UE have to coexist. The methods for solving these problems will be disclosed hereinafter.

The PUSCH of the LR-UE is mapped, per PRB, to a physical resource region to which the conventional PUSCHs are mapped. One or more PRBs may be used per PUSCH.

Under the current LTE, the SC-FDMA is used for the uplink. Thus, when a plurality of PRBs are used for the PUSCH of the LR-UE, localized PRBs may be used. The PUSCH of the LR-UE can be mapped while a peak-to-average power ratio (PAPR) remains low.

In the future where the OFDMA will be used for the uplink, localized PRBs or distributed PRBs may be used similarly as the PDSCH for the downlink. The high-speed transmission becomes possible using the localized PRBs at a frequency band whose uplink communication quality is superior. Alternatively, using the distributed PRBs enables obtainment of the frequency diversity gain and improvement in the communication quality.

The PUSCHs of the LR-UE are mapped by avoiding PRB pairs to which the PUSCHs of the legacy UE are mapped.

The RSs for uplink demodulation may be mapped to the symbols identical to those of the RSs for demodulation in the PUSCHs of the conventional legacy UE. Consequently, the methods for inserting the RSs into the PUSCHs are integrated into one method, and the control can be facilitated.

Figure 26:
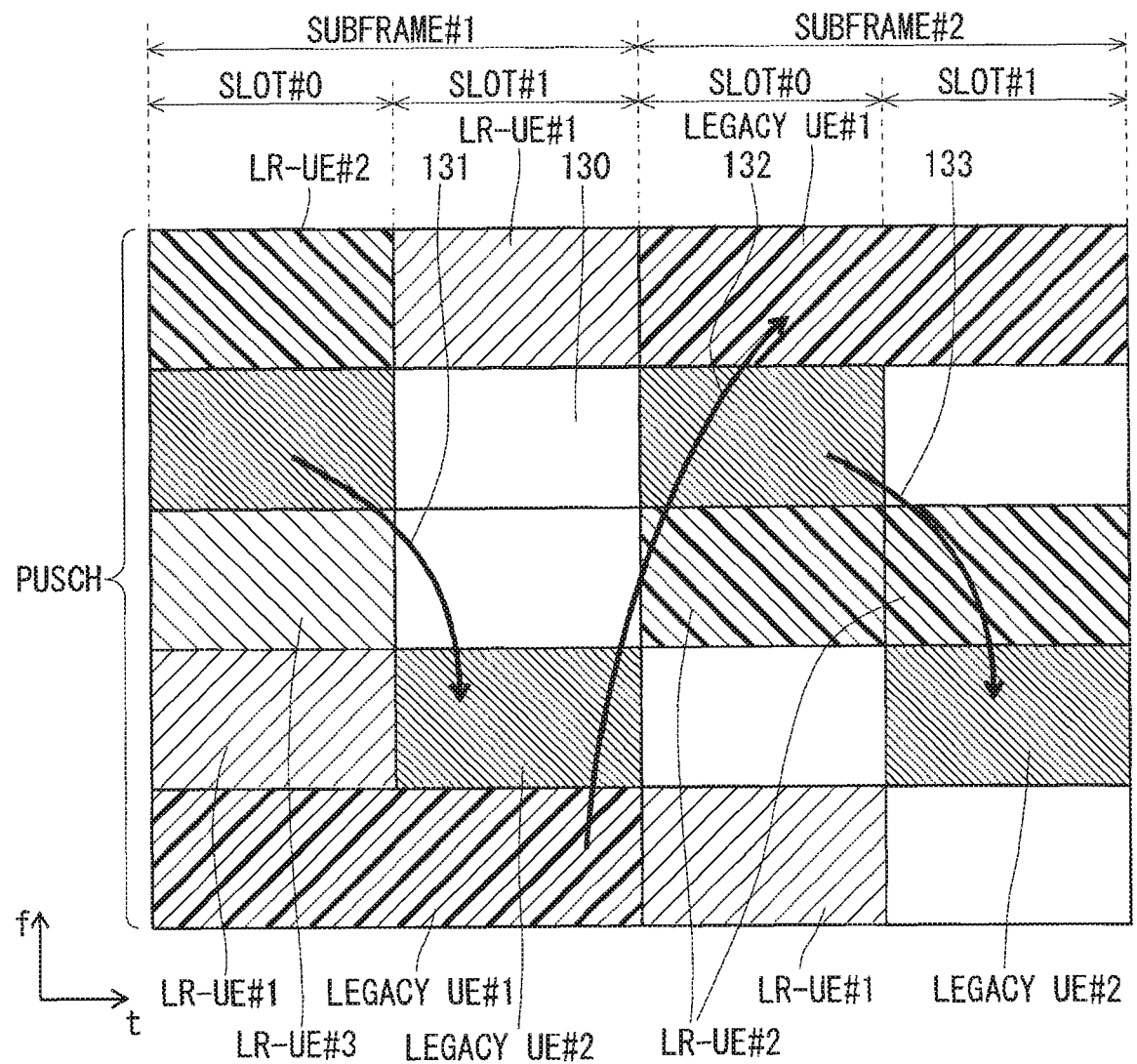
FIG. 26 is a view for describing mapping PUSCHs of the LR-UE to physical resources according to the third embodiment.

FIG. 26 is a view for describing mapping the PUSCHs of the LR-UE to physical resources according to the third embodiment.

As illustrated in FIG. 26, the PUSCHs of the legacy UE are mapped to a PRB pair consisting of 2 PRBs of 2 slots in a subframe. As illustrated by an arrow mark 132, the legacy UE #1 performs frequency hopping between the subframes. As illustrated by arrow marks 131 and 133, the legacy UE #2 performs frequency hopping between 2 slots in the respective subframes.

The PUSCH per slot of the LR-UE is mapped per PRB. The LR-UEs #1, #2, and #3 are mapped in the first slot of the subframe #1, and the LR-UE #1 is mapped in the second slot. The LR-UEs #1 and #2 are mapped in the first slot of the subframe #2, and the LR-UE #2 is mapped in the second slot. As denoted by a reference "130", the physical resources that are not scheduled per PRB exist.

The PUSCHs of the legacy UE are scheduled per subframe, and allocated to the physical resources per subframe. The downlink control information (DCI) includes control information for scheduling including the allocation information for allocating the PUSCHs to the physical resources. The DCI is mapped to the PDCCHs (see Non-Patent Document 10).

However, the shortened TTI is shorter than 1 subframe, and the physical resources to be allocated are also shorter than 1 subframe for the LR-UE. Thus, the method for scheduling the legacy UE is not applicable.

To support the shortened TTI on the same LTE carriers, the LR-UE and the legacy UE have to coexist.

The method for scheduling the PDSCH may be applied as a method for solving these problems.

Scheduling per shortened TTI data is performed for the LR-UE. The PUSCHs for the LR-UE are scheduled every shortened TTI. The scheduling is performed per slot when TTI=1 slot. The PUSCHs for the LR-UE are allocated to the physical resources per slot. The HARQ is performed per TTI. The HARQ is performed on the LR-UE per slot. The HARQ is performed on the legacy UE per subframe.

The method for scheduling the PDSCHs of the LR-UE may be applied as a method for scheduling the PUSCHs of the LR-UE.

The method may be applied by associating the PDSCHs with the PUSCHs and associating the scheduling information for the PDSCHs included in the DCI of the LR-UE with the scheduling information for the PUSCHs as necessary.

The data per shortened TTI of the LR-UE can be scheduled by scheduling the PUSCH of the LR-UE every shortened TTI, for example, scheduling the LR-UE using the PDCCH or the LR-EPDCCH. Thus, the data transmission rate of the LR-UE can be improved. The LR-UE can coexist with the legacy UE while the shortened TTI is supported for the LR-UE on the same LTE carriers.

Fourth Embodiment

The PUCCHs of the legacy UE are scheduled per subframe, and allocated to the physical resources per subframe. However, the shortened TTI for the LR-UE is shorter than 1 subframe, and the physical resources to be allocated are also shorter than 1 subframe. Thus, the PUCCH of the legacy UE cannot be used. To support the shortened TTI on the same LTE carriers, the LR-UE and the legacy UE have to coexist. The fourth embodiment will disclose a method for solving such problems.

The PUCCH of the LR-UE (hereinafter may be referred to as an "LR-PUCCH") is mapped, per PRB, to a physical resource region to which the conventional PUSCHs are mapped. One or more PRBs may be used.

Under the current LTE, the SC-FDMA is used for the uplink. When a plurality of PRBs are used for the PUCCH of the LR-UE using such a single-carrier multiple access scheme, the localized PRBs may be used. Thus, the PUCCH of the LR-UE can be mapped while the PAPR remains low.

In the future where a multi-carrier multiple access scheme such as the OFDMA will be used for the uplink, the localized PRBs or the distributed PRBs may be used. The high-speed transmission becomes possible using the localized PRBs at a frequency band whose uplink communication quality is superior. Alternatively, using the distributed PRBs enables obtainment of the frequency diversity gain and improvement in the communication quality.

The LR-PUCCH is mapped by avoiding the physical resources to which the PUCCHs of the legacy UE are mapped. The LR-PUCCH may be mapped to the physical resources at a frequency inside that of the physical resources to which the PUCCHs of the legacy UE are mapped. Consequently, the legacy UE and the LR-UE can coexist without changing the scheduling of the physical resources of the PUCCHs of the legacy UE.

The LR-PUCCH and the PUCCH of the legacy UE may be mapped to the physical resources consecutively on the frequency axis. Since the PUSCH regions are never discrete in using a single-carrier multiple access scheme, the use efficiency of the uplink physical resources can be increased and the capacity as a cell can be improved.

The RSs for uplink demodulation may be mapped to the symbols identical to those of the RSs for demodulation in the PUCCHs of the conventional legacy UE. Consequently, the methods for inserting the RSs into the PUCCHs are integrated into one method, and the control can be facilitated.

The PUCCHs of a plurality of the LR-UEs may be multiplexed in a physical resource region to which the LR-PUCCH is mapped. The PUCCHs may be, for example, frequency-division multiplexed or code-division multiplexed.

The resources of the LR-PUCCH for Ack/Nack for the PDSCH of each LR-UE may be derived to be a physical resource region to which the LR-PUCCH is mapped, using a predetermined CCE number of the PDCCH of the LR-UE with which the PDSCH is scheduled. When the PDSCH is scheduled using the LR-EPDCCH, the resources may be derived to be a physical resource region to which the LR-PUCCH is mapped by providing an offset in the frequency axis direction. The eNB may notify the LR-UE of the offset value. The eNB may notify it to the LR-UE using the RRC signaling or the LR-EPDCCH. The offset value may be included in the DCI for scheduling the PDSCH and notified.

Figure 27:
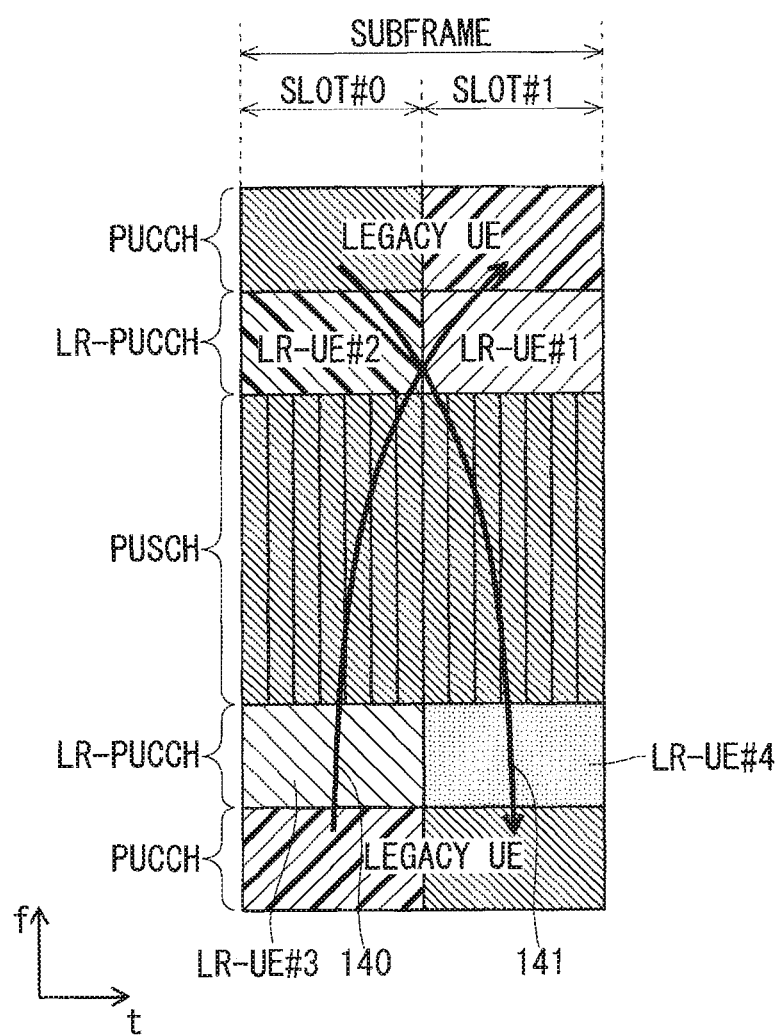
FIG. 27 is a view for describing mapping PUCCHs of the LR-UE to physical resources according to the fourth embodiment.

FIG. 27 is a view for describing mapping the PUCCHs of the LR-UE to physical resources according to the fourth embodiment. In the example illustrated in FIG. 27, physical resource regions to which the LR-PUCCHs are mapped are configured to be continuous with the inner portions of the frequency domains to which the conventional PUCCHs are mapped. The LR-PUCCHs are mapped every slot. In the first slot of the subframe, the LR-PUCCH of the LR-UE #2 is mapped to the physical resource region for the LR-PUCCH at one side, and the LR-PUCCH of the LR-UE #3 is mapped to the physical resource region for the LR-PUCCH at the opposite side. In the second slot of the subframe, the LR-PUCCH of the LR-UE #1 is mapped to the physical resource region for the LR-PUCCH at one side, and the LR-PUCCH of the LR-UE #4 is mapped to the physical resource region for the LR-PUCCH at the opposite side.

Although the physical resource regions of the LR-PUCCHs are configured on both sides of the frequency axis, the physical resource region may be configured only on one side of the frequency axis. Such a configuration is effective when the communication quality is superior and the frequency hopping is unnecessary. Since the physical resources to be allocated to the PDSCHs can be increased, the throughput as a system can be increased.

The uplink control information (UCI) of the LR-UE includes information per slot. The UCI of the LR-UE may be modulated and coded as conventionally performed. Increase in complexity of the control can be avoided using the same method as that of the legacy UE. A unit that receives the PUCCH can be easily implemented in the eNB.

Although the UCI to be transmitted on the PUCCH is mapped to the physical resources using 1 subframe for the legacy UE, the UCI is mapped to the physical resources using 1 slot for the LR-UE.

However, the necessary physical resources may be lacking in the time axis direction when the UCI of the LR-UE is modulated and coded as conventionally performed. Such a case may be addressed by increasing the physical resources in the frequency axis direction and using a method for mapping the UCI to the increased physical resources. The number of PRBs in 1 slot may be increased. Localized PRBs may be used for a single carrier. The localized PRBs or the distributed PRBs may be used for multi-carriers As an alternative method, the amount of information of the UCI of the LR-UE may be reduced to reduce the necessary amount of the physical resources. As an additional alternative method, the modulating or coding method may be changed to reduce the necessary amount of the physical resources. The physical resources may be reduced to the same amount as that of the conventional PUCCHs on the frequency axis. Consequently, the physical resources necessary for the control channels can be reduced, and the physical resources to which data channels can be mapped can be increased. Thus, the data transmission rate can be improved.

As illustrated by arrow marks 140 and 141 in mapping of the PUCCHs of the legacy UE to the physical resources, the frequency hopping is performed between the slots to obtain the frequency diversity gain. However, since each of the PUCCHs of the LR-UE is mapped in 1 slot, the frequency hopping cannot be performed between the slots. The methods for solving this problem will be disclosed hereinafter.

The symbols in a slot are divided into a plurality of groups. The frequency hopping may be performed between the groups. How to group the symbols in a slot may be statically predetermined, for example, in a standard, or semi-statically or dynamically determined. When the grouping is semi-statically or dynamically determined, the eNB may determine the grouping and notify the determined grouping information to the UE. The grouping information may be notified using the RRC signaling or through the PDCCH or the LR-EPDCCH as a notification method. Alternatively, the notification method may be a combination of these. For example, a list of groupings may be determined by a standard, and the eNB may determine an indication indicating which grouping is to be used and notify the indication to the UE. Consequently, the amount of signaling can be reduced.

Figure 28:
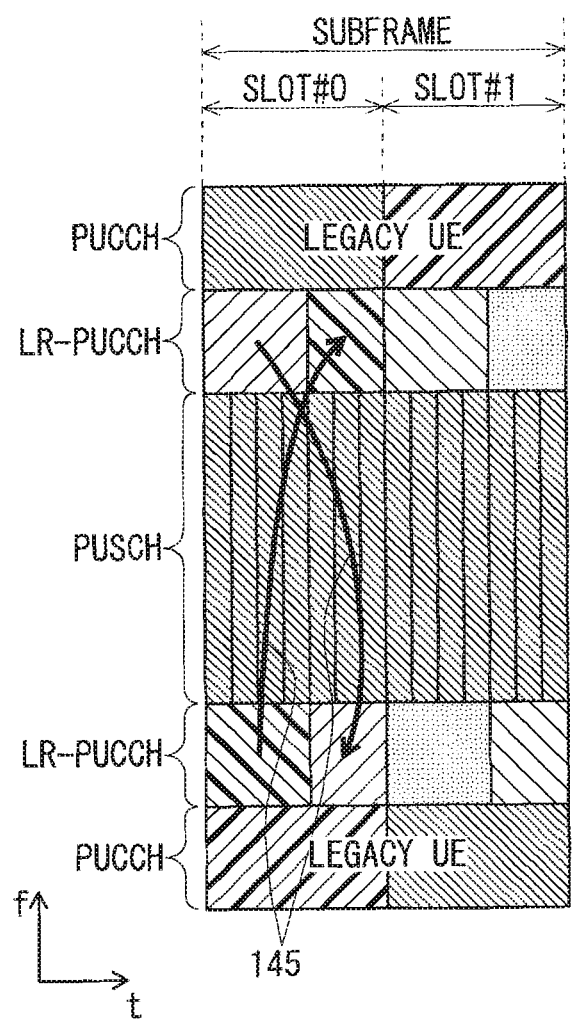
FIG. 28 is a view for describing another method for mapping the PUCCHs of the LR-UE to the physical resources according to the fourth embodiment.

FIG. 28 is a view for describing another method for mapping the PUCCHs of the LR-UE to physical resources according to the fourth embodiment.

In the example illustrated in FIG. 28, physical resource regions to which the LR-PUCCHs are mapped are configured to be continuous with the inner portions of the frequency domains to which the conventional PUCCHs are mapped. The LR-PUCCHs are mapped every slot. In the example illustrated in FIG. 28, two groups of consecutive symbols are structured in a slot. As illustrated by arrow marks 145, frequency hopping of the LR-PUCCHs is performed between the groups of the symbols in the slot. Consequently, the frequency diversity gain can be obtained, and the communication quality of the PUCCHs can be improved.

The conventional methods for setting the PUCCHs may be applied to a method for setting the LR-PUCCHs. Although the PUCCHs are conventionally set by setting a PRB configuration per subframe, the LR-PUCCHs may be set by setting a PRB configuration per slot instead.

The conventional methods for notifying the PUCCH configuration may be applied as a method for notifying the LR-PUCCH configuration from the eNB to the LR-UE.

The LR-UE maps the UCI per slot to the LR-PUCCH using the LR-PUCCH configuration notified from the eNB, and transmits the UCI to the eNB.

Consequently, the UCI per shortened TTI of the LR-UE can be mapped to the PUCCHs, and the PUCCHs can be mapped to the physical resources every shortened TTI.

The PUCCHs are used for transmitting Ack/Nack for the downlink data. Thus, the HARQ can be performed for the downlink data in the shortened TTI of the LR-UE. Thus, latency can be reduced, and the data transmission rate can be improved.

The LR-UE and the legacy UE can coexist on the same LTE carriers.

Fifth Embodiment

A Sounding Reference Signal (SRS) of the legacy UE is scheduled per subframe, and is allocated to the last symbol in a subframe. However, the shortened TTI for the LR-UE is shorter than 1 subframe. The SRS per subframe may be incompatible with the shortened TTI. Thus, a SRS compatible with the shortened TTI is required. To support the shortened TTI on the same LTE carriers, the LR-UE and the legacy UE have to coexist. The fifth embodiment will disclose a method for solving these problems.

A SRS for the LR-UE is configurable per slot. The SRS can be set per slot for the LR-UE. The SRS for the LR-UE is mapped to the physical resources per slot.

The SRS is configured in any 1 symbol in a slot. The SRS may be configured in the last 1 symbol in a slot. The symbol number of the SRS may differ every slot. For example, the SRS of the LR-UE may be configured in the last symbol in a slot whose slot # is even-numbered, whereas the SRS of the LR-UE may be configured in the first symbol in a slot whose slot # is odd-numbered.

When the SRS of the LR-UE is configured in the last symbol in the slot whose slot # is odd-numbered, it conflicts with the SRS of the legacy UE. In order to avoid this, the SRS of the LR-UE and the SRS of the legacy UE may be frequency-division multiplexed.

The method for configuring the SRS of the legacy UE may be applied as a method for configuring the SRS of the LR-UE. Consequently, even when the SRS of the LR-UE is configured in the last symbol in a slot whose slot # is odd-numbered, the SRS of the LR-UE and the SRS of the legacy UE can coexist.

Figure 29:
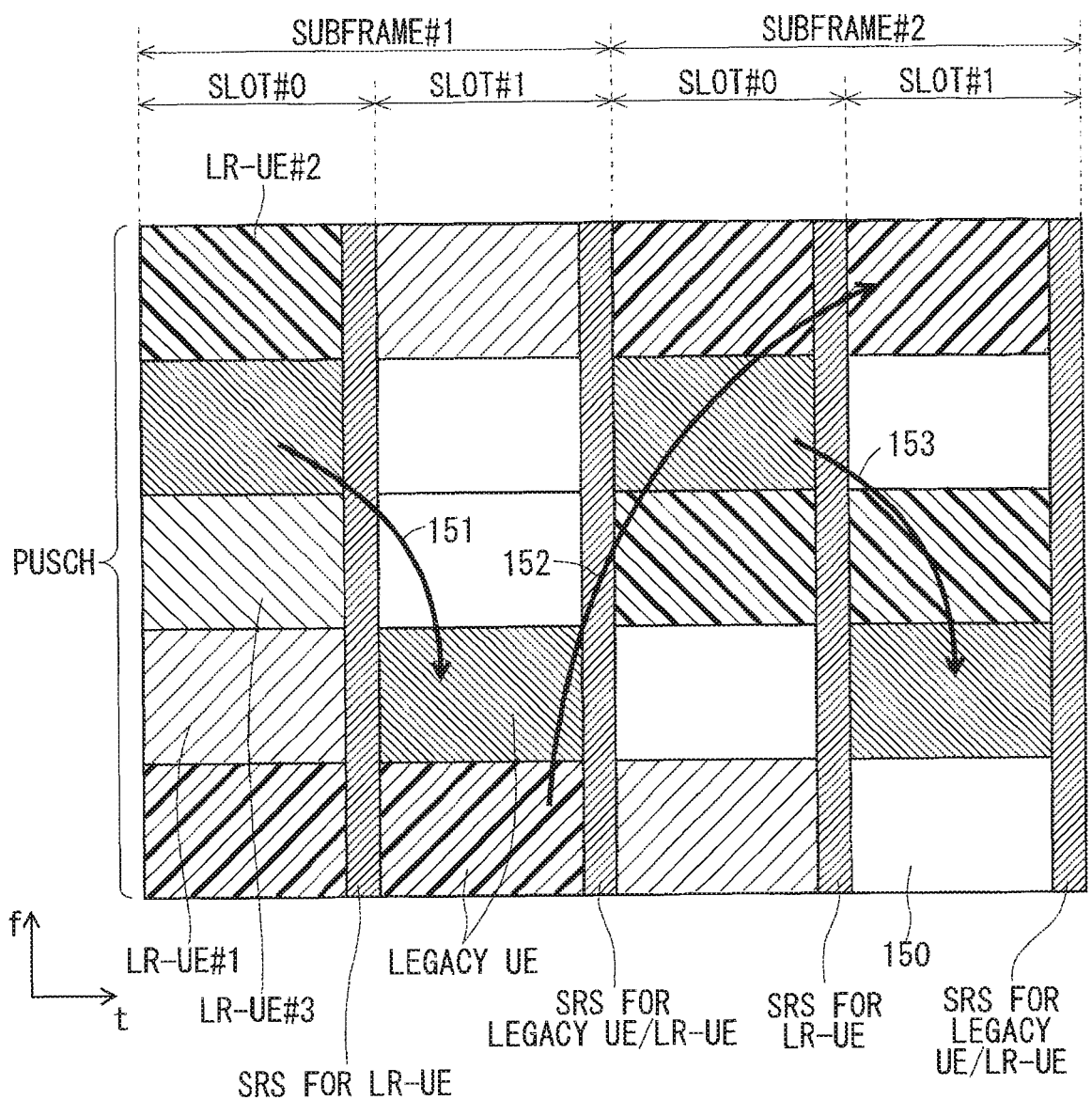
FIG. 29 is a view for describing a method for configuring SRSs of the LR-UE according to the fifth embodiment.

FIG. 29 is a view for describing a method for configuring the SRSs of the LR-UE according to the fifth embodiment. In the example illustrated in FIG. 29, the SRS of the LR-UE is configured in the last symbol of every slot. The conventional SRS of the legacy UE is configured in the last symbol in each subframe, that is, the last symbol in the second slot in each of the subframes. Thus, the SRS of the LR-UE is also configured in the same symbol in the example illustrated in FIG. 29. The SRS of the legacy UE is multiplexed with the SRS of the LR-UE in the symbol. Consequently, the SRS of the legacy UE and the SRS of the LR-UE can coexist. The LR-UE can transmit the SRSs using the symbol in which the SRSs are configured.

As illustrated by arrow marks 151 and 153 in the example illustrated in FIG. 29, the legacy UE performs frequency hopping between 2 slots in a subframe. As illustrated by an arrow mark 152, the legacy UE performs frequency hopping between the subframes. As denoted by a reference "150", the physical resources that are not scheduled per PRB exist.

An example of the method for setting the SRS will be disclosed. The SRS is set per slot for the LR-UE. The SRS may be set every cell or every UE. Alternatively, a part of the SRS configuration may be set every cell, and the remaining SRS configuration may be set every UE. The eNB notifies the LR-UE of setting information of the SRS per slot. The RRC signaling, the PDCCH, or the LR-EPDCCH may be used. When the SRS is set every cell, the setting may be included in the system information to be broadcast. The system information is an MIB or an SIB. When the SRS is set to each UE, the setting may be notified using the dedicated RRC signaling. When the SRS is set to each UE, the information may be included in the DCI and notified using the PDCCH or the LR-EPDCCH.

For example, the eNB initially sets a SRS configuration every cell. Then, the eNB sets a SRS configuration to be used for each LR-UE in the set SRS configuration.

The SRS configuration per cell may be, for example, resource information on the time axis. The SRS configuration may be information for identifying in which slot the SRS is configured. Examples of the identifying information include a system frame number (SFN), a radio frame number, a slot number, a symbol number, an offset value of a radio frame in a system frame, an offset value of a slot in a subframe, and an interval between slots, etc. With these, the LR-UE can identify a slot in which the SRS is to be configured every cell.

The SRS configuration per UE may be the resource information on the frequency axis. The SRS configuration may be information for identifying in which PRB the SRS is configured. Examples of the information for identifying in which PRB the SRS is configured include a PRB number, etc. Alternatively, the identifying information may be information for identifying in which sub-carrier the SRS is configured. Examples of the information for identifying in which sub-carrier the SRS is configured include a sub-carrier number, etc.

The SRS configuration per UE may be information on a method for multiplexing with another LR-UE or the legacy UE. For example, in frequency-division multiplexing with the other LR-UE or the legacy UE within 1 PRB, the SRS configuration may be information capable of identifying the resources on the frequency axis in which the own SRS is configured. Examples of the information capable of identifying the resources include an offset value of a sub-carrier and a sub-carrier interval, etc.

The LR-UE maps the SRSs to the physical resources using the SRS configuration notified from the eNB, and transmits the SRSs.

The LR-UE does not transmit data using a symbol in which the SRS is configured per slot. The LR-UE does not map data to the symbol.

The LR-UE needs not to transmit data, as the symbol, in not only a symbol with the SRS configuration that is set to each LR-UE but also a symbol with the SRS configuration that is set every cell. The LR-UE needs not to map data in the symbol.

The LR-UE needs not to transmit data in a symbol in which the SRS of the legacy UE is configured. The LR-UE needs not to map data to the symbol.

The LR-UE needs not to transmit data, as the symbol, in a symbol with the SRS configuration that is set every cell. The LR-UE needs not to map data to the symbol.

The LR-UE may receive, from the eNB, the SRS configuration set every cell for the legacy UE.

Consequently, the LR-UE can avoid a conflict of the own transmission data with the own SRS or the SRS of the legacy UE.

When the SRS for the LR-UE is configured in any 1 symbol in a slot, the SRS may conflict with the uplink data of the legacy UE. Here, the communication quality of the uplink data of the legacy UE and the accuracy in the SRS of the LR-UE degrade. The methods for solving such problems will be disclosed.

The SRS of the LR-UE is not configured in a PRB region in which the PUSCH of the legacy UE is transmitted. The eNB may prevent the SRS of the LR-UE from being set in the PRB region in which the PUSCH of the legacy UE is transmitted.

The LR-UE transmits the SRS in at least one of a PRB to which the PUSCH for the LR-UE is mapped and a PRB to which nothing is mapped.

Figure 30:
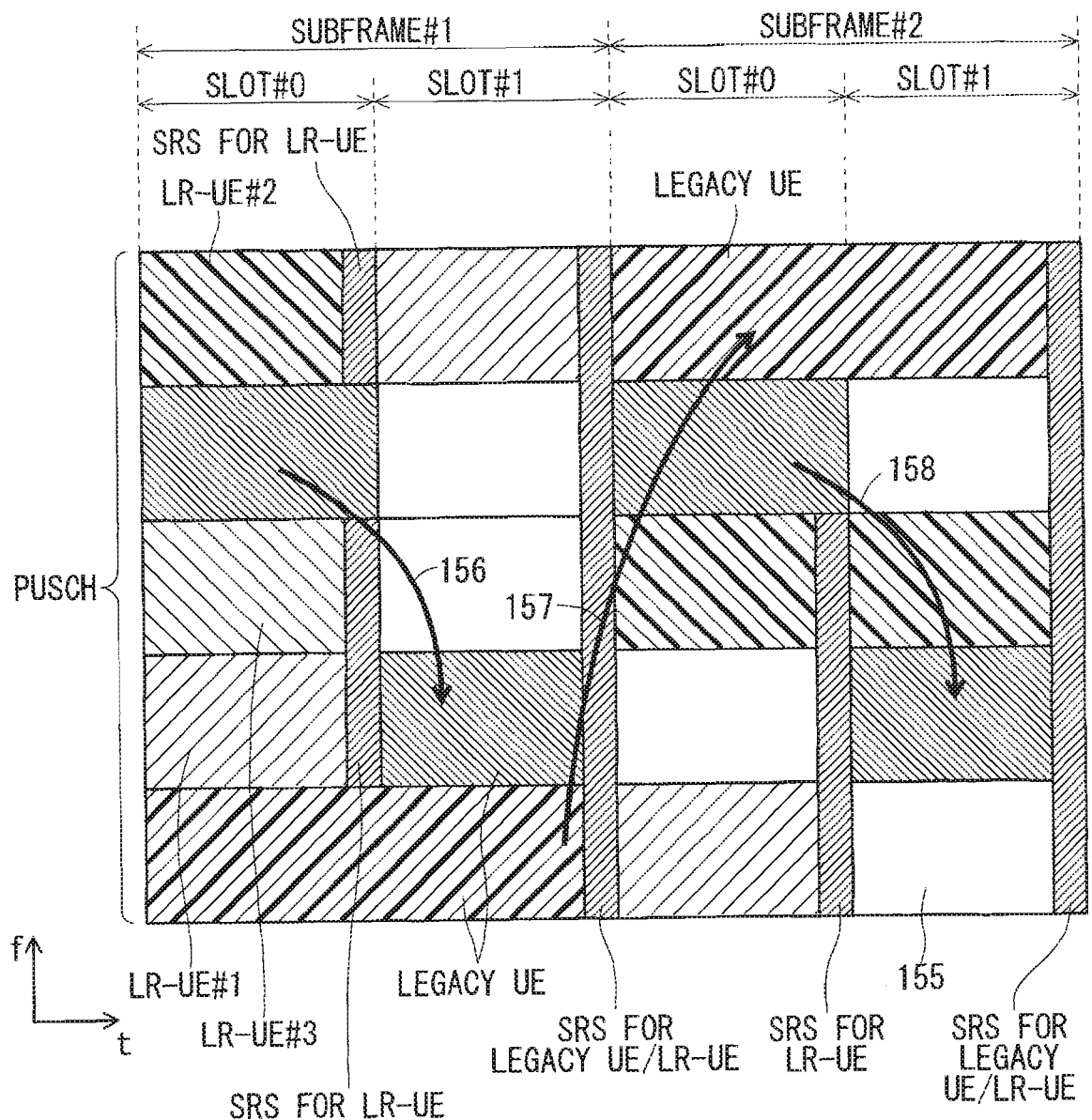
FIG. 30 is a view for describing a method for configuring the SRSs of the LR-UE according to the fifth embodiment.

FIG. 30 is a view for describing a method for configuring the SRSs of the LR-UE according to the fifth embodiment. The SRS of the LR-UE is not configured in a PRB region in which the PUSCH of the legacy UE is transmitted. In the first slot of the subframe #1 in the example illustrated in FIG. 30, the SRS of the LR-UE is not configured in the last symbol of the PRBs to each of which the PUSCH of the legacy UE is mapped. The SRS of the LR-UE is configured in the last symbol of the PRBs to each of which the PUSCH of the LR-UE is mapped.

In the first slot of the subframe #2, the SRS of the LR-UE is not configured in the last symbol of the PRBs to each of which the PUSCH of the legacy UE is mapped. The SRS of the LR-UE is configured in the last symbol of the PRBs to each of which the PUSCH of the LR-UE is mapped and of the PRB in which nothing is scheduled.

In the example illustrated in FIG. 30, the SRS of the legacy UE is configured in the last symbol of the second slot in each of the subframes #1 and #2. The SRS of the LR-UE is also configured in the same symbols. The SRS of the legacy UE is multiplexed with the SRS of the LR-UE in each of the symbols.

Consequently, the conflict between the PUSCH of the legacy UE and the SRS of the LR-UE can be avoided. The SRS of the legacy UE and the SRS of the LR-UE can coexist. The LR-UE can transmit the SRSs using the symbols in each of which the SRSs are configured.

As illustrated by arrow marks 156 and 158 in the example illustrated in FIG. 30, the legacy UE performs frequency hopping between 2 slots in the respective subframes. As illustrated by an arrow mark 157, the legacy UE also performs frequency hopping between the subframes. As denoted by a reference "155", the physical resources that are not scheduled per PRB exist.

Since the eNB schedules the PUSCHs for the legacy UE, the eNB recognizes the PRBs to which the PUSCHs are mapped. Thus, the eNB may configure the SRSs for the LR-UE by avoiding the PRBs to which the PUSCHs of the legacy UE are mapped.

Alternatively, although the eNB may configure the SRSs for the LR-UE, every cell, in the PRBs to which the PUSCHs of the legacy UE are mapped, the eNB may set the SRSs, every LR-UE, by avoiding the PRBs to which the PUSCHs of the legacy UE are mapped.

The LR-UE transmits the SRSs according to the own SRS settings that are notified from the eNB.

The LR-UE may not recognize a PUSCH region of another LR-UE using such a method. Thus, increase in complexity of the control over the LR-UE can be avoided.

As an alternative method, the eNB may notify the LR-UE of PUSCH region information of another LR-UE. Alternatively, the eNB notifies the LR-UE of region information to which nothing is mapped. Examples of the PUSCH region information and the region information to which nothing is mapped include a PRB number. Upon receipt of the information, the LR-UE can transmit the SRS in the region.

The eNB notifies, for example, a slot configuration as the SRS configuration for the LR-UE per cell. Then, the eNB notifies, every LR-UE, the SRS setting information, and at least one of the PUSCH region information of the other LR-UE and the region information to which nothing is mapped.

The LR-UE transmits the SRS in at least one of the PRB to which the PUSCH for the LR-UE is mapped and the PRB to which nothing is mapped, using such information received from the eNB according to the own SRS settings.

The LR-UE can transmit the SRS by avoiding the PRB to which the PUSCH of the legacy UE is mapped, using such a method.

The eNB may secure in advance a physical resource region to which the PUSCH of the LR-UE is mapped when notifying, every LR-UE, the PUSCH region information of the other LR-UE. However, securing a physical resource region in advance may not be able to flexibly accommodate a temporally dynamic load state and a radio propagation situation, and reduce the use efficiency of the physical resources.

The SRSs may be dynamically set as a method for solving such problems. The eNB notifies the LR-UE of a request for transmitting SRSs when requiring the SRSs to be transmitted from the LR-UE.

The request for transmitting the SRSs may be notified to the LR-UE by the PDCCH or the LR-EPDCCH. The request included in the DCI per slot may be notified. The eNB notifies, as well as the request for transmitting the SRSs, the SRS setting information, and at least one of the PUSCH region information of the other LR-UE and the region information to which nothing is mapped.

Upon receipt, from the eNB, the PDCCH or the LR-EPDCCH addressed to itself, the request for transmitting the SRSs, and such information, the LR-UE transmits the SRSs using an uplink slot corresponding to the slot in which the PDCCH or the LR-EPDCCH is transmitted, according to the received information.

The eNB may notify, without the request for transmitting the SRSs, merely the SRS setting information, and the information of at least one of the PUSCH region of the other LR-UE and the region to which nothing is mapped. The LR-UE may determine to transmit the SRSs upon receipt of the information. Consequently, the information for request can be reduced.

Alternatively, the eNB may notify only the request for transmitting the SRSs and the SRS setting information. The eNB does not notify the information of at least one of the PUSCH region of the other LR-UE and the region to which nothing is mapped.

As described above, since the eNB schedules the PUSCHs for the legacy UE, the eNB recognizes the PRBs to which the PUSCHs are mapped. The eNB can set the SRSs for the LR-UE by avoiding the PRBs to which the PUSCHs of the legacy UE are mapped. Here, the eNB may notify only the request for transmitting the SRSs and the SRS setting information.

The LR-UE sets the SRSs according to the own SRS settings notified from the eNB, and transmits the SRSs using the corresponding uplink slot in response to the request for transmitting the SRSs notified from the eNB.

Consequently, since the information of at least one of the PUSCH region of the other LR-UE and the region to which nothing is mapped does not need to be notified, the amount of the DCI can be reduced.

Alternatively, the eNB may notify not the request for transmitting the SRSs but only the SRS setting information. The SRS settings may be determined as the request for transmitting the SRSs. The LR-UE transmits the SRSs using the corresponding uplink slot, according to the own SRS settings notified from the eNB. This can further reduce the amount of the DCI.

The LR-UE can cope with the flexible scheduling of the PUSCHs of the legacy UE, using such a method. The LR-UE can transmit the SRSs by avoiding the PRBs to which the PUSCHs of the legacy UE are mapped.

Since the temporally dynamic load state and the radio propagation situation can be flexibly accommodated, decrease in the use efficiency of the physical resources can be prevented.

As an alternative method, the SRS for the LR-UE may be configured in the last symbol in a slot whose slot # is odd-numbered and multiplexed with the SRS of the legacy UE in the aforementioned method.

The eNB notifies the legacy UE of the SRS configuration of the legacy UE. Thus, the legacy UE recognizes in the last symbol of which slot the SRS is configured and does not transmit data using the symbol. The conflict with the data of the legacy UE can be avoided using the symbol in which this data is not transmitted as a symbol for the SRS of the LR-UE.

Using the method above enables the SRS of the LR-UE to be transmitted per slot. The SRS of the LR-UE and the SRS of the legacy UE can coexist on the same LTE carriers.

Thus, the eNB can receive the SRS per slot of the LR-UE, and data can be efficiently scheduled for the LR-UE using the SRS.

The eNB can improve the data scheduling efficiency for the LR-UE while preventing decrease in the data scheduling efficiency for the legacy UE.

Thus, the data transmission rate of the LR-UE can be improved while decrease in the data transmission rate of the legacy UE can be prevented.

The same slot may undergo both setting of the SRS of the LR-UE and transmission of the PUCCH. Here, the conventional method applied when the SRS and the PUCCH are concurrently generated may be used. Increase in complexity of the control can be avoided using the conventional method.

As described above, the fifth embodiment discloses the SRS per slot to support the shortened TTI.

However, the conventional method for transmitting the SRSs per subframe may be applied as an alternative method for transmitting the SRSs of the LR-UE.

The SRS per slot may be unnecessary in scheduling by the eNB. Examples of such a case include a case with less cell load, etc. Decrease in the scheduling efficiency of the eNB will be subtle even without the SRS per slot. Applying the conventional method for transmitting the SRSs under such a circumstance enables prevention of increase in the amount of signaling. Increase in complexity of the control can be avoided because of facilitation of coexistence with the legacy UE.

The SRS per slot and the SRS per subframe may be appropriately combined. The SRSs may be used differently every cell or every UE. The SRSs may be used differently, semi-statically or dynamically. The SRSs may be used differently depending on, as a judgment criterion, a cell load, a cell throughput, an average cell latency, and the communication quality per UE, every required Quality of Service (QoS), and every required latency, etc.

Although Ack/Nack for the SR, the CSI, and the downlink data is transmitted using the PUCCHs for the LR-UE, the conventional method on the PUCCHs and the SRSs of the legacy UE may be used in transmitting the PUCCH and the SRS of the LR-UE in the same symbol.

Sixth Embodiment

The first embodiment discloses the case where 1 TTI=1 slot as an example of the shortened TTI. The sixth embodiment will disclose a solution for TTI=1 symbol as an example of the shortened TTI.

The following (1) and (2) will be disclosed as methods for transmitting the PDSCH and the PDCCH.

(1) A physical resource region to which the PDCCH of the LR-UE is mapped is set for the UE using the RRC signaling.

(2) A physical resource region to which the PDSCH of the LR-UE is mapped is set for the UE using the RRC signaling.

In the transmitting method (1), the PDCCH of the LR-UE includes the scheduling information of the PDSCH of the LR-UE. The LR-UE receives the PDCCH addressed to itself, the scheduling information of the PDSCH included in the received PDCCH and addressed to itself, and then the PDSCH.

Specific examples of the transmitting method (1) will be further disclosed. The physical resources to which the PDCCHs of the LR-UE are mapped are configured per PRB. The physical resources to which the PDCCHs of the LR-UE are mapped may be configured per PRB pair.

The PDCCH of the LR-UE is mapped to a physical resource region to which the conventional PDSCH is mapped.

The PDCCH of the LR-UE is mapped by avoiding a PRB pair to which the PDSCH for the legacy UE is mapped.

The symbols (the first to fourth symbols, indicated by the PCFICH) to which the conventional PDCCHs are mapped are excluded.

With such a method, the PDCCH region of the LR-UE can coexist with the existing physical channels. Here, the PDCCH region of the LR-UE will be referred to as an "LR-PDCCH region".

The PDCCHs of a plurality of the LR UEs are multiplexed in the LR-PDCCH region. The PDCCHs of any one of the LR-UEs are mapped in 1 symbol. The PDCCHs of a plurality of the LR UEs may be multiplexed in 1 symbol. Alternatively, the PDCCH of one LR-UE may be mapped in 1 symbol, and the PDCCHs of a plurality of the LR UEs may be multiplexed in the LR-PDCCH region.

The DCI of the LR-UE may be the DCI per TTI=1 symbol. The DCI includes the scheduling information for 1 symbol.

The DCI of the LR-UE may include the scheduling information of the PDSCH of the LR-UE. The scheduling information of the LR-UE may include the allocation information for allocating the PDSCH of the LR-UE to the physical resources. The DCI of the LR-UE is mapped to the PDCCH of the LR-UE, and then to the LR-PDCCH region.

Examples of the scheduling information include the allocation information and the MCS information. Examples of the allocation information include symbol information and sub-carrier information. Instead of the sub-carrier information, the PRB information may be used as information per PRB to identify the physical resources on the frequency axis. Examples of the PRB information include the number of PRBs and a PRB number, etc.

The CRC scrambled by the C-RNTI of the LR-UE may be used for the PDCCH for the LR-UE. The PDCCH addressed to itself can be detected and received by searching for the LR-PDCCH region using the own C-RNTI of the LR-UE, similarly as the PDCCH for the conventional UEs.

The PDCCH including the scheduling information of the PDSCH of the LR-UE may be mapped to the same symbol as that of the PDSCH in the LR-PDCCH region.

Consequently, the LR-UE can receive the PDSCH in the same symbol as the one in which the own PDCCH was detected and received.

A plurality of the PDCCHs of the LR-UE may be mapped to a plurality of symbols in the LR-PDCCH region.

The LR-UE detects and receives the own PDCCH in the LR-PDCCH region every symbol. The LR-UE receives the PDSCH existing in the same symbol as that of the PDCCH, according to the scheduling information of the received PDCCH.

A plurality of the PDCCHs of the LR-UE may be mapped in 1 symbol. Each performs the scheduling for different PDSCHs. The PDSCHs may be mapped to the same symbol or different symbols.

When the PDSCHs are mapped to the same symbol, the LR-UE detects and receives the own PDCCH in the LR-PDCCH region every symbol. The LR-UE receives a plurality of the PDSCHs existing in the same symbols as those of the PDCCHs, according to the scheduling information included in the received plurality of PDCCHs.

When the PDSCHs are mapped to different symbols, the DCI may include information for identifying the symbols. The information is effective not only when the PDSCHs are scheduled in the same symbol but also when the PDSCHs are scheduled in different symbols. The LR-UE detects and receives the own PDCCH in the LR-PDCCH region every symbol. The LR-UE receives the PDSCH using the symbol in which the PDSCH is scheduled, according to the scheduling information included in the received plurality of PDCCHs.

The scheduling information on a plurality of the PDSCHs may be mapped to the DCI of one PDCCH of the LR-UE. The PDSCHs may be mapped to the same symbol or different symbols. The DCI may include information for identifying symbols to which the respective PDSCHs are mapped. The LR-UE detects and receives the own PDCCH in the LR-PDCCH region every symbol. The LR-UE receives a plurality of the PDSCHs included in the received PDCCHs, according to the scheduling information of the plurality of PDSCHs.

Figure 31:
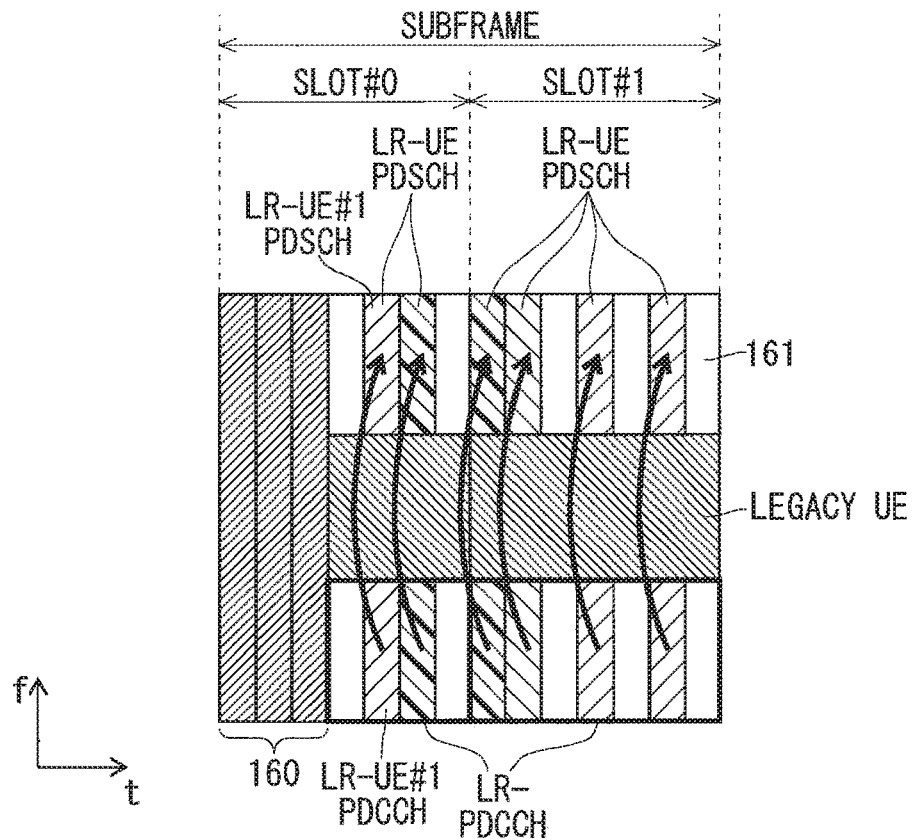
FIG. 31 is a view for describing a method for transmitting a PDCCH per symbol and a PDSCH per symbol for the LR-UE according to the sixth embodiment.

FIG. 31 is a view for describing a method for transmitting the PDCCH per symbol and the PDSCH per symbol for the LR-UE according to the sixth embodiment. In the example illustrated in FIG. 31, the LR-PDCCH region is configured per PRB every slot. The LR-PDCCH region and a region to which the PDSCH of the legacy UE is mapped are configured so as not to overlap each other. When the LR-PDCCH region is configured in advance, the PDSCH of the legacy UE is mapped by avoiding the LR-PDCCH region. The PDCCHs of a plurality of the LR-UEs are multiplexed and mapped to the LR-PDCCH region every symbol. A plurality of the PDCCHs of the same LR-UE may be mapped. The LR-PDCCH region in the first slot in the subframe excludes symbols in a conventional PDCCH region 160.

The PDSCHs of the LR-UE are scheduled by the PDCCHs of the LR-UE that are mapped to the LR-PDCCH region. The PDSCH is scheduled in a symbol including the PDCCH of the LR-UE. The PDSCH of the LR-UE and the PDSCH of the legacy UE are scheduled so as not to overlap each other. This enables the coexistence with the legacy UE.

In the example illustrated in FIG. 31, the PDSCHs of the LR-UE are scheduled in the same frequency domain on the frequency axis. The PDSCHs of the LR-UE are not limited to such but may be separately scheduled in different frequency domains on the frequency axis. When the PDSCHs are scheduled in the same frequency domain on the frequency axis, for example, per 12 sub-carriers that form a frequency domain of a PRB, the scheduling can be performed easily and efficiently in consideration of the relationship with the mapping of the PDSCH of the legacy UE to the physical resources. As denoted by a reference "161", the physical resources that are not scheduled per PRB exist.

Figure 32:
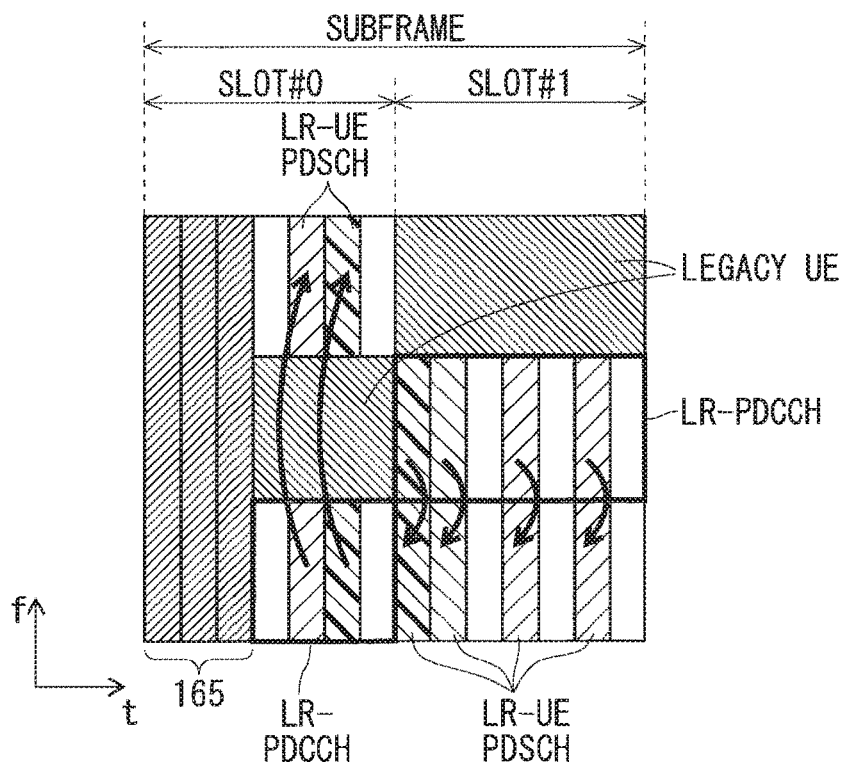
FIG. 32 is a view for describing another example of the PDCCH per symbol and the PDSCH per symbol for the LR-UE according to the sixth embodiment.

FIG. 32 is a view for describing another example of the PDCCH per symbol and the PDSCH per symbol for the LR-UE according to the sixth embodiment. FIG. 32 illustrates that frequencies of a PRB pair of the PDSCHs of the legacy UE are different. The LR-PDCCHs are configured in different frequency domains on the frequency axis every slot. The PDSCHs are scheduled in the second slot in the subframe successively from the PDCCHs of the LR-UE that are mapped to the LR-PDCCH region. The LR-PDCCH region in the first slot in the subframe excludes symbols in a conventional PDCCH region 165.

Thus, flexibly configuring the LR-PDCCH region per PRB every slot enables flexible settings of the physical resources to which the PDSCH of the legacy UE and the PDSCHs of the LR-UE are mapped.

A method for setting the LR-PDCCH region will be disclosed. The LR-PDCCH region is set. The LR-PDCCH region may be set as an LR-PDCCH set. The resources of the LR-PDCCH set on the frequency axis are set per PRB. The localized PRBs or the distributed PRBs may be set.

The resources of the LR-PDCCH region on the time axis are set per slot. The consecutive slots or the non-consecutive slots may be set. The resources may be set every slot. Alternatively, the resources may be set per subframe.

The LR-PDCCH region may be set every cell, every LR-UE, or every LR-UE group, for example, every LR-UE group that is mapped to the LR-PDCCH region. The LR-PDCCH region may also be set as a system in a standard. Alternatively, the LR-PDCCH region may be set by a combination of these.

The LR-PDCCH region is set, for example, every cell on the time axis and the frequency axis. A multiplexing method in 1 symbol for the LR-UE may be predetermined as a system in a standard. Consequently, the eNB can preset the slot timing and the PRB of the LR-PDCCH region, which facilitates the scheduling. The LR-UE can recognize the slot timing and the PRB of the LR-PDCCH region that are set every cell, search the slot and the PRB for the PDCCH per UE, and receive the PDCCHs.

As an alternative example, the resources to which the LR-PDCCH region can be set may be set every cell, and the LR-PDCCH region for the LR-UE may be actually set every UE. Presetting, every cell, the resources to which the LR-PDCCH region can be set can facilitate the scheduling of the PDCCH of the LR-UE in the same subframe as that of the legacy UE. The legacy UE and the LR-UE can easily coexist.

Settings of the LR-PDCCH region may be statically, semi-statically, or dynamically determined.

The settings may be statically determined, for example, in a standard. The RRC signaling may be used when the settings are semi-statically or dynamically determined.

For example, the settings per cell may be determined in a standard, and the settings per UE may be semi-statically or dynamically determined using the RRC signaling.

As an alternative example, the eNB may broadcast the settings per cell to the UEs being served thereby as broadcast information. The eNB notifies the LR-UE that implements the shortened TTI of the settings per LR-UE through the UE-dedicated signaling.

The eNB may include the setting information of the LR-PDCCH region in an RRC Connection Reconfiguration message and notify the LR-UE of such a message as the RRC signaling.

The operations of the LR-UE will be disclosed. The LR-UE receives the PCFICH, and recognizes the first symbol in the PDSCH region of the slot #0. The LR-UE detects the LR-PDCCH region by the own C-RNTI. The eNB notifies the configuration of the LR-PDCCH region using, for example, the RRC signaling.

Consequently, the LR-UE can detect the PDCCH addressed to itself. The LR-UE obtains the DCI from the PDCCH detected by the own C-RNTI. The LR-UE receives the PDSCH using the scheduling information in the DCI. The symbol information and the sub-carrier information may be used to recognize to which slot and to which PRB the PDSCH is allocated. The PRB information may be used as information per PRB to identify a frequency domain in a symbol. The LR-UE demodulates the received PDSCH using the scheduling information to obtain the data.

The RS is provided every symbol in the LR-PDCCH region. The RS may be provided in a symbol to which the PDCCH of the LR-UE is mapped. The RS may be used to demodulate the PDCCH. The RS is provided in a physical resource of a symbol to which the PDSCH of the LR-UE is mapped. The RS may be used to demodulate the LR-PDSCH. The RS may be provided for each cell or for each LR-UE.

The interval of sub-carriers on which the RSs are set may be increased when the PDCCHs or the PDSCHs of the LR-UE are mapped to a plurality of localized PRBs on the frequency axis. For example, the number of PRBs and the interval of subcarriers on which the RSs are set may be predetermined in a standard. Alternatively, the eNB may determine the sub-carrier interval semi-statically or dynamically, and notify it to the LR-UE using the RRC signaling.

Mapping the PDCCH and the PDSCH of the LR-UE to the localized PRBs on the frequency axis enables demodulation of the PDCCH and the PDSCH using RSs mapped on the combination of the PDCCH and the PDSCH. Here, the interval of sub-carriers on which the RSs are set can be increased. In such a case, the number of localized PRBs and the interval of subcarriers on which the RSs are set may be predetermined in a standard. Alternatively, the eNB may determine the sub-carrier interval semi-statically or dynamically, and notify it to the LR-UE using the RRC signaling.

Mapping the PDCCH and the PDSCH of the LR-UE to the consecutive symbols on the time axis enables demodulation of the PDCCH and the PDSCH using RSs mapped on the combination of the PDCCH and the PDSCH. Here, the interval between symbols on which the RSs are set can be increased. In such a case, the number of consecutive symbols and the interval between symbols on which the RSs are set may also be predetermined in a standard. Alternatively, the eNB may determine the symbol interval semi-statically or dynamically, and notify it to the LR-UE using the RRC signaling.

As such, the PDSCH of the legacy UE is mapped to the physical resources per subframe according to the transmitting method (1). The PDSCH of the LR-UE is mapped, per symbol, to a physical resource region to which the PDSCH of the legacy UE is mapped. Consequently, the PDSCH of the LR-UE can be mapped to the physical resources every TTI. Thus, the data transmission rate of the LR-UE can be improved. Moreover, the PDSCHs of the legacy UE and the PDSCHs of the LR-UE can coexist in the physical resources in one subframe. Thus, a communication system compatible with various TTIs and having backward compatibility can be implemented.

According to the transmitting method (2), the PDCCH of the LR-UE may be multiplexed with the PDSCH region of the LR-UE, or provided in a separate region. When the PDCCH is provided in a separate region, the transmitting method (1) may be applied. The DCI including the scheduling information of the PDSCH is mapped to the PDCCH of the LR-UE. The scheduling information of the PDSCH of the LR-UE may include not the physical resource allocation information of the PDSCH but only the other information, for example, MCS. The LR-UE receives the PDCCH addressed to itself, the scheduling information of the PDSCH included in the received PDCCH, and then the PDSCH in the PDSCH region for the LR-UE.

The physical resources to which the PDSCH of the LR-UE is mapped are configured per PRB. The physical resources to which the PDSCH of the LR-UE is mapped may be configured per PRB pair.

The PDSCH of the LR-UE is mapped to a physical resource region to which the conventional PDSCH is mapped.

The PDSCH of the LR-UE is mapped by avoiding a PRB pair to which the PDSCH of the legacy UE is mapped.

The symbols (the first to fourth symbols, indicated by the PCFICH) to which the conventional PDCCHs are mapped are excluded.

With such a method, a PDSCH region of the LR-UE can coexist with the existing physical channels. Here, the PDSCH region of the LR-UE will be referred to as an "LR-PDSCH region".

The PDSCHs of a plurality of the LR-UEs are multiplexed in the LR-PDSCH region. The PDSCHs of any one of the LR UEs are mapped in 1 symbol. The PDSCHs of a plurality of the LR-UEs may be multiplexed in 1 symbol. Alternatively, the PDSCH of one LR-UE may be mapped in 1 symbol, and the PDSCHs of a plurality of the LR-UEs may be multiplexed in the LR-PDSCH region.

The DCI of the LR-UE may be the DCI per TTI=1 symbol. The DCI includes the scheduling information for 1 symbol.

The DCI of the LR-UE may include the scheduling information of the PDSCH of the LR-UE. The DCI of the LR-UE is mapped to the PDCCH of the LR-UE, and multiplexed and mapped to the LR-PDSCH region.

Examples of the scheduling information include the allocation information and the MCS information. Examples of the allocation information include information on physical resources per PRB to identify a frequency domain. Examples of such information include the number of PRBs and a PRB number, etc. The scheduling information may not include allocation information for allocating the PDSCH of the LR-UE to the physical resources. Since the PDSCH is allocated to the LR-PDSCH region, the allocation information for allocating the PDSCH of the LR-UE to the physical resources may be unnecessary.

The CRC scrambled by the C-RNTI of the LR-UE may be used for the PDCCH for the LR-UE. The PDCCH addressed to itself can be detected and received by searching for the LR-PDSCH region using the own C-RNTI of the LR-UE, similarly as the PDCCH for the conventional UEs.

The PDCCH of the LR-UE may be mapped to the same symbol as that of the PDSCH in the LR-PDSCH region. The PDCCH and the PDSCH of the LR-UE are multiplexed and mapped. The multiplexing is performed in 1 symbol. Examples of the multiplexing method include frequency-division multiplexing and code-division multiplexing, etc. The frequency-division multiplexing may be performed per sub-carrier and per RE. The frequency-division multiplexing may be performed per PRB (per 12 sub-carriers) on the frequency axis. The frequency-division multiplexing may be applied when the LR-PDSCH region is configured from a plurality of PRBs.

The multiplexing method may be statically predetermined, for example, in a standard, or semi-statically or dynamically determined. The eNB may determine the multiplexing method semi-statically or dynamically, and notify it to the LR-UE using the RRC signaling. A list of multiplexing methods of several kinds is provided in a standard, and the LR-UE may be notified of information indicating one of the methods to be selected.

Consequently, the LR-UE can detect the own PDCCH, and receive the PDSCH in the received symbol of the PDCCH.

A plurality of the PDCCHs of the LR-UE may be multiplexed with a plurality of symbols in the LR-PDSCH region.

The LR-UE detects and receives the own PDCCH in the LR-PDSCH region every symbol. The LR-UE receives the PDSCH existing in the same symbol as that of the PDCCH, according to the scheduling information of the received PDCCH.

A plurality of the PDCCHs of the LR-UE may be mapped in 1 symbol. Each performs the scheduling for different PDSCHs. The PDSCHs may be mapped to the same symbol or different symbols.

When the PDSCHs are mapped to the same symbol, the LR-UE detects and receives the own PDCCH multiplexed in the LR-PDSCH region every symbol. The LR-UE receives the plurality of PDSCHs existing in the same symbols as those of the PDCCHs, according to the scheduling information included in the received plurality of PDCCHs.

When the PDSCHs are mapped to different symbols, the DCI may include information for identifying the symbols. The information is effective not only when the PDSCHs are scheduled in the same symbol but also when the PDSCHs are scheduled in different symbols. The LR-UE detects and receives the own PDCCH in the LR-PDSCH region every symbol. The LR-UE receives the PDSCH using a symbol in which the PDSCH is scheduled, according to the scheduling information included in the received plurality of PDCCHs.

The scheduling information on the plurality of PDSCHs may be mapped to the DCI of one PDCCH of the LR-UE. The PDSCHs may be mapped to the same symbol or different symbols. The DCI may include information for identifying symbols to which the respective PDSCHs are mapped. The LR-UE detects and receives the own PDCCH in the LR-PDSCH region every symbol. The LR-UE receives a plurality of the PDSCHs according to the scheduling information of the plurality of PDSCHs that are included in the received PDCCHs.

Figure 33:
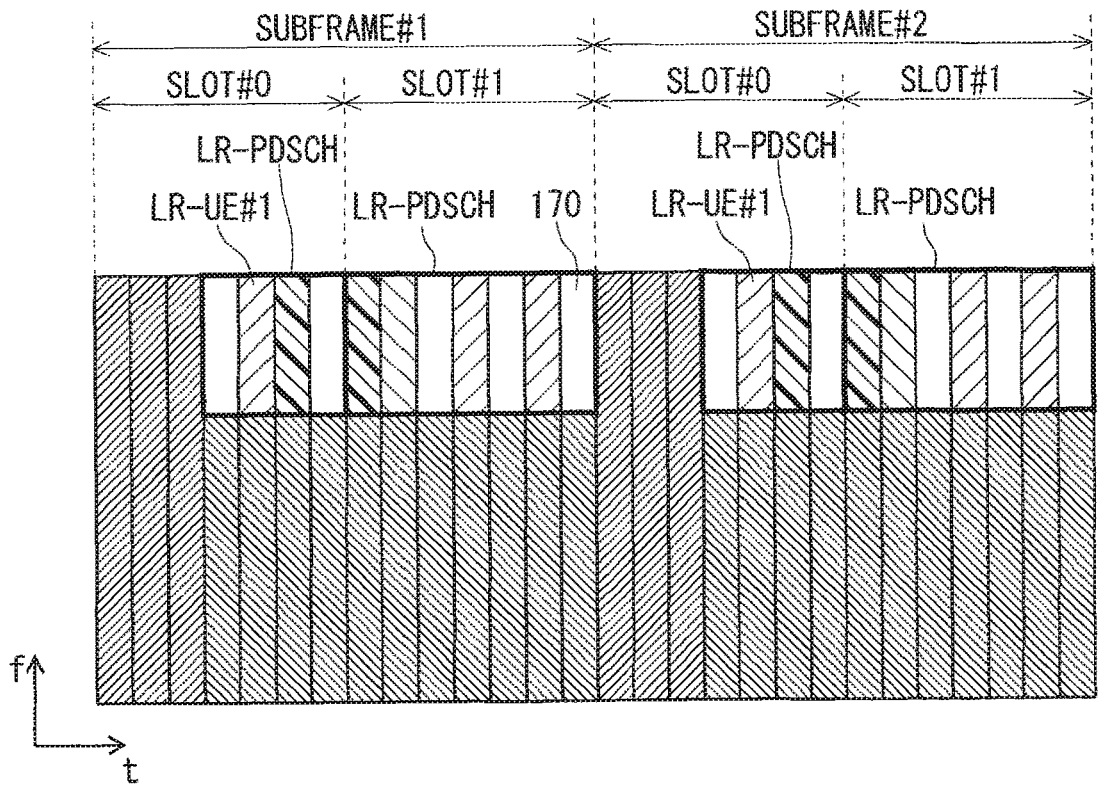
FIG. 33 is a view for describing a transmitting method according to the sixth embodiment.

FIG. 33 is a view for describing a transmitting method according to the sixth embodiment. FIG. 33 illustrates the method for transmitting the PDSCH when the LR-PDSCH is configured.

In the example illustrated in FIG. 33, an LR-PDSCH region is configured per PRB every slot. The LR-PDSCH region and a region to which the PDSCHs of the legacy UE are mapped are configured so as not to overlap each other. When the LR-PDSCH region is configured in advance, the PDSCHs of the legacy UE are mapped by avoiding the LR-PDSCH region. When the LR-PDSCH regions are scheduled in the same frequency domain on the frequency axis, for example, per 12 sub-carriers that form a frequency domain of a PRB, the scheduling can be performed easily and efficiently in consideration of the relationship with the mapping of the PDSCHs of the legacy UE to the physical resources.

A plurality of the PDSCHs of the LR-UE are multiplexed and mapped per symbol to the LR-PDSCH regions. A plurality of the PDSCHs of the same LR-UE may be mapped. The LR-PDSCH region in the first slot in the subframe excludes symbols in a conventional PDCCH region.

The PDCCH of the LR-UE may be multiplexed in the LR-PDSCH region. The PDSCH of the LR-UE is scheduled using the PDCCH. The PDSCH is scheduled in a symbol including the PDCCH of the LR-UE. As denoted by a reference "170", the physical resources that are not scheduled per symbol exist.

Figure 34:
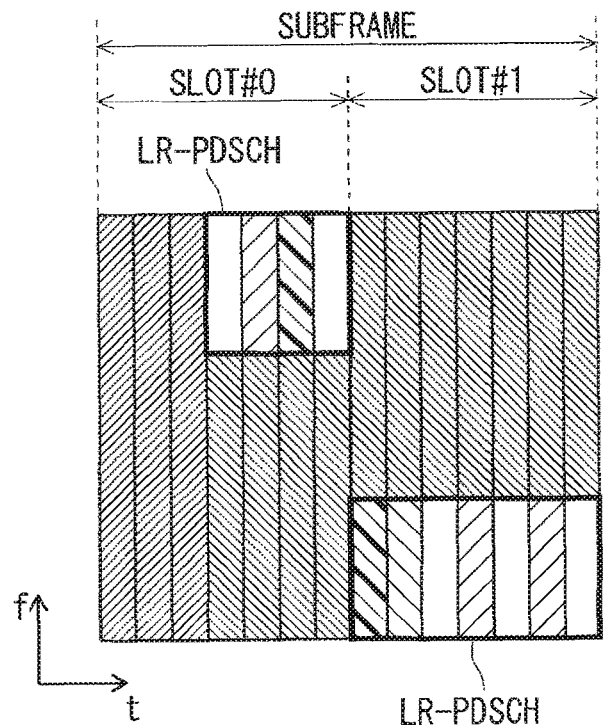
FIG. 34 is a view for describing another method for configuring an LR-PDSCH according to the sixth embodiment.

FIG. 34 is a view for describing another method for configuring the LR-PDSCH according to the sixth embodiment.

In the example illustrated in FIG. 33, the LR-PDSCH regions are configured in the same frequency domain on the frequency axis in the first and second slots in the subframe. The LR-PDSCHs are not limited to such but may be separately scheduled in different frequency domains on the frequency axis.

FIG. 34 illustrates that the LR-PDSCH region is configured in a different frequency domain on the frequency axis every slot. Flexibly configuring the LR-PDSCHs on the frequency axis enables flexible settings of the physical resources to which the PDSCHs of the legacy UE are mapped.

The method for setting the LR-PDCCH in the transmitting method (1) may be applied as a method for setting the LR-PDSCHs.

The operations of the LR-UE will be disclosed. The LR-UE receives the PCFICH, and recognizes the first symbol in the PDSCH region of the slot #0.

The LR-UE detects the PDCCH addressed to itself by the own C-RNTI in the LR-PDSCH region. The eNB notifies the configuration of the LR-PDSCH region using, for example, the RRC signaling. A method for multiplexing the PDSCH and the PDCCH in the LR-PDSCH region is predetermined, for example, in a standard. Consequently, the LR-UE can detect the PDCCH addressed to itself.

The LR-UE obtains the DCI from the PDCCH detected by the own C-RNTI. The LR-UE obtains the scheduling information in the DCI. The LR-UE receives and demodulates the PDSCH, using the multiplexing method and the scheduling information to obtain the data.

The RS is provided every symbol in the LR-PDSCH region. The RS may be used to demodulate the PDCCH and the LR-PDCCH of the LR-UE. The RS may be provided for each cell or for each LR-UE.

The method for configuring the RS in the PDCCH region of the LR-UE, the method for configuring the RS when the PDCCH and the PDSCH of the LR-UE are mapped to the localized PRBs on the frequency axis, and the method for configuring the RS when the PDCCH and the PDSCH of the LR-UE are mapped to the consecutive symbols on the time axis all of which are disclosed as the transmitting method (1) may be applied as a method for configuring the RS in the PDSCH region of the LR-UE as necessary.

The PDCCHs of the LR-UE may be provided in a region separate from the PDSCH region of the LR-UE. When the PDCCHs are provided in a separate region, the method for providing the LR-PDCCH region in the transmitting method (1) may be applied.

The HARQ will be disclosed. The HARQ is performed per TTI. The HARQ may be performed on the LR-UE per shortened TTI, that is, per symbol according to the sixth embodiment. The HARQ is performed on the legacy UE per conventional TTI, that is, per subframe. The method disclosed in the first modification of the first embodiment may be applied to a method for performing the HARQ on the LR-UE per shortened TTI. The asynchronous HARQ may also be applied. The symbols to which the PDSCH of the LR-UE cannot be mapped exist as in the conventional PDCCH region. In such a case, the asynchronous HARQ enables the scheduling except for the conventional PDCCH region.

The PDSCH of the LR-UE can be mapped to the physical resources every TTI using the method disclosed in the sixth embodiment. The PDSCH of the LR-UE can be mapped to the physical resources every symbol. Moreover, the PDSCHs of the legacy UE and the PDSCHs of the LR-UE can coexist in the physical resources in 1 subframe. The PDSCH of the LR-UE whose 1 TTI is shorter than 1 subframe can be scheduled. Thus, the data transmission rate of the LR-UE can be improved. The LR-UE and the legacy UE can coexist on the same LTE carriers.

Seventh Embodiment

Ack/Nack for the uplink data will be disclosed. Since the TTI is shorter than 1 subframe as described in the second embodiment, the HARQ needs to be performed on the LR-UE per unit shorter than 1 subframe. However, when the HARQ is performed per unit shorter than 1 subframe, the conventional method for transmitting the PHICH in LTE cannot be applied thereto. To support the shortened TTI on the same LTE carriers, the LR-UE and the legacy UE have to coexist. The seventh embodiment will disclose a method for solving such problems.

The HARQ is performed on the LR-UE per TTI. Ack/Nack for the uplink data of the LR-UE can be transmitted per symbol.

The following (1) to (4) will be disclosed as specific examples of the method for transmitting Ack/Nack.

(1) Ack/Nack is transmitted using the LR-PHICH.

(2) Ack/Nack is multiplexed to the LR-PDCCH region to be transmitted.

(3) Ack/Nack is transmitted using the PDCCH of the LR-UE.

(4) A combination of (1) to (3) above.

A method for transmitting Ack/Nack using the LR-PHICH in the specific example (1) will be disclosed. The PHICH that is a physical channel for transmitting Ack/Nack for the uplink data of the LR-UE is provided. This PHICH will be hereinafter referred to as an "LR-PHICH". The LR-PHICH is mapped in 1 symbol.

The LR-PHICH configuration disclosed in the second embodiment may be applied to this LR-PHICH configuration. Although Ack/Nack of the LR-UE is mapped to the entire physical resources for the LR-PHICH in the second embodiment, Ack/Nack of the LR-UE is mapped in 1 symbol of the physical resources for the LR-PHICH in the seventh embodiment. The LR-PHICH group may be mapped in 1 symbol of the physical resources for the LR-PHICH. 1 HREG may also be configured in 1 symbol. Consequently, Ack/Nack of any LR-UE is transmitted in 1 symbol of the physical resources for the LR-PHICH.

Thus, Ack/Nack for the uplink data of the LR-UE can be transmitted per symbol.

A method for multiplexing Ack/Nack to the LR-PDCCH region to transmit the Ack/Nack in the specific example (2) will be disclosed. Ack/Nack for the LR-UE is multiplexed and mapped to the physical resources to which the LR-PDCCH is mapped. The PHICH for the LR-UE and the PDCCH for the LR-UE are multiplexed in 1 symbol of the LR-PDCCH region.

Examples of the multiplexing method include frequency-division multiplexing and code-division multiplexing. The frequency-division multiplexing may be performed per sub-carrier and per RE.

The multiplexing method may be statically predetermined, for example, in a standard, or semi-statically or dynamically determined. The eNB may determine the multiplexing method semi-statically or dynamically, and notify it to the LR-UE using the RRC signaling. A list of multiplexing methods of several kinds is provided in a standard, and the LR-UE may be notified of information indicating one of the methods to be selected.

The method for multiplexing Ack/Nack to the LR-EPDCCH region to transmit the Ack/Nack disclosed in the second embodiment may be applied as the multiplexing method. Although Ack/Nack of the LR-UE is mapped to the entire PRBs of the LR-EPDCCH region in the second embodiment, Ack/Nack of the LR-UE is mapped in 1 symbol of the LR-PDCCH region in the seventh embodiment. The LR-PHICH group may be mapped in 1 symbol of the LR-PDCCH region. 1 HREG may also be configured in 1 symbol. Consequently, Ack/Nack of any LR-UE is multiplexed in 1 symbol of the physical resources for the PDCCH of the LR-UE to be transmitted.

A method for transmitting Ack/Nack using the PDCCH of the LR-UE in the specific example (3) will be disclosed. Ack/Nack for the uplink data of the LR-UE is transmitted only by scheduling in the PDCCH of the LR-UE. The PHICH of the LR-UE may not be provided.

The DCI for the LR-UE includes information indicating new data or not. The DCI is mapped to the PDCCH of the LR-UE. The LR-UE can recognize whether the scheduling is performed for the new data or the retransmission data by receiving the PDCCH addressed to itself and receiving the information in the DCI. When the information indicates the new data, the LR-UE transmits the new data according to the scheduling. Here, the LR-UE can determine Ack. When the information does not indicate the new data, the LR-UE transmits the retransmission data according to the scheduling. Here, the LR-UE can determine Nack.

Neither the LR-PHICH nor the region for the LR-PHICH may be provided. Thus, the physical resources to be used as data can be increased, and the data transmission rate can be further improved.

As such, Ack/Nack for the uplink data of the LR-UE can be transmitted, and the HARQ for the uplink data can be performed per shortened TTI. The HARQ for the uplink data can also be performed per symbol.

Thus, latency can be reduced, and the data transmission rate can be improved.

The LR-UE and the legacy UE can coexist on the same LTE carriers.

Eighth Embodiment

The PUSCH will be disclosed. Since 1 TTI of the LR-UE operating with the shortened TTI is shorter than 1 subframe as described in the third embodiment, the mapping method of the legacy UE is not applicable mapping the PUSCH to the physical resources. To support the shortened TTI on the same LTE carriers, the LR-UE and the legacy UE have to coexist. The eighth embodiment disclose a method for solving such problems.

The following (1) and (2) will be disclosed as methods for transmitting the PUSCH.

(1) The UE is notified of the scheduling information of the PUSCH of the LR-UE using the PDCCH of the LR-UE.

(2) The UE is notified of the scheduling information of the PUSCH of the LR-UE using the RRC signaling.

According to the transmitting method (1), the LR-UE receives the PUSCH by receiving the PDCCH for the LR-UE and then the scheduling information of the PUSCH of the LR-UE that is included in the PDCCH.

According to the transmitting method (2), the LR-UE receives the PUSCH using the scheduling information of the PUSCH of the LR-UE that is notified from the eNB using the RRC signaling.

Specific examples of the transmitting method (1) will be further disclosed. The physical resources to which the PUSCH of the LR-UE is mapped are configured per symbol.

The physical resources to which the PUSCH of the LR-UE is mapped are configured at one or more predetermined frequencies in 1 symbol. The predetermined frequencies may be set per sub-carrier or per RE. For example, 12 sub-carriers in 1 symbol may be configured as a physical resource to which the PUSCH of the LR-UE is mapped.

The PUSCH of the LR-UE is mapped to a physical resource region to which the conventional PUSCH is mapped.

The PUSCH of the LR-UE is mapped by avoiding a PRB pair to which the PUSCH of the legacy UE is mapped.

The PUSCH of the LR-UE can coexist with the existing physical channels using such a method.

Figure 35:
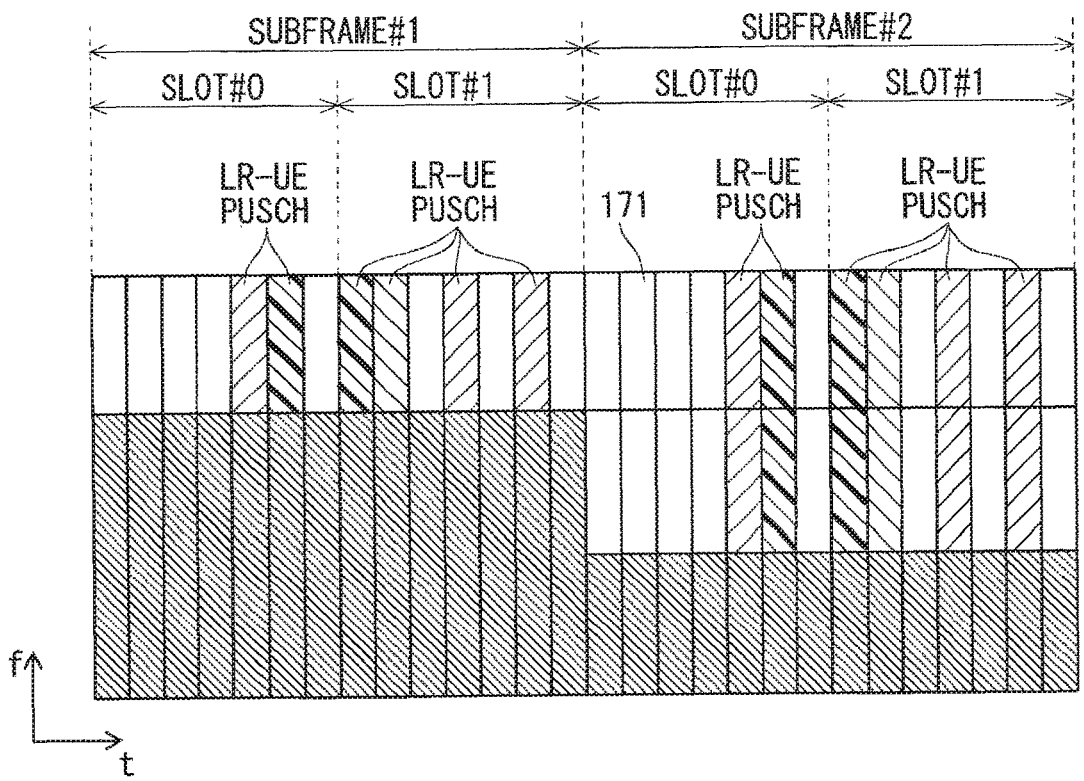
FIG. 35 is a view for describing a method for transmitting a PUSCH per symbol for the LR-UE according to the eighth embodiment.

FIG. 35 is a view for describing a method for transmitting the PUSCH per symbol for the LR-UE according to the eighth embodiment. The PUSCH of the LR-UE is mapped to the physical resources every symbol. In the example illustrated in FIG. 35, the PUSCH is mapped to the physical resources per 12 sub-carriers. In the subframe #1, the PUSCH of the LR-UE is mapped in 1 symbol to a physical resource consisting of 12 sub-carriers. In the subframe #2, the PUSCHs of the LR-UE are mapped in 1 symbol to 2 consecutive physical resources each consisting of 12 sub-carriers. Consequently, the amount of data can be increased. The PUSCH of the LR-UE is scheduled using the PDCCH in the downlink.

In the example illustrated in FIG. 35, the PUSCHs of the LR-UE are scheduled every slot in the same frequency domain on the frequency axis. The PUSCHs of the LR-UE are not limited to such but may be separately scheduled in different frequency domains on the frequency axis. When the PUSCHs are scheduled in the same frequency domain on the frequency axis, for example, per 12 sub-carriers that form a frequency domain of a PRB, the scheduling can be performed easily and efficiently in consideration of the relationship with the mapping of the PUSCHs of the legacy UE to the physical resources. As denoted by a reference "171", the physical resources that are not scheduled per symbol exist.

Since the PDCCH for the LR-UE is not mapped to the symbols in a conventional PDCCH region, the PUSCH per symbol cannot be scheduled. The PUSCH may not be transmitted in an uplink symbol corresponding to a symbol in the conventional PDCCH region.

As an alternative method, the uplink symbol corresponding to the symbol in the conventional PDCCH region may be scheduled using the PDCCH for the LR-UE. Consequently, the PUSCH can also be transmitted in the uplink symbol corresponding to the symbol in the conventional PDCCH region.

As an alternative method, the PDCCH for the LR-UE may be multiplexed and mapped to the symbol in the conventional PDCCH region. Consequently, the PUSCH can also be transmitted in the uplink symbol corresponding to the symbol in the conventional PDCCH region.

The PUSCHs of any one of the LR-UEs are mapped in 1 symbol. The PUSCHs of a plurality of the LR-UEs may be multiplexed in 1 symbol.

The PUSCHs of any one of the LR-UEs may be mapped to consecutive sub-carriers or consecutive REs. Alternatively, the PUSCH may be mapped to non-consecutive sub-carriers or non-consecutive REs. When the PUSCH is mapped to the non-consecutive sub-carriers or the non-consecutive REs, it may be mapped to the sub-carriers or the REs that have equal intervals. Application to the SC-FDMA becomes possible.

When the PUSCHs of a plurality of the LR-UEs are mapped to the sub-carriers or the REs with equal intervals, the PUSCHs may be mapped by shifting the sub-carriers or the REs one by one. Consequently, even when the non-consecutive sub-carriers or the non-consecutive REs are used, the PUSCHs of a plurality of the LR-UEs can be multiplexed with the physical resources in 1 symbol.

When the PUSCHs of the LR-UE are mapped to the non-consecutive sub-carriers or the non-consecutive REs, the physical resources in the frequency axis direction to which the PUSCHs are mapped increase. Increase in the physical resources in the frequency axis direction enables obtainment of the frequency diversity gain.

Figure 36:
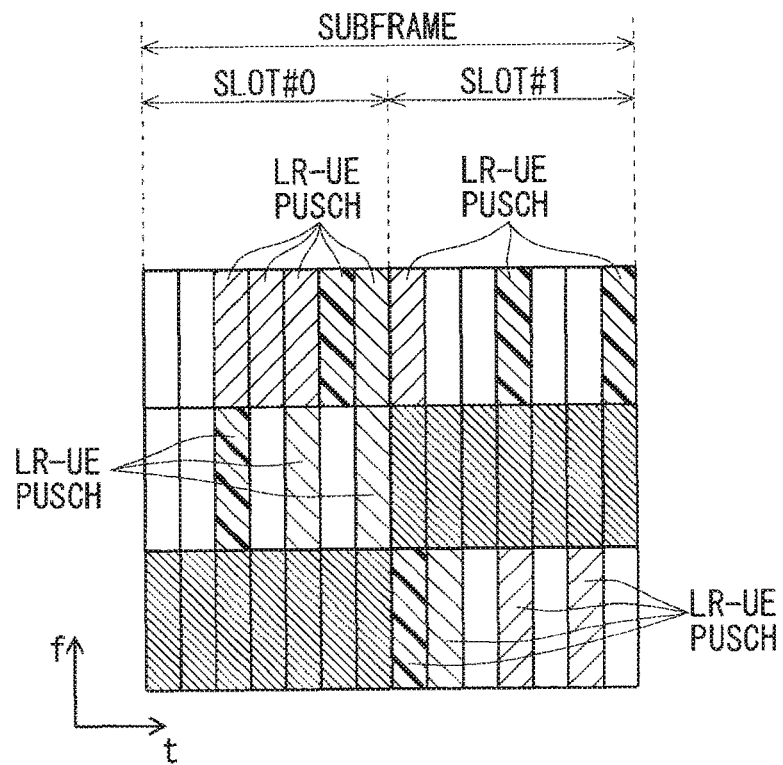
FIG. 36 is a view for describing a method for multiplexing a plurality of PUSCHs of the LR-UE in 1 symbol to transmit the PUSCHs according to the eighth embodiment.

FIG. 36 is a view for describing a method for multiplexing the PUSCHs of a plurality of the LR-UEs in 1 symbol to transmit the PUSCHs according to the eighth embodiment. The PUSCHs of the LR-UE are mapped to the physical resources every symbol. In the example illustrated in FIG. 36, the PUSCHs are mapped to the physical resources per 12 sub-carriers.

PUSCHs of two LR-UEs are multiplexed in the third symbol of the first slot in the subframe. The PUSCHs of each of the LR-UEs are mapped to consecutive physical resources each consisting of 12 sub-carriers. PUSCHs of two LR-UEs are also multiplexed in the fifth symbol. In the seventh symbol, the PUSCH of one LR-UE is mapped to two consecutive physical resources each consisting of 12 sub-carriers.

PUSCHs of two LR-UEs are multiplexed in the first symbol of the second slot in the subframe. The PUSCHs of each of the LR-UEs are mapped to non-consecutive physical resources each consisting of 12 sub-carriers. PUSCHs of two LR-UEs are also multiplexed in the fourth symbol.

Consequently, PUSCHs of a plurality of LR-UE data can be more flexibly mapped to the physical resources.

Frequency hopping of the conventional PUSCHs is performed. However, when the PUSCHs are mapped in 1 symbol, the frequency hopping cannot be performed.

To solve this problem, the aforementioned method for mapping the PUSCHs to the sub-carriers or the REs with equal intervals for one LR-UE may be used. Increase in the physical resources in the frequency axis direction to which the PUSCHs of the LR-UE are mapped enables obtainment of the frequency diversity gain.

A plurality of TTIs may be selectable for the UE as an alternative method. For example, TTI=1 symbol is set for the UE whose uplink communication quality is superior. TTI=1 slot or 1 subframe is set for the UE whose uplink communication quality is inferior.

TTI=1 symbol that does not support the frequency hopping is selected and set for the UE whose uplink communication quality is superior and which does not require the frequency diversity gain. TTI=1 slot or 1 subframe that supports the frequency hopping is selected and set for the UE whose uplink communication quality is inferior and which requires the frequency diversity gain.

The eNB may perform such selection and setting by evaluating the uplink communication quality of the target UE. The UE may notify the eNB of a request for setting the TTI.

Consequently, the frequency hopping can be adaptively supported for the LR-UE, and the diversity gain can be obtained.

The DCI of the LR-UE may be the DCI per TTI=1 symbol. The DCI includes the scheduling information for 1 symbol. The DCI of the LR-UE may include the scheduling information of the PUSCH of the LR-UE. The DCI of the LR-UE is mapped to the PDCCH of the LR-UE. The method disclosed in the seventh embodiment may be applied to a method for configuring the PDCCH of the LR-UE.

The operations of the LR-UE will be disclosed. The LR-UE detects the PDCCH addressed to itself to obtain the DCI. The method disclosed in the seventh embodiment may be applied to this method. The LR-UE receives the PUSCH using the scheduling information in the DCI. The symbol information and the frequency domain information may be used to recognize to which symbol and to which frequency domain the PDSCH is allocated. The LR-UE demodulates the received PDSCH using the scheduling information to obtain the data.

The RS is provided every symbol in the PUSCH region of the LR-UE. The RS may be used to demodulate the PUSCH. The RS may be provided during 1 symbol. The RS may be used to demodulate the PUSCH. The UE time-multiplexes data of the PUSCH and the RS to map the data to 1 symbol. The RS may be inserted in a predetermined position. The predetermined position may be statically determined, for example, in a standard. Alternatively, the predetermined position may be determined semi-statically or dynamically. The eNB may determine the predetermined position, and notify it to the LR-UE using the RRC signaling. Examples of the predetermined position include a position of the RS, a position of the RS from the beginning, an interval between the RSs, and the number of RSs, etc.

As described above, the eighth embodiment states that the PUSCH of the LR-UE is mapped by avoiding a PRB pair to which the PUSCH of the legacy UE is mapped.

The PUSCH may be mapped without avoiding a PRB pair to which the PUSCH of the legacy UE is mapped as an alternative method.

Figure 37:
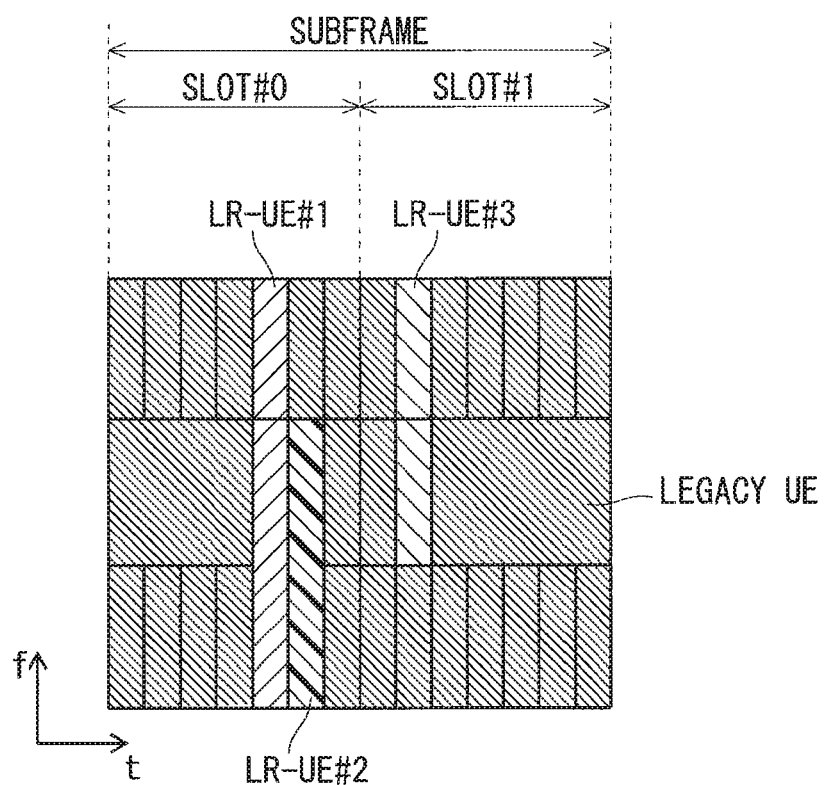
FIG. 37 is a view for describing a mapping method according to the eighth embodiment.

FIG. 37 is a view for describing a mapping method according to the eighth embodiment. FIG. 37 illustrates a method for mapping the PUSCH of the LR-UE without avoiding the PUSCH of the legacy UE. The PUSCH of the LR-UE is mapped to the physical resources every symbol. In the example illustrated in FIG. 37, the PUSCH of the LR-UE #1 is mapped to 3 consecutive physical resources each consisting of 12 sub-carriers, in the fifth symbol of the first slot in the subframe. The PUSCH of the LR-UE #2 is mapped to 2 consecutive physical resources each consisting of 12 sub-carriers, in the sixth symbol of the first slot in the subframe. The PUSCH of the LR-UE #3 is mapped to 2 consecutive physical resources each consisting of 12 sub-carriers, in the second symbol of the second slot in the subframe.

As illustrated in FIG. 37, the PUSCHs of the LR-UEs are mapped without avoiding a PRB pair to which the PUSCH of the legacy UE is mapped.

The PUSCH of the LR-UE may conflict with the PUSCH of the legacy UE in a symbol to which the PUSCH of the LR-UE is mapped. In the uplink, both the PUSCH of the LR-UE and the PUSCH of the legacy UE are transmitted in the symbol. Here, the eNB may not be able to normally receive these channels.

As a method for solving this problem, the transmission power of the LR-UE may be increased more than that of the legacy UE. The eNB sets the transmission power of the LR-UE higher than that of the legacy UE. Alternatively, the eNB may set the transmission power of the legacy UE lower than that of the LR-UE. The eNB may set the transmission power using a power setting parameter to be notified to the UE.

A difference from a normal setting value may be set as the power setting parameter. An offset parameter may be set. The eNB may notify the LR-UE of the offset parameter. Alternatively, the eNB may notify the legacy UE of the offset parameter.

The eNB may include the power setting parameter in the DCI for the legacy UE and the DCI for the LR-UE and notify the power setting parameter.

When the legacy UE can receive only a conventional power setting parameter, the eNB may notify the power setting parameter only to the LR-UE.

The PUSCH transmission power of the UE is derived using the power setting parameter notified from the eNB to the UE and a path loss measured by the UE. This method can yield the transmission powers of the LR-UE and the legacy UE with a difference from those derived from the conventional deriving method. Thus, the difference between the received power of the LR-UE and the received power of the legacy UE in the eNB can be yielded. Thus, the eNB can receive a signal of a higher received power.

The eNB can reduce degradation in the reception performance of data by the gain in the demodulation through the CRC check, etc. or the retransmission control for the PUSCH of the UE whose received power is set lower.

What is disclosed is that setting the transmission power of the LR-UE higher than that of the legacy UE is preferable. Consequently, the eNB can receive a signal of the LR-UE. When the PUSCH of the LR-UE transmitted per symbol conflicts with the PUSCH of the legacy UE in a symbol, the demodulation gain using another symbol cannot be obtained. Enabling the eNB to normally receive a signal of the LR-UE subject to the conflict can improve the reception performance of the PUSCH of the LR-UE. In contrast, the reception performance of data for the PUSCH of the legacy UE can be improved using another symbol through obtainment of the gain in the demodulation through the CRC check, etc.

Conversely, the transmission power of the legacy UE may be set higher than that of the LR-UE. The reception performance of the PUSCH of the legacy UE can be improved because the eNB can receive a signal of the legacy UE. Although the reception performance of the PUSCH of the LR-UE in the eNB degrades, the degradation can be reduced by the retransmission control.

Even when the PUSCH of the LR-UE conflicts with the PUSCH of the legacy UE, the eNB can receive these channels using such a method.

Another method for solving a problem caused by the conflict will be disclosed. The legacy UE does not perform transmission using a symbol for transmitting the PUSCH of the LR-UE. The legacy UE may not transmit data. The transmission power may be set to zero. The legacy UE may puncture data of the conflicting symbol and transmit the data using another symbol. The legacy UE may map data to symbols except for the conflicting symbol and transmit the data.

This enables the eNB to receive the PUSCH of the legacy UE.

The eNB may notify the legacy UE of a symbol to be used by the LR-UE. The eNB may include information on the symbol in the DCI for the legacy UE to notify the information. Consequently, the legacy UE can recognize a symbol to be transmitted from the LR-UE.

Conversely, the LR-UE may not transmit data using a symbol for transmitting the PUSCH of the legacy UE. Here, the LR-UE may puncture data of an RE of the conflicting symbol and transmit the data using another RE. The LR-UE may map data to REs except for the conflicting RE and transmit the data.

This enables the eNB to receive the PUSCH of the LR-UE.

The eNB may notify the LR-UE of at least one of a symbol and a frequency domain to be used by the legacy UE. The frequency domain is, for example, an RE and a sub-carrier. The eNB may include the power setting parameter in the DCI for the LR-UE to notify the power setting parameter. Consequently, the LR-UE can recognize at least one of the symbol and the frequency domain to be transmitted from the legacy UE.

Specific examples of the transmitting method (2) will be further disclosed. The eNB notifies the LR-UE of the scheduling information of the PUSCH of the LR-UE using the RRC signaling. The LR-UE receives the own PUSCH using the scheduling information of the PUSCH received through the RRC signaling.

Examples of the scheduling information include the symbol information, and information on the sub-carrier or the RE. When this scheduling is used during a predetermined duration, the scheduling information may include information indicating the predetermined duration. Examples of the information indicating the predetermined duration include information indicating the beginning of a duration, information indicating a duration, information indicating the end of a duration, and information indicating a period.

The PUSCH of the LR-UE can be mapped to the physical resources every shortened TTI, that is, every symbol herein using the method disclosed in the eighth embodiment. Thus, the data transmission rate of the LR-UE can be improved. Moreover, the PUSCH of the legacy UE and the PUSCH of the LR-UE can coexist in the physical resources in 1 subframe.

Ninth Embodiment

The PUCCH will be disclosed. Since a TTI of the LR-UE operating with the shortened TTI is shorter than 1 subframe as described in the fourth embodiment, the mapping method of the legacy UE is not applicable to mapping the PUCCH to the physical resources. To support the shortened TTI on the same LTE carriers, the LR-UE and the legacy UE have to coexist. The ninth embodiment will disclose a method for solving such problems.

The physical resources to which the PUCCH for the LR-UE is mapped are configured per PRB. Alternatively, the physical resources to which the PUCCH for the LR-UE is mapped may be configured per PRB pair. Alternatively, the physical resources to which the PUCCH for the LR-UE is mapped may be configured per symbol.

The PUCCH for the LR-UE is mapped to an uplink physical resource region. The PUCCH for the LR-UE is mapped by avoiding a PRB pair to which the PUCCH of the legacy UE is mapped.

The PUCCH for the LR-UE may be mapped inside the PRB pair to which the PUCCH of the legacy UE is mapped. The PUCCH for the LR-UE may be mapped to be continuous with the PRB pair to which the PUCCH of the legacy UE is mapped.

The PUCCHs for the LR-UE may not be provided on both sides of the frequency axis of the uplink physical resources, unlike the PUCCHs of the conventional legacy UE. In other words, the PUCCH for the LR-UE may be provided only on one side of the frequency axis of the uplink physical resources.

The PUCCH of the LR-UE can coexist with the existing physical channels using such a method.

Here, the physical resources to which the PUCCH for the LR-UE is mapped will be referred to as an "LR-PUCCH region".

The LR-PUCCH region may be set every cell, every LR-UE, or every LR-UE group, for example, every LR-UE group that is mapped to the LR-PUCCH region. The LR-PUCCH region may also be set as a system in a standard. Alternatively, the LR-PUCCH region may be set by a combination of these.

The LR-PUCCH region is set, for example, every cell on the time axis and the frequency axis. A multiplexing method in 1 symbol for the LR-UE may be predetermined as a system in a standard. Consequently, the eNB can preset the LR-PUCCH region, for example, the slot timing and the PRB, which facilitates the scheduling. The LR-UE can recognize the LR-PUCCH region that is set every cell, for example, the slot timing and the PRB, and search the LR-PUCCH region for the PUCCH per UE to receive the PUCCHs.

As an alternative example, the resources to which the LR-PUCCH region can be set may be set every cell, and the LR-PUCCHs for the LR-UE may be actually set every UE. Presetting, every cell, the resources to which the LR-PUCCH region can be set can facilitate the scheduling of the LR-PUCCHs in the same subframe as that of the legacy UE. The legacy UE and the LR-UE can easily coexist.

Settings of the LR-PUCCH region may be statically, semi-statically, or dynamically determined.

The settings may be statically determined, for example, in a standard. The RRC signaling may be used when the settings are semi-statically or dynamically determined.

For example, the settings per cell may be determined in a standard, and the settings per UE may be semi-statically or dynamically determined using the RRC signaling.

As an alternative example, the eNB may broadcast the settings per cell to the UEs being served thereby as broadcast information. The eNB notifies the LR-UE that implements the shortened TTI of the settings per LR-UE through the UE-dedicated signaling.

The eNB may include the setting information of the LR-PUCCH region in an RRC Connection Reconfiguration message and notify the LR-UE of such a message as the RRC signaling.

The PUCCHs of a plurality of the LR-UEs are time-division multiplexed in the LR-PUCCH region every symbol. The PUCCHs of a plurality of the LR-UEs may be multiplexed in 1 symbol in the LR-PUCCH region. The PUCCHs may be code-division multiplexed. Alternatively, the frequency-division multiplexing may be used. When the PUCCHs are frequency-division multiplexed, the method for multiplexing the PUSCHs of a plurality of the LR UEs in 1 symbol that is disclosed in the eighth embodiment may be applied.

Figure 38:
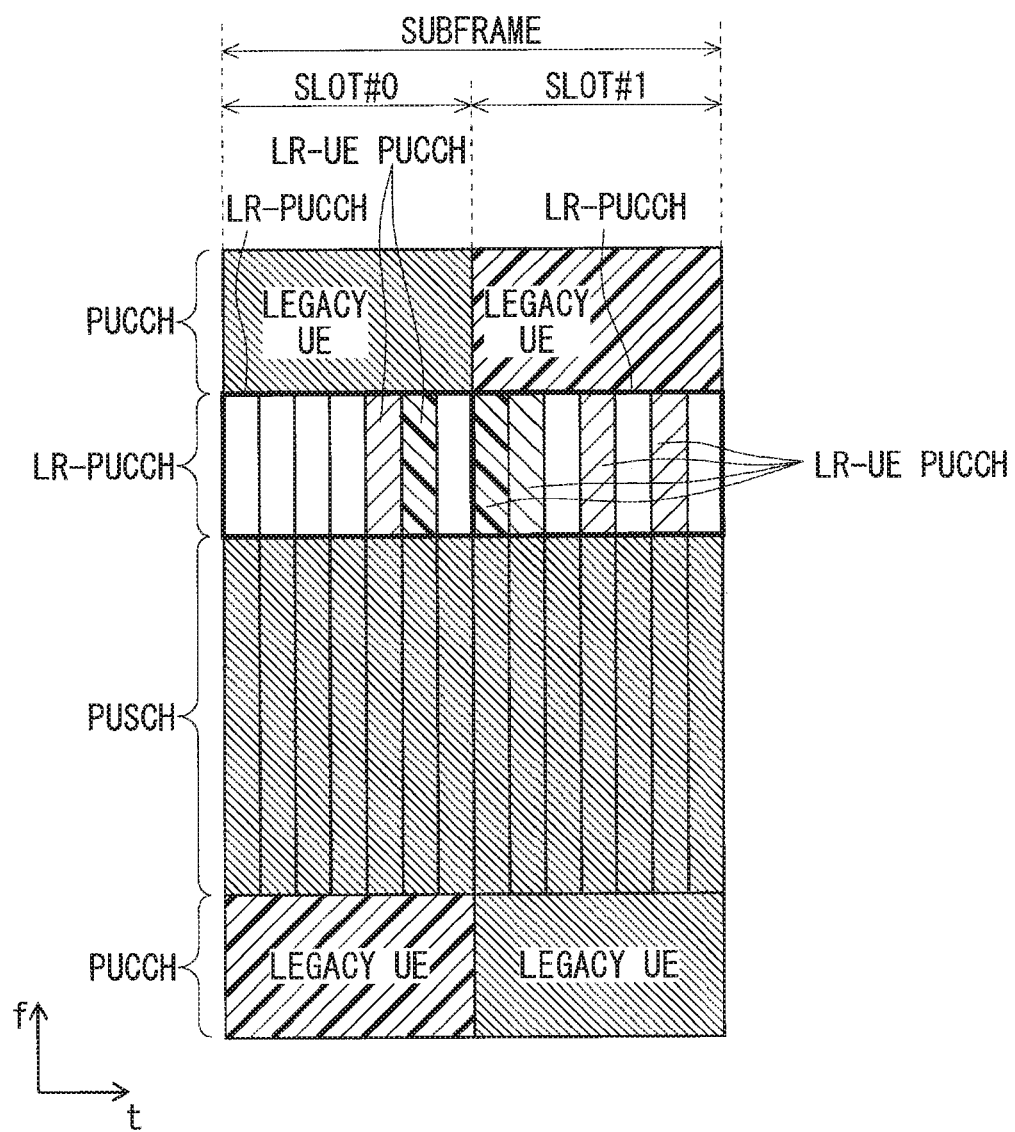
FIG. 38 is a view for describing mapping a PUCCH per symbol for the LR-UE to physical resources according to the ninth embodiment.

FIG. 38 is a view for describing mapping the PUCCH per symbol for the LR-UE to the physical resources according to the ninth embodiment. In the example illustrated in FIG. 38, a physical resource region to which the LR-PUCCHs are mapped are configured to be continuous with one of the inner portions of the frequency domains to which the conventional PUCCHs are mapped. The PUCCHs of the legacy UE are mapped every slot. The PUCCH of the LR-UE is mapped in the LR-PUCCH region every symbol. In the example illustrated in FIG. 38, the PUCCHs of the LR-UE are mapped in the fifth and sixth symbols of the first slot in the subframe. The PUCCHs of the LR-UE are mapped in the first, second, fourth, and sixth symbols of the second slot in the subframe.

Frequency hopping of the conventional PUCCHs is performed. However, when the PUCCH is mapped in 1 symbol, the frequency hopping cannot be performed. The method on the PUSCH disclosed in the eighth embodiment may be applied to solve this problem. Consequently, the frequency diversity gain can be obtained.

The RS is provided every symbol in the PUSCH region of the LR-UE. The RS may be used to demodulate the PUSCH. The RS may be provided during 1 symbol. The RS may be used to demodulate the PUSCH. The UE time-multiplexes data of the PUSCH and the RS to map the data to 1 symbol. The RS may be inserted in a predetermined position. The predetermined position may be statically determined, for example, in a standard. Alternatively, the predetermined position may be determined semi-statically or dynamically. The eNB may determine the predetermined position, and notify it to the LR-UE using the RRC signaling. Examples of the predetermined position include a position of the RS such as a bit and a symbol, a position of the RS from the beginning, an interval between the RSs, and the number of RSs such as the number of bits and the number of symbols, etc.

Consequently, the UCI per shortened TTI of the LR-UE can be mapped to the PUCCH, and the PUCCH can be mapped to the physical resources every shortened TTI.

The PUCCH is also used for transmitting Ack/Nack for the downlink data. Thus, the HARQ can be performed for the downlink data in the shortened TTI of the LR-UE. Thus, latency can be reduced, and the data transmission rate can be improved.

Tenth Embodiment

An example method for setting the SRS will be disclosed. The SRS is set per symbol for the LR-UE. The SRS may be set every cell or every UE. Alternatively, a part of the SRS configuration may be set every cell, and the remaining SRS configuration may be set every UE. The SRS may be statically set, for example, in a standard, or semi-statically or dynamically set. The eNB notifies the LR-UE of setting information of the SRS per symbol. The RRC signaling or the PDCCH of the LR-UE may be used. When the SRS is set every cell, the SRS may be included in the system information to be broadcast. The system information is an MIB or an SIB. When the SRS is set to each UE, it may be notified using the dedicated RRC signaling. When the SRS is set to each UE, the information may be included in the DCI and notified using the PDCCH of the LR-UE.

The eNB may notify the LR-UE of a request for transmitting SRSs when requiring the SRSs to be transmitted from the LR-UE. The method disclosed in the fifth embodiment may be applied to a method for notifying the request for transmitting the SRSs.

For example, the eNB initially sets the SRS configuration every cell. Then, the eNB sets a SRS configuration to be used for each LR-UE in the set SRS configuration.

The SRS configuration per cell may be, for example, resource information on the time axis. The SRS configuration may be information for identifying in which symbol the SRS is configured. Examples of the identifying information include a system frame number (SFN), a radio frame number, a slot number, a symbol number, an offset value of a radio frame in a system frame, an offset value of a slot in a subframe, an offset value of a symbol, and an interval between symbols, etc. Consequently, the LR-UE can identify a symbol in which the SRS is configured every cell.

The SRS configuration per UE may be resource information on the frequency axis. The identifying information may be information for identifying in which sub-carrier or RE the SRS is configured. Examples of the identifying information include a sub-carrier number and a RE number, etc. The identifying information may be a PRB number.

The SRS configuration per UE may be information on the method for multiplexing with another LR-UE or the legacy UE. For example, in frequency-division multiplexing with the other LR-UE or the legacy UE in 1 symbol, the SRS configuration may be information capable of identifying the resources on the frequency axis in which the own SRS is configured. Examples of the information capable of identifying the resources on the frequency axis include an offset value of a sub-carrier and a sub-carrier interval, etc.

The LR-UE maps the SRSs to the physical resources using the SRS configuration notified from the eNB, and transmits the SRSs.

The LR-UE does not transmit data using a symbol in which the SRS is configured per symbol. The LR-UE does not map data to the symbol.

The LR-UE may not transmit data using, as the symbol, only a symbol with the SRS configuration that is set to each LR-UE, only a symbol with the SRS configuration that is set every cell, or both of the symbols. The LR-UE may not map data to the symbol.

The LR-UE needs not to transmit data in a symbol in which the SRS of the legacy UE is configured. The LR-UE needs not to map data to the symbol.

The LR-UE may not transmit data using, as the symbol, only a symbol with the SRS configuration that is set to each legacy UE, only a symbol with the SRS configuration that is set every cell, or both of the symbols. The LR-UE may not map data to the symbol.

The eNB may not schedule the PDSCH for the LR-UE using the symbol in which the SRS of the legacy UE is configured.

The eNB may not schedule the PDSCH for the LR-UE using the symbol in which the SRS of the LR-UE is configured.

The eNB may not schedule the PDSCH for another LR-UE using the symbol and the frequency domain in which the SRS of the LR-UE is configured.

Consequently, it is possible to avoid a conflict of the own transmission data with the own SRS, the SRS of another LR-UE, or the SRS of the legacy UE.

When the SRS is configured per symbol, the SRS may conflict with the uplink data of the legacy UE. Here, the communication quality of the uplink data of the legacy UE and the accuracy in the SRS of the LR-UE degrade as described in the fifth embodiment. The method disclosed in the fifth embodiment may be applied to a method for solving such a problem.

FIG. 39 is a view for describing a method for configuring the SRSs of the LR-UE according to the tenth embodiment. In the example illustrated in FIG. 39, the SRS of the LR-UE is configured per symbol. The conventional SRS for the legacy UE is configured in the last symbol in a subframe, that is, the last symbol in the second slot in the subframe. Thus, in the example illustrated in FIG. 39, the SRS of the LR-UE is also configured in the last symbol in the second slot in the subframe. The SRS of the legacy UE and the SRS of the LR-UE are multiplexed in the symbol. This enables the coexistence of the SRS of the legacy UE with the SRS of the LR-UE. The LR-UE can transmit the SRSs using the symbol in which the SRSs are configured.

The SRS of the LR-UE and the PUSCH of the LR-UE may be multiplexed in the same symbol. The UE time-multiplexes data of the PUSCH and the SRS to map the data to 1 symbol. The SRS may be inserted in a predetermined position. The predetermined position may be statically determined, for example, in a standard. Alternatively, the predetermined position may be determined semi-statically or dynamically. The eNB may determine the predetermined position, and notify it to the LR-UE using the RRC signaling. Examples of the predetermined position include a position of the SRS such as a bit and a symbol, a position of the SRS from the beginning, an interval between the SRSs, and the number of the SRSs such as the number of bits and the number of symbols, etc. The SRSs may be multiplexed consecutively or non-consecutively.

The eNB may schedule, for the LR-UE, the PUSCH for the LR-UE in consideration of the SRS. The LR-UE maps data obtained by multiplexing the PUSCH data and the SRS to the PUSCH region scheduled for the LR-UE, and transmits the data.

Figure 40:
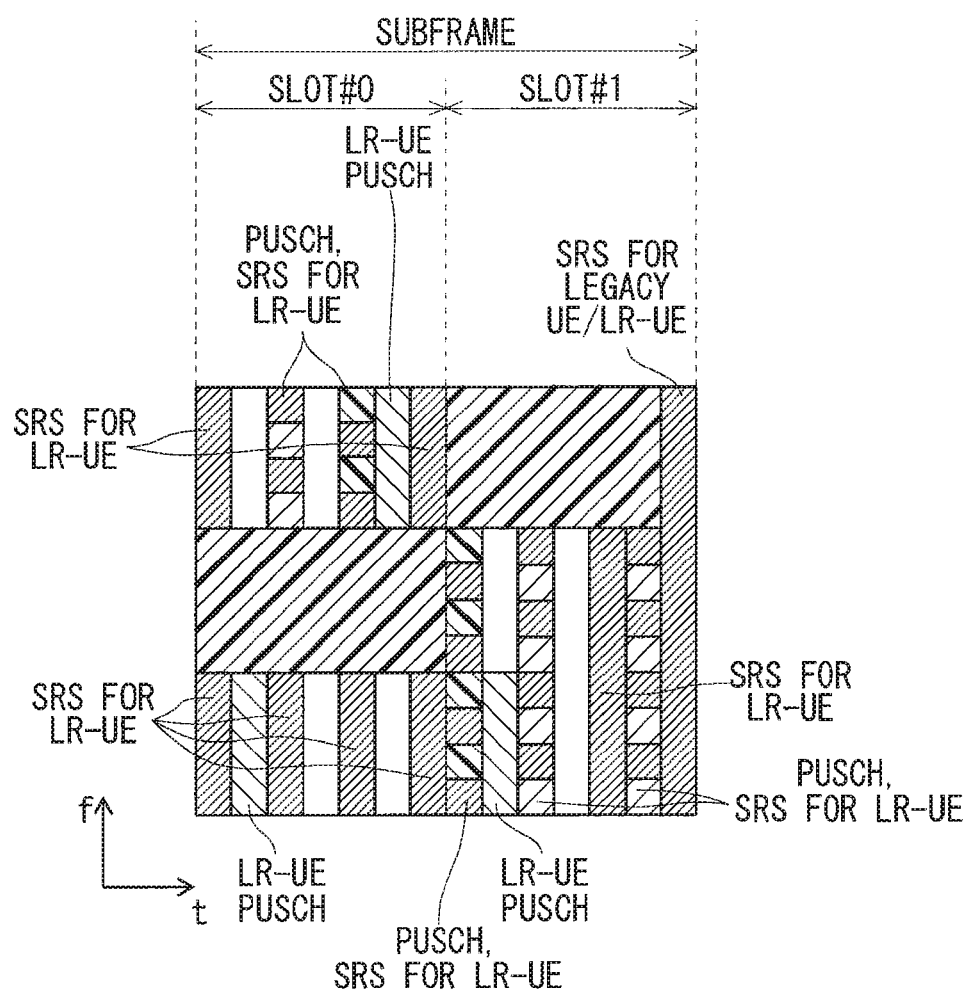
FIG. 40 is a view for describing a method for multiplexing the SRSs of the LR-UE and the PUSCHs to transmit the SRSs according to the tenth embodiment.

FIG. 40 is a view for describing a method for multiplexing the SRSs of the LR-UE and the PUSCHs according to the tenth embodiment. In the example illustrated in FIG. 40, the SRS of the LR-UE is configured per symbol. The conventional SRS of the legacy UE is configured in the last symbol in a subframe, that is, the last symbol in the second slot in the subframe. Thus, in the example illustrated in FIG. 40, the SRS of the LR-UE is also configured in the last symbol in the second slot in the subframe. The SRS of the legacy UE and the SRS of the LR-UE are multiplexed in the symbol. This enables the coexistence of the SRS of the legacy UE with the SRS of the LR-UE. The LR-UE can transmit the SRSs using the symbol in which the SRSs are configured.

The SRS of the LR-UE and the PUSCH of the LR-UE are multiplexed and mapped in each of the third and fifth symbols of the first slot in the subframe. Here, 12 sub-carriers are used as a frequency domain. These symbols may have a frequency domain to which no PUSCH is mapped. The SRS of the LR-UE and the PUSCH of the LR-UE are multiplexed and mapped in each of the first, third, and sixth symbols of the second slot in the subframe. Here, 2 sets of 12 sub-carriers are used as frequency domains.

Consequently, the SRS of the LR-UE and the PUSCH of the LR-UE can be flexibly mapped to the physical resources. The use efficiency of the physical resources can be improved. Since the SRSs can be distributed over the wide frequency bands, the frequency diversity gain can be obtained.

Although Ack/Nack for the SR, the CSI, and the downlink data is transmitted using the PUCCH for the LR-UE, the conventional method applied to the PUCCH and the SRS that are of the legacy UE may be applied in transmitting the PUCCH and the SRS that are of the LR-UE in the same symbol.

The SRS of the LR-UE can be transmitted per symbol, using the method disclosed in the tenth embodiment. The SRS of the LR-UE and the SRS of the legacy UE can coexist on the same LTE carriers.

Thus, the eNB can receive the SRS of the LR-UE per symbol, and data can be efficiently scheduled for the LR-UE using the SRS.

The eNB can improve the data scheduling efficiency for the LR-UE while preventing decrease in the data scheduling efficiency for the legacy UE.

Thus, the data transmission rate of the LR-UE can be improved while decrease in the data transmission rate of the legacy UE can be prevented.

As described above, the tenth embodiment discloses the SRS per symbol to support the shortened TTI.

However, the conventional method for transmitting the SRS per subframe or the method for transmitting the SRS per slot disclosed in the fifth embodiment may be applied as an alternative method for transmitting the SRS of the LR-UE.

The SRS per symbol may be unnecessary for the scheduling in the eNB. Examples of such a case include a case with less cell load, etc. Decrease in the scheduling efficiency of the eNB will be subtle even without the SRS per symbol. Applying the conventional method for transmitting the SRS per subframe or the method for transmitting the SRS per slot disclosed in the fifth embodiment enables increase in the amount of signaling to be prevented. Increase in complexity of the control can be avoided because of facilitation of coexistence with the legacy UE.

The SRS per symbol, the SRS per slot, and the SRS per subframe may be appropriately combined. The SRSs may be differently used every cell. The SRSs may be differently used every UE. The SRSs may be differently used semi-statically or dynamically. The SRSs may be used differently depending on, as a judgment criterion, a cell load, a cell throughput, an average cell latency, and the communication quality per UE, every required Quality of Service (QoS), and every required latency, etc. Consequently, appropriate settings in response to requirements for each service can be configured for various services.

Eleventh Embodiment

The previous embodiments disclose a method for supporting the UE (LR-UE) operating with the shortened TTI. The previous embodiments also describe that 3GPP has proposed to shorten the TTI for UEs in a connected state. Thus, the UE operates with the shortened TTI after transitioning to the connected state. The UE requires a method for switching to the shortened TTI after transitioning to the connected state. The eleventh embodiment will disclose these methods. Here, the UE switching to the shortened TTI will also be referred to as the LR-UE.

The eNB notifies the LR-UE in a connected state of TTI configuration information. Examples of the TTI configuration information include a TTI value, configuration information of physical channels, and configuration information of RSs.

The TTI configuration information includes a parameter configured every cell or every UE. The parameter configured every cell may be notified through the cell-dedicated signaling or the UE-dedicated signaling. The parameter configured every UE may be notified through the UE-dedicated signaling.

After notifying the LR-UE of the TTI configuration information, the eNB switches to the TTI configuration for the LR-UE. Alternatively, after notifying the TTI configuration information and then, upon receipt of acknowledge (ACK) from the LR-UE in response to the notification, the eNB may switch to the TTI configuration for the LR-UE. Alternatively, after notifying the TTI configuration information and then, upon receipt of a setting complete message using the TTI configuration information from the LR-UE, the eNB may switch to the TTI configuration for the LR-UE.

After receiving the TTI configuration information from the eNB, the LR-UE sets relevant layers such as the PHY and MAC layers using the TTI configuration information, and starts transmission and reception.

Figure 42:
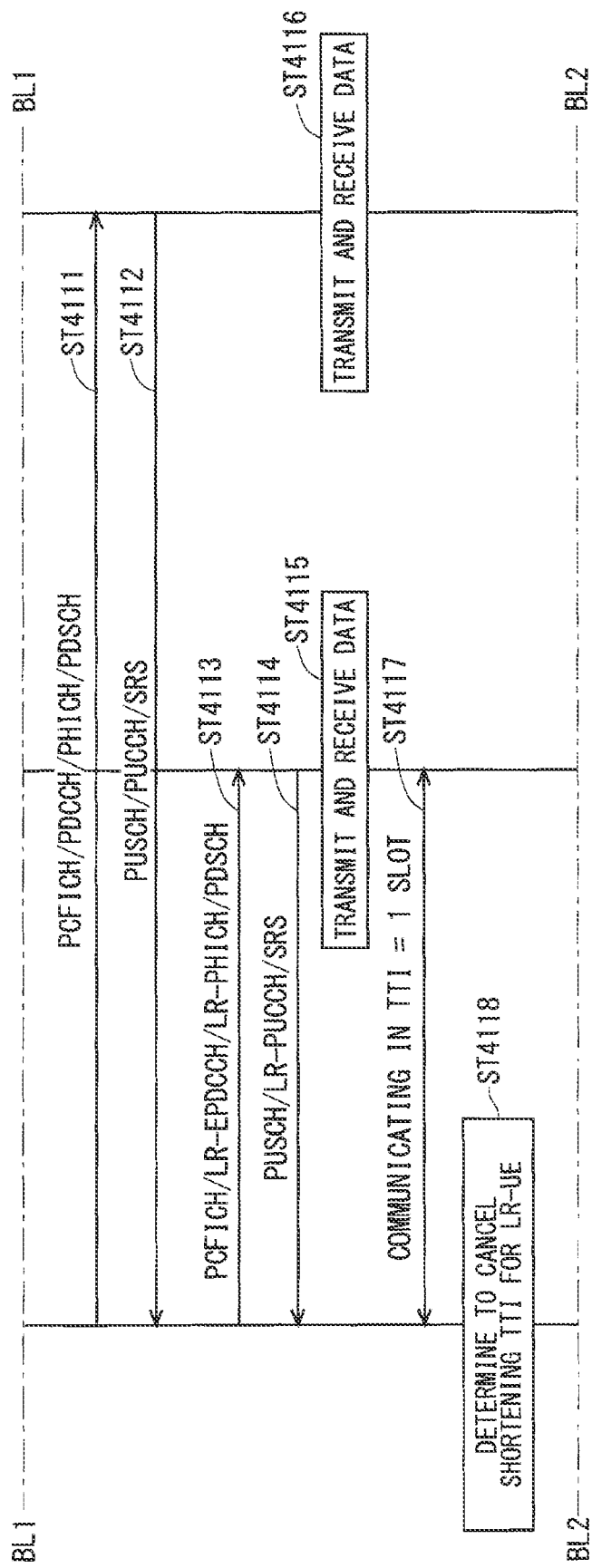
FIG. 42 illustrates the example sequence on the TTI switching for the LR-UE according to the eleventh embodiment.
Figure 43:
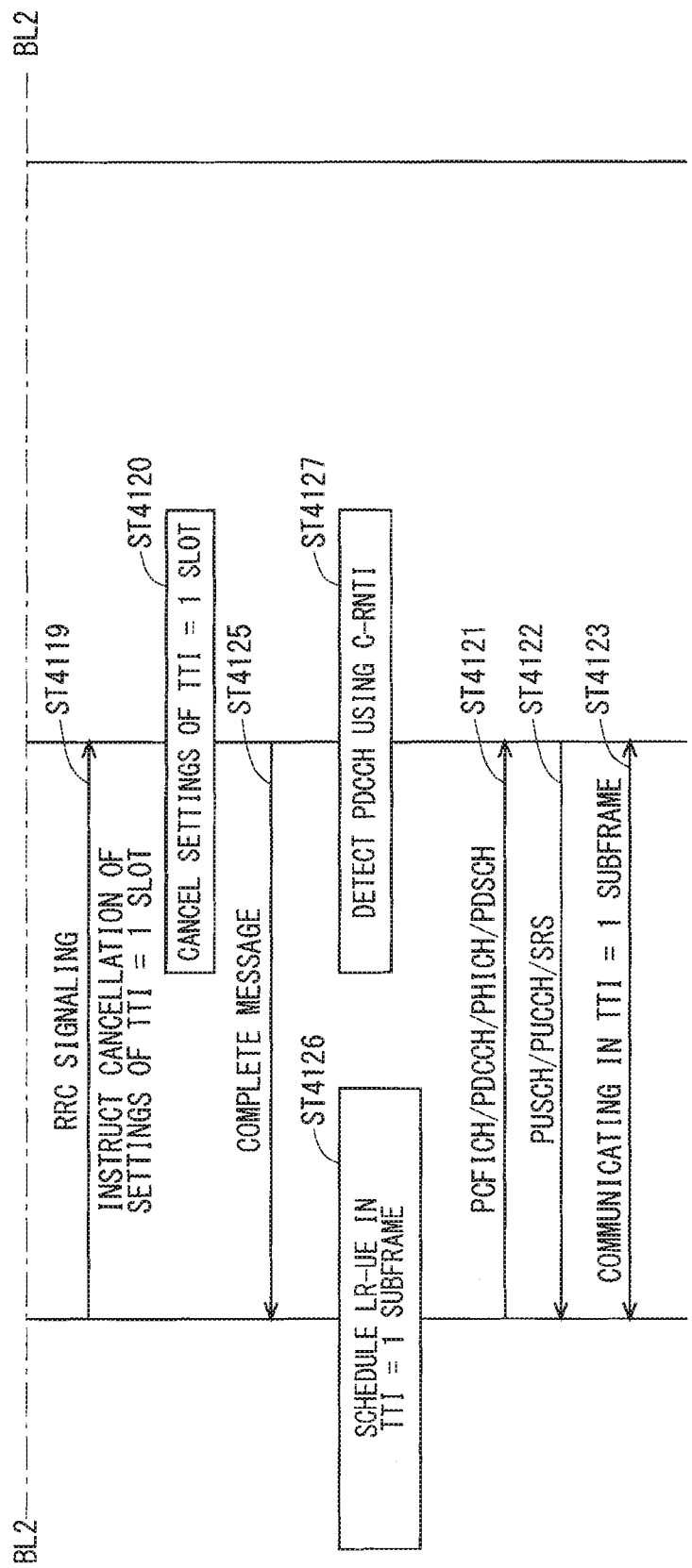
FIG. 43 illustrates the example sequence on the TTI switching for the LR-UE according to the eleventh embodiment.

FIGS. 41 to 43 illustrate an example sequence on the TTI switching for the LR-UE according to the eleventh embodiment. FIGS. 41 to 43 illustrate that the eNB notifies each of the UEs of the TTI configuration information. FIGS. 41 to 43 also illustrate coexistence with the legacy UE. FIGS. 41 and 42 are connected across a border BL1. FIGS. 42 and 43 are connected across a border BL2.

In Step ST4101, the legacy UE is communicating with the eNB in TTI=1 subframe. In Step ST4102, the LR-UE is communicating with the eNB in TTI=1 subframe.

In Step ST4103, the eNB determines to shorten the TTI for the LR-UE, and sets TTI=1 slot.

In Step ST4104, the eNB determines an LR-EPDCCH configuration. The eNB may determine the other necessary TTI configurations. The control unit 411 in FIG. 4 may determine the necessary TTI configurations for the LR-UE.

In Step ST4105, the eNB notifies the LR-UE of the configuration information of the shortened TTI. Here, the eNB notifies it using the UE-dedicated RRC signaling. The eNB may notify the UE of it using, for example, an RRC Connection Reconfiguration message. The TTI configuration information may be included in "RadioResourceConfigDedicated" information in the RRC Connection Reconfiguration message. The TTI configuration information may be included in "physicalConfigDedicated" information in the "RadioResourceConfigDedicated" information.

In Step ST4108, the LR-UE sets the relevant layers such as the PHY and MAC layers using the TTI configuration information notified from the eNB. TTI=1 slot is set herein. The protocol processing unit 301 in FIG. 3 may perform the settings in the LR-UE using the TTI configuration information. Alternatively, the control unit 310 may process the TTI configuration information notified from the eNB, and control the protocol processing unit 301 so that the protocol processing unit 301 sets the relevant layers.

Upon completion of the configuration settings for TTI=1 slot, the LR-UE notifies the eNB of the setting complete message in Step ST4124. The UE-dedicated RRC signaling may be used for notifying the setting complete message. The UE may notify the eNB using, for example, an RRC Connection Reconfiguration Complete message.

In Step ST4109, the LR-UE performs transmission and reception according to the set TTI configuration information. Here, the configuration using the LR-EPDCCH is described. The LR-UE searches for the LR-EPDCCH region using the own C-RNTI to detect the own PDCCH. The control unit 310 or the protocol processing unit 301 in FIG. 3 maps the physical resources in the LR-UE according to the set TTI configuration information. The control unit 310 or the protocol processing unit 301 may control the transmission data buffer unit 303, the encoder unit 304, the modulating unit 305, the frequency converting unit 306, the demodulating unit 308, and the decoding unit 309 according to the set TTI configuration information.

Upon receipt of the setting complete message from the LR-UE in Step ST4124, the eNB schedules the legacy UE in TTI=1 subframe without any change in Step ST4106. In Step ST4107, the eNB starts scheduling the LR-UE with the set TTI configuration. The protocol processing unit 403 in FIG. 4 may perform the settings using the TTI configuration information in the eNB. The control unit 411 may notify the protocol processing unit 403 of the TTI configuration information set for the LR-UE, and control the protocol processing unit 403 so that the protocol processing unit 403 sets the relevant layers. The scheduler in the MAC layer performs the scheduling with the TTI configuration set for each of the UEs, such as the legacy UE and the LR-UE.

The control unit 411 or the protocol processing unit 403 in FIG. 4 maps the physical resources in the eNB using the set TTI configuration information for each of the UEs. The control unit 411 or the protocol processing unit 403 may control the transmission data buffer unit 404, the encoding unit 405, the modulating unit 406, the frequency converting unit 407, the demodulating unit 409, and the decoding unit 410 according to the set TTI configuration information.

In Step ST4110, the legacy UE searches for the conventional PDCCH region using the own C-RNTI without any change to detect the own PDCCH.

In Steps ST4111 and ST4112 of FIG. 42, the eNB and the legacy UE perform transmission and reception with the configuration of TTI=1 subframe using the physical channels and the RSs as conventionally performed. In this way, the legacy UE continuously transmits and receives data in Step ST4116.

In Steps ST4113 and ST4114, the eNB and the LR-UE perform transmission and reception with the configuration of TTI=1 slot that is a shortened TTI. The transmission and reception are performed using the physical channels and the RSs with the configuration of TTI=1 slot and the method for mapping the physical channels and the RSs to the physical resources. For example, the LR-EPDCCH, the LR-PHICH, the PUSCH of the LR-UE, the PUSCH of the LR-UE, the PUCCH of the LR-UE, the SRS of the LR-UE, etc. are used.

In this way, the LR-UE continuously transmits and receives data in Step ST4115.

In Step ST4117, the LR-UE is communicating with the eNB in TTI=1 slot. In Step ST4118, the eNB determines to cancel shortening the TTI for the LR-UE.

In Step ST4119 of FIG. 43, the eNB notifies the LR-UE of cancellation of the configuration of the shortened TTI (TTI=1 slot). The UE-dedicated RRC signaling may be used for notifying the cancellation of the shortened TTI configuration. The eNB may notify the UE using, for example, an RRC Connection Reconfiguration message. Information for instructing the cancellation may be included in the signaling and notified. Alternatively, the configuration information of TTI=1 subframe may be included in the signaling. The LR-UE may determine that the cancellation of TTI=1 slot has been notified through this information.

The LR-UE notified of the cancellation of the shortened TTI in Step ST4119 cancels the settings of the shortened TTI (TTI=1 slot) in Step ST4120. The conventional settings of TTI=1 subframe may be restored.

Upon completion of the cancellation of the settings of TTI=1 slot, the LR-UE notifies the eNB of a setting cancellation complete message in Step ST4125. The UE-dedicated RRC signaling may be used for notifying the setting cancellation complete message. The UE may notify the eNB using, for example, an RRC Connection Reconfiguration Complete message.

In Step ST4127, the LR-UE performs transmission and reception according to the conventional settings of TTI=1 subframe. The LR-UE searches for the PDCCH region using the own C-RNTI to detect the own PDCCH.

Upon receipt of the setting cancellation complete message from the LR-UE in Step ST4125, the eNB starts scheduling the LR-UE with the conventional TTI configuration (TTI=1 subframe) in Step ST4126.

In Steps ST4121 and ST4122, the eNB and the LR-UE perform transmission and reception with the configuration of TTI=1 subframe using the physical channels and the RSs as conventionally performed.

In Step ST4123, the LR-UE cancels the shortened TTI (TTI=1 slot), and communicates with the eNB in the conventional TTI (TTI=1 subframe).

Consequently, the LR-UE that is in a connected state with the eNB can communicate in the shortened TTI.

The shortened TTI can be cancelled, and the TTI configuration can be flexibly changed between the eNB and the LR-UE.

The eNB can communicate with the legacy UE in the conventional TTI while communicating with the LR-UE in the shortened TTI. Thus, communication with the LR-UE operating with the shortened TTI and communication with the legacy UE operating with the conventional TTI can coexist.

Figure 44:
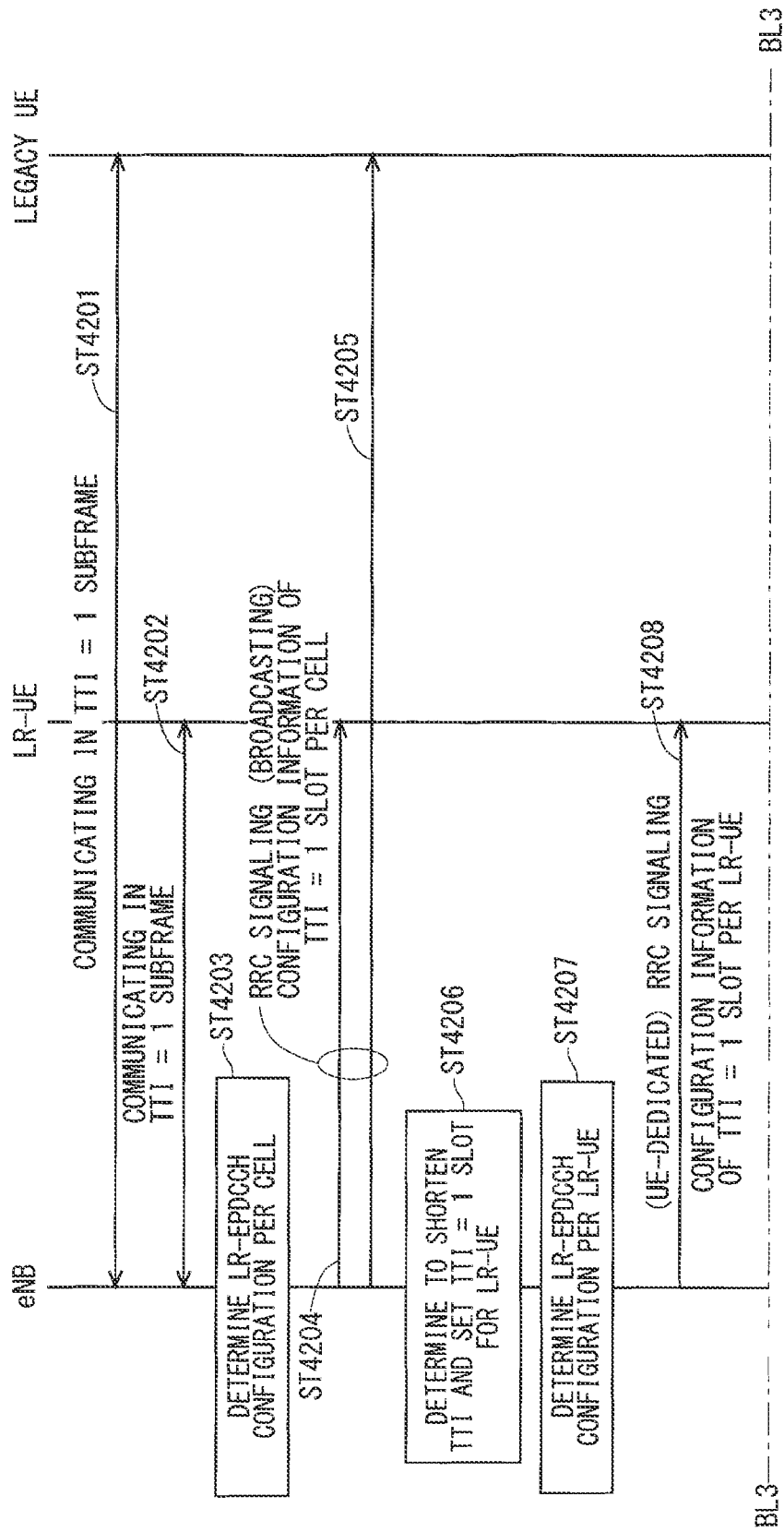
FIG. 44 illustrates another example sequence on the TTI switching for the LR-UE according to the eleventh embodiment.
Figure 45:
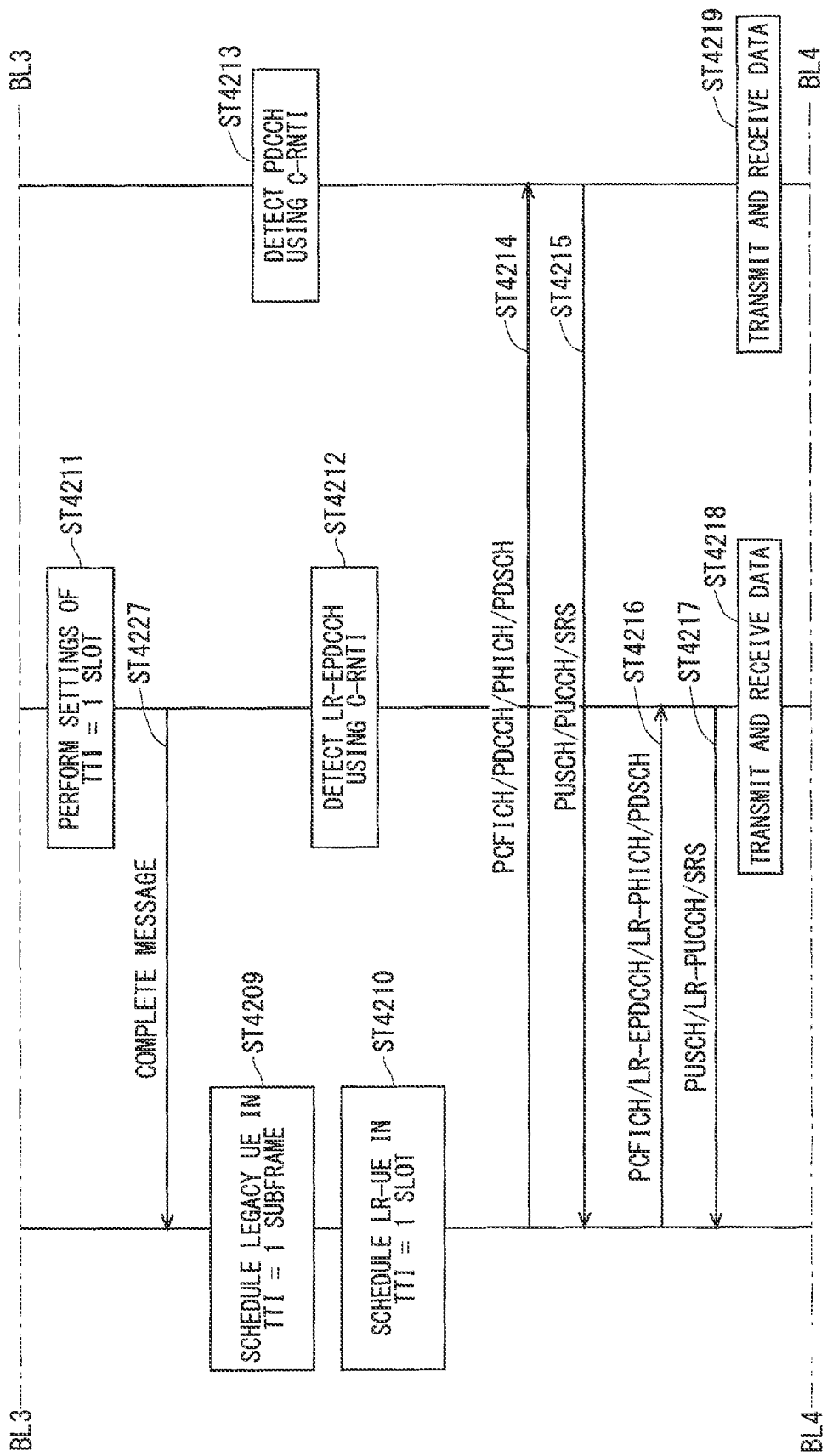
FIG. 45 illustrates the other example sequence on the TTI switching for the LR-UE according to the eleventh embodiment.
Figure 46:
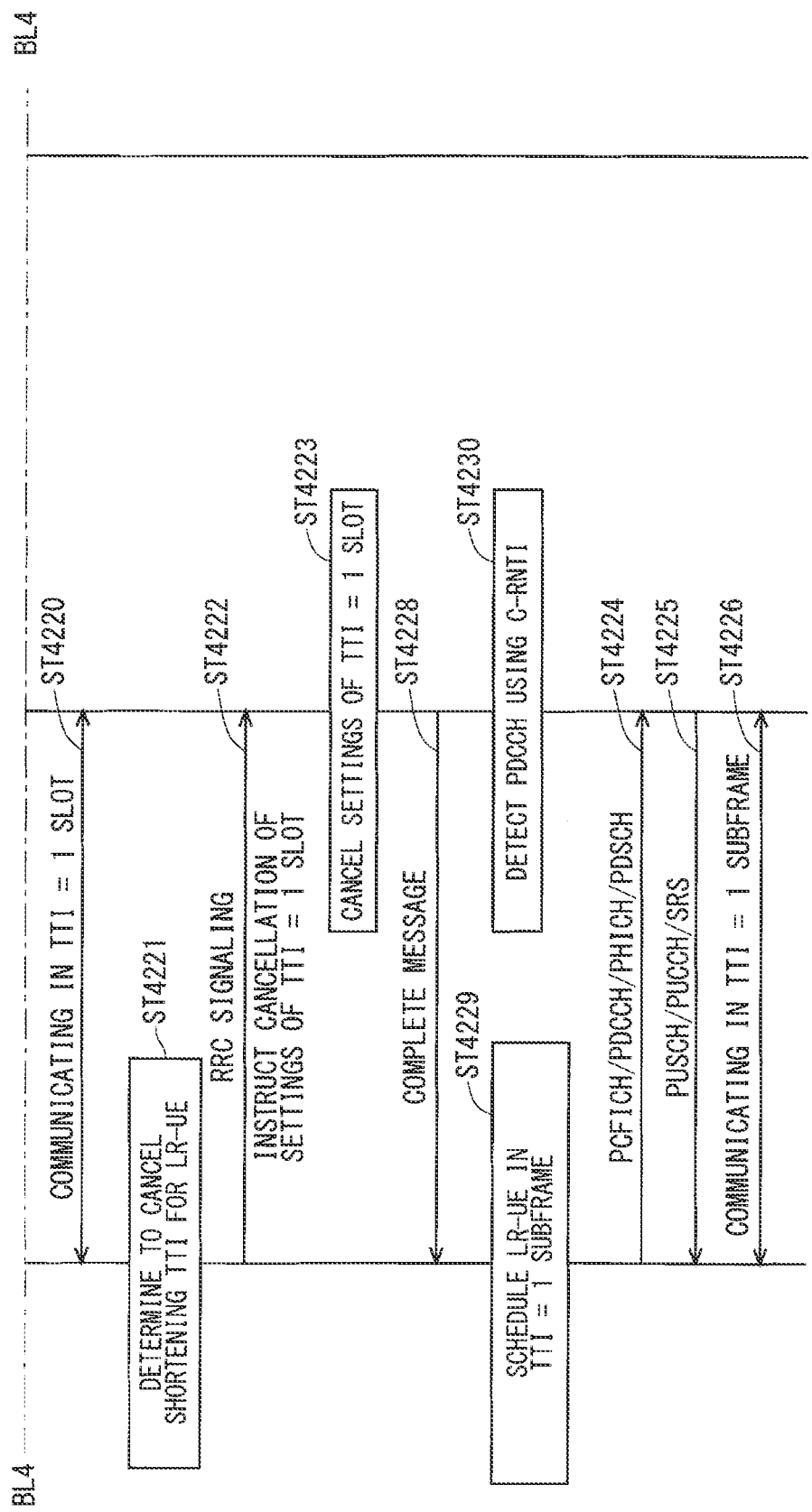
FIG. 46 illustrates the other example sequence on the TTI switching for the LR-UE according to the eleventh embodiment.

FIGS. 44 to 46 illustrate another example sequence on the TTI switching for the LR-UE according to the eleventh embodiment. In FIGS. 44 to 46, the cell-dedicated signaling is used in notifying the TTI configuration information configured every cell, whereas the UE-dedicated signaling is used in notifying the TTI configuration information configured every UE. FIGS. 44 and 45 are connected across a border BL3. FIGS. 45 and 46 are connected across a border BL4.

Since the sequence illustrated in FIGS. 44 to 46 are similar to that illustrated in FIGS. 41 to 43, the differences will be mainly described hereinafter.

In Step ST4201, the legacy UE is communicating with the eNB in TTI=1 subframe. In Step ST4202, the LR-UE is communicating with the eNB in TTI=1 subframe.

In Step ST4203, the eNB determines to operate with the shortened TTI, and determines the TTI configuration information per cell. The TTI configuration information per cell is, for example, the LR-EPDCCH configuration per cell. TTI=1 slot is set herein.

In Steps ST4204 and ST4205, the eNB broadcasts the TTI configuration information per cell, for example, the LR-EPDCCH configuration information to the LR-UE and the legacy UE.

In Step ST4206, the eNB determines to shorten the TTI and sets TTI=1 slot for the LR-UE. In Step ST4207, the eNB determines the TTI configuration information per UE.

In Step ST4208, the eNB notifies the LR-UE of the TTI configuration information per UE. Here, the eNB notifies it using the UE-dedicated RRC signaling.

In Step ST4211 of FIG. 45, the LR-UE sets the relevant layers such as the PHY and MAC layers, using the TTI configuration information per cell notified from the eNB and the TTI configuration information per UE notified from the eNB per UE. TTI=1 slot is set herein.

Upon completion of the configuration settings for TTI=1 slot, the LR-UE notifies the eNB of the setting complete message in Step ST4227. The UE-dedicated RRC signaling may be used for notifying the setting complete message.

In Step ST4212, the LR-UE performs transmission and reception according to the set TTI configuration information. Here, the configuration using the LR-EPDCCH is described. The LR-UE searches for the LR-EPDCCH region using the own C-RNTI to detect the own PDCCH.

Upon receipt of the setting complete message from the LR-UE in Step ST4227, the eNB schedules the legacy UE in TTI=1 subframe without any change in Step ST4209. In Step ST4210, the eNB starts scheduling the LR-UE with the set TTI configuration.

In Step ST4213, the legacy UE searches for the conventional PDCCH region using the own C-RNTI without any change to detect the own PDCCH.

In Steps ST4214 and ST4215, the eNB and the legacy UE perform transmission and reception with the configuration of TTI=1 subframe using the physical channels and the RSs as conventionally performed. In this way, the legacy UE continuously transmits and receives data in Step ST4219.

In Steps ST4216 and ST4217, the eNB and the LR-UE perform transmission and reception with the configuration of TTI=1 slot that is the shortened TTI. The transmission and reception are performed using the physical channels and the RSs with the configuration of TTI=1 slot and the method for mapping the physical channels and the RSs to the physical resources. For example, the LR-EPDCCH, the LR-PHICH, the PDSCH of the LR-UE, the PUSCH of the LR-UE, the PUCCH of the LR-UE, the SRS of the LR-UE, etc. are used. In this way, the LR-UE continuously transmits and receives data in Step ST4218.

In Step ST4220 of FIG. 46, the LR-UE is communicating with the eNB in TTI=1 slot. In Step ST4221, the eNB determines to cancel shortening the TTI for the LR-UE.

In Step ST4222, the eNB notifies the LR-UE of cancellation of the shortened TTI configuration (TTI=1 slot). The UE-dedicated RRC signaling may be used for notifying the cancellation of the shortened TTI configuration. The eNB may notify the UE using, for example, an RRC Connection Reconfiguration message. Information for instructing the cancellation may be included in the signaling and notified. Alternatively, the configuration information of TTI=1 subframe may be included in the signaling. The LR-UE may determine that the cancellation of TTI=1 slot has been notified through this information.

The LR-UE notified of the cancellation of the shortened TTI in Step ST4222 cancels the settings of the shortened TTI (TTI=1 slot) in Step ST4223. The conventional settings of TTI=1 subframe may be restored.

Upon completion of the cancellation of the configuration of TTI=1 slot, the LR-UE notifies the eNB of the setting cancellation complete message in Step ST4228. The UE-dedicated RRC signaling may be used for notifying the setting cancellation complete message. The UE may notify the eNB using, for example, an RRC Connection Reconfiguration Complete message.

In Step ST4230, the LR-UE performs transmission and reception according to the conventional settings of TTI=1 subframe. The LR-UE searches for the PDCCH region using the own C-RNTI to detect the own PDCCH.

Upon receipt of the setting cancellation complete message from the LR-UE in Step ST4228, the eNB starts scheduling the LR-UE with the conventional TTI configuration (TTI=1 subframe) in Step ST4229.

In Steps ST4224 and ST4225, the eNB and the LR-UE perform transmission and reception with the configuration of TTI=1 subframe using the physical channels and the RSs as conventionally performed.

In Step ST4226, the LR-UE cancels the shortened TTI (TTI=1 slot), and communicates with the eNB in the conventional TTI (TTI=1 subframe).

Setting a part of the TTI configuration information to every cell and broadcasting the TTI configuration information per cell can reduce the amount of information in the TTI configuration information necessary to be notified every UE. For example, when the TTI configuration is frequently changed for any UE, the amount of information through signaling per UE which is necessary for switching the TTI configuration can be reduced. Thus, the signaling load can be reduced in a system.

First Modification of Eleventh Embodiment

In the previous embodiments, the eNB determines to shorten the TTI for the LR-UE. Alternatively, the eNB determines to cancel the shortened TTI. This first modification will disclose a judging method for the eNB about which TTI is set to the LR-UE.

The eNB makes a judgment using a predetermined judgment indicator. The following (1) to (11) will be disclosed as specific examples of the predetermined judgment indicator:

(1) Service type;
(2) Amount of data;
(3) QoS Class Identifier (QCI);
(4) RB type;
(5) Downlink communication quality;
(6) Uplink communication quality;
(7) The number of HARQs;
(8) A load state of a cell;
(9) A resource use state of a cell;
(10) Transmission rate; and
(11) A combination of (1) to (10) above.

The specific example (1) will be described. The eNB makes a judgment depending on what kind of service or application a subject communication is. The eNB makes a judgment depending on, for example, what kind of streaming data the service is. Alternatively, the eNB makes a judgment depending on, for example, whether the service is a real-time data streaming service. Alternatively, the eNB makes a judgment depending on, for example, whether the service is a buffered data streaming service. Alternatively, the eNB makes a judgment depending on, for example, whether the service is FTP data service. Alternatively, the eNB makes a judgment depending on, for example, whether the service is a TCP-based service. Information on type of the service or the application of the subject communication may be notified from a core network to the eNB or from the LR-UE to the eNB. In the case of the streaming data, for example, the eNB determines to operate the real-time data streaming with the shortened TTI, whereas the eNB determines to operate the buffered data streaming with the conventional TTI.

Alternatively, the eNB may make a judgment depending on whether the service is an emergency communications service. The eNB may determine to operate the emergency communications service with the shortened TTI.

Consequently, the amount of latency can be improved according to the type of a service or an application, and the data transmission rate can also be improved.

The specific example (2) will be described. The eNB makes a judgment depending on an amount of data to be communicated. For example, when the amount of data is greater than a predetermined threshold, the eNB determines to operate with the shortened TTI. When the amount of data is less than or equal to the predetermined threshold, the eNB determines to operate with the conventional TTI. Information on the amount of data to be communicated may be notified from a core network to the eNB or from the LR-UE to the eNB. Alternatively, the eNB may make a judgment depending on an amount of data that has already been received or transmitted. Alternatively, the eNB may make a judgment depending on the remaining amount of data. For example, when the remaining amount of data is large, the eNB may determine to operate with the shortened TTI. Alternatively, the eNB may make a judgment depending on variations in the amount of communication data. Alternatively, the eNB may make a judgment depending on variations in the remaining amount of data. A downlink buffer size or a state of a buffer for the LR-UE may be used as the amount of data. Alternatively, an uplink buffer size or a state of a buffer notified from the LR-UE may be used.

Consequently, the amount of latency can be improved according to the amount of communication data, and the data transmission rate can also be improved.

The specific example (3) will be described. The eNB makes a judgment depending on a QCI of the subject communication. For example, when the QCIs are 1 and 4, the eNB determines to operate with the shortened TTI. Alternatively, the eNB may make a judgment depending on a required amount of latency. For example, when the required amount of latency is less than or equal to a predetermined threshold, the eNB determines to operate with the shortened TTI. When the required amount of latency is greater than the predetermined threshold, the eNB determines to operate with the conventional TTI.

Consequently, the amount of latency can be improved according to the QCI of the communication or the required amount of latency, and the data transmission rate can also be improved.

The specific example (4) will be described. The eNB makes a judgment depending on the type of a radio bearer (RB) of the subject communication. For example, the eNB determines to use a data radio bearer (DRB) in the shortened TTI. Alternatively, the eNB may determine to use a predetermined DRB in the shortened TTI. Since the DRB is a radio bearer for data, improvement in the data transmission rate is often required. Thus, the data transmission rate can be improved by operating with the shortened TTI. The eNB may determine to use a signaling radio bearer (SRB) in the conventional TTI. The SRB carries a relatively less amount of data per communication. This is because the total time for transmission and reception of massive data hardly varies even when the TTI is changed to the shortened TTI for the SRB.

Consequently, the amount of latency can be improved according to an RB of communication, and the data transmission rate can also be improved.

The specific example (5) will be described. The eNB makes a judgment depending on the downlink communication quality. The eNB makes a judgment, for example, by receiving the CQI or the CSI from the UE. When the downlink communication quality between the eNB and the target UE is superior, the eNB determines to operate with the shortened TTI. When the downlink communication quality is not superior, the eNB determines to operate with the conventional TTI. A threshold may be set to indicators of the communication quality. The eNB may make a judgment depending on whether the communication quality is greater than or equal to the threshold, or less than the threshold.

Alternatively, the eNB may make a judgment depending on variations in the downlink communication quality. For example, when variations in the CQI or the CSI are less, the eNB determines to operate with the shortened TTI. When variations in the downlink communication quality are greater, the eNB determines to operate with the conventional TTI. A threshold may be set to indicators of variations in the communication quality. The eNB may make a judgment depending on whether variations in the communication quality are greater than or equal to a threshold, or less than the threshold. When the variations are less, it is possible to estimate that the communication quality and the radio propagation environment are stable. The eNB determines to operate with the shortened TTI for the LR-UE having the stable radio propagation environment.

Consequently, the amount of latency can be improved according to the downlink communication quality, and the data transmission rate can also be improved.

The specific example (6) will be described. The eNB makes a judgment depending on the uplink communication quality. The eNB makes a judgment, for example, by receiving the PUCCH, the PUSCH, the uplink DMRS, or the SRS from the UE. When the uplink communication quality between the eNB and the target UE is superior, the eNB determines to operate with the shortened TTI. When the uplink communication quality is not superior, the eNB determines to operate with the conventional TTI. A threshold may be set to indicators of the communication quality. The eNB may make a judgment depending on whether the communication quality is greater than or equal to the threshold, or less than the threshold.

Alternatively, the eNB may make a judgment depending on variations in the uplink communication quality. For example, when variations in the uplink DMRS are less, the eNB determines to operate with the shortened TTI. When variations in the downlink communication quality are greater, the eNB determines to operate with the conventional TTI. A threshold may be set to indicators of variations in the communication quality. The eNB may make a judgment depending on whether variations in the communication quality are greater than or equal to a threshold, or less than the threshold. When the variations are less, it is possible to estimate that the communication quality and the radio propagation environment are stable. The eNB determines to operate with the shortened TTI for the LR-UE having the stable radio propagation environment.

Consequently, the amount of latency can be improved according to the uplink communication quality, and the data transmission rate can also be improved.

The specific example (7) will be described. The eNB makes a judgment depending on the number of HARQ retransmissions. The number of HARQ retransmissions may be either the number of uplink HARQ retransmissions or the number of downlink HARQ retransmissions. The eNB may make a judgment depending on the number of HARQ retransmissions in the past. The eNB may make a judgment depending on the number of HARQs during a predetermined past duration. The eNB may make a judgment by deriving an average of the numbers of HARQs during a predetermined duration. For example, when the number of HARQ retransmissions is larger, the eNB determines to operate with the shortened TTI. The number of HARQ retransmissions greatly affects the latency. Thus, the amount of latency can be improved using the shortened TTI under a circumstance where the number of HARQ retransmissions is large.

Consequently, the amount of latency can be improved according to the number of HARQ retransmissions, and the data transmission rate can also be improved.

The specific example (8) will be described. The eNB makes a judgment depending on a load state of a cell. The shortened TTI is used when the cell load is low, whereas the conventional TTI is used when the cell load is high. Since the shortened TTI coexists with the conventional TTI to operate the shortened TTI, the physical resources for the shortened TTI are required in addition to the physical resources for the conventional TTI. When the cell load is high, increase in the physical resources reduces the capacity of a system. Thus, the shortened TTI is configured according to a cell load. Consequently, the amount of latency can be improved in a system, and the data transmission rate can also be improved.

The specific example (9) will be described. The eNB makes a judgment depending on a resource use state of a cell. The shortened TTI is used when the resource use state of the cell is low, whereas the conventional TTI is used when the resource use state of the cell is high. Similarly as the specific example (8), increase in the physical resources reduces the capacity of a system when the resource use state of the cell is high. Thus, the shortened TTI is configured according to a resource use state of the cell. Consequently, the amount of latency can be improved in a system, and the data transmission rate can also be improved.

The specific example (10) will be described. The eNB makes a judgment depending on the data transmission rate. The shortened TTI is used when the data transmission rate with the UE is low, whereas the conventional TTI is used when the data transmission rate with the UE is high. When the data transmission rate is low, the shortened TTI is used to improve the data transmission rate. When the data transmission rate is high, the conventional TTI is used under the assumption that a desired data transmission rate has already been obtained. Consequently, the shortened TTI can be configured according to the data transmission rate. Thus, the amount of latency can be improved in a system, and the data transmission rate can also be improved.

The eNB can determine whether to shorten the TTI for the LR-UE according to a communication state, using such judgment indicators. Although the judgment on whether to shorten the TTI is described in the explanation of the judgment indicators, the judgment indicators are applicable, as necessary, to a case where a plurality of shortened TTIs are configured. Consequently, the plurality of shortened TTIs, for example, 1 slot, 1 symbol, and the conventional TTI (1 subframe) can be used differently.

As described above, the first modification discloses the judging methods for the eNB about which TTI is set to the LR-UE. The LR-UE may request the eNB to make the judgment. The LR-UE may request the eNB to change the settings of the TTI.

The LR-UE notifies the eNB of a request for changing the TTI settings. The UE-dedicated RRC signaling may be used for notifying the request for changing the TTI settings.

Upon receipt of the request for changing the TTI settings, the eNB determines, for the LR-UE that has transmitted the request, whether to shorten the TTI and which TTI length is used.

The LR-UE notifies the eNB of the request for changing the TTI settings, for example, before the process of Step ST4103 in FIGS. 41 to 43.

The LR-UE may determine whether to notify the eNB before notifying the request for changing the TTI settings. The LR-UE may apply, as a judgment indicator for judging whether to notify the request for changing the TTI settings, an applicable one of the aforementioned judgment indicators as necessary.

The LR-UE may notify the eNB of a judgment indicator and its value. The eNB can recognize the judgment indicator and its value in the LR-UE. The LR-UE may notify the eNB of a judgment indicator and its value as well as a request for changing the TTI settings. The eNB can recognize the judgment indicator and its value in the LR-UE as well as the request, and determine whether to change the TTI settings for the LR-UE using the information as requested.

The eNB may notify the UE of information indicating whether the TTI configuration can be changed. The eNB may notify it every cell. At least one of the information indicating whether the TTI configuration can be changed and information on the TTI configuration to be supported is provided, and the eNB may notify the UE of the information in each cell. The information on the TTI configuration to be supported may be a TTI type to be described in the second modification of the eleventh embodiment.

Such information may be included in the broadcast information and broadcast as a notifying method. Alternatively, each UE may be notified of the information using the dedicated RRC signaling. Consequently, the UEs being served by the eNB can recognize the TTI configuration supported by the cell and whether the TTI configuration can be changed. Thus, the LR-UE can notify a request for changing the TTI settings to a cell that supports a desired TTI configuration and change in the TTI configuration.

Upon receipt of the request for changing the TTI settings from the LR-UE, the eNB may determine not to change the TTI settings. In such a case, the eNB may notify the LR-UE that has transmitted the request for changing the TTI settings of rejection of changing the TTI settings. The eNB may notify a cause of the rejection together with the rejection. Upon receipt of the rejection message, the LR-UE can determine that the TTI settings are not changed, and continues to communicate with the current TTI settings.

The eNB may notify, together with the rejection, a prohibition duration during which a request for changing the TTI settings is prohibited. Upon receipt of the prohibition duration, the LR-UE cannot notify the eNB of the request for changing the TTI settings during the prohibition duration. The eNB can prevent continuous transmission of the request from the LR-UE, and reduce the amount of signaling. The eNB may set the prohibition duration according to a state of the own cell, for example, a load state, etc. Consequently, the eNB can control the LR-UE so that the request is notified after an appropriate period.

With the method disclosed in the first modification, the TTI configuration can be adaptively changed according to a state of the LR-UE and the surrounding radio propagation environment, etc.

The LR-UE, which is allowed to request a change in the TTI settings, can immediately request the change using measurements obtained by the LR-UE itself, such as the communication quality, etc. The eNB can do without using the communication quality obtained from the LR-UE, for example, information on the communication quality with less precision such as the CQI/CSI. Thus, the TTI configuration with high precision can be adaptively set. Consequently, the transmission rate can be further improved.

Second Modification of Eleventh Embodiment

In the previous embodiments, the eNB determines to shorten the TTI for the LR-UE. The eNB needs to recognize whether the target UE can support the shortened TTI.

The second modification will disclose a method performed by the eNB for recognizing whether the UE can support the shortened TTI.

An indicator indicating whether the plurality of TTIs are supported is provided. Information on type of a compatible TTI may be provided. Such examples include TTI=1 subframe TTI=1 slot, and TTI=1 symbol, etc. Each type may be indicated by one or more bits. The bits may be predetermined. The TTI type is indicated by 2 bits, for example, TTI=1 subframe is indicated by 10, TTI=1 slot is indicated by 01, and TTI=1 symbol is indicated by 00. The TTI type can be represented by a small amount of information. TTI=1 subframe may be unnecessary as a default. Information on the number of the TTI types that can be simultaneously supported may be provided. Information for identifying a UE to be notified, for example, an identifier of the UE may be included.

Such information will be referred to as "information on plural TTIs". The information on plural TTIs may be included in UE capability information.

The UE notifies the eNB of the information on plural TTIs. Alternatively, the UE may notify a network side node of the information on plural TTIs. The network side node may notify the eNB of the information on plural TTIs received from the UE as necessary. The UE may notify the eNB of the information on plural TTIs using a method for notifying the UE capability information.

Consequently, the eNB can receive the TTI information of the UE, and recognize whether the UE supports the plurality of TTIs. Thus, the eNB can change the TTI configuration for the UE using the information on plural TTIs received from the UE, and notify the UE of the TTI configuration.

The LR-UE can charge the TTI configuration by receiving the notification on changing the TTI configuration from the eNB, and communicate with the eNB according to the TTI configuration. Thus, the communication in the shortened TTI becomes possible when the set TTI configuration indicates the shortened TTI.

Twelfth Embodiment

The eleventh embodiment discloses the method for switching to the shortened TTI for the LR-UE after transitioning to the connected state. The twelfth embodiment will disclose a method performed by a system for simultaneously supporting a plurality of TTI configurations for the eNB and the UE.

The system allows simultaneous settings of the plurality of TTIs. The eNB can set the plurality of TTIs to any one of the LR-UEs in a connected state. The eNB can set the plurality of TTIs to the LR-UE that can simultaneously support the plurality of TTIs.

The physical resources of physical channels for configuring each of the TTIs may be mapped without conflicting with one another. The previous embodiments disclose avoiding a conflict between the physical resources to which the physical channels for configuring the shortened TTI are mapped and the physical resources to which the physical channels for configuring the conventional TTI are mapped. With application of the method disclosed in the previous embodiments, the physical resources to which the physical channels for configuring a plurality of shortened TTIs are mapped preferably avoid a conflict with one another. The physical channels and the physical resources to which the physical channels are mapped may be configured without conflicting with one another.

The method disclosed in the second modification of the eleventh embodiment may be applied as a method performed by the eNB for determining whether the target UE can simultaneously support the plurality of TTIs. Information indicating whether the UE can simultaneously support the plurality of TTIs may be provided and included in the information on plural TTIs. When notifying the eNB of the information on plural TTIs, the UE may also notify information indicating whether the UE can simultaneously support the plurality of TTIs. Consequently, the eNB can determine whether the target UE can simultaneously support the plurality of TTIs.

An example of simultaneously supporting the plurality of TTIs for one LR-UE will be disclosed. For example, the eNB transmits data to the LR-UE in the plurality of TTIs according to a kind of the downlink control information. The conventional TTI is used for the control information to be mapped to a common search space (CSS) (see Non-Patent Document 12), whereas the shortened TTI is used for the control information to be mapped to a UE-specific search space (USS) (see Non-Patent Document 12).

Examples of the control information to be mapped to the CSS include SIB control information, paging control information, and Random Access Response (RAR) control information. Such control information is not control information for data of each UE. Such control information is used for detecting the PDCCH not using the own C-RNTI of the LR-UE but using a predetermined RNTI every cell or in a system. Thus, transmission of the control information to be mapped to the CSS using the conventional TTI can be performed in the same manner as the conventional method for receiving the control information by the legacy UE. Consequently, there is no need to newly secure physical resources for each LR-UE and to create paging for the legacy UE and paging for the LR-UE using different mechanisms. Similarly, there is no need to create a RAR for the legacy UE and a RAR for the LR-UE using different mechanisms. Thus, the use efficiency of the physical resources can be improved, and increase in complexity of the control can be avoided. Simplifying the control can facilitate the implementation.

Examples of the control information to be mapped to the USS include control information for UE-dedicated communication data. This control information is used for detecting the PDCCH using the own C-RNTI of the LR-UE. Thus, using the shortened TTI for transmitting the control information to be mapped to the USS enables reduction in the latency of the UE-dedicated communication data. Thus, the data transmission rate of the LR-UE can be improved.

Figure 47:
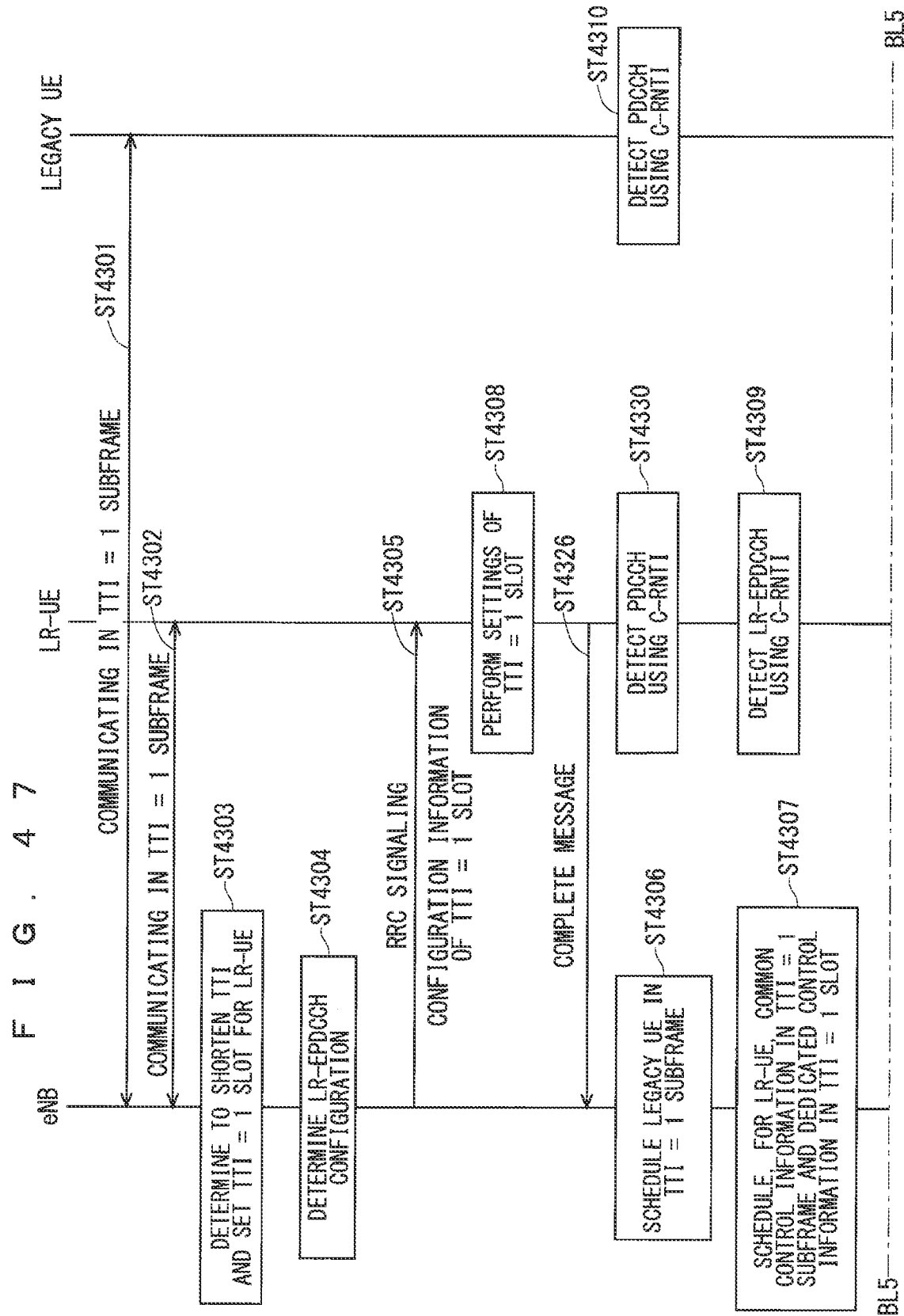
FIG. 47 illustrates an example sequence on processes of simultaneously supporting a plurality of TTIs for one LR-UE according to the twelfth embodiment.
Figure 48:
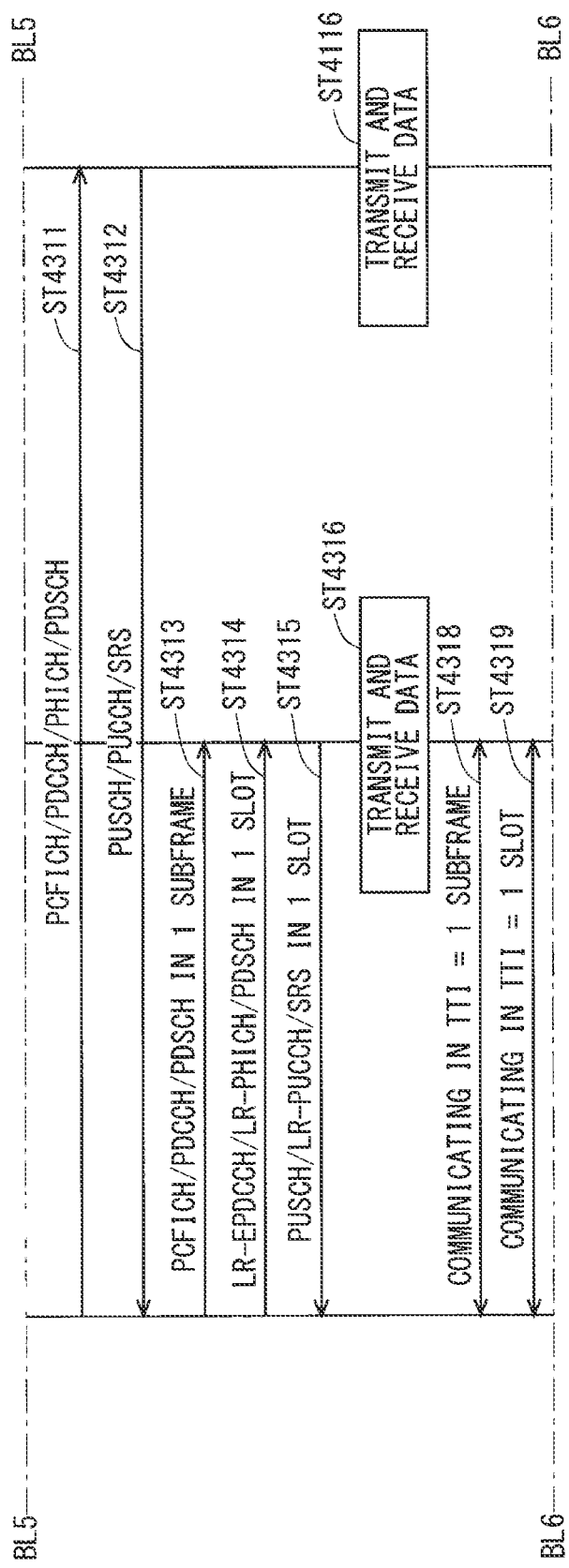
FIG. 48 illustrates the example sequence on the processes of simultaneously supporting the plurality of TTIs for one LR-UE according to the twelfth embodiment.

FIGS. 47 to 49 illustrate an example sequence on processes of simultaneously supporting the plurality of TTIs for one LR-UE according to the twelfth embodiment. In FIGS. 47 to 49, the conventional TTI (TTI=1 subframe) is used for the control information to be mapped to the CSS, whereas the shortened TTI is used for the control information to be mapped to the USS. The shortened TTI is defined as TTI=1 slot in the example illustrated in FIGS. 47 to 49. FIGS. 47 to 49 illustrate coexistence with the legacy UE. FIGS. 47 and 48 are connected across a border BL5. FIGS. 48 and 49 are connected across a border BL6.

In Step ST4301, the legacy UE is communicating with the eNB in TTI=1 subframe. In Step ST4302, the LR-UE is communicating with the eNB in TTI=1 subframe.

In Step ST4303, the eNB determines to shorten the TTI for the LR-UE, and sets TTI=1 slot as the shortened TTI. The eNB determines to use, for the LR-UE, the conventional TTI for the control information to be mapped to the CSS and the shortened TTI for the control information to be mapped to the USS.

In Step ST4304, the eNB determines an LR-EPDCCH configuration for the shortened TTI. The eNB may determine the other necessary TTI configurations.

In Step ST4305, the eNB notifies the LR-UE of the configuration information of the shortened TTI. Here, the eNB notifies it using the UE-dedicated RRC signaling. The eNB may notify the UE using, for example, an RRC Connection Reconfiguration message. The TTI configuration information may be included in "RadioResourceConfigDedicated" information in the RRC Connection Reconfiguration message. The TTI configuration information may be included in "physicalConfigDedicated" information in the "RadioResourceConfigDedicated" information.

There may be information indicating that the conventional TTI is used for the control information to be mapped to the CSS and that the shortened TTI is used for the control information to be mapped to the USS. The eNB notifies the LR-UE of such information together with the TTI configuration information. Such information may be included in the TTI configuration information to be notified.

In Step ST4308, the LR-UE sets the relevant layers such as the PHY and MAC layers using the TTI configuration information notified from the eNB. TTI=1 slot is set herein. The LR-UE also maintains the settings of the relevant layers conforming to the conventional TTI (TTI=1 subframe) configuration. In other words, the relevant layers are set in accordance with the two TTI configurations of the conventional TTI and the shortened TTI. The LR-UE is operable with the two TTIs.

Upon completion of the configuration settings for TTI=1 slot, the LR-UE notifies the eNB of the setting complete message in Step ST4326. The UE-dedicated RRC signaling may be used for notifying the setting complete message. The UE may notify the eNB using, for example, an RRC Connection Reconfiguration Complete message.

In Step ST4330, the LR-UE maintains transmission and reception according to the conventional TTI configuration. The LR-UE searches for the conventional PDCCH region using the own C-RNTI to detect the own PDCCH. Consequently, the LR-UE can receive the control information mapped to the CSS. The LR-UE can also perform transmission and reception according to the control information.

In Step ST4309, the LR-UE performs transmission and reception according to information on the shortened TTI configuration. Here, the configuration using the LR-EPDCCH is described. The LR-UE searches for the LR-EPDCCH region using the own C-RNTI to detect the own PDCCH. Consequently, the LR-UE can receive the control information mapped to the USS. The LR-UE can also perform transmission and reception according to the control information.

Upon receipt of the setting complete message from the LR-UE in Step ST4326, the eNB starts scheduling, for the LR-UE, the control information to be mapped to the CSS in the conventional TTI and the control information to be mapped to the USS in the shortened TTI in Step ST4307. Consequently, the method based on the conventional TTI is used for the control information to be mapped to the CSS, whereas the method based on the shortened TTI is used for the control information to be mapped to the USS. These processes are simultaneously performed between the eNB and the LR-UE.

In Step ST4306, the eNB schedules the legacy UE in the conventional TTI without any change.

In Step ST4310, the legacy UE searches for the conventional PDCCH region using the own C-RNTI without any change to detect the own PDCCH.

In Steps ST4311 and ST4312 of FIG. 48, the eNB and the legacy UE perform transmission and reception with the configuration of TTI=1 subframe using the physical channels and the RSs as conventionally performed. In this way, the legacy UE continuously transmits and receives data in Step ST4116.

In Step ST4313, the eNB and the LR-UE perform transmission and reception on the control information to be mapped to the CSS with the configuration of TTI=1 subframe that is the conventional TTI. The transmission and reception are performed using the physical channels and the RSs with the conventional configuration of TTI=1 subframe and the method for mapping the physical channels and the RSs to the physical resources. For example, the PDCCH and the PDSCH, etc. are used.

In Steps ST4314 and ST4315, the eNB and the LR-UE perform transmission and reception with the configuration of TTI=1 slot that is the shortened TTI. The transmission and reception are performed using the physical channels and the RSs with the configuration of TTI=1 slot and the method for mapping the physical channels and the RSs to the physical resources. For example, the LR-EPDCCH, the LR-PHICH, the PDSCH of the LR-UE, the PUSCH of the LR-UE, the PUCCH of the LR-UE, the SRS of the LR-UE, etc. are used.

In this way, the LR-UE transmits and receives data simultaneously using the two TTIs in Step ST4316.

In Step ST4318, the eNB and the LR-UE perform transmission and reception on the control information to be mapped to the CSS with the conventional TTI.

In Step ST4319, the eNB and the LR-UE perform transmission and reception on the control information to be mapped to the USS with the shortened TTI.

In Step ST4320 in FIG. 49, the eNB determines to cancel shortening the TTI for the LR-UE.

In Step ST4321, the eNB notifies the LR-UE of cancellation of the shortened TTI configuration (TTI=1 slot). The eNB may notify cancellation of applying the shortened TTI to the control information to be mapped to the USS.

The UE-dedicated RRC signaling may be used for notifying the cancellation of the shortened TTI configuration. The eNB may notify the UE using, for example, an RRC Connection Reconfiguration message. Information for instructing the cancellation may be provided and included in the signaling to be notified. Alternatively, the configuration information of TTI=1 subframe may be included in the signaling. The LR-UE may determine that the cancellation of TTI=1 slot has been notified through this information.

The LR-UE notified of the cancellation of the shortened TTI in Step ST4321 cancels the settings of the shortened TTI (TTI=1 slot) in Step ST4322. The conventional settings of TTI=1 subframe may be restored in the control information to be mapped to the USS. Consequently, both the control information to be mapped to the CSS and the control information to be mapped to the USS have the same conventional settings of TTI=1 subframe.

Upon completion of the cancellation of the configuration of TTI=1 slot, the LR-UE notifies the eNB of the setting cancellation complete message in Step ST4327. The UE-dedicated RRC signaling may be used for notifying the setting cancellation complete message. The UE may notify the eNB using, for example, an RRC Connection Reconfiguration Complete message.

In Step ST4329, the LR-UE performs transmission and reception according to the conventional settings of TTI=1 subframe. The LR-UE searches for the PDCCH region using the own C-RNTI to detect the own PDCCH.

Upon receipt of the setting cancellation complete message from the LR-UE in Step ST4327, the eNB starts scheduling, for the LR-UE, both the control information to be mapped to the CSS and the control information to be mapped to the USS with the conventional TTI configuration (TTI=1 subframe) in Step ST4328.

In Steps ST4323 and ST4324, the eNB and the LR-UE perform transmission and reception with the configuration of TTI=1 subframe using the physical channels and the RSs as conventionally performed.

In Steps ST4325, the LR-UE cancels the plurality of TTIs including the shortened TTI, and communicates with the eNB in the one conventional TTI.

Consequently, the use efficiency of the physical resources can be improved with the plurality of TTIs supportable for one LR-UE and by differently using the TTIs as described above. Moreover, the data transmission rate of the LR-UE can be improved while increase in complexity of the control can be avoided.

Another example of simultaneously supporting the plurality of TTIs for one LR-UE will be disclosed. For example, the eNB sets a different TTI to the LR-UE every RB. With the settings of the different TTI to one LR-UE every RB, the eNB communicates with the LR-UE simultaneously using the plurality of TTIs.

For example, the eNB uses the shortened TTI only for a predetermined DRB. The eNB uses the conventional TTI for the other RBs. The eNB may use different TTI configurations for a plurality of DRBs of the LR-UE. For example, TTI=1 slot is set to one DRB, whereas TTI=1 symbol is set to another DRB. TTI=1 subframe is set to the other RBs. Applying the shortened TTI configuration to the DRB is effective in an attempt to reduce the latency in transmitting data and improve the data transmission rate.

Alternatively, the eNB uses the shortened TTI only for a predetermined SRB. The eNB uses the conventional TTI for the other RBs. When an amount of signaling is excessive, applying the shortened TTI configuration to the SRB is effective to reduce the latency in the signaling.

The eNB may notify the LR-UE of the TTI configuration together with an RB configuration. The eNB conventionally notifies the UE of the RB configuration using the RRC signaling. The RRC connection reconfiguration is used as the RRC signaling. The RB configuration is notified using information on the SRB or the DRB that is included in "RadioResourceConfigDedicated" information in an RRC Connection Reconfiguration message.

The TTI configuration may be notified together with the RB configuration. For example, information on the TTI configuration may be included in information on the SRB. Alternatively, information on the TTI configuration may be included in information on the DRB. The information on the TTI configuration may be replaced with information on the TTI type. The TTI configuration per TTI type may be separately notified. This enables the eNB to set the TTI configuration to the LR-UE every RB. The eNB can communicate with the LR-UE in a desired TTI every RB. The latency performance corresponding to the RB characteristics can be obtained.

Consequently, the latency performance suitable for characteristics of each RB can be obtained with the plurality of TTIs supportable for one LR-UE and by differently using the TTIs as described above. The data transmission rate can be improved using the shortened TTI for an RB requiring low latency performance.

Thirteenth Embodiment

The UE communicating in the conventional TTI measures the communication quality such as the RSRP and the RSRQ of the downlink of a cell by receiving a cell-specific reference signal (CRS) to be mapped over 1 subframe. In other words, the UE measures the CRS to derive the communication quality.

The LR-UE communicating in the shortened TTI needs to perform such measurements. However, the unit of reception for the LR-UE is the shortened TTI. Examples of the unit of reception include 1 slot and 1 symbol, etc. Thus, the LR-UE cannot receive the conventional CRS in the unit of reception.

Although a new CRS may be provided for the LR-UE to map the CRS to the physical resources, the physical resources that can be used for data will decrease. Thus, the conventional CRS is used for the LR-UE.

The conventional CRS is also mapped to the physical resources to which data or control channels for the LR-UE are mapped. The data or the control channels for the LR-UE are mapped by avoiding the conventional CRS. The data or the control channels for the LR-UE are frequency-division multiplexed or time-division multiplexed with the CRS.

A method performed by the LR-UE for measuring the communication quality using the conventional CRS will be disclosed. The LR-UE may measure the conventional CRS in a TTI, according to a set TTI length. The LR-UE measures, for example, the conventional CRS for 1 slot when TTI=1 slot.

However, the conventional CRS may not be mapped within the set TTI if the TTI is further shortened. When TTI=1 symbol, for example, symbols to which the conventional CRS is not mapped exist. The LR-UE to which such a short TTI is set may not be able to measure the CRS in the TTI.

The LR-UE measures the CRS for a predetermined duration regardless of the TTI length as a method for solving such a problem. When, for example, TTI=1 symbol is set, the LR-UE may measure the CRS for 1 subframe. Normal subframes each always include the CRS. Thus, the LR-UE can measure the CRS. When TTI=1 symbol is set, the LR-UE may measure only a symbol including the CRS among 14 symbols equivalent to 1 subframe.

The CRS may be measured regularly, periodically, or consecutively. The CRSs may be averaged using a plurality of measurement results. The CRSs may be averaged with a predetermined filter function.

The measurement result of the CRS may be derived per subframe. Alternatively, the measurement result may be derived per slot. Alternatively, the measurement result may be derived per RE. Information on measurement of the CRS will be referred to as "CRS measurement information".

The CRS measurement information may be statically predetermined, for example, in a standard, or semi-statically or dynamically determined. When the CRS measurement information is semi-statically or dynamically determined, the eNB or a network node may determine the CRS measurement information and notify it to the LR-UE.

When, for example, TTI=1 slot is set, the LR-UE measures and averages the CRSs for 2 slots to derive a measurement result of the CRSs per RE. The LR-UE measures the CRS every slot or the CRSs in predetermined slots to derive a moving average of the CRSs for the latest 2 slots. Here, the measurement result of the CRSs can be derived every slot or per RE.

The CRS measurement information may be included in the broadcast information and broadcast as a notification method from the eNB to the LR-UE. As an alternative method, the CRS measurement information may be included in an RRC message and notified using the dedicated RRC signaling.

The eNB may notify the LR-UE of, for example, the CRS measurement information together with the TTI configuration information or the CRS measurement information included in the TTI configuration information.

The eNB may notify the LR-UE of, as an alternative example, the CRS measurement information together with a measurement configuration message, or the CRS measurement information included in the measurement configuration message.

Consequently, the LR-UE can obtain the CRS measurement information and recognize how to measure the CRS.

The aforementioned method may be applied to measurement of the CRS in an adjacent cell. The LR-UE measures the communication quality of the adjacent cell using the CRS of the adjacent cell. Consequently, the LR-UE can also evaluate the communication quality of the adjacent cell.

The LR-UE to which the shortened TTI is set can measure the communication quality using the conventional CRS with application of the method disclosed in the thirteenth embodiment. Thus, the conventional measurement method is applicable to the LR-UE. Since the communication quality can be measured in the conventional method, the evaluation methods can be integrated as a system. For example, event criteria for reporting measurement results can be integrated. Settings of, for example, a threshold for determining occurrence of an event can be integrated.

Thus, facilitating comparison of the measurement results in the eNB or the network side node enables easy, fair, and high-precision control. The legacy UE and the LR-UE can easily coexist, for example, in the communication control such as the handover.

Fourteenth Embodiment

The UE communicating in the conventional TTI receives the CRS to be mapped in 1 subframe to measure the communication quality (CQI) of a downlink channel. In other words, the UE measures the CRS to derive the communication quality (CQI) of the downlink channel.

The UE communicating in the conventional TTI also receives the CSI Reference Signal (CSI-RS) to be mapped in 1 subframe to measure the communication quality (CSI) of a downlink channel. In other words, the UE measures the CRS to derive the communication quality (CSI) of the downlink channel.

The LR-UE communicating in the shortened TTI needs to perform such measurements. However, the unit of reception for the LR-UE is the shortened TTI. Examples of the unit of reception include 1 slot and 1 symbol, etc. Thus, the LR-UE can receive neither the conventional CRS nor the conventional CSI-RS in the unit of reception.

Although a new CRS and a new CSI-RS may be provided for the LR-UE to map them to the physical resources, the physical resources that can be used for data will decrease. The conventional CRS and CSI-RS may be used for the LR-UE.

Since the thirteenth embodiment discloses the CRS, the description will be omitted herein. The LR-UE may measure the communication quality (CQI) of the downlink channel using the conventional CRS.

The method disclosed in the thirteenth embodiment may be applied to the CSI-RS. Specifically, the method may be applied to the CSI-RS instead of the CRS.

The LR-UE reports a measurement result of the CSI-RS to the eNB. The PUCCH is used for the reporting. The PUCCH compatible with the shortened TTI is configurable. Thus, the CSI can be reported per shortened TTI. The eNB may set a reporting period to an integer multiple of the shortened TTI for the LR-UE. Since the CSI can be reported per shortened TTI, feedback of the CSI on the downlink reception in the LR-UE can be expedited. Thus, the eNB can perform more accurate scheduling.

When the LR-UE can support the plurality of TTIs, the LR-UE may use the PUCCH transmitted in the conventional TTI to report the CSI.

The eNB sets a reporting period of a measurement result of the CSI-RS per conventional TTI for the LR-UE to transmit the report about the CSI on the PUCCH in the conventional TTI. The LR-UE uses the PUCCH configured per conventional TTI, that is, per subframe for the transmission to report the CSI. Since the PUCCH is configured per subframe, the amount of control information that can be mapped to the PUCCH can be increased.

The LR-UE to which the shortened TTI is set can measure the communication quality using the conventional CRI-RS with application of the method disclosed in the fourteenth embodiment. Thus, the conventional measurement method is applicable to the LR-UE. Since the communication quality can be measured in the conventional method, the evaluation methods can be integrated as a system. Thus, facilitating comparison of the measurement results in the eNB or the network side node enables easy, fair, and high-precision scheduling.

Fifteenth Embodiment

The legacy UE measures the reception quality of the CRS in a PDCCH region to perform radio link monitoring (RLM). The LR-UE operating with the shortened TTI does not always receive the PDCCH region. In such a case, the LR-UE may measure the reception quality of the RS in an LR-EPDCCH region to perform the RLM. When the CRS is mapped to the LR-EPDCCH region, the reception quality is measured using the CRS. When the CRS is not mapped but another RS is mapped to the LR-EPDCCH region, the reception quality may be measured using the RS. Consequently, the LR-UE can perform the RLM.

The LR-UE operating with the plurality of TTIs may measure only the communication quality of the conventional TTI. The LR-UE may measure the reception quality of the CRS in a conventional PDCCH region to perform the RLM. This is effective in receiving the conventional PDCCH region. The control can be facilitated with use of the conventional method.

As an alternative method, the LR-UE operating with the plurality of TTIs may measure only the communication quality of the shortened TTI. This is effective particularly when the conventional PDCCH region is not used.

As an alternative method, the LR-UE operating with the plurality of TTIs may measure the communication quality of each of the TTIs. The communication quality in the conventional TTI may be derived by measuring the reception quality of the CRS in the PDCCH region, whereas the communication quality in the shortened TTI may be derived by measuring the reception quality of the CRS in the PDCCH region or the LR-EPDCCH region to be used in the TTI configuration.

The LR-UE may report the measurement result of the communication quality per TTI settings to the eNB. Alternatively, a threshold may be set, and a report activation (event trigger) may be provided based on the threshold. For example, the LR-UE may notify the eNB of the TTI settings whose communication quality falls below the threshold.

Consequently, the eNB can recognize the communication quality with each TTI setting. Thus, the eNB can use the communication quality with each TTI setting for the LR-UE to determine whether to set, change, and cancel the TTI.

Sixteenth Embodiment

When the LR-UE to which the shortened TTI is set performs a handover (HO) process, the LR-UE may not be able to communicate with a target eNB (T-eNB) in the TTI set to the LR-UE in a target eNB (T-eNB). Examples of such a case include a case where the T-eNB does not support the shortened TTI but supports only the conventional TTI. Alternatively, even when the T-eNB supports the shortened TTI, the T-eNB may not be able to set the TTI due to a load state of a cell. The LR-UE will be disconnected if nothing is done. Thus, the LR-UE leaves a connected state. The sixteenth embodiment will disclose a method for solving such problems.

A HO of the LR-UE is performed in the conventional TTI (TTI=1 subframe). When the shortened TTI is set to the LR-UE, the shortened TTI is canceled and the conventional TTI is restored.

A specific example of a method for canceling the shortened TTI set to the LR-UE when the HO of the LR-UE is performed will be disclosed.

When being instructed to execute the HO from a source eNB (S-eNB) that is a HO source through an RRC Connection Reconfiguration message including mobility control information (MCI), the LR-UE executes the HO to the target eNB (T-eNB) that is a HO destination.

Upon receipt of an instruction to execute the HO from the S-eNB, the LR-UE to which the shortened TTI is set may cancel the settings of the shortened TTI. The method disclosed in the eleventh embodiment may be applied to the method for canceling the shortened TTI. The LR-UE that has canceled the shortened TTI operates with the conventional TTI.

Consequently, the LR-UE can execute the HO in the conventional TTI. The LR-UE accesses the T-eNB in the conventional TTI. Thus, the T-eNB can transition to a communication state with the LR-UE using the conventional TTI.

Another method will be disclosed. The S-eNB may notify the LR-UE of cancelation of the shortened TTI in performing the HO. The S-eNB may notify the LR-UE of cancelation of the shortened TTI together with the instruction to execute the HO through an RRC message including the MCI. The method disclosed in the eleventh embodiment may be applied as information for instructing cancelation of the shortened TTI and a method for the cancelation.

Consequently, the cancelation of the shortened TTI can be explicitly notified to the LR-UE to which the execution of the HO is instructed. Thus, the LR-UE can execute processes of canceling the shortened TTI without missing the cancelation start timing thereof. Consequently, the malfunction of the LR-UE can be reduced.

FIGS. 50 and 51 illustrate an example sequence on processes of notifying cancelation of the shortened TTI from the S-eNB to the LR-UE in performing the HO according to the sixteenth embodiment. FIGS. 50 and 51 are connected across a border BL7.

In Step ST4401, the LR-UE is communicating with the S-eNB in TTI=1 slot that is the shortened TTI. In Step ST4402, the S-eNB notifies the LR-UE of a measurement setting message. Upon receipt of the measurement setting in Step ST4402, the LR-UE performs the measurement.

In Step ST4403, the LR-UE reports a measurement result to the S-eNB. The method disclosed in the thirteenth embodiment may be applied to this measurement process.

Upon receipt of the measurement report in Step ST4403, the S-eNB determines the HO for the LR-UE in Step ST4404.

In Step ST4405, the S-eNB notifies the T-eNB of a HO request message.

In Step ST4406, the T-eNB performs admission control. In Step ST4407, the T-eNB notifies the S-eNB of an Ack message in response to the HO request.

Upon receipt of the Ack message in response to the HO request in Step ST4407, the S-eNB can recognize that the T-eNB has acknowledged the HO request for the LR-UE.

Upon receipt of the Ack message in response to the HO request in Step ST4407, the S-eNB determines to cancel the shortened TTI for the LR-UE in Step ST4408.

In Step ST4409 of FIG. 51, the S-eNB that has determined to cancel the shortened TTI for the LR-UE notifies the LR-UE of cancelation of the shortened TTI. The S-eNB notifies the LR-UE of cancelation of the shortened TTI together with instruction of executing the HO through the RRC message including the MCI.

In Step ST4410, the LR-UE cancels the settings of the shortened TTI, and restores the conventional TTI settings. Thus, the LR-UE operates with the conventional TTI in the processes of the following steps.

In Step ST4411, the LR-UE initiates a change in connection from the S-eNB to the T-eNB.

In Step ST4412, the LR-UE executes a synchronization process with the T-eNB to execute an RA process. Here, the LR-UE and the T-eNB executes the process in TTI=1 subframe that is the conventional TTI.

Upon completion of the connection with the T-eNB through the processes of Steps ST4410, ST4411, and ST4412, the LR-UE notifies the T-eNB of an RRC Connection Reconfiguration Complete message in Step ST4413. Here, the LR-UE and the T-eNB execute the process in TTI=1 subframe that is the conventional TTI.

In Step ST4414, the LR-UE, the S-eNB, the T-eNB, the MME, and the S-GW perform the HO process (see Non-Patent Document 1).

After completion of the HO process, the LR-UE and the T-eNB perform communication in Step ST4415. The LR-UE and the T-eNB communicate with each other in TTI=1 subframe that is the conventional TTI.

Upon execution of the HO process for the LR-UE, when the T-eNB does not support the shortened TTI due to cancelation of the shortened TTI set to the LR-UE, and even when the T-eNB supports the shortened TTI but cannot set the TTI due to a load state of a cell, the LR-UE and the T-eNB can communicate with each other using the conventional TTI. Thus, the LR-UE can continue the connected state.

In the aforementioned method, the S-eNB determines cancelation of the shortened TTI and notifies it to the LR-UE subjected to the HO. Another method will be disclosed.

The T-eNB determines whether to cancel the shortened TTI for the LR-UE subjected to the HO.

The S-eNB notifies the T-eNB of the TTI information set to the LR-UE subjected to the HO. The TTI information may be notified when the shortened TTI is set. The set TTI information may be the TTI configuration information. The set TTI information may be a TTI type. X2 signaling may be used for the notification. S1 signaling via the MME may be used for the notification. Such information may be notified together with the HO request message of the LR-UE that is notified from the S-eNB to the T-eNB. The HO request message including such information may be notified. Such information may be included in, for example, the HO request message in Step ST4405 of FIG. 50.

Consequently, the T-eNB can recognize the TTI configuration information set to the LR-UE requesting the HO.

The T-eNB that has obtained the TTI configuration information set to the LR-UE determines whether the TTI set to the LR-UE can be continued in the own cell. The T-eNB may determine it in the admission control performed in Step ST4406 of FIG. 50.

When the T-eNB determines that the TTI set to the LR-UE cannot be continued in the own cell, the T-eNB determines to cancel the settings of the shortened TTI for the LR-UE. The T-eNB notifies the LR-UE of cancelation of the settings of the shortened TTI.

An example of the notification method will be disclosed. The T-eNB notifies the S-eNB of cancelation of the settings of the shortened TTI for the LR-UE. The T-eNB may notify the cancelation together with the Ack message in response to the HO request in Step ST4407 of FIG. 50, or notify the Ack message including the cancelation.

Upon notification from the T-eNB of cancellation of the settings of the shortened TTI for the LR-UE subjected to the HO, the S-eNB notifies the LR-UE of cancellation of the settings of the shortened TTI. The S-eNB may notify the cancellation together with the RRC Connection Reconfiguration message including the HO instruction in Step ST4409 of FIG. 51, or notify the RRC Connection Reconfiguration message including the cancellation.

Upon notification from the S-eNB of cancelation of the settings of the shortened TTI, the LR-UE cancels the settings of the shortened TTI, and restores the conventional TTI settings. The LR-UE operates with the conventional TTI in the following HO processes.

Consequently, in performing the HO of the LR-UE, the T-eNB can determine whether to cancel the shortened TTI for the LR-UE subjected to the HO. When the T-eNB cannot maintain the connection to the LR-UE with the shortened TTI, the T-eNB can notify the LR-UE of cancelation of the settings of the shortened TTI. Upon notification of the cancelation of the shortened TTI settings according to the determination by the T-eNB, the LR-UE can cancel the settings of the shortened TTI, and operate with the conventional TTI in the following HO processes. The LR-UE and the T-eNB can perform communication using the conventional TTI. Thus, the LR-UE can continue the connected state.

As described above, the sixteenth embodiment discloses that the T-eNB determines to cancel the settings of the shortened TTI for the LR-UE when determining that the TTI set to the LR-UE cannot be continued in the own cell.

A case where the T-eNB determines that the TTI set to the LR-UE can be continued in the own cell will be disclosed. The T-eNB notifies the LR-UE of continuation of the TTI settings.

An example of the notification method will be disclosed. The T-eNB notifies the S-eNB of continuation of the TTI settings for the LR-UE. The T-eNB may notify the continuation together with the Ack message in response to the HO request in Step ST4407 of FIG. 50, or notify the Ack message including the continuation. Information for instructing the continuation of the TTI settings may be provided, included in the message, and notified. Alternatively, the TTI configuration information and the TTI type to be continued may be included in the message.

Upon notification from the T-eNB of continuation of the TTI settings for the LR-UE subjected to the HO, the S-eNB notifies the LR-UE of continuation of the TTI settings. The S-eNB may notify the continuation together with the RRC Connection Reconfiguration message including the HO instruction in Step ST4409 of FIG. 51, or notify the RRC Connection Reconfiguration message including the continuation. Information for instructing the continuation of the TTI settings may be provided, included in the message, and notified. Alternatively, the TTI configuration information and the TTI type to be continued may be included in the message.

Upon notification from the S-eNB of continuation of the TTI settings, the LR-UE continues the TTI settings. The LR-UE continues to operate with the TTI settings in the following HO processes.

As an alternative method performed by the S-eNB for notifying the LR-UE of continuation of the TTI settings, the S-eNB may not instruct the LR-UE to change the settings of the TTI configuration. Without any instruction for changing the settings of the TTI configuration given in performing the HO, the LR-UE continues to operate with the TTI settings.

Consequently, the T-eNB can notify the LR-UE of continuation of the TTI settings when the connection in the TTI that is set for connection with the S-eNB can be continued. Upon notification of continuation of the TTI settings according to the determination by the T-eNB, the LR-UE can continue the TTI settings, and continue to operate with the TTI settings in the following HO processes. During the HO, communication between the LR-UE and the S-eNB and between the LR-UE and the T-eNB in the continued TTI can be performed. Thus, the LR-UE can continue the connected state while maintaining the TTI settings.

As described above, the sixteenth embodiment discloses that upon obtaining the TTI configuration information set to the LR-UE, the T-eNB determines, using the information, whether the TTI set to the LR-UE can be continued in the own cell.

The T-eNB may determine to set a TTI configuration to the LR-UE. A method performed by the T-eNB for setting the TTI configuration to the LR-UE will be disclosed.

The S-eNB notifies the T-eNB of the information on plural TTIs obtained from the LR-UE and supported by the LR-UE. The method disclosed in the second modification of the eleventh embodiment may be applied as a method performed by the S-eNB for obtaining the information on plural TTIs supported by the LR-UE. As a notification method from the S-eNB to the T-eNB, the information on plural TTIs may be notified together with the HO request message in Step ST4405 of FIG. 50, or the HO request message including the information on plural TTIs may be notified. Consequently, the T-eNB can recognize the TTI configuration supported by the LR-UE subjected to the HO.

The T-eNB determines the settings of the TTI configuration for the LR-UE. The T-eNB determines the settings of the TTI configuration for the LR-UE in consideration of a support situation of the TTI configuration in the own cell, a load state of a cell, and a kind of a service, etc. The method disclosed in the first modification of the eleventh embodiment may be applied as the judgment indicators. The S-eNB may notify, in advance, the T-eNB of the indicators necessary for making the judgment. The S-eNB may notify the indicators, for example, together with the information on plural TTIs supported by the LR-UE. The TTI configuration information set to the S-eNB may be notified.

The T-eNB can determine the appropriate settings of the TTI configuration for the LR-UE, using these indicators. The TTI configuration may not be the one set to the S-eNB.

The T-eNB notifies the LR-UE of the settings of the TTI configuration. An example of the notification method will be disclosed. The T-eNB notifies the S-eNB of the TTI settings of the LR-UE. The TTI configuration information to be set may be notified. The T-eNB may notify the settings together with the Ack message in response to the HO request in Step ST4407 of FIG. 50, or to notify the Ack message including the settings.

Upon notification from the T-eNB of the TTI settings for the LR-UE subjected to the HO, the S-eNB notifies the LR-UE of the TTI settings. The TTI configuration information to be set may be notified. The S-eNB may notify the settings together with the RRC Connection Reconfiguration message including the HO instruction in Step ST4409 of FIG. 51, or notify the RRC Connection Reconfiguration message including the settings.

Upon notification from the S-eNB of the TTI settings, the LR-UE switches to the notified TTI configuration. The LR-UE operates with the notified TTI configuration in the following HO processes.

This enables the T-eNB to notify the LR-UE of the TTI settings set by the T-eNB. Upon notification of the TTI settings according to the determination by the T-eNB, the LR-UE can operate with the notified TTI settings in the following HO processes. During the HO, the LR-UE and the T-eNB can communicate with each other with the TTI configuration set by the T-eNB to be a HO destination. The LR-UE can communicate with the T-eNB while maintaining the connected state with the appropriate TTI configuration.

The methods disclosed in the sixteenth embodiment may be appropriately combined. The settings of the TTI configuration per RB configured in the LR-UE may be, for example, canceled, maintained, and changed every RB. For example, the settings of the TTI configuration in the S-eNB are maintained for a predetermined DRB, whereas the settings of the TTI configuration in the S-eNB are canceled for another predetermined DRB.

With such appropriate combinations, communication between the LR-UE and the T-eNB can be controlled more minutely and efficiently.

Seventeenth Embodiment

The DRX in a connected state is set per TTI. Conventionally, the DRX is set per TTI=1 subframe that is the conventional TTI. Thus, the conventional DRX cannot be set to the LR-UE operating with the shortened TTI.

The DRX of the LR-UE in a connected state may be set per shortened TTI. When the shortened TTI is, for example, TTI=1 slot, the DRX may be set per slot. The DRX may be set with the number of slots to which the PDCCH of the LR-UE is mapped.

Examples of the DRX setting parameter include "DRX-Cycle" representing a DRX period, "drxStartOffset" representing a start offset, "onDurationTimer" representing an ON duration, "drx-InactivityTimer" representing a DRX inactivity duration, and "drx-RetransmissionTimer" representing a DRX retransmission duration. The conventional methods may be applied to a method for notifying the DRX settings.

Consequently, the DRX can be set to the LR-UE operating with the shortened TTI. The LR-UE operating with the shortened TTI can perform the DRX.

The DRX can be set to the LR-UE operating with the plurality of TTIs every TTI. Consequently, the DRX can be flexibly controlled every TTI.

However, the individual settings of the DRX per TTI as mentioned in the previous methods may cause different ON timings of the DRX of the respective TTIs. Here, the UE has to perform reception with the respective ON timings of the TTIs, and cannot eventually obtain the advantages of the DRX in the reception operations of the UE.

A method for solving such problems will be disclosed. The eNB sets the DRX of each of the TTIs so that the ON durations of the DRX of the TTIs overlap one another. For example, subframes #1 and #2 are assumed to be DRX ON durations under the conventional TTI. Under the shortened TTI, slots #0 and #1 in the subframe #1 and slots #2 and #3 in the subframe #2 may be DRX ON durations. Overlapping the DRX ON durations in the plurality of TTIs can produce the advantages of the DRX in the reception operations of the UE.

The eNB may set the other DRX setting parameters of each of the TTIs so that the respective timings overlap one another. This setting can further produce the advantages of the DRX in the reception operations of the UE.

The parameters may be set per subframe to overlap the DRX setting parameters of the conventional TTI. The LR-UE may convert the parameters set per subframe into parameters per TTI, for example, per slot or per symbol.

Consequently, the DRX can be set to the LR-UE in a connected state. The LR-UE can obtain the advantages of the DRX.

Although the seventeenth embodiment discloses the DRX setting parameters, a similar method may be applied to the other setting parameters as necessary. When the parameters set per subframe in the conventional TTI operate with the shortened TTI, the parameters may be settable per shortened TTI.

Consequently, even when the LR-UE operates with the shortened TTI, the LR-UE can be minutely controlled.

Eighteenth Embodiment

The previous embodiment discloses coexistence of the conventional TTI configuration and the shortened TTI configuration in 1 subframe.

The eighteenth embodiment will disclose another coexistence method. The conventional TTI configuration and the shortened TTI configuration coexist through time-division multiplexing per subframe. A subframe with the conventional TTI configuration and a subframe with the shortened TTI configuration are time-division multiplexed.

The eNB may notify the UEs being served thereby of respective structures of the subframe with the conventional TTI configuration and the subframe with the shortened TTI configuration. The eNB may notify the UEs being served thereby of only the structure of the subframe with the shortened TTI configuration. The method for notifying an almost blank subframe (ABS) may be applied to a method for notifying the respective structures of the subframe with the conventional TTI configuration and the subframe with the shortened TTI configuration from the eNB to the UEs being served thereby. Alternatively, the method for notifying the MBSFN subframe may be applied thereto.

Consequently, both the legacy UE and the LR-UE can recognize which subframe has the conventional TTI configuration or which subframe has the shortened TTI configuration.

The eNB may set a subframe to which the SS, the PBCH, and a paging are mapped with the conventional TTI configuration.

The eNB may set an ABS and set a subframe with the shortened TTI configuration to the ABS. The ABS has no conventional PDCCH region, and only the CRS is mapped to the ABS. The PDSCH of the legacy UE is not mapped to the ABS. Thus, the PDCCH for the LR-UE is easily mapped to the physical resources. A physical channel for the LR-UE is easily mapped to the physical resources.

In both the downlink HARQ and the uplink HARQ, subframes with a desired TTI configuration may not be generated depending on the timing. In both the downlink HARQ and the uplink HARQ, only the subframes with the desired TTI configuration may be counted to determine the timing.

Under the conventional TTI configuration, only the subframes with the conventional TTI configuration are counted to determine the timing of Ack/Nack. Under the shortened TTI configuration, only the subframes with the shortened TTI configuration are counted to determine the timing of Ack/Nack.

The asynchronous HARQ may be applied to both the downlink HARQ and the uplink HARQ as an alternative method of the HARQ. The timing of Ack/Nack is not fixed but determined by scheduling. The Ack/Nack can be scheduled according to the TTI configuration per subframe set by the eNB.

Even in time-division multiplexing the subframe with the conventional TTI configuration and the subframe with the shortened TTI configuration, the HARQ can be performed for both the legacy UE and the LR-UE. Thus, the communication quality can be improved by the HARQ.

First Modification of Eighteenth Embodiment

In TDD, a new DL-UL configuration may be provided within one subframe. A DL duration and a UL duration may be provided within one subframe. A duration corresponding to a conventional special subframe may be provided. Alternatively, special symbols may be provided.

When the shortened TTI is, for example, TTI=1 slot, the first slot of one subframe may be configured as a DL slot, and the second slot thereof may be configured as a UL slot.

The special symbols may be configured using at least one of (i) one or more symbols from the end of the DL slot and (ii) one or more symbols from the beginning of the UL slot.

The CRS may be configured only in a DL slot or a DL symbol. The CRS needs not be configured in a UL slot or a UL symbol.

In TDD, both DL and UL durations corresponding to the shortened TTI can be configured in one subframe.

The eNB notifies the UEs being served thereby of a subframe configuration including the new DL-UL configuration. The legacy UE may not be scheduled in the subframe. The LR-UE may be scheduled in the subframe.

The TTI configuration information may include the subframe configuration. The method for notifying the TTI configuration information may be applied as a method for notifying the subframe configuration. The method for notifying the ABS may also be applied as a method for notifying the subframe configuration. Alternatively, the method for notifying the MBSFN subframe may be applied thereto.

Consequently, both the legacy UE and the LR-UE can recognize which subframe has the new DL-UL configuration.

The eNB may set an ABS and set the new DL-UL configuration to the ABS. The ABS has no conventional PDCCH region, and only the CRS is mapped to the ABS. The CRS of the ABS to which the new DL-UL configuration is set may be configured only in a DL slot or a DL symbol. The CRS needs not be configured in a UL slot or a UL symbol.

Consequently, the DL and UL durations can be provided in a conventional DL subframe or a conventional UL subframe. Thus, data can be transmitted and received to and from the LR-UE in the shortened TTI. Moreover, latency can be reduced, and the data transmission rate can be improved.

The eNB may set an MBSFN subframe and a new DL-UL configuration of the MBSFN subframe. The MBSFN subframe has no conventional PDSCH region, and the CRS is not mapped to the region. When the shortened TTI is, for example, TTI=1 slot, the first slot of one MBSFN subframe may be configured as a DL slot, and the second slot thereof may be configured as a UL slot. The special symbols may be configured using at least one of (i) one or more symbols from the end of the DL slot and (ii) one or more symbols from the beginning of the UL slot. The CRS may be configured only in a DL slot or a DL symbol. The CRS needs not be configured in a UL slot or a UL symbol.

Consequently, both DL and UL durations corresponding to the shortened TTI can be configured in one MBSFN subframe.

Since the DL and UL durations can be provided in a conventional DL subframe or a conventional UL subframe, data can be transmitted and received to and from the LR-UE in the shortened TTI. Moreover, latency can be reduced, and the data transmission rate can be improved.

Providing a new DL-UL configuration in one subframe and setting different DL-UL configurations between cells may cause a problem with interference between the cells. To solve such a problem, the eNB having the cell with the new DL-UL configuration in one subframe may notify surrounding eNBs of the set new DL-UL configuration. The set new DL-UL configuration may be notified using X2 signaling. Alternatively, the set new DL-UL configuration may be notified using S1 signaling via an MME.

Consequently, each of the surrounding eNBs can set the DL-UL configuration in the own cell in consideration of the new DL-UL configuration.

As an alternative method, a network side node or an operation administration and maintenance (OAM) may set a new DL-UL configuration and notify one or more eNBs of the new DL-UL configuration. The network node may notify the eNB that will be troubled by interference in using a different DL-UL configuration that the same DL-UL configuration is to be set.

Adjustment between the eNBs can reduce the interference between the cells.

Second Modification of Eighteenth Embodiment

The second modification will disclose another coexistence method. The conventional TTI configuration and the shortened TTI configuration are set every component carrier. A component carrier with the conventional TTI configuration and a component carrier with the shortened TTI configuration are provided, and carrier aggregation (CA) is implemented. The component carrier with the conventional TTI configuration may be used as a PCell, and the component carrier with the shortened TTI configuration may be used as a SCell.

The eNB sets the SCell with the shortened TTI configuration to the LR-UE in a connected state, and implements CA. The eNB may notify the LR-UE of information on the shortened TTI configuration of the component carrier configured as the SCell. The eNB may notify the information together with the configuration information of the SCell or the configuration information of the SCell including the information.

The LR-UE implements CA using the configuration information of the SCell and the information on the shortened TTI configuration of the SCell. The LR-UE may implement CA in the uplink on the SCell using the component carrier with the shortened TTI configuration. The eNB can easily control the scheduling and the timing of the HARQ, etc. using the same component carrier with the same shortened TTI configuration in both the uplink and the downlink.

Consequently, the eNB and the LR-UE communicate with each other using the conventional TTI and the shortened TTI. Thus, the high-speed transmission of data becomes possible between the eNB and the LR-UE.

Not the component carrier with the shortened TTI configuration but only the component carrier with the conventional TTI configuration may be used for the legacy UE. Consequently, the legacy UE and the LR-UE can coexist.

Here, the component carrier with the shortened TTI configuration needs not to have the carrier configuration currently supported by the LTE. The component carrier may have different configurations in, for example, symbol length, CP length, subcarrier frequency, and the number of symbols in 1 subframe, etc. Although a duration of a TTI is shortened as the shortened TTI, 1 TTI may be 1 subframe. The duration of the TTI may be shortened. CA is implemented using the component carrier with the conventional TTI configuration and the component carrier with the shortened TTI configuration. Consequently, a future carrier configuration can be flexibly accommodated.

Third Modification of Eighteenth Embodiment

The third modification will disclose another coexistence method. The conventional TTI configuration and the shortened TTI configuration are set every eNB. Dual connectivity (DC) is performed using the eNB having a carrier with the conventional TTI configuration and the eNB having a carrier with the shortened TTI configuration. Non-Patent Document 1 describes the DC that is being studied by 3GPP in Release 12. The eNB having the carrier with the conventional TTI configuration is defined as an MeNB. The MeNB sets the eNB having the carrier with the shortened TTI configuration as the SeNB for the LR-UE in a connected state, and performs DC. The eNB may notify the LR-UE of information on the shortened TTI configuration of the carrier of the SeNB. The eNB may notify the information together with the configuration information of the SeNB or the configuration information of the SeNB including the information. The LR-UE performs DC using the configuration information of the SeNB and the information on the shortened TTI configuration of the carrier of the SeNB.

Consequently, communication is performed between the MeNB and the LR-UE using the conventional TTI, and between the SeNB and the LR-UE using the shortened TTI. Thus, the high-speed transmission of data becomes possible between the SeNB and the LR-UE. Then, the high-speed transmission of data is performed between the network and the LR-UE.

The legacy UE may communicate only using the MeNB having the carrier with the conventional TTI configuration. Alternatively, when the SeNB has a carrier with the conventional TTI configuration, both the MeNB and the SeNB may perform DC using the carrier with the conventional TTI configuration. Consequently, the legacy UE and the LR-UE can coexist.

Although the previous embodiments and the modifications thereof disclose the cases where the conventional TTI is TTI=1 subframe=1 ms under the LTE, the conventional TTI or the base TTI is not limited to such but may have a value of another TTI. A system using the other TTI may be used. The previous embodiments and the modifications thereof are applicable when the shortened TTI is configured by shortening the conventional TTI or the base TTI. For example, the base TTI may be defined as TTI=1 slot, and the shortened TTI may be defined as TTI=1 symbol. Here, the same advantages as those according to the previous embodiments and the modifications thereof can be obtained.

The embodiments and the modifications thereof are merely illustrations of the present invention and can be freely combined within the scope of the invention. Also, any constituent elements of the embodiments and the modifications thereof can be appropriately modified or omitted. Even when various services are supported, a system with backward compatibility owing to the coexistence with the legacy UE can be configured. Thus, a communication system that can shorten the latency and improve the data transmission rate can be provided.

While the invention has been described in detail, the foregoing description is in all aspects illustrative and not restrictive. It is therefore understood that numerous modifications and variations can be devised without departing from the scope of the invention.

DESCRIPTION OF REFERENCES 40, 41, 42, 51, 52 symbol, 50 conventional PDCCH region, 701 coverage of macro eNB (macro cell), 702 coverage of small eNB (small cell), 703 user equipment (UE).

The invention claimed is:

1. A communication system comprising a plurality of communication terminal devices, and a base station device capable of radio communication with each of the plurality of communication terminal devices,
   wherein the plurality of communication terminal devices include a first communication terminal device whose Transmission Time Interval with the base station device is set to 1 subframe, and a second communication terminal device whose Transmission Time Interval is set shorter than 1 subframe,
   a shared channel of the first communication terminal device, to which data is mapped, is mapped to physical resources per subframe, and
   a shared channel of the second communication terminal device is mapped, per physical resource block included in the subframe, to a region of the physical resources to which the shared channel of the first communication terminal device is mapped, wherein
   the shared channel of the first communication terminal device is mapped to the physical resources per physical resource block pair including two of the physical resource blocks, and
   the shared channel of the second communication terminal device is mapped to remaining physical resources excluding the physical resource block pairs to which the shared channel of the first communication terminal device is mapped, and
   a control channel of the second communication terminal device to which control information is mapped is mapped to the physical resource block per symbol included in the physical resource block.

2. The communication system according to claim 1,
   wherein the first communication terminal device is scheduled per subframe, and the second communication terminal device is scheduled per unit compatible with the Transmission Time Interval.

* * * * *